(12) United States Patent
Bugno et al.

(10) Patent No.: US 8,559,092 B2
(45) Date of Patent: *Oct. 15, 2013

(54) VEHICULAR REARVIEW MIRROR ELEMENTS AND ASSEMBLIES INCORPORATING THESE ELEMENTS

(75) Inventors: Mark D. Bugno, Stevensville, MI (US); William L. Tonar, Holland, MI (US); George A. Neuman, Holland, MI (US); Danny L. Minikey, Jr., Fenwick, MI (US); John S. Anderson, Holland, MI (US); David L. Poll, Holland, MI (US); Joel A. Stray, Hudsonville, MI (US); Bradley L. Busscher, Grand Rapids, MI (US); Kenton J. Ypma, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,700

(22) Filed: Mar. 27, 2012

(65) Prior Publication Data

US 2012/0236387 A1  Sep. 20, 2012

Related U.S. Application Data

(63) Continuation of application No. 12/832,838, filed on Jul. 8, 2010, now Pat. No. 8,169,684, which is a
(Continued)

(51) Int. Cl.
*G02F 1/153* (2006.01)
*G02B 5/08* (2006.01)
*B60Q 1/26* (2006.01)

(52) U.S. Cl.
USPC ........... 359/265; 359/267; 359/268; 359/269; 359/270; 359/272; 359/273; 359/274; 359/601; 359/602; 359/603; 359/604; 362/494; 362/514; 362/516

(58) Field of Classification Search
USPC .......... 359/265–274, 601–604, 871; 362/494, 362/514, 516
See application file for complete search history.

(56) References Cited

U.S. PATENT DOCUMENTS 3,280,701 A   10/1966  Donnelly et al.
3,837,129 A   9/1974   Losell
(Continued)

FOREIGN PATENT DOCUMENTS

WO    WO 01/01192      1/2001
WO    WO 2011/044312   4/2011
WO    WO 2012/051500   4/2012

OTHER PUBLICATIONS

European Search Report and Written Opinion in European Patent Application No. EP 10184089.0, dated Mar. 31, 2011; 11 pages.
(Continued)

*Primary Examiner* — Evelyn A. Lester
(74) *Attorney, Agent, or Firm* — Quarles & Brady LLP; Yakov Sidorin Esq.

(57) ABSTRACT

The present invention relates to improved electro-optic rearview mirror elements and assemblies incorporating the same. Area of the effective field of view of the electro-optic mirror element substantially equals to that defined by the outermost perimeter of the element.

38 Claims, 99 Drawing Sheets

Related U.S. Application Data

(63) continuation-in-part of application No. 12/750,357, filed on Mar. 30, 2010, now abandoned, which is a continuation of application No. 12/154,736, filed on May 27, 2008, now Pat. No. 7,719,750, which is a continuation of application No. 11/477,312, filed on Jun. 29, 2006, now Pat. No. 7,379,225, which is a continuation of application No. 11/066,903, filed on Feb. 25, 2005, now Pat. No. 7,372,611, which is a continuation-in-part of application No. 10/260,741, filed on Sep. 30, 2002, now Pat. No. 7,064,882, and a continuation-in-part of application No. 10/430,885, filed on May 6, 2003, now Pat. No. 7,324,261.

(60) Provisional application No. 60/548,472, filed on Feb. 27, 2004, provisional application No. 60/605,111, filed on Aug. 27, 2004, provisional application No. 60/614,150, filed on Sep. 29, 2004.

(56) References Cited

U.S. PATENT DOCUMENTS

| | | | |
|---|---|---|---|
| 4,902,108 | A | 2/1990 | Byker |
| 5,052,163 | A | 10/1991 | Czekala |
| 5,066,112 | A | 11/1991 | Lynam et al. |
| 5,069,535 | A | 12/1991 | Baucke et al. |
| 5,073,012 | A | 12/1991 | Lynam |
| 5,076,673 | A | 12/1991 | Lynam et al. |
| 5,115,346 | A | 5/1992 | Lynam |
| 5,158,638 | A | 10/1992 | Osanami et al. |
| 5,253,109 | A | 10/1993 | O'Farrell et al. |
| 5,379,146 | A | 1/1995 | Defendini |
| 5,421,940 | A | 6/1995 | Cornils et al. |
| 5,448,397 | A | 9/1995 | Tonar |
| 5,649,756 | A | 7/1997 | Adams et al. |
| 5,790,298 | A | 8/1998 | Tonar |
| 5,818,625 | A | 10/1998 | Forgette et al. |
| 5,923,457 | A | 7/1999 | Byker et al. |
| 6,064,508 | A | 5/2000 | Forgette et al. |
| 6,068,380 | A | 5/2000 | Lynn et al. |
| 6,102,546 | A | 8/2000 | Carter |
| 6,170,956 | B1 | 1/2001 | Rumsey et al. |
| 6,195,194 | B1 | 2/2001 | Roberts et al. |
| 6,239,899 | B1 | 5/2001 | DeVries et al. |
| 6,249,369 | B1 | 6/2001 | Theiste et al. |
| 6,317,248 | B1 | 11/2001 | Agrawal et al. |
| 6,407,468 | B1 | 6/2002 | LeVesque et al. |
| 6,407,847 | B1 | 6/2002 | Poll et al. |
| 6,606,183 | B2 | 8/2003 | Ikai et al. |
| 6,614,579 | B2 | 9/2003 | Roberts et al. |
| 6,650,457 | B2 | 11/2003 | Busscher et al. |
| 6,781,738 | B2 | 8/2004 | Kikuchi et al. |
| 6,870,656 | B2 | 3/2005 | Tonar et al. |
| 7,042,616 | B2 | 5/2006 | Tonar et al. |
| 7,184,190 | B2 | 2/2007 | McCabe et al. |
| 7,324,261 | B2 | 1/2008 | Tonar et al. |
| 7,543,947 | B2 | 6/2009 | Varaprasad et al. |
| 7,706,046 | B2 | 4/2010 | Bauer et al. |
| 7,817,020 | B2 | 10/2010 | Turnbull et al. |
| 7,864,399 | B2 | 1/2011 | McCabe et al. |
| 8,169,684 | B2 * | 5/2012 | Bugno et al. ............ 359/265 |
| 2002/0021481 | A1 | 2/2002 | Lin et al. |
| 2011/0176323 | A1 | 7/2011 | Skiver et al. |
| 2011/0181727 | A1 | 7/2011 | Weller et al. |
| 2012/0038964 | A1 | 2/2012 | De Wind et al. |
| 2012/0069444 | A1 | 3/2012 | Campbell et al. |

OTHER PUBLICATIONS

Supplementary European Search Report, in a related application EP 05714035.2-2205, dated Apr. 3, 2009; 6 pages.

Communication pursuant to Article 94(3) EPC, in a related application EP 05714035.2-2205, dated Nov. 19, 2009; 6 pages.

U.S. Appl. No. 12/832,838, filed Mar. 30, 2010, Vehicular Rearview Mirror Elements and Assemblies Incorporating These Elements, Bugno et al.

U.S. Appl. No. 12/563,917, filed Sep. 21, 2009, Vehicular Rearview Mirror Elements and Assemblies Incorporating These Elements, Tonar et al.

U.S. Appl. No. 12/505,458, filed Jul. 17, 2009, Vehicular Rearview Mirror Elements and Assemblies Incorporating These Elements, Tonar et al.

U.S. Appl. No. 12/154,736, filed May 27, 2008, Vehicular Rearview Mirror Elements and Assemblies Incorporating These Elements, Tonar et al.

U.S. Appl. No. 11/477,312, filed Jun. 29, 2006, Vehicular Rearview Mirror Elements and Assemblies Incorporating These Elements, Tonar et al.

U.S. Appl. No. 11/477,242, filed Jun. 29, 2006, Vehicular Rearview Mirror Elements and Assemblies Incorporating These Elements, Tonar et al.

U.S. Appl. No. 11/066,903, filed Feb. 25, 2005, Vehicular Rearview Mirror Elements and Assemblies Incorporating These Elements, Tonar et al.

* cited by examiner

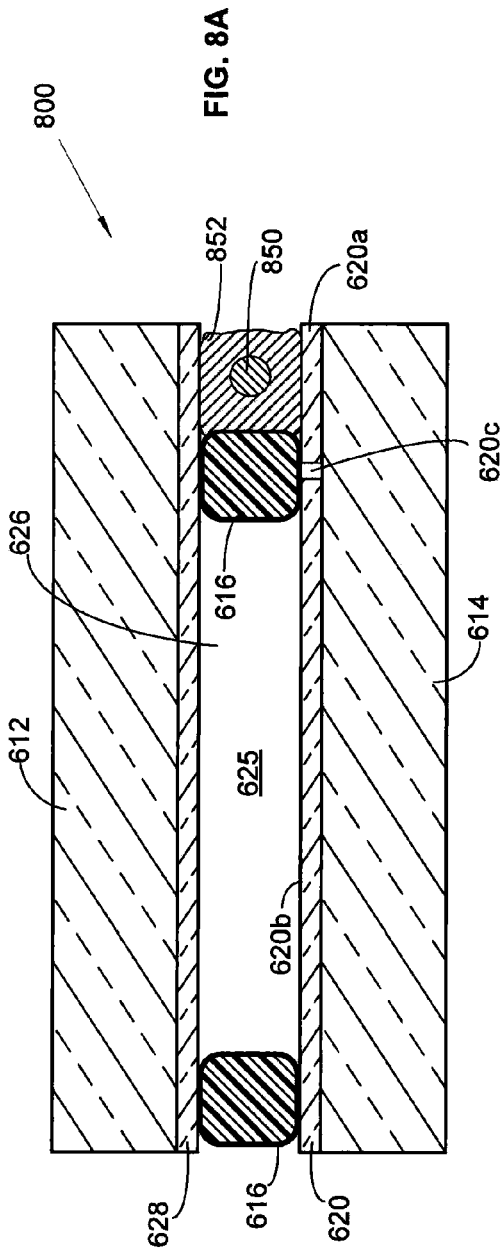
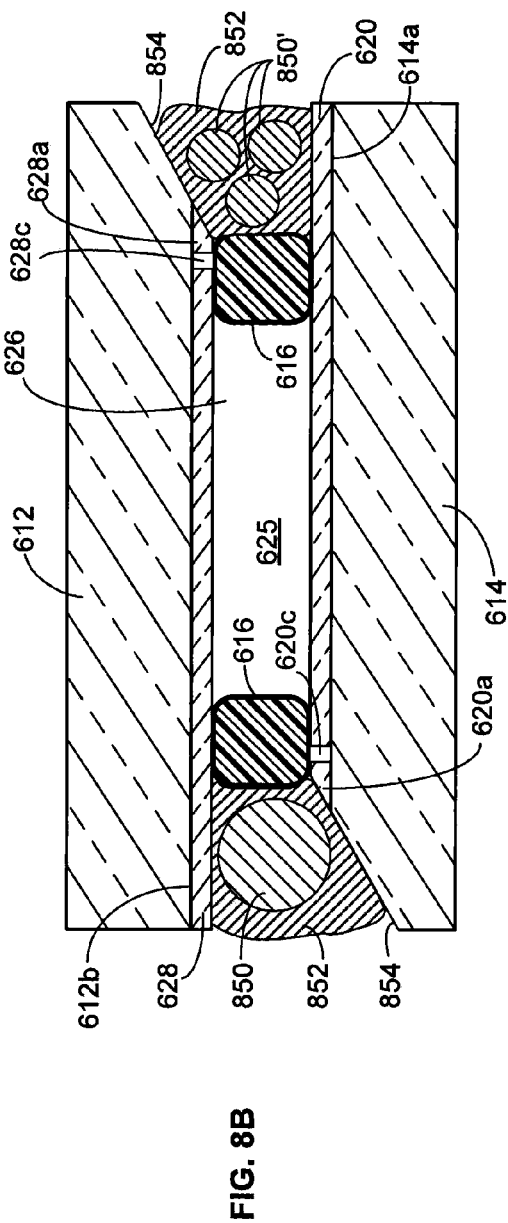

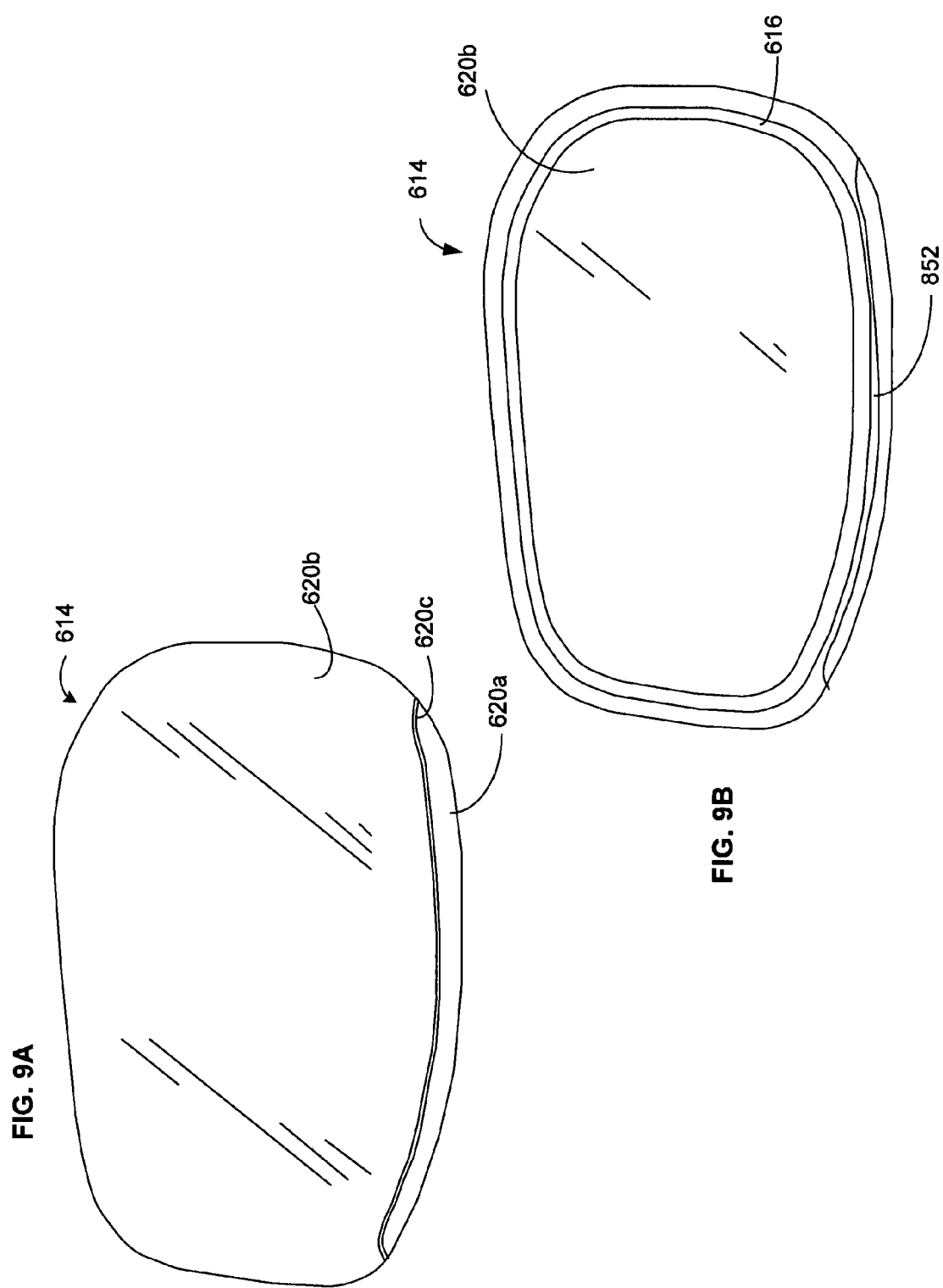

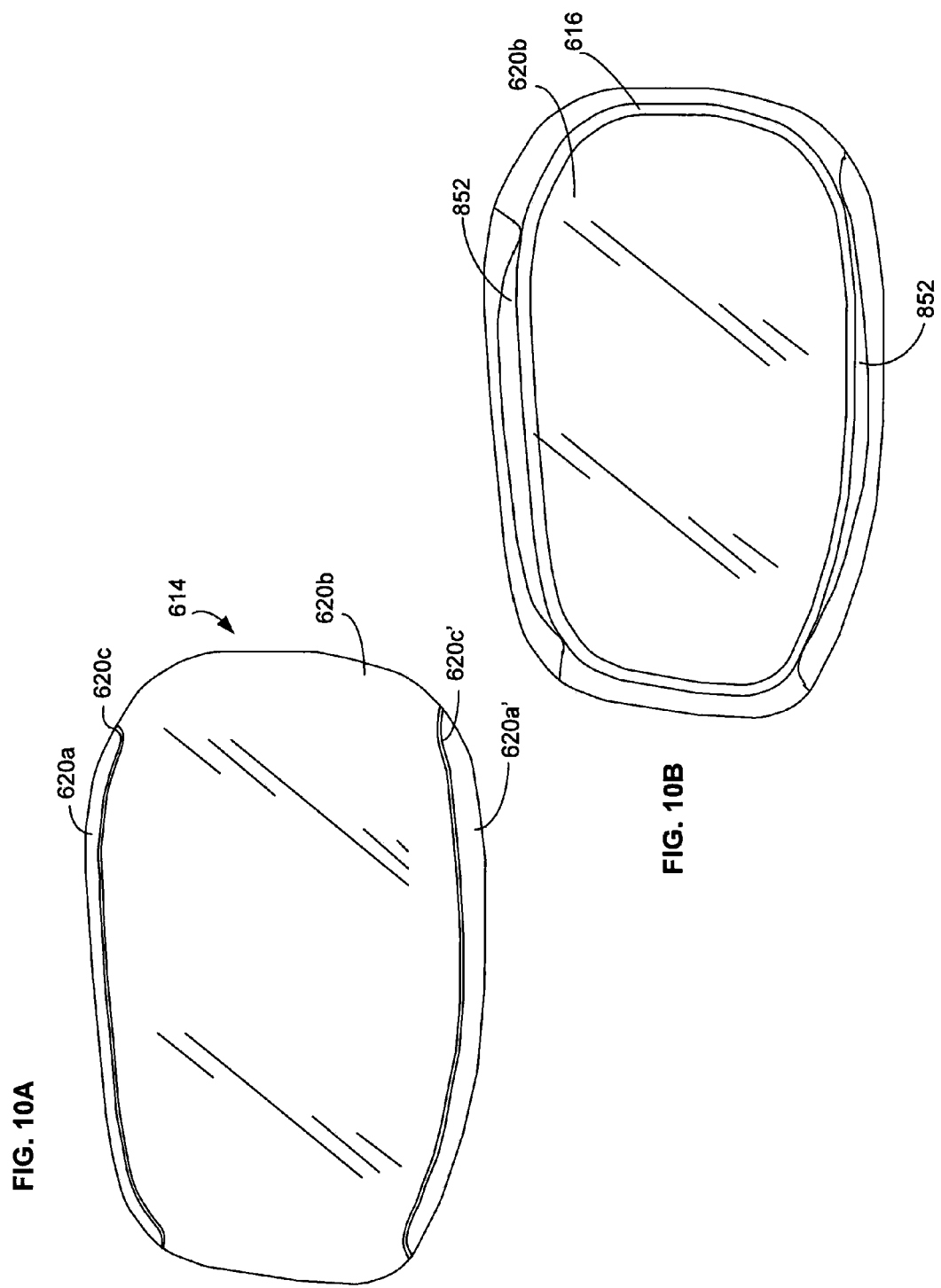

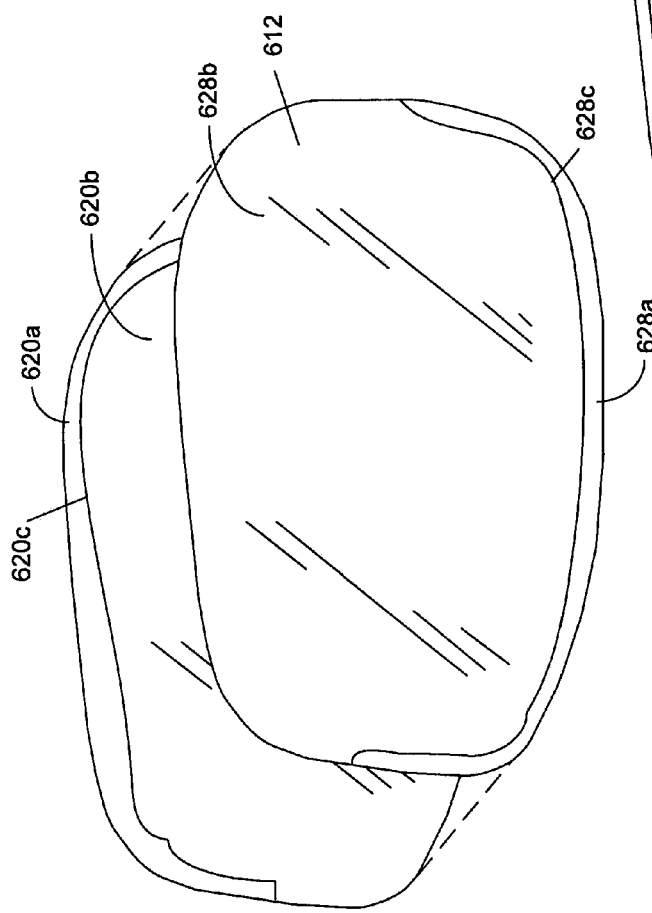
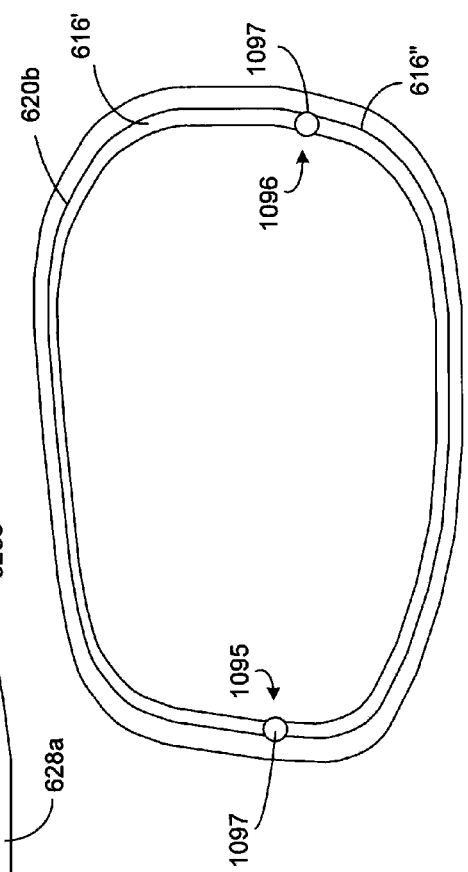
FIG. 10C
FIG. 10D

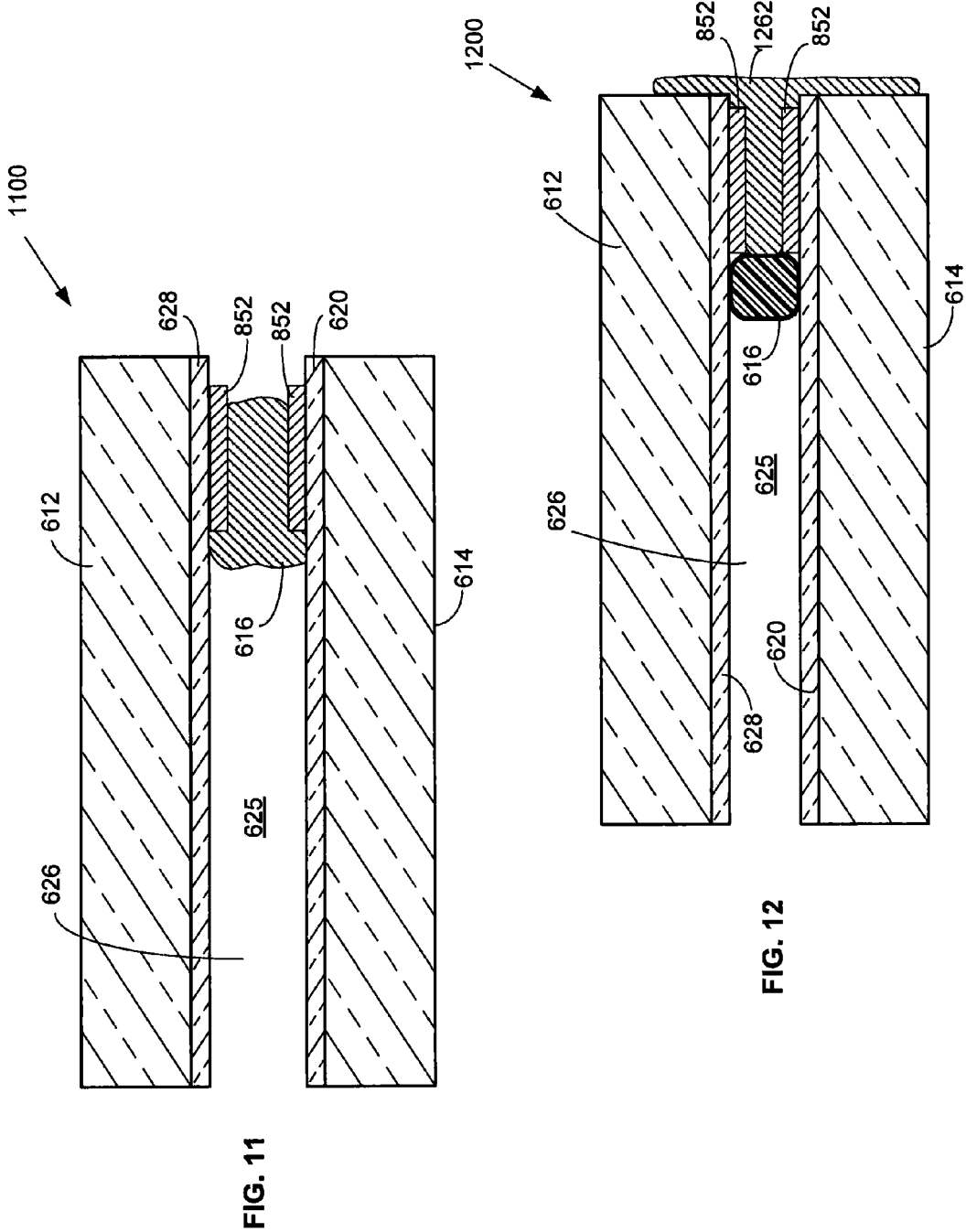

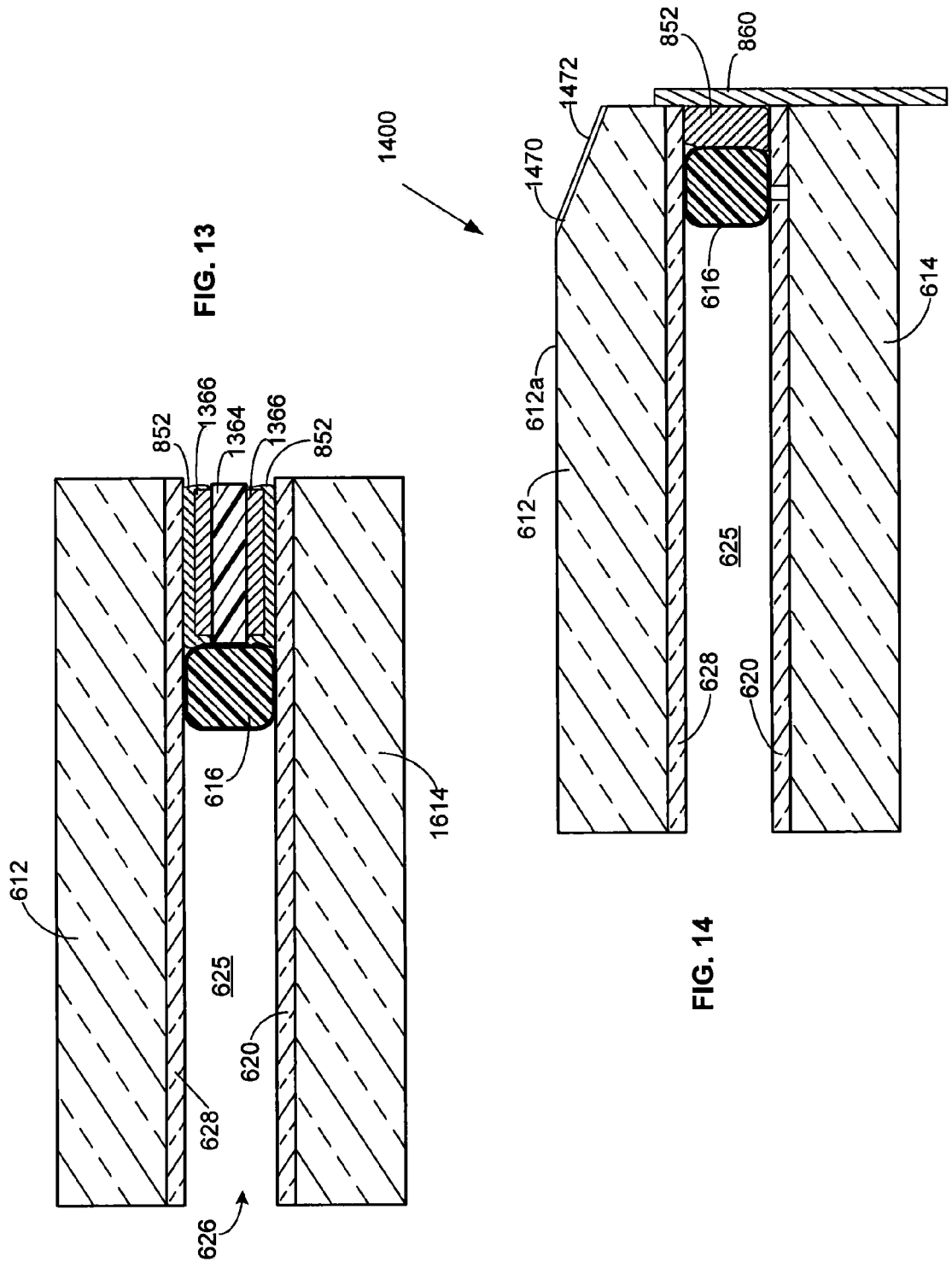

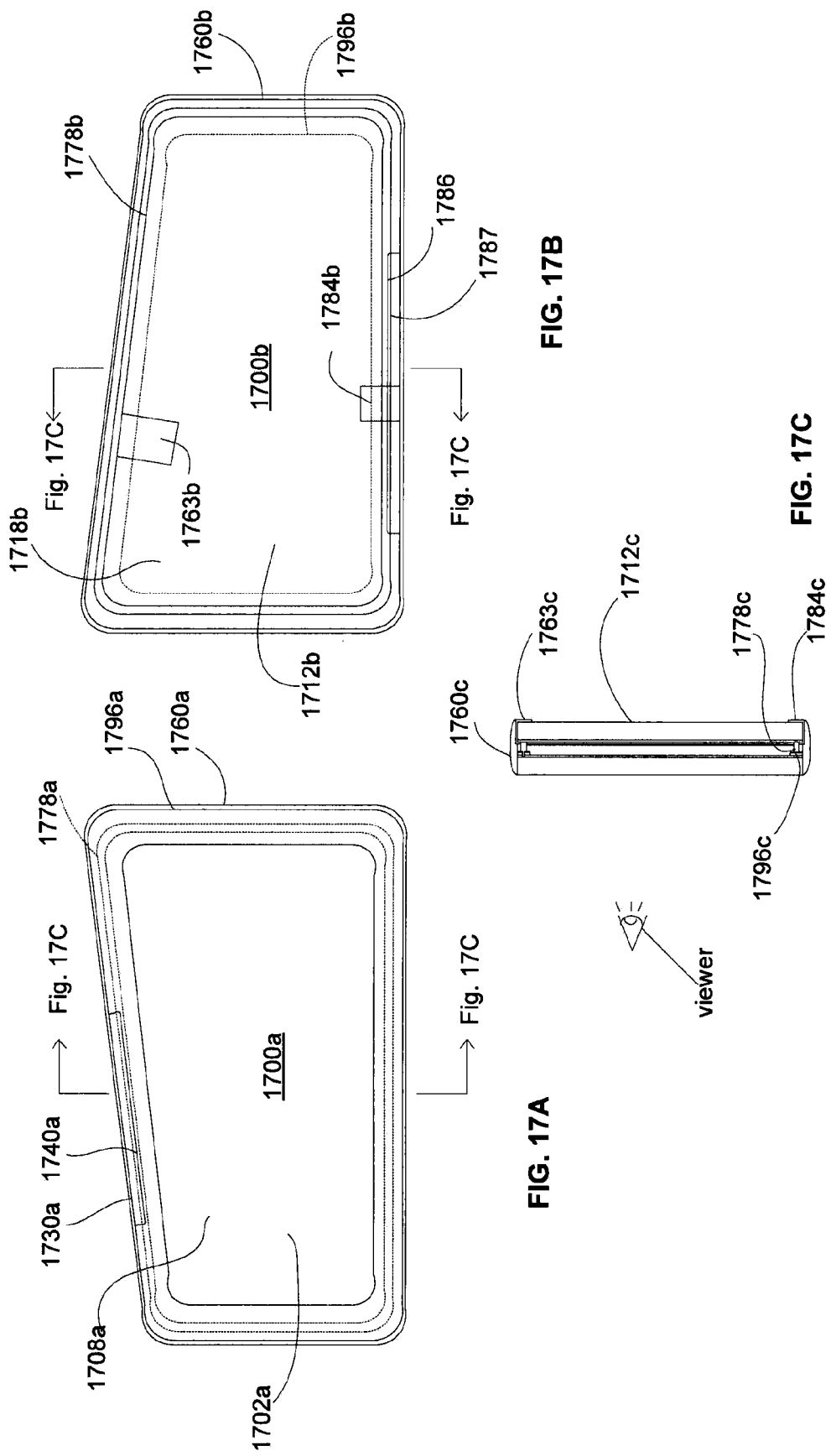

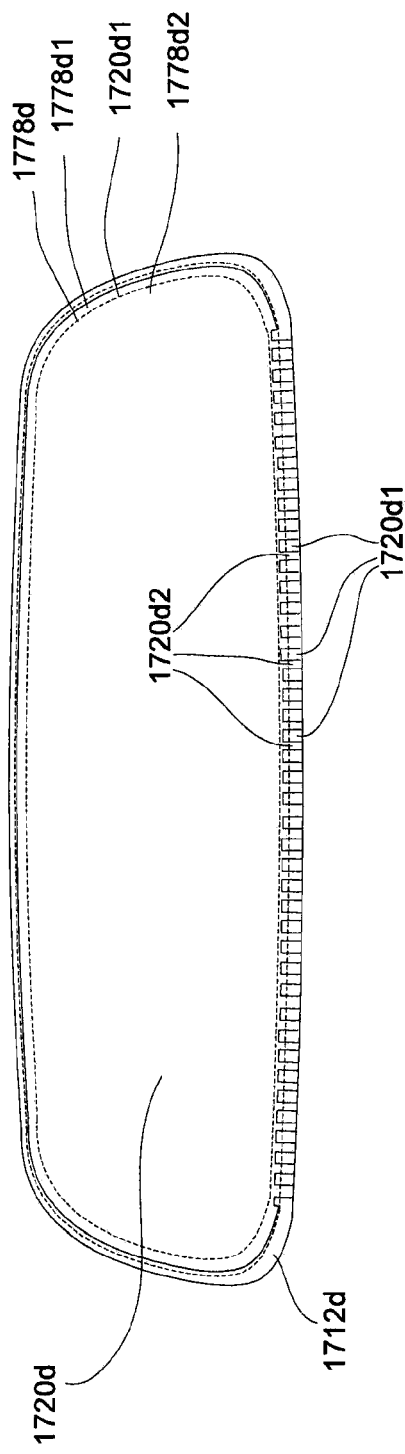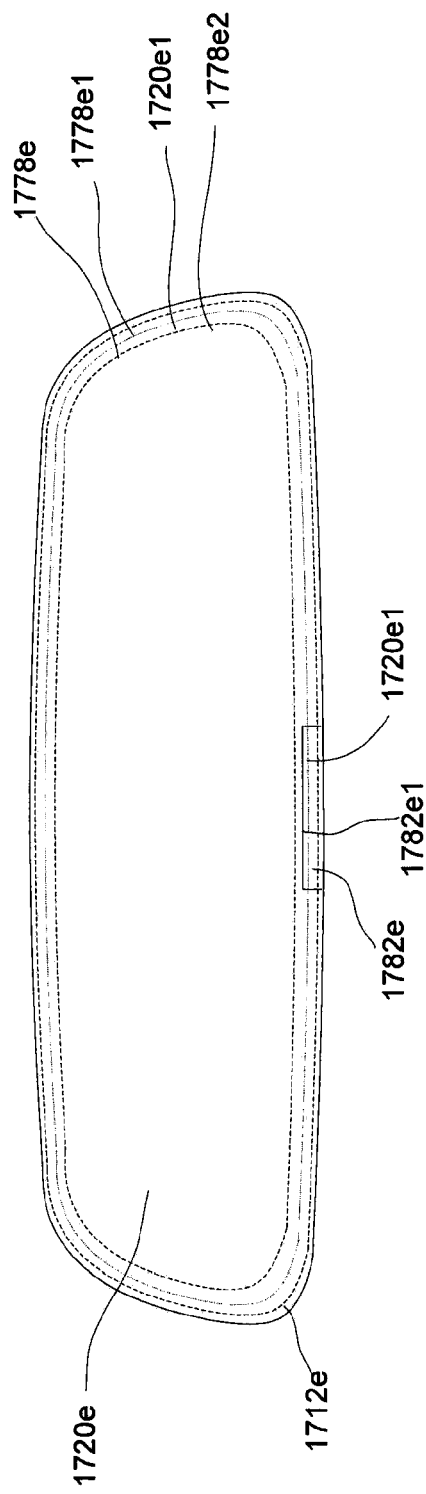

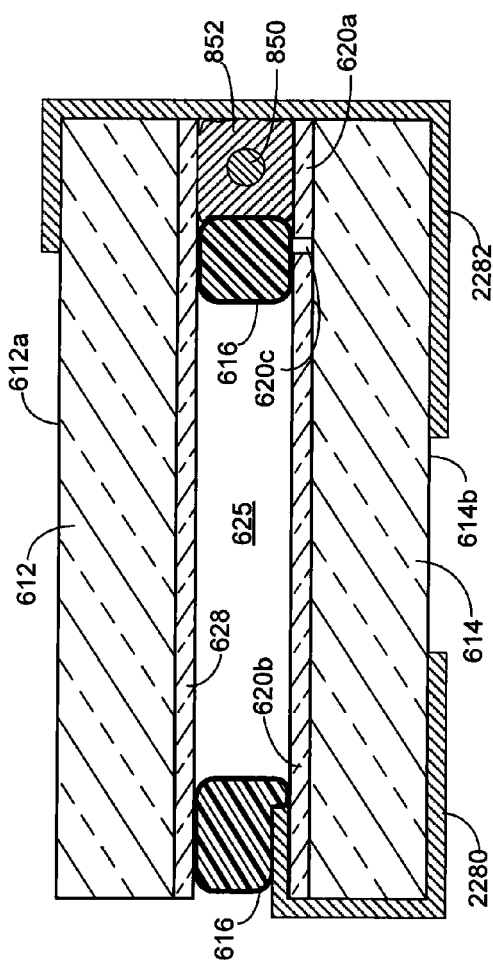
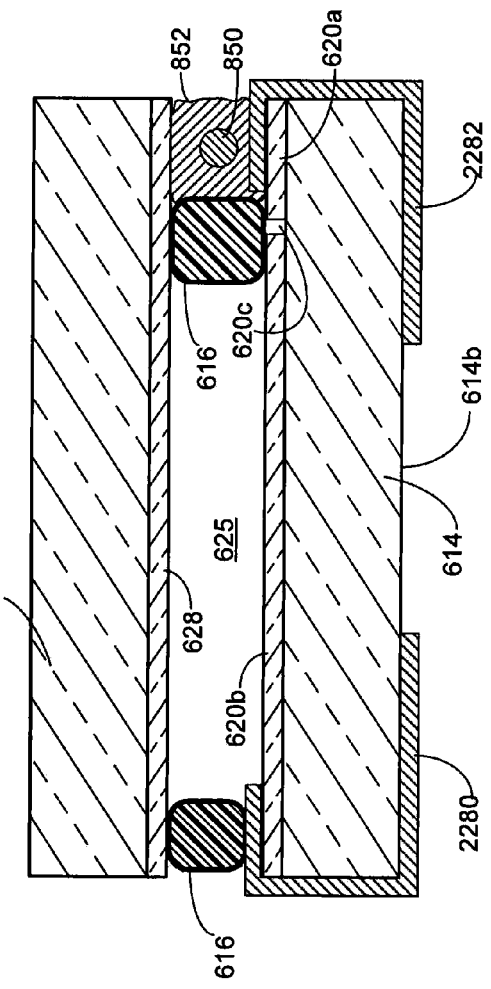
FIG. 22A
FIG. 22B

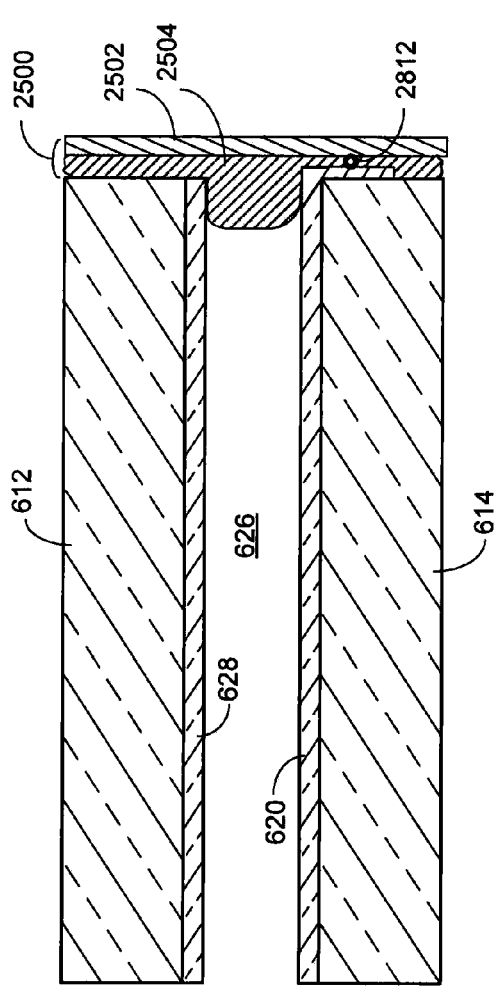
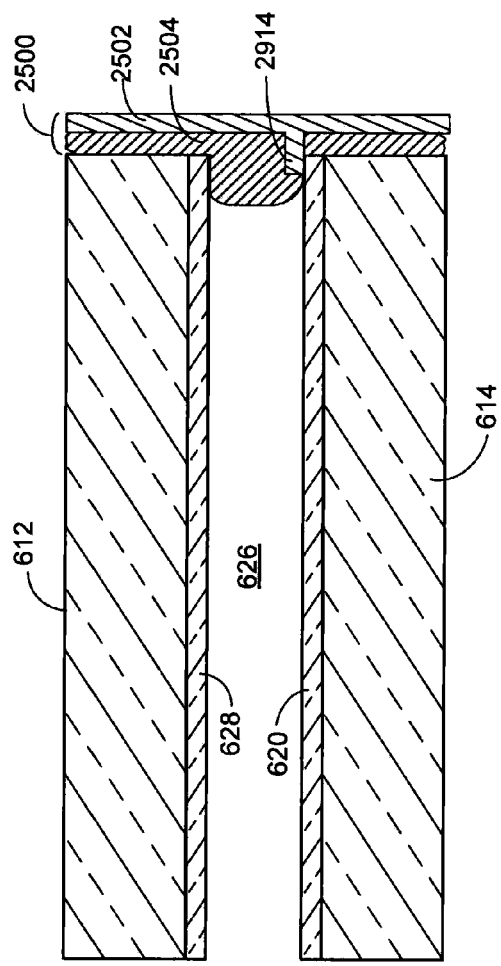
FIG. 28
FIG. 29

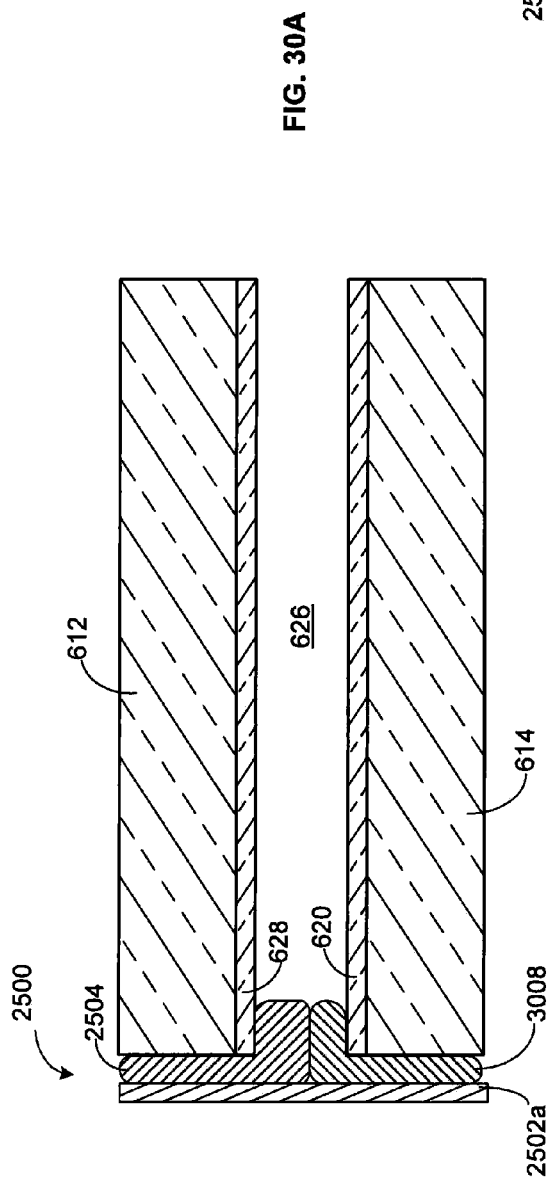
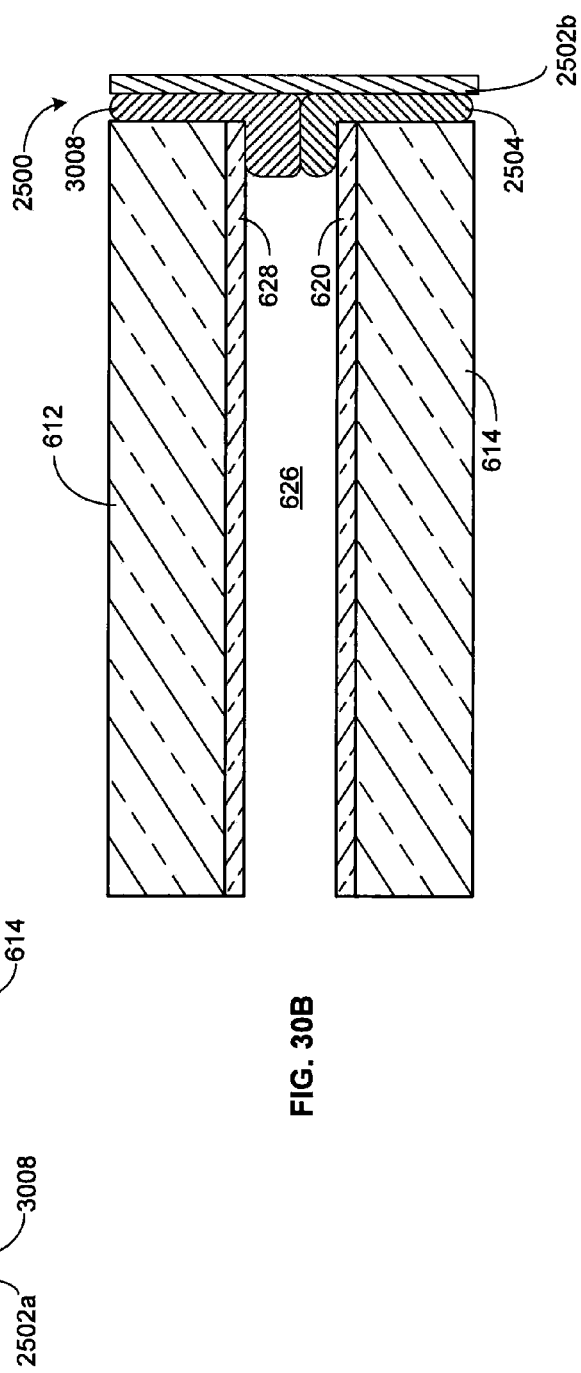
FIG. 30A
FIG. 30B

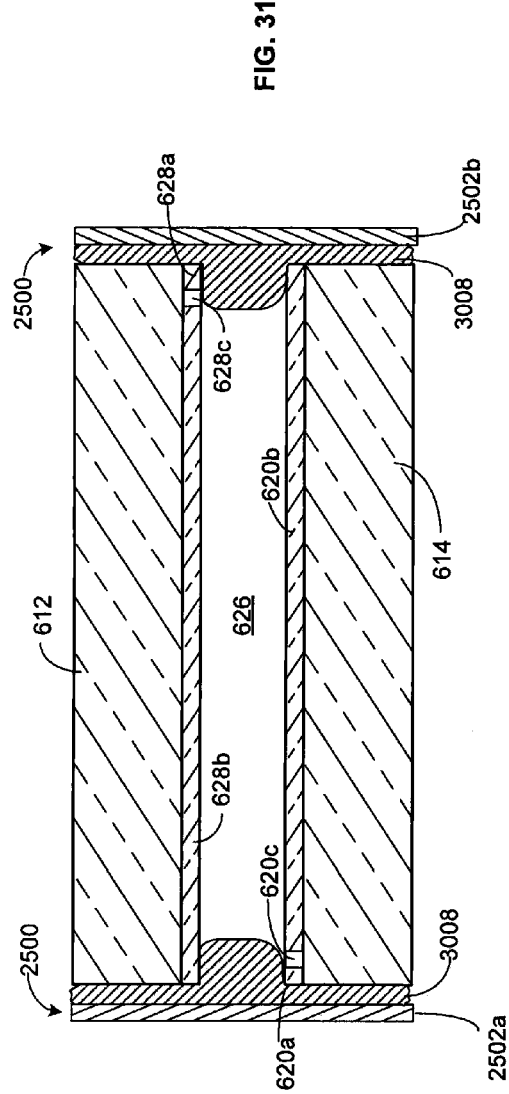
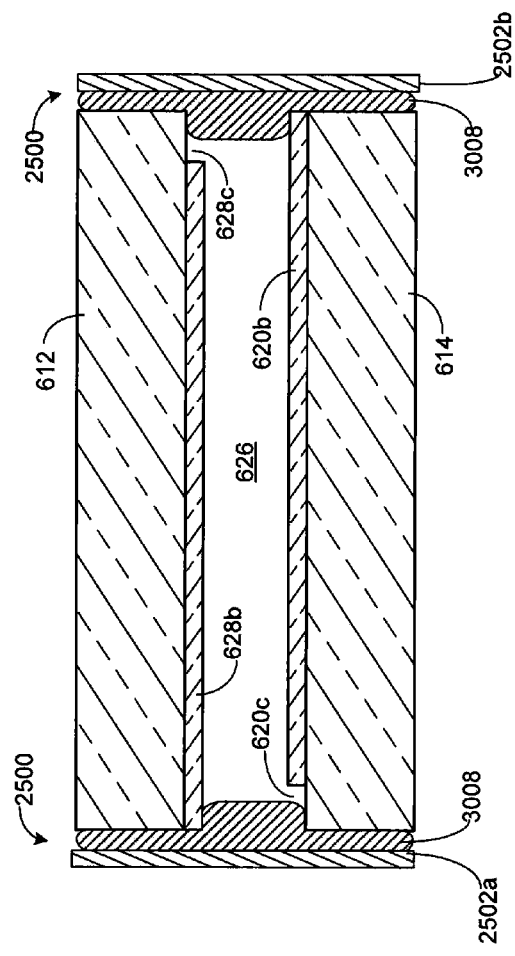

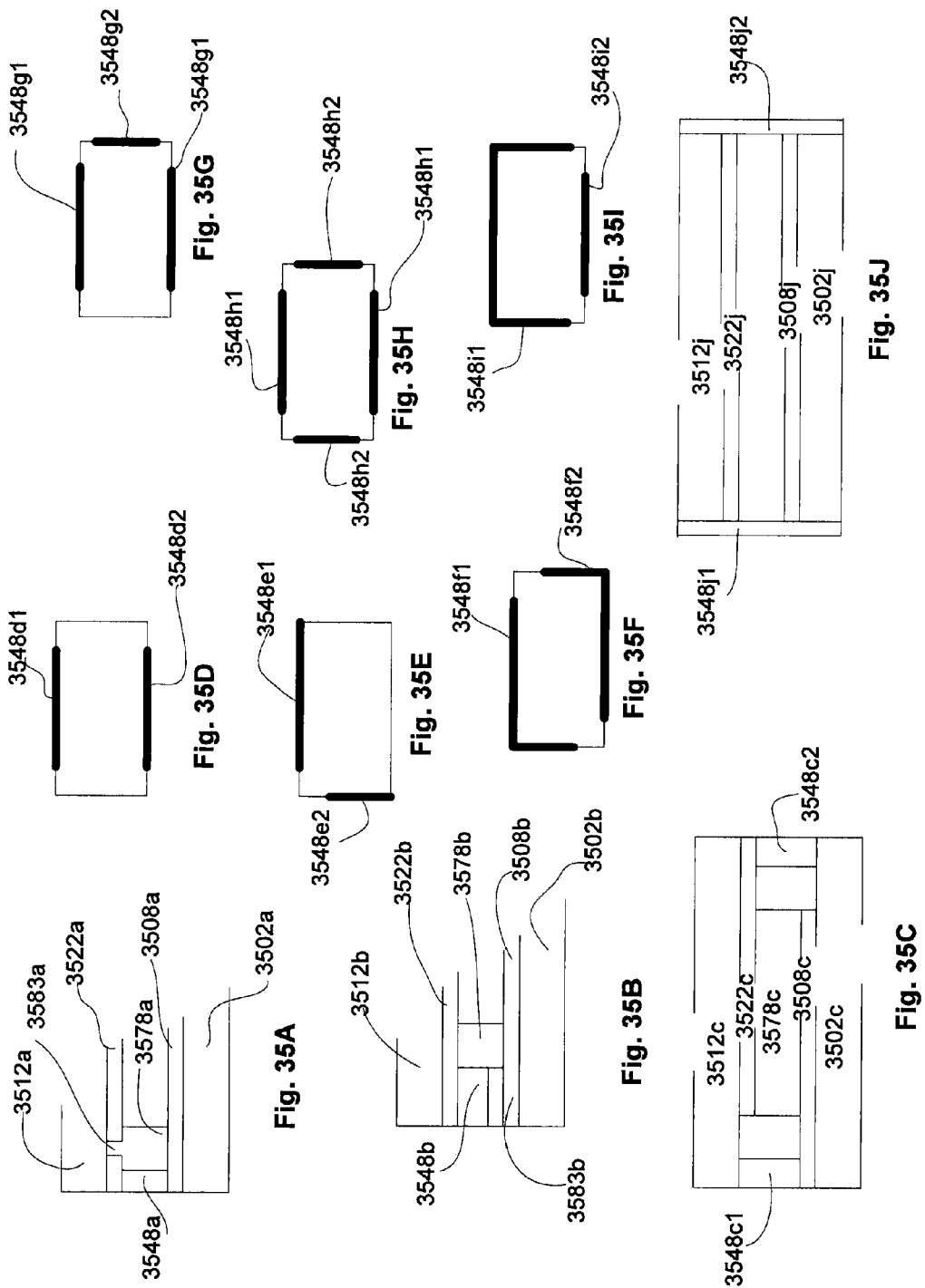

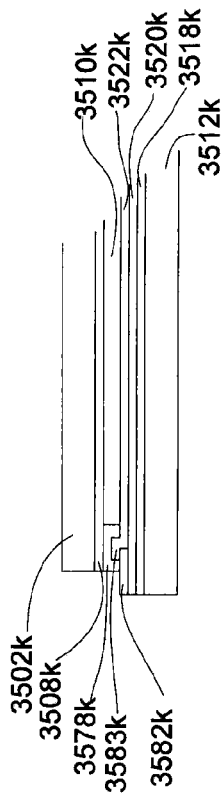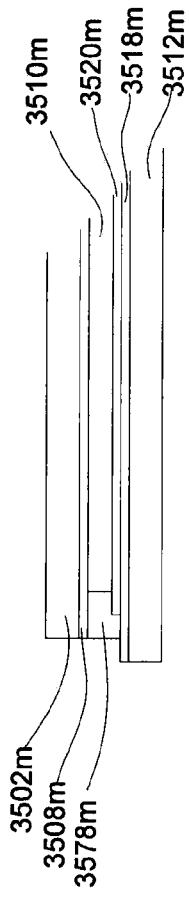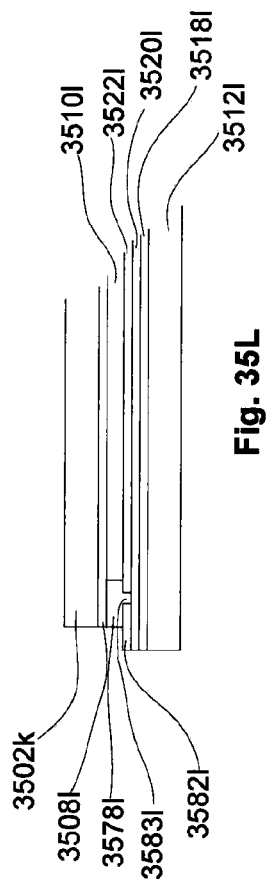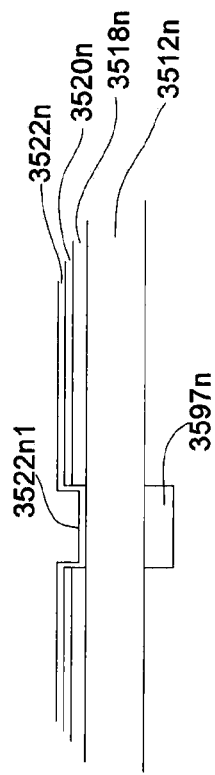

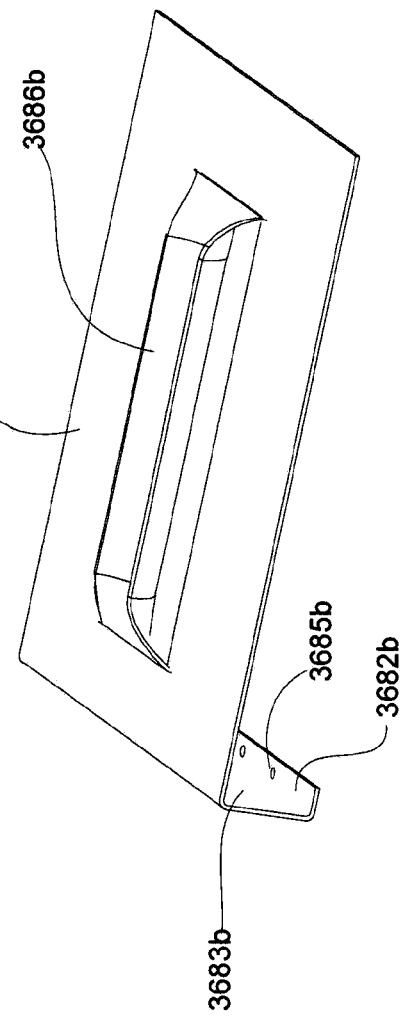
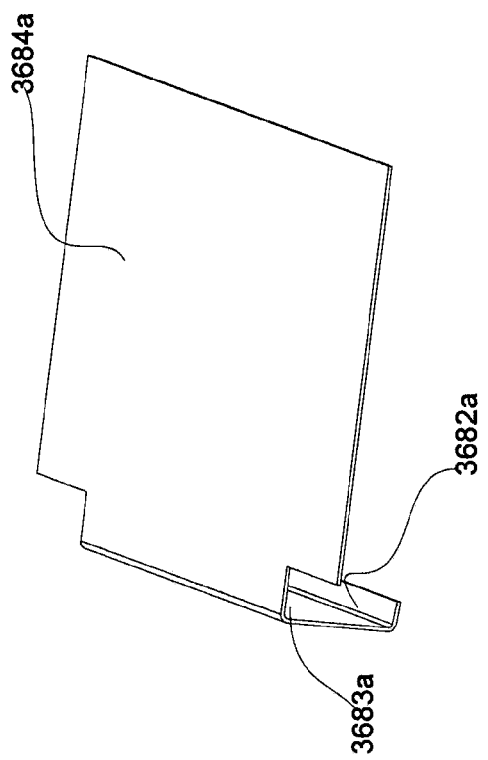
Fig. 36B
Fig. 36A

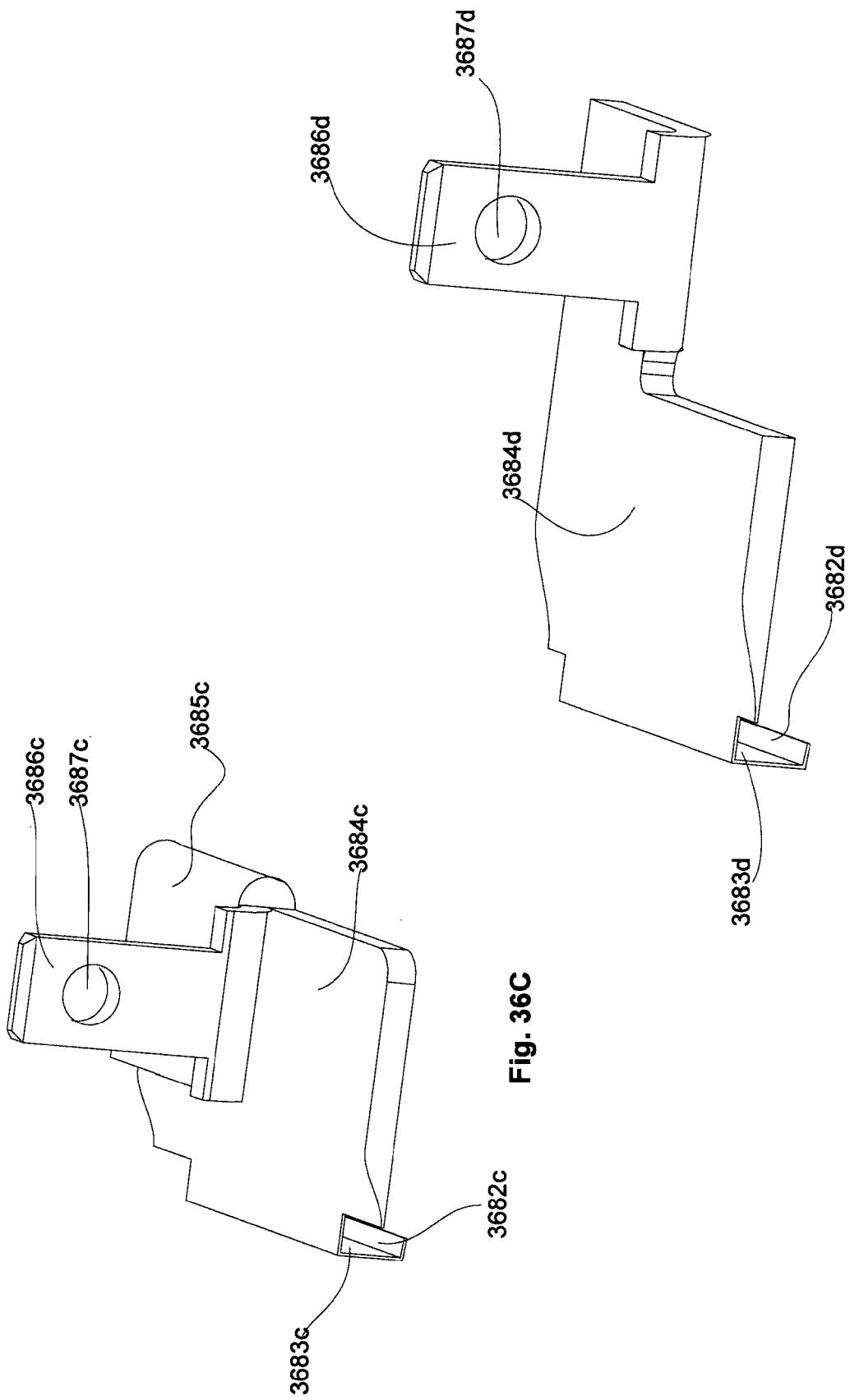

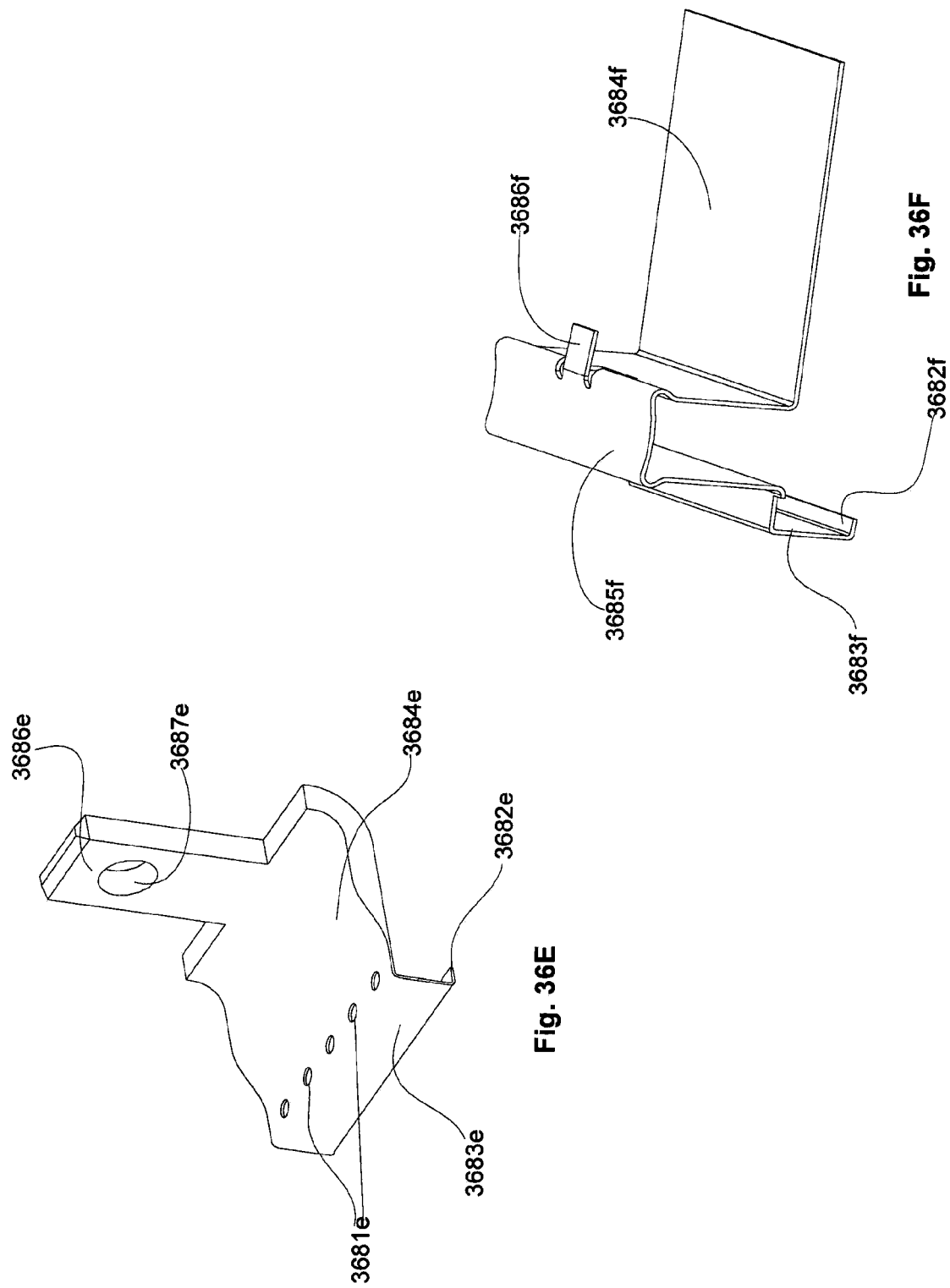

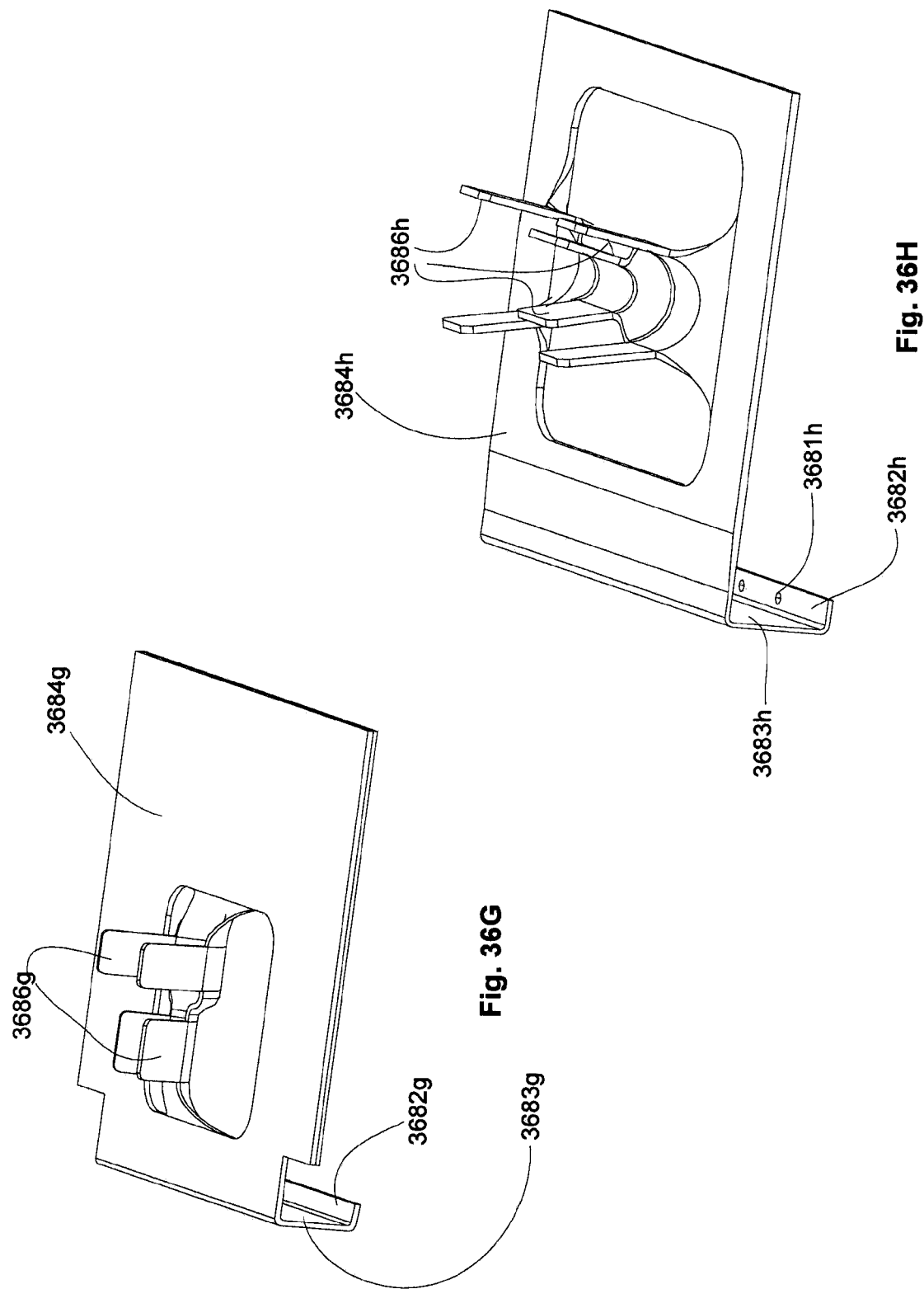

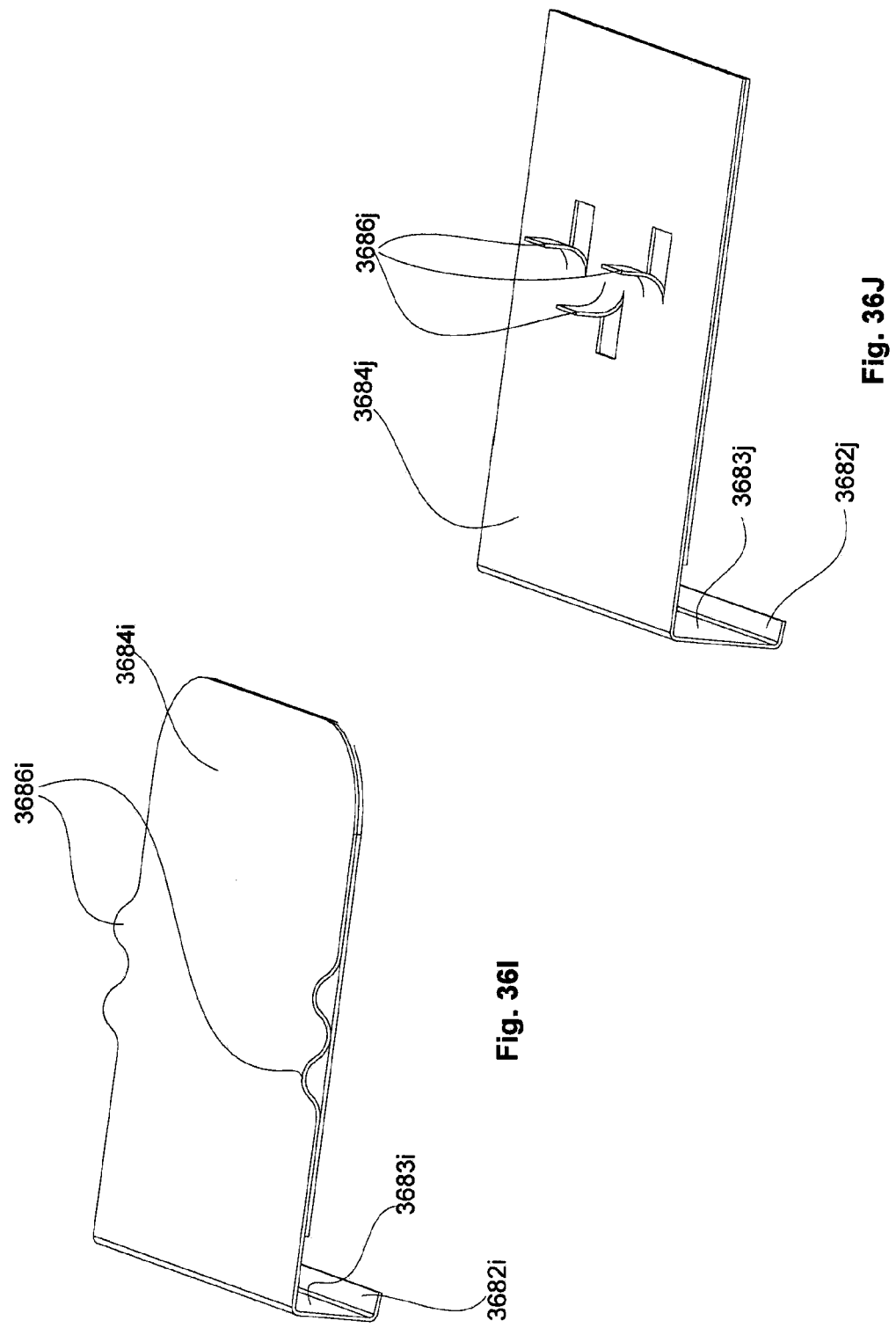

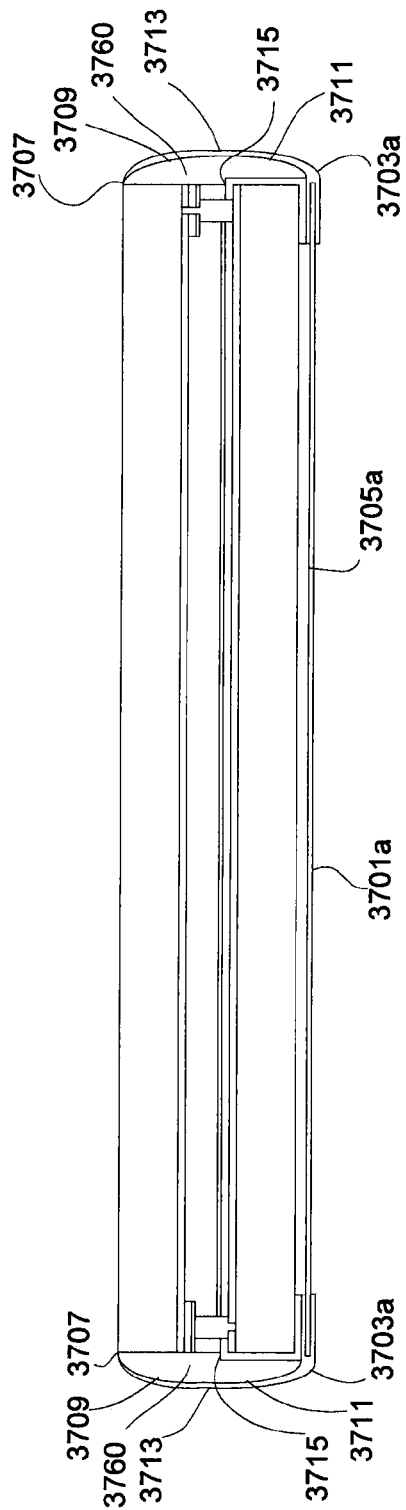
Fig. 37A
Fig. 37C
Fig. 37B

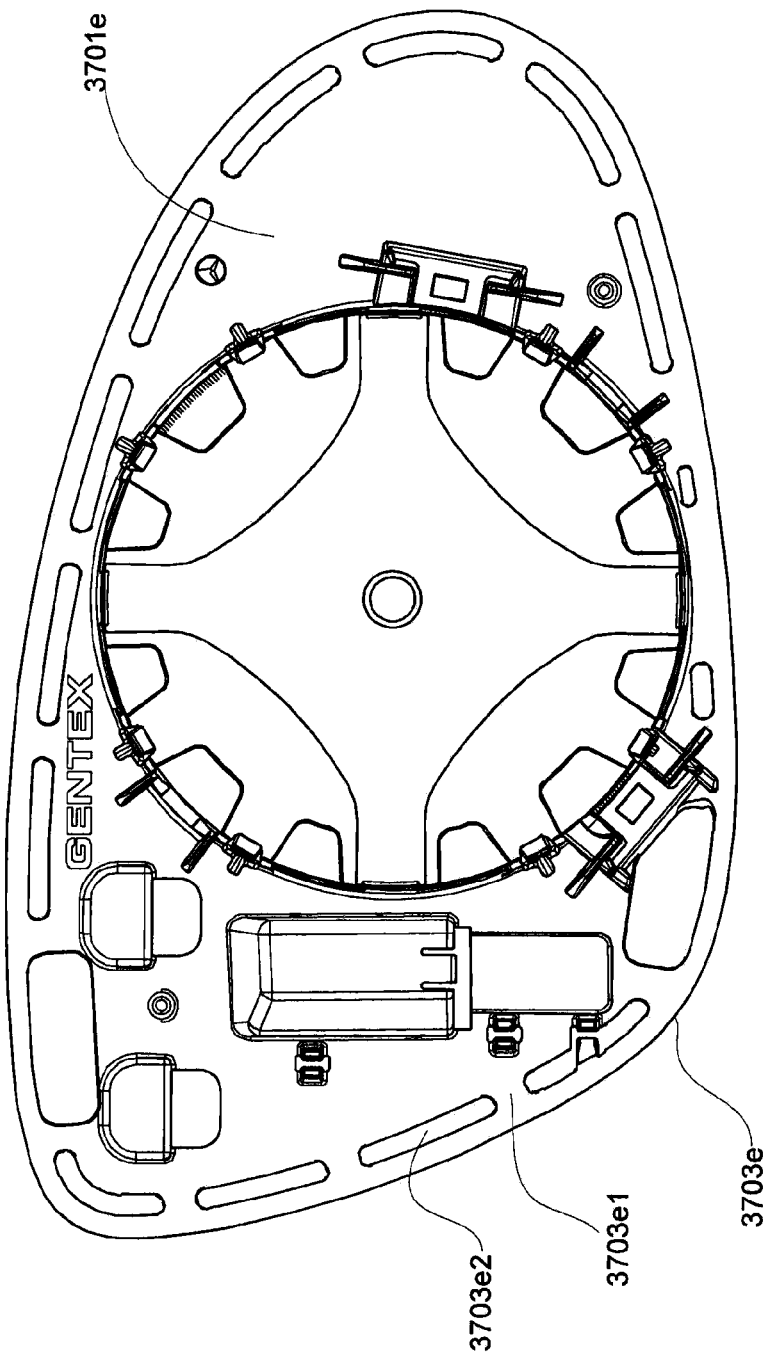
Fig. 37E
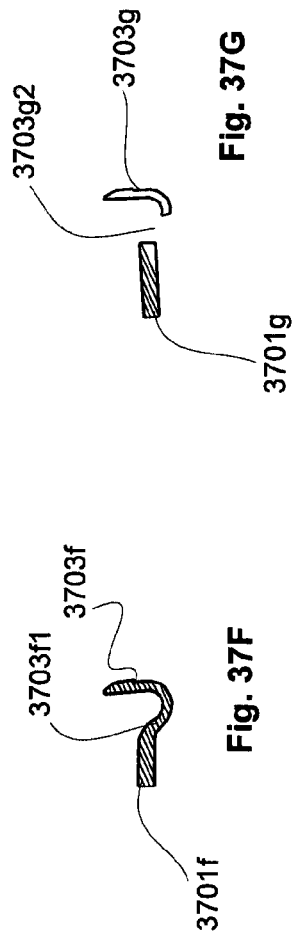
Fig. 37F
Fig. 37G

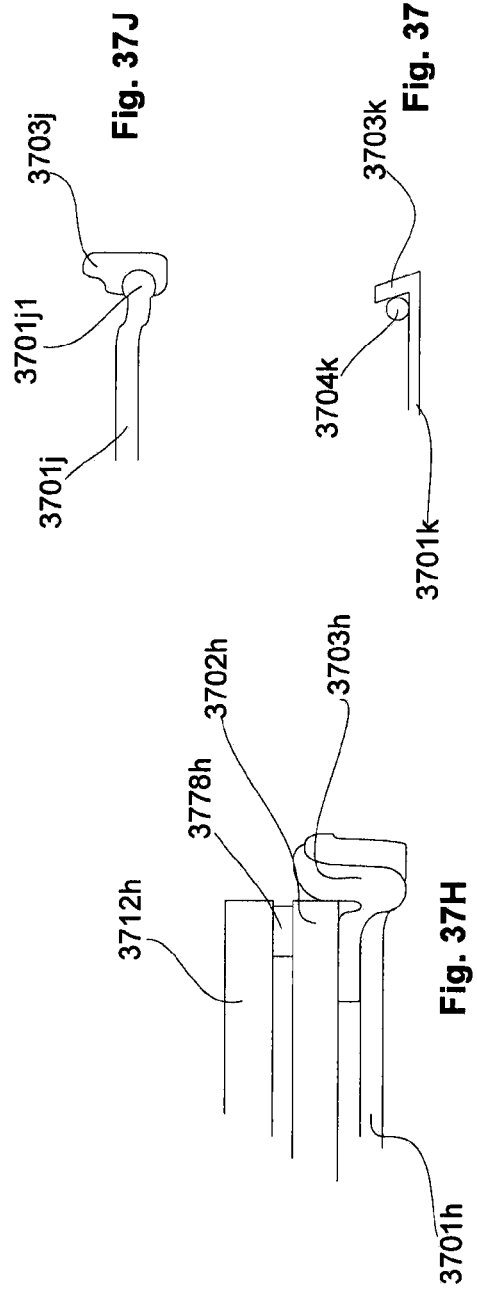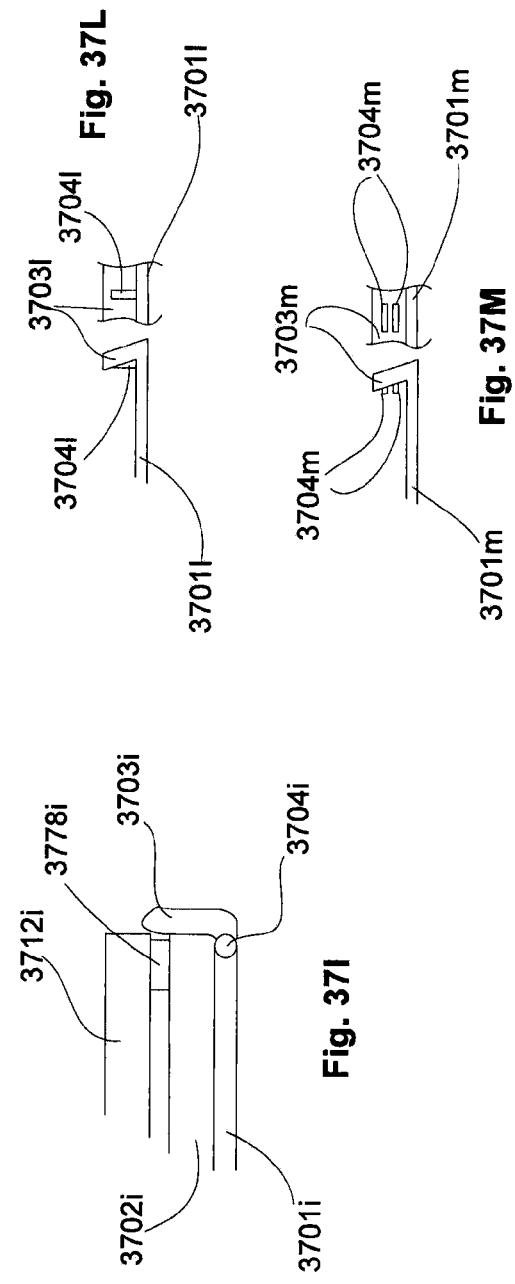

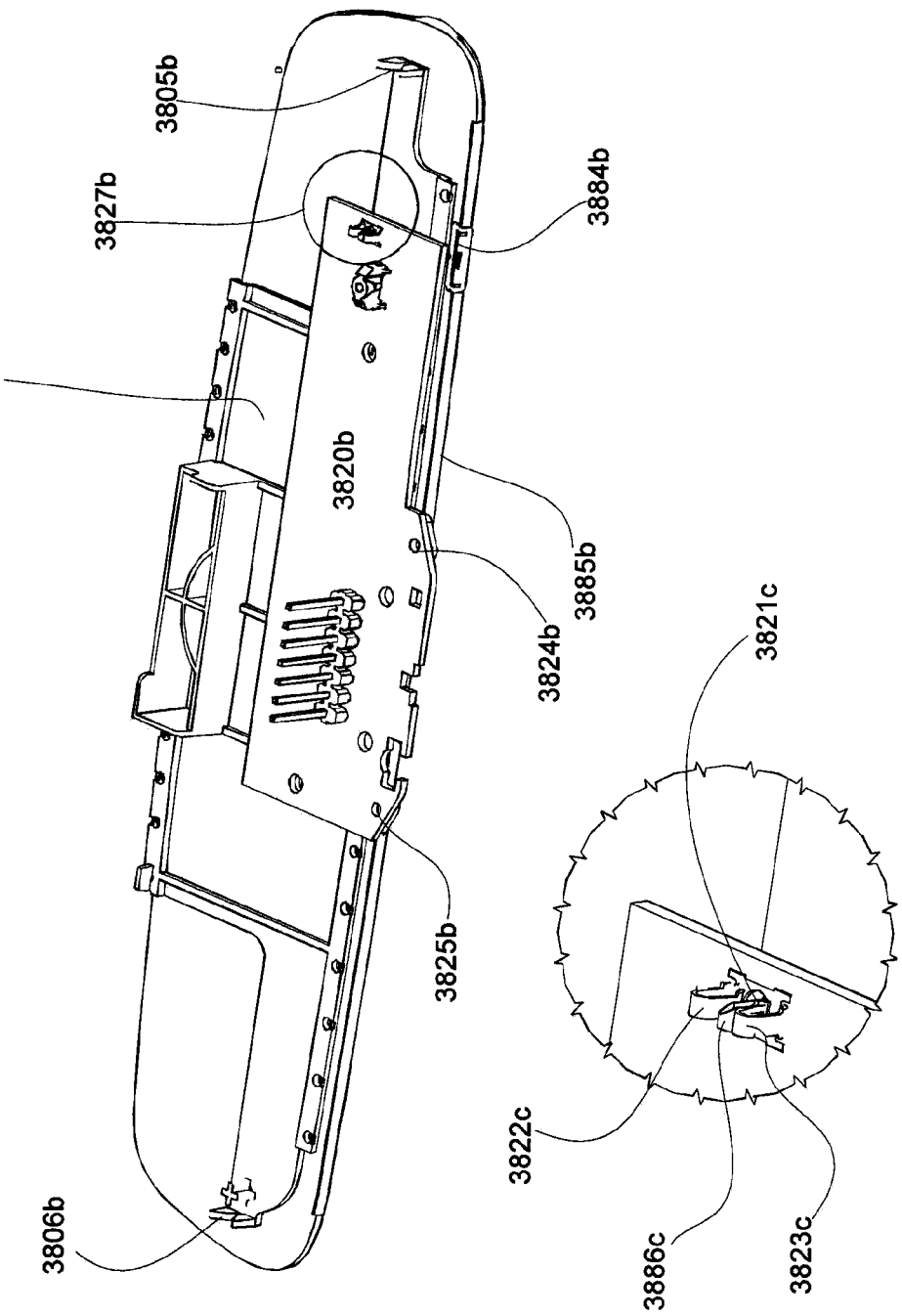

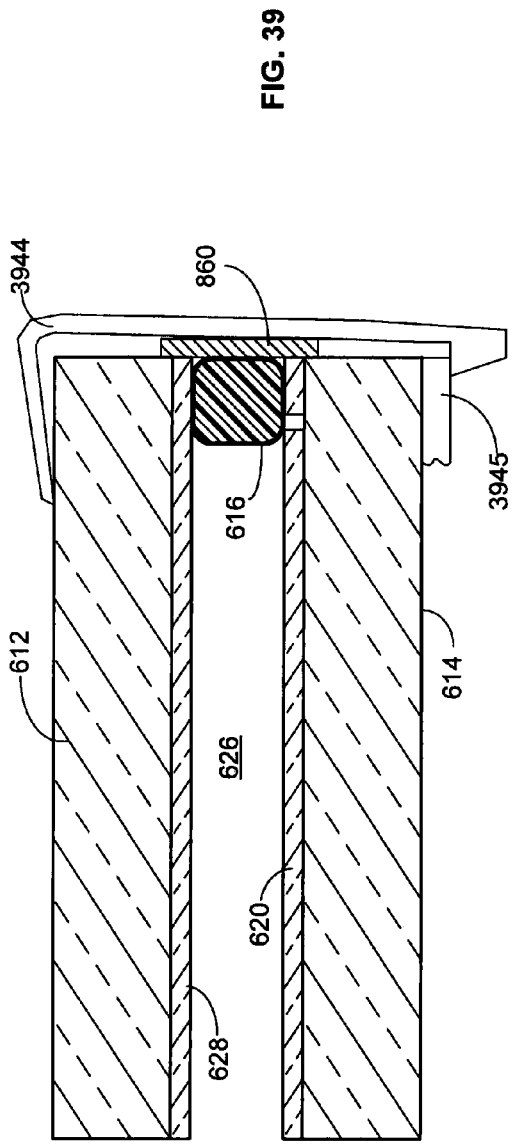
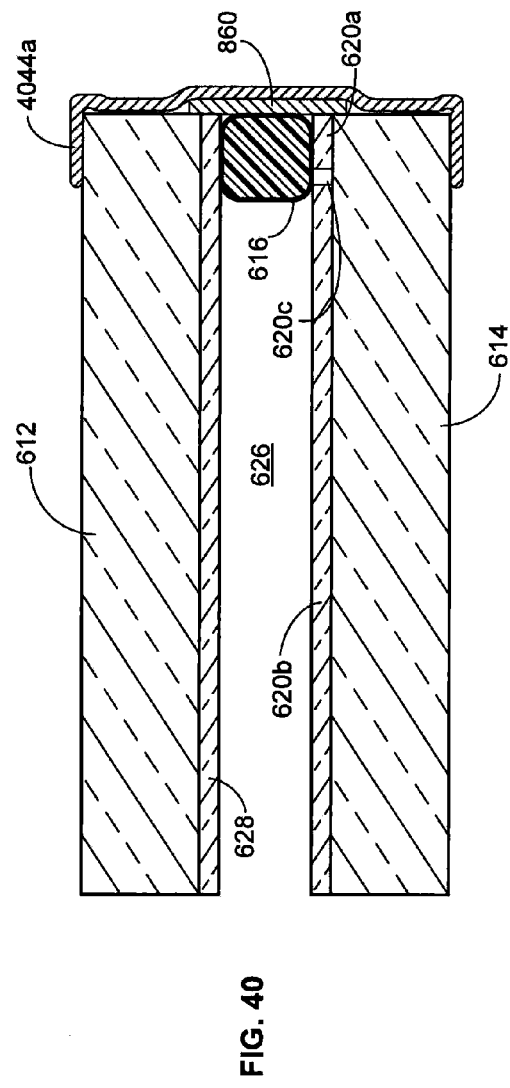
FIG. 39
FIG. 40

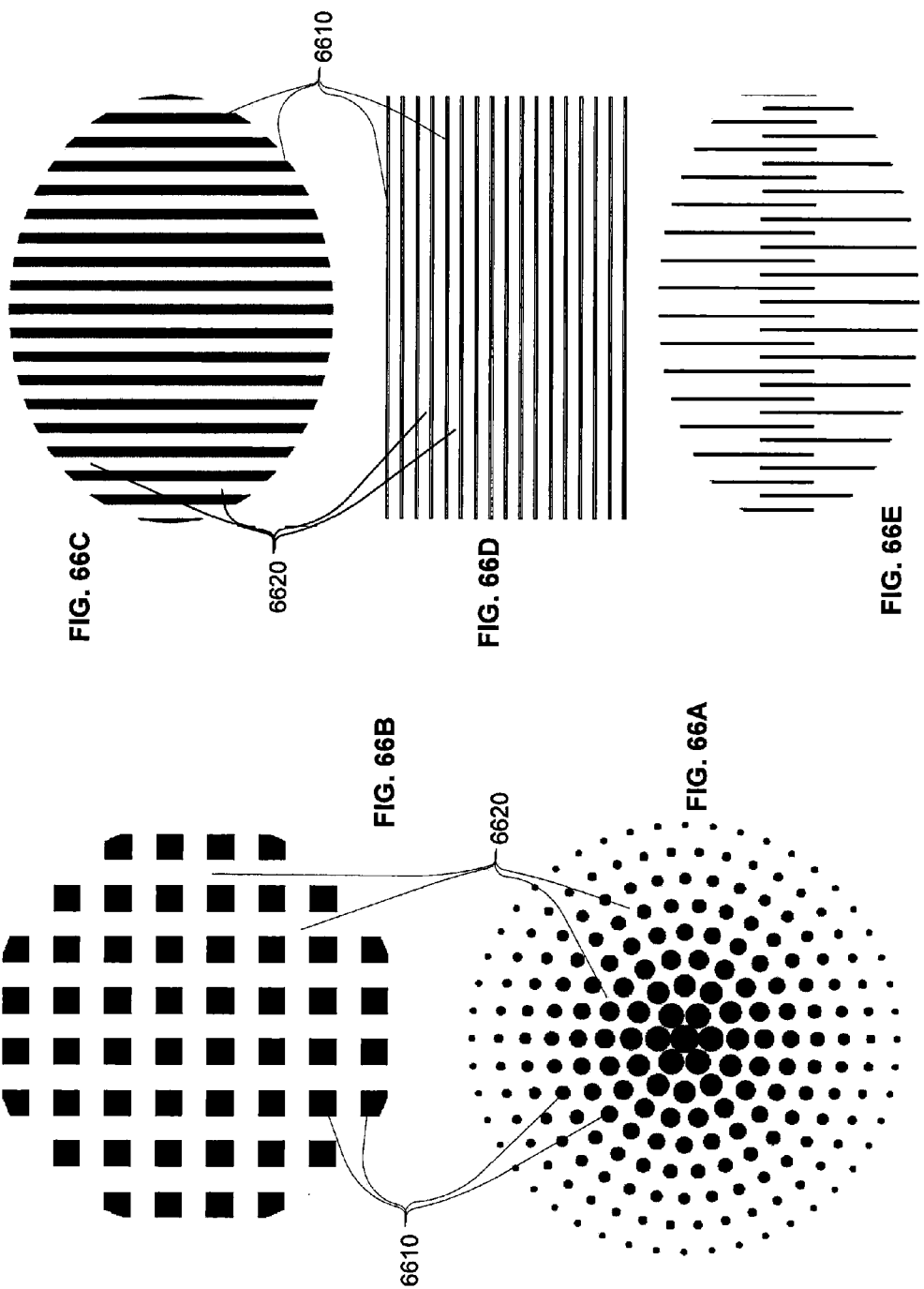

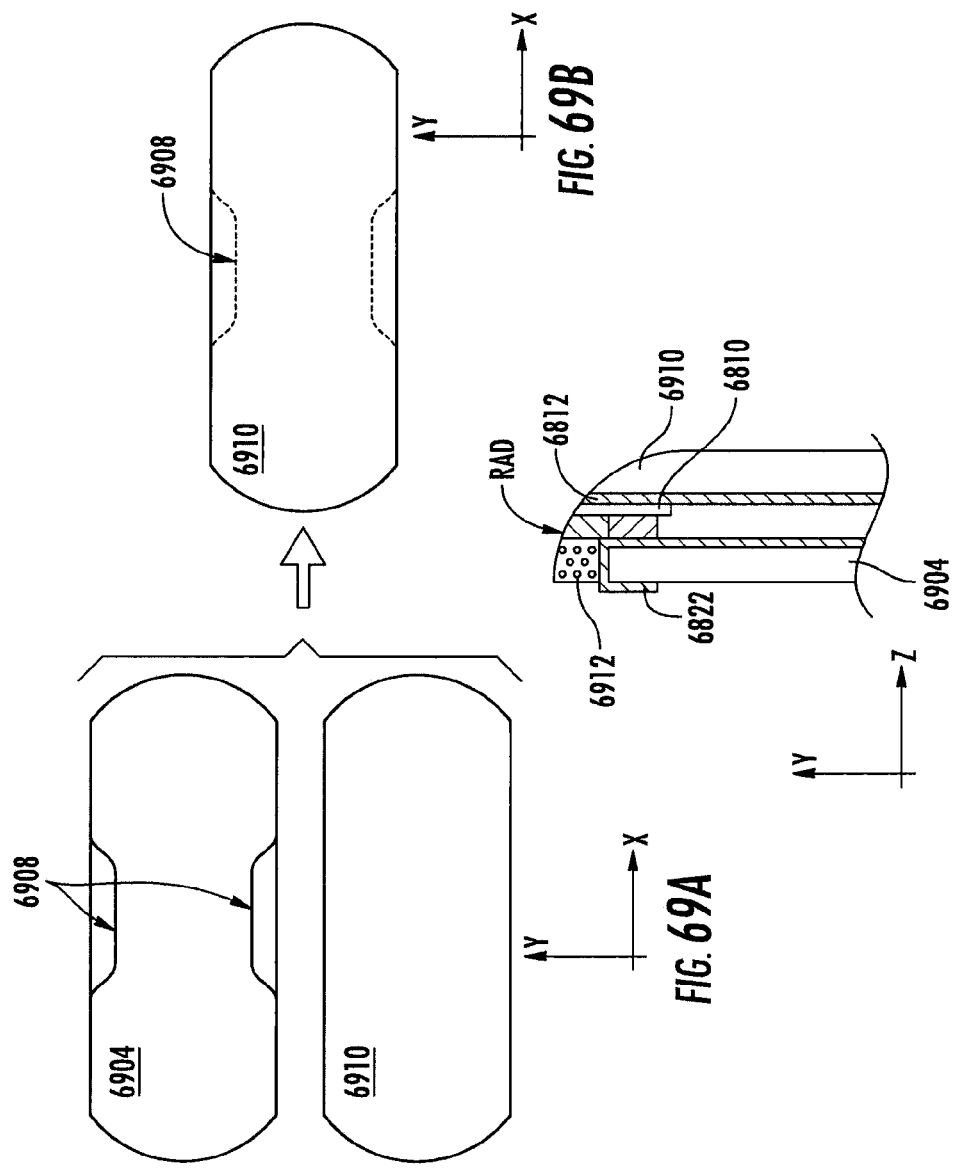

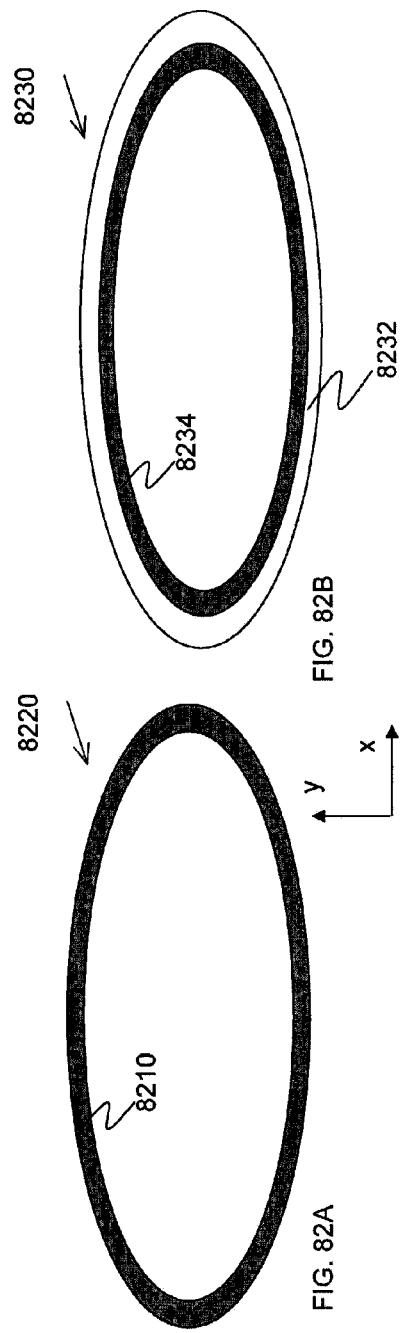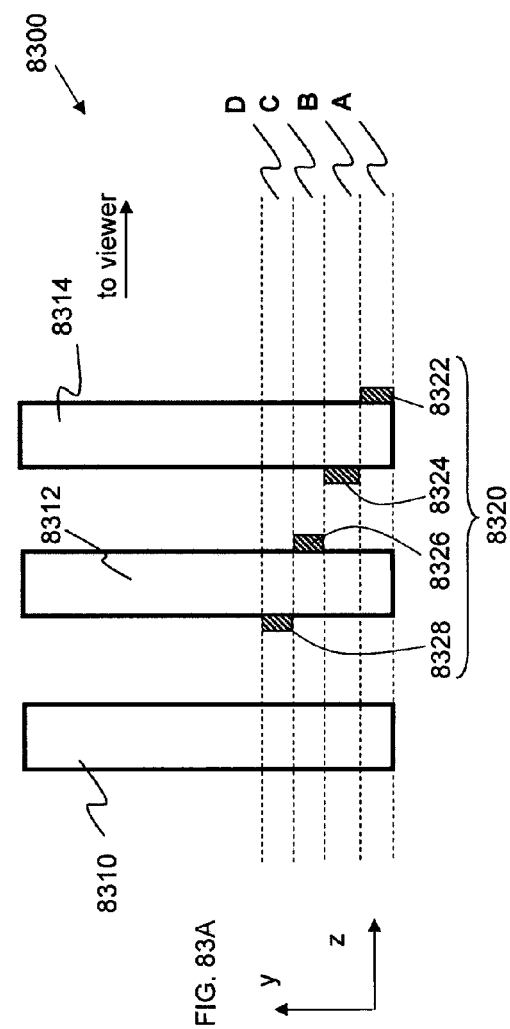

VEHICULAR REARVIEW MIRROR ELEMENTS AND ASSEMBLIES INCORPORATING THESE ELEMENTS

CROSS-REFERENCE TO RELATED APPLICATIONS

The present application is a continuation of U.S. patent application Ser. No. 12/832,838 filed on Jul. 8, 2010 and published as U.S. 2010/0321758, which is a continuation-in-part of U.S. patent application Ser. No. 12/750,357 filed on Mar. 30, 2010 and now abandoned, which is a continuation of U.S. patent application Ser. No. 12/154,736, filed on May 27, 2008 and now issued as U.S. Pat. No. 7,719,750, which is a continuation of U.S. patent application Ser. No. 11/477,312 filed on Jun. 29, 2006 and now issued as U.S. Pat. No. 7,379,225, which is a continuation of U.S. patent application Ser. No. 11/066,903 filed on Feb. 25, 2005 and now issued as U.S. Pat. No. 7,372,611, which in turn claims priority under 35 U.S.C. §119 to U.S. Provisional Application Ser. Nos. 60/548,472 filed on Feb. 27, 2004, and 60/605,111 filed on Aug. 27, 2004, and 60/614,150 filed on Sep. 29, 2004. The U.S. patent application Ser. No. 11/066,903 is also a continuation-in-part of U.S. patent application Ser. Nos. 10/260,741 filed Sep. 30, 2002 and now issued as U.S. Pat. Nos. 7,064,882 and 10/430,885 filed on May 6, 2003 and now issued as U.S. Pat. No. 7,324,261. The disclosure of each of the above-mentioned patent applications is incorporated herein by reference in its entirety.

BACKGROUND OF THE INVENTION

The present invention generally relates to electro-optic devices and apparatus incorporating such devices. In particular, the invention relates to electro-optic devices used in architectural windows or vehicular rearview mirror elements.

Electro-optic rearview mirror elements are becoming more common in vehicular applications with regard to both inside and outside rearview mirrors and mirror assemblies, whether on the driver's or the passenger's side. Such electro-optic rearview mirrors are automatically controlled to vary the reflectivity of the mirror in response to rearward and forward aimed light sensors so as to reduce the glare of headlamps in the image reflected to the driver's eyes. Typical electro-optic elements, when incorporated in vehicular rearview mirror assemblies, will have an effective field of view (as defined by relevant laws, codes and specifications) that is less than the area defined by the perimeter of the element itself. Often, the effective field of view of the element is limited, at least in part, by the construction of the element itself and/or an associated bezel.

Various attempts have been made to provide an electro-optic element having an effective field of view substantially equal to the area defined by its perimeter. Assemblies incorporating these elements have also been proposed. FIG. 1A shows an exploded view of a portion of a rearview mirror subassembly 100 as used in a typical exterior rearview mirror assembly. As shown in FIG. 1B, the subassembly 100 includes an electrochromic mirror element 110, a bezel 115, and a carrier plate 117. The subassembly may further include gaskets 120 and 122 that are placed on either side of electrochromic mirror element 110 to form a secondary seal around the periphery of the mirror element 110. As shown in FIG. 1B, electrochromic element 110 includes a front substantially transparent element 130 typically formed of glass and having a front surface 130a and a rear surface 130b. Electrochromic element 110 further includes a rear element 140, which is spaced slightly apart from the element 130. A seal 146 is formed between elements 130 and 140 about their periphery so as to define a sealed chamber 147 therebetween, in which an electrochromic medium is provided. Elements 130 and 140 preferably have electrically conductive layers (serving as electrodes, not shown) on the surfaces facing the chamber such that an electrical potential may be applied across the electrochromic medium. These electrodes are electrically isolated from one another and separately coupled to a power source by means of first and second bus connectors 148a and 148b. To facilitate connection of bus connectors 148a and 148b, elements 130 and 140 are typically vertically offset so that one bus connector may be secured along a bottom edge of one of the elements and another bus connector may be secured to the top edge of the other element. The bus connectors 148a and 148b are typically spring clips (similar to those disclosed in commonly-assigned U.S. Pat. Nos. 6,064,509 and 6,062,920) and are configured to ensure that they remain physically and electrically coupled to the electrode layers on the inward-facing surfaces of elements 130 and 140. Once the electrochromic element 110 has been manufactured and bus clips 148a and 148b attached, then the mirror subassembly 100 may be formed. As shown in FIGS. 1A and 1B, bezel 115 includes a front lip 151, which extends over a portion of the front surface 130a of the front element 130. Typically, the front lip 151 extends over a sufficient portion of front surface 130a to obscure a person's view of the seal 146 and protect the seal 146 from possible degradation caused by ambient UV light. As apparent from FIG. 1B, the width $D_1$ of the front lip 151 of the bezel 115 depends upon a number of factors including an offset distance $D_2$ between the elements 130 and 140. The width $D_1$ may also depend on the degree to which the bus connector clips 148a and 148b extend beyond the peripheral edges of elements 130 and 140. Typical bezels in the related art have a front lip with a width $D_1$ of 5 mm or more.

Prior to inserting the electrochromic mirror element 110 in the bezel 115, an optional front gasket 120 may be provided behind the front lip 151 so as to be pressed between the front surface 130a of the front element 130 and the inner surface of the front lip 151 of bezel 50. The mirror element 110 is then placed in bezel 115 and an optional rear gasket 122 may be provided along the periphery of the back surface of element 140. In lieu of, or in addition to front and/or rear gaskets 120, 122 the bezel/mirror interface area may be filled or potted with a sealing material such as urethane, silicone, or epoxy. A carrier plate 117, which is typically formed of an engineering grade rigid plastic or a similar material as used for bezel 115, is then pressed against the rear surface of element 140 with the gasket 122 compressed therebetween. A plurality of tabs 152 may be formed inside of the bezel such that carrier plate 70 is snapped in place so as to secure mirror element 110 within the bezel. The carrier plate 117 is typically used to mount the mirror subassembly within an exterior mirror housing. More specifically, a positioner (shown below as element 6540 in FIG. 65) may also be mounted within the mirror housing and mechanically coupled to the carrier plate 117 for enabling remote adjustment of the position of the mirror subassembly within the housing.

While the above-described structure is readily manufacturable, styling concerns have arisen with respect to the width of the front lip of the bezel of an electrochromic mirror subassembly. Specifically, the width of the front lip of the bezel of an EC-mirror has been typically made wider than that of any bezel used on non-dimming (non-electro-optic) mirrors due to the need to obscure and hide from view a mutual positional offset of elements 130 and 140 (introduced to accommodate electrical buss clips) and the seal between the substrates. In fact, in non-dimming mirrors bezels are often not used at all. In some vehicles, only the exterior mirror on the driver's side is electro-optic, while the passenger side mirror is non-dimming. Thus, there exists the need for an improved electro-optic mirror element and an improved electro-optic exterior mirror subassembly that has a reduced bezel front width or that does not include a front bezel at all.

SUMMARY OF THE INVENTION

At least one embodiment of the present invention provides improved electro-optic mirror elements. A related embodiment has an effective field of view area substantially equal to the field of view associated with an area defined by the perimeter of the element.

At least one embodiment of the present invention provides improved assemblies incorporating electro-optic elements. A related embodiment has an effective field of view area substantially equal to the area of the element itself as defined by its outer most perimeter.

Other advantages of the present invention will become apparent while reading the detailed description of the invention in light of the figures and appended claims.

BRIEF DESCRIPTION OF THE FIGURES

FIG. 8A is an enlarged cross-sectional view of another embodiment of an electro-optical element of the present invention.

FIG. 8B is an enlarged cross-sectional view of an electro-optic mirror element incorporating alternative aspects of an embodiment of the invention.

FIG. 9A shows a top plan view of the second substrate of an embodiment of the invention with an electrode layer formed thereon, as may be used in the embodiment of FIG. 8.

FIG. 9B shows a top plan view of the embodiment of FIG. 9A that additionally has a seal disposed thereon.

FIG. 10A shows a top plan view of the second substrate of an alternative embodiment of the invention with an electrode layer formed thereon, as may be used in the embodiment of FIG. 8.

FIG. 10B shows a top plan view of the alternative embodiment of FIG. 10A that additionally has a seal disposed thereon.

FIG. 10C offers an exploded view showing the first and second substrates with electrodes formed thereon, as may be used in embodiments of an electro-optic mirror element of the present invention.

FIG. 10D is a top plan view of the second substrate shown in FIG. 10C and additionally having a seal formed thereon.

FIG. 11 provides an enlarged cross-sectional view of embodiments of an electro-optic mirror element.

FIG. 12 is an enlarged cross-sectional view of an electro-optic mirror element according to another alternative embodiment of the present invention.

FIG. 13 is an enlarged cross-sectional view of an electro-optic mirror element incorporating aspects of a different embodiment of the present invention.

FIG. 14 is an enlarged cross-sectional view of an embodiment of an electro-optic mirror element incorporating means for visually hiding a seal.

FIGS. 17 (A-C) depict a plan view of the first surface, a plan view of the fourth surface, and a section view of an embodiment of an electro-optic element, respectively.

FIG. 17D depicts a plan view of the fourth surface of an embodiment of the invention.

FIG. 17E depicts a plan view of the second substrate of an embodiment.

FIG. 22A is an enlarged cross-sectional view of an alternative embodiment of the invention.

FIG. 22B is an enlarged cross-sectional view of an electro-optic mirror element incorporating alternative aspects of an embodiment of the present invention.

FIG. 28 is an enlarged cross-sectional view of an electro-optic mirror element incorporating an edge seal in accordance with one more embodiment of the present invention.

FIG. 29 is an enlarged cross-sectional view of an electro-optic mirror element incorporating an edge seal in accordance with a substitute embodiment of the present invention.

FIG. 30A is a first enlarged cross-sectional view of an electro-optic mirror element incorporating an edge seal in accordance with another embodiment of the present invention.

FIG. 30B is a second enlarged cross-sectional view of an electro-optic mirror element incorporating an edge seal in accordance with the embodiment of FIG. 30A.

FIG. 31 is an enlarged cross-sectional view of an electro-optic mirror element incorporating an edge seal in accordance with another embodiment of the present invention.

FIG. 32 is an enlarged cross-sectional view of an electro-optic mirror element incorporating an edge seal in accordance with yet another embodiment of the present invention.

FIGS. 35 (A-N) depict various techniques for establishing external electrical connections to the second and third surface conductive electrodes.

FIG. 39 is an enlarged cross-sectional view of an embodiment of the invention incorporating a bezel.

FIG. 40 is an enlarged cross-sectional view of another embodiment incorporating a bezel.

FIGS. 66(A-E) illustrate embodiments of patterning of an eye-hole of a rearview assembly.

FIGS. 67(B-D): embodiments of plug configurations.

FIGS. 69(A-C) provide illustrations related to another embodiment having an EC-element based mirror system with a rounded edge.

FIGS. 79(C-G) show embodiments employing a user interface having an "through-bezel" type of a capacitive sensor or a field sensor.

FIGS. 82(A,B) illustrate embodiments of a peripheral ring used with rearview assembly of the present invention. FIG. 82A: a single-band peripheral ring; FIG. 82B: a multi-band peripheral ring.

FIG. 83A shows a specific embodiment of a mirror system of the invention including a multi-band peripheral ring.

DETAILED DESCRIPTION OF THE INVENTION

Figure 1A:
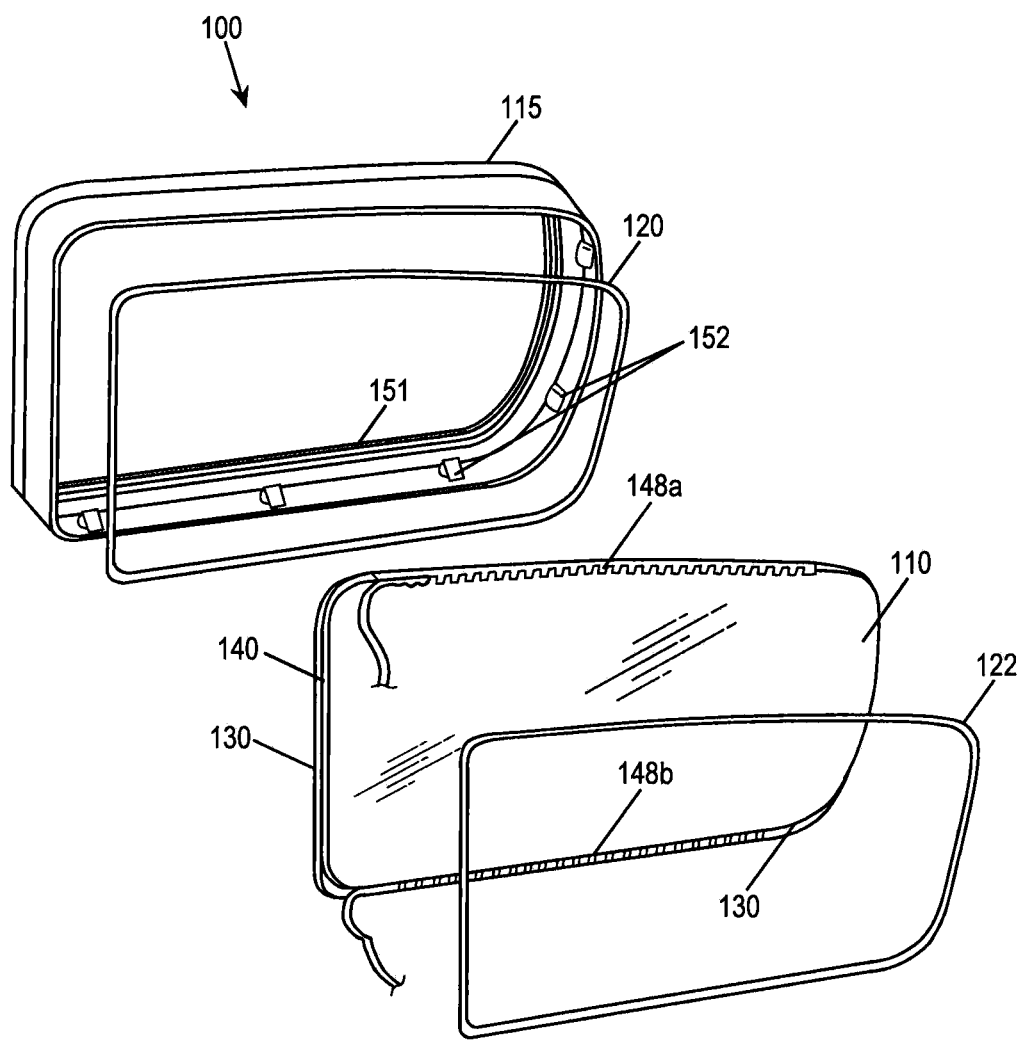
FIG. 1A is an exploded perspective view of a portion of a conventional exterior electro-optic mirror subassembly.

Definitions: As used in this description and the accompanying claims, the following terms shall have the meanings indicated, unless the context otherwise requires:

"Transflective" describes an optical element or component that has a useful non-zero level of transmittance and also has a useful, non-zero level of reflectance in a specified spectral region. In the context of an image-forming reflector, such as a mirror for viewing reflected images, for example, the viewer in front of the mirror may not only observe an image of the ambient objects, formed in reflection from such transflective area but also receive information contained in the displayed image delivered with light from the light source located behind the transflective area of the mirror.

The spectrum of light reflected (and that of light transmitted) by an embodiment of the mirror system of the invention can be tuned or modified by adjusting the thickness of the reflectance-enhancing layers. The peak reflectance will vary with optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. As used in this application, Y (sometimes also referred to as Cap Y), represents either the overall reflectance or the overall transmittance, depending on context. L*, a*, and b* can be used to characterize parameters of light in either transmission or reflection. According to the L*a*b* quantification scheme, L* represents brightness and is related to the eye-weighted value of either reflectance or transmittance (also known as normalized Y Tristimulus value) by the Y Tristimulus value of a white reference, Yref: L*=116*(Y/Yref)−16. The a*-parameter is a color coordinate that denotes the color gamut ranging from red (positive a*) to green (negative a*), and b* is a color coordinate that denotes the color gamut ranging from yellow and blue (positive and negative values of b*, respectively). For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a (reflectance) value Y from the 1931 CIE Standard since it corresponds more closely to the spectral reflectance than L*. The value of "color magnitude", or C*, is defined as $C*=\sqrt{(a*)^2+(b*)^2}$ and provides a measure for quantifying color neutrality. The metric of "color difference", or ΔC* is defined as $\Delta C*=\sqrt{(a*-a*')^2+(b*-b*')^2}$, where (a*, b*) and (a*',b*') describe color of light obtained in two different measurements. Additional CIELAB metric is defined as $\Delta E*=(\Delta a*^2+\Delta b*^2+\Delta L*^2)^{1/2}$. The color values described herein are based, unless stated otherwise, on the CIE Standard D65 illuminant and the 10-degree observer.

An optical element such as a mirror is said to be relatively color neutral in reflected light if the corresponding C* value of the element is generally less than 20. Preferably, however, a color-neutral optical element is characterized by the C* value of less than 15, and more preferably of less than about 10.

As broadly used and described herein, the reference to an electrode or a material layer as being "carried" on a surface of an element refers to such an electrode or layer that is disposed either directly on the surface of an underlying element or on another coating, layer or layers that are disposed directly on the surface of the element.

The following disclosure describes embodiments of the invention with reference to the corresponding drawings, in which like numbers represent the same or similar elements wherever possible. In the drawings, the depicted structural elements are not to scale and certain components are enlarged relative to the other components for purposes of emphasis and understanding. References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. For example, to simplify a particular drawing of an electro-optical device of the invention not all thin-film coatings (whether electrically conductive, reflective, or absorptive or other functional coatings such as alignment coatings or passivation coatings), electrical interconnections between or among various elements or coating layers, elements of structural support (such as holders, clips, supporting plates, or elements of housing, for example), or auxiliary devices (such as sensors, for example) may be depicted in a single drawing. It is understood, however, that practical implementations of discussed embodiments may contain some or all of these features and, therefore, such coatings, interconnections, structural support elements, or auxiliary devices are implied in a particular drawing, unless stated otherwise, as they may be required for proper operation of the particular embodiment. In the following description, numerous specific details are recited to provide a thorough understanding of embodiments of the invention. One skilled in the relevant art will recognize, however, that the invention may be practiced without one or more of the specific details, or with other methods, components, or materials.

Numbering of structural surfaces. In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

The present disclosure refers to U.S. Pat. Nos. 4,902,108; 5,128,799; 5,151,824; 5,278,693; 5,280,380; 5,282,077; 5,294,376; 5,336,448; 5,448,397; 5,679,283; 5,682,267; 5,689,370; 5,803,579; 5,808,778; 5,818,625; 5,825,527; 5,837,994; 5,888,431; 5,923,027; 5,923,457; 5,928,572; 5,940,201; 5,956,012; 5,990,469; 5,998,617; 6,002,511; 6,008,486; 6,020,987; 6,023,229; 6,037,471; 6,049,171; 6,057,956; 6,062,920; 6,064,509; 6,084,700; 6,102,546; 6,111,683; 6,111,684; 6,129,507; 6,130,421; 6,130,448; 6,132,072; 6,140,933; 6,166,848; 6,170,956; 6,188,505; 6,193,378; 6,193,912; 6,195,194; 6,222,177; 6,224,716; 6,229,435; 6,238,898; 6,239,898; 6,244,716; 6,246,507; 6,247,819; 6,249,369; 6,255,639; 6,262,831; 6,262,832; 6,268,950; 6,281,632; 6,291,812; 6,313,457; 6,335,548; 6,356,376; 6,359,274; 6,379,013; 6,392,783; 6,399,049; 6,402,328; 6,403,942; 6,407,468; 6,420,800; 6,426,485; 6,429,594; 6,441,943; 6,465,963; 6,469,739; 6,471,362; 6,504,142; 6,512,624; 6,521,916; 6,523,976; 6,614,579; 6,471,362; 6,477,123; 6,521,916; 6,545,794; 6,587,573; 6,614,579; 6,635,194; 6,657,767; 6,774,988; 6,816,297; 6,861,809; 6,968,273; 6,700,692; 7,064,882; 7,287,868; 7,324,261; 7,342,707; 7,417,717; 7,663,798 and D410,607. The present application also refers to the International Patent Applications nos. PCT/WO97/EP498; PCT/WO98/EP3862 and U.S. patent application Ser. Nos. 60/360,723; 60/404,879; 11/682,121; 11/713,849; 11/833,701; 12/138,206; 12/154,824; 12/370,909; 12/629,757; 12/774,721. The disclosure of each of the abovementioned patent documents is incorporated herein by reference in its entirety. All these patent documents may be collectively referred to herein as "Our Prior Applications".

Figure 2:
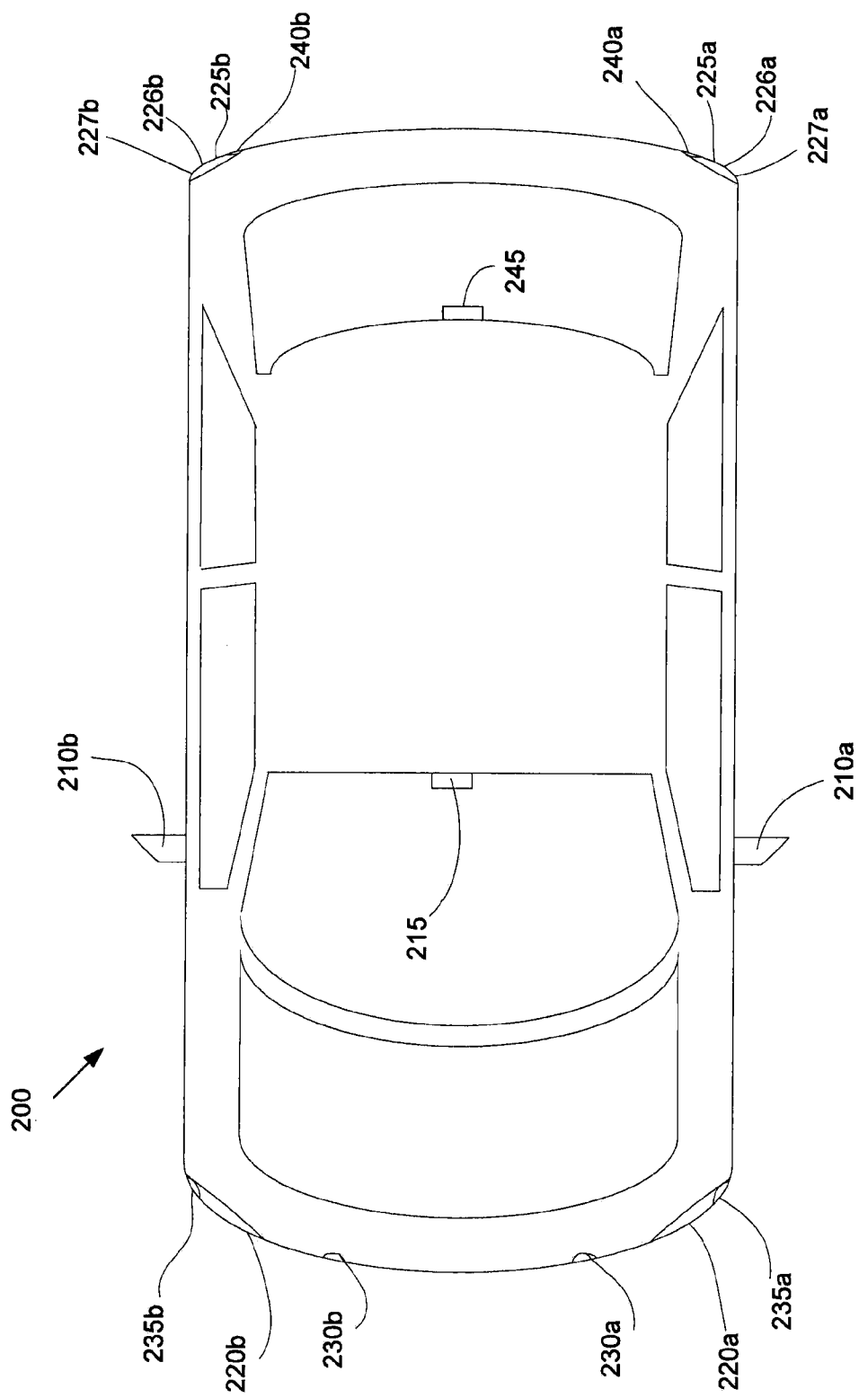
FIG. 2 depicts a controlled vehicle.

Referring initially to FIG. 2, there is shown a controlled vehicle 200 having a driver's side outside rearview mirror 210a, a passenger's side outside rearview mirror 210b and an inside rearview mirror 215. Details of these and other features will be described herein. Preferably, the controlled vehicle comprises an inside rearview mirror of unit magnification. A unit magnification mirror, as used herein, refers to a mirror with a plane or flat reflective element producing an image having perceived angular and linear sizes equal to those of the object. A prismatic day-night adjustment rearview mirror wherein at least one associated position provides unit magnification is considered herein to be a unit magnification mirror. Preferably, the mirror provides a field of view with an included horizontal angle measured from the projected eye point of at least 20 degrees and a sufficient vertical angle to provide a view of a level road surface extending to the horizon beginning at a point not greater than 61 m to the rear of the controlled vehicle when the controlled vehicle is occupied by a driver and four passengers or the designated occupant capacity, if less, based on an average occupant weight of 68 kg. It should be understood that the line of sight may be partially obscured by seated occupants or by head restraints. The location of the driver's eye reference points are preferably in accordance with regulation or a nominal location appropriate for any 95th percentile male driver. Preferably, the controlled vehicle comprises at least one outside mirror of unit magnification. Preferably, the outside mirror provides a driver of a controlled vehicle a view of a level road surface extending to the horizon from a line, perpendicular to a longitudinal plane tangent to the driver's side of the controlled vehicle at the widest point, extending 2.4 m out from the tangent plane 10.7 m behind the driver's eyes, with the seat in the rearmost position. It should be understood that the line of sight may be partially obscured by rear body or fender contours of the controlled vehicle. Preferably, the locations of the driver's eye reference points are in accordance with regulation or a nominal location appropriate for any 95th percentile male driver. Preferably, the passenger's side mirror is not obscured by an unwiped portion of a corresponding windshield and is preferably adjustable by tilting in both horizontal and vertical directions from the driver's seated position. In at least one embodiment, the controlled vehicle comprises a convex mirror installed on the passenger's side. Preferably, the mirror is configured for adjustment by tilting in both horizontal and vertical directions. Preferably, each outside mirror comprises not less than 126 cm of reflective surface and is located so as to provide the driver a view to the rear along an associated side of the controlled vehicle. Preferably, the average reflectance of any mirror, as determined in accordance with SAE Recommended Practice J964, OCT84, is at least 35 percent (40 percent for many European Countries). In embodiments where the mirror element is capable of operating at multiple reflectance levels, the minimum reflectance level in the day mode shall be at least 35 percent (40 percent when mirror is fabricated according to European standards) and the minimum reflectance level in the night mode shall be at least 4 percent.

With further reference to FIG. 2, the controlled vehicle 200 may comprise a variety of exterior lights, such as, headlight assemblies 220a, 220b; foul condition lights 230a, 230b; front turn-signal indicators 235a, 235b; taillight assembly 225a, 225b; rear turn signal indicators 226a, 226b; rear emergency flashers 227a, 227b; backup lights 240a, 240b and center high-mounted stop light (CHMSL) 245.

As described in detail herein, the controlled vehicle may comprise at least one control system incorporating various components that provide shared functions with other vehicle equipment. An example of one control system described herein integrates various components associated with automatic control of the reflectivity of at least one rearview mirror element and automatic control of at least one exterior light. Such systems may comprise at least one image sensor within a rearview mirror, an A-pillar, a B-pillar, a C-pillar, a CHMSL or elsewhere within or upon the controlled vehicle. Images acquired, or portions thereof, by a sensor may be used for automatic vehicle equipment control. The images, or portions thereof, may alternatively or additionally be displayed on one or more displays. At least one display may be covertly positioned behind a transflective, or at least partially transmissive, electro-optic element. A common controller may be configured to generate at least one mirror element drive signal and at least one other equipment control signal.

Exterior and Interior Rearview Assemblies.

Figure 3A:
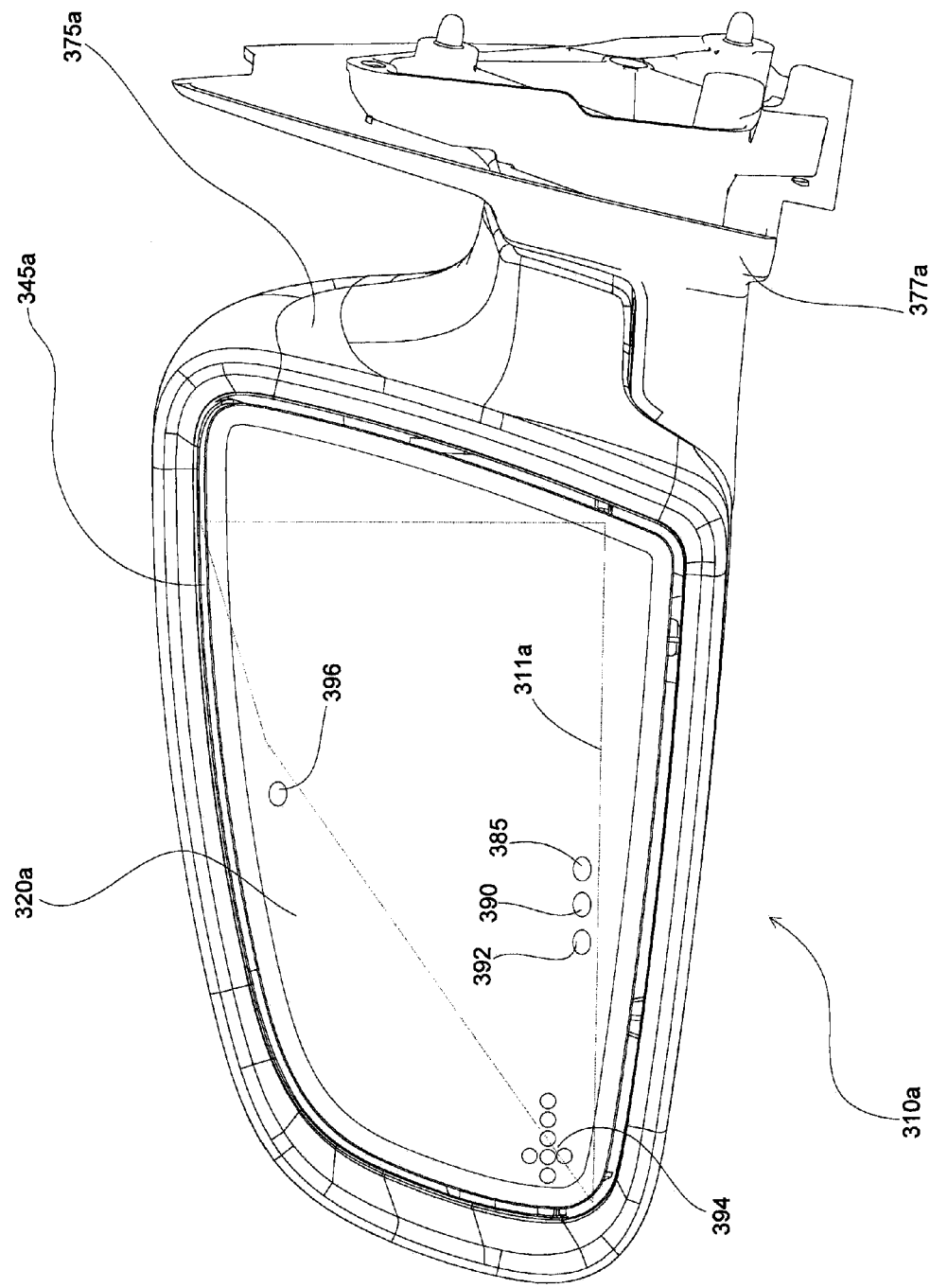
FIG. 3A depicts an assembly incorporating an electro-optic element.
Figure 3B:
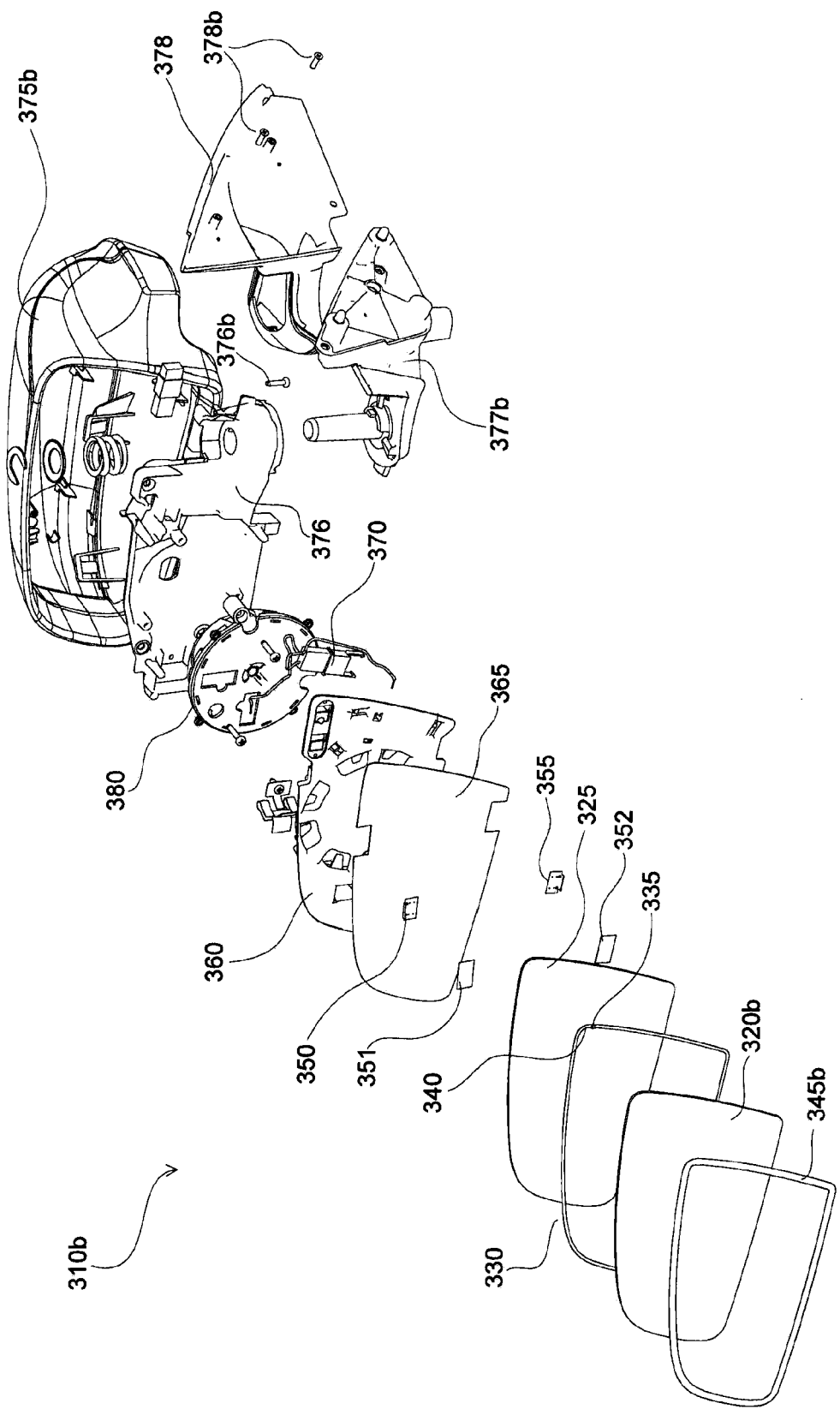
FIG. 3B depicts an exploded view of an outside rearview mirror.

Turning now to FIGS. 3a and 3b, various components of an outside (or exterior) rearview mirror assembly 310a, 310b are depicted. As described in detail herein, an electro-optic mirror element may comprise a first substrate 320a, 320b secured in a spaced apart relationship with a second substrate 325 via a primary seal 330 to form a chamber there between. At least a portion of the primary seal is left void to form at least one chamber fill port 335. An electro-optic medium is enclosed in the chamber and the fill port(s) are sealingly closed via a plug material 340. Preferably, the plug material is a UV-curable epoxy or acrylic material. Also shown is a spectral filter material 345a, 345b located near the periphery of the element. Generally, this optical thin-film spectral filter material 345a, 345b is circumferentially disposed in a peripheral area, next to a corresponding perimeter-defining edge, of either of the first and the second surface of the system, and is configured as a ring. Such ring of the spectral filter material will be interchangeably referred to herein as a peripheral ring. The electrical clips 350, 355 are preferably secured to the element, respectively, via first adhesive material 351, 352. The element is secured to a carrier plate 360 via second adhesive material 365. Electrical connections from the outside rearview mirror to other components of the controlled vehicle are preferably made via a connector 370. The carrier is attached to an associated housing mount 376 via a positioner 380. Preferably, the housing mount is engaged with a housing 375a, 375b and secured via at least one fastener 376b. Preferably, the housing mount comprises a swivel portion configured to engage a swivel mount 377a, 377b. The swivel mount is preferably configured to engage a vehicle mount 378 via at least one fastener 378b. Additional details of these components, additional components, their interconnections and operation are discussed below.

With further reference to FIG. 3a, the outside rearview mirror assembly 310a is oriented such that a view of the first substrate 320a is shown with the spectral filter material 345a positioned between the viewer and the primary seal material (not shown). A blind spot indicator 385, a keyhole illuminator 390, a puddle light 392, a turn signal 394, a photo sensor 396, any one thereof, a subcombination thereof or a combination thereof may be incorporated within the rearview mirror assembly such that they are positioned behind the mirror element with respect to the viewer. Preferably, the devices 385, 390, 392, 394, 396 are configured in combination with the mirror element to be at least partially covert as discussed in detail within various references incorporated by reference herein. Additional details of these components, additional components, their interconnections and operation are further discussed in reference to FIG. 65, below.

Figure 4:
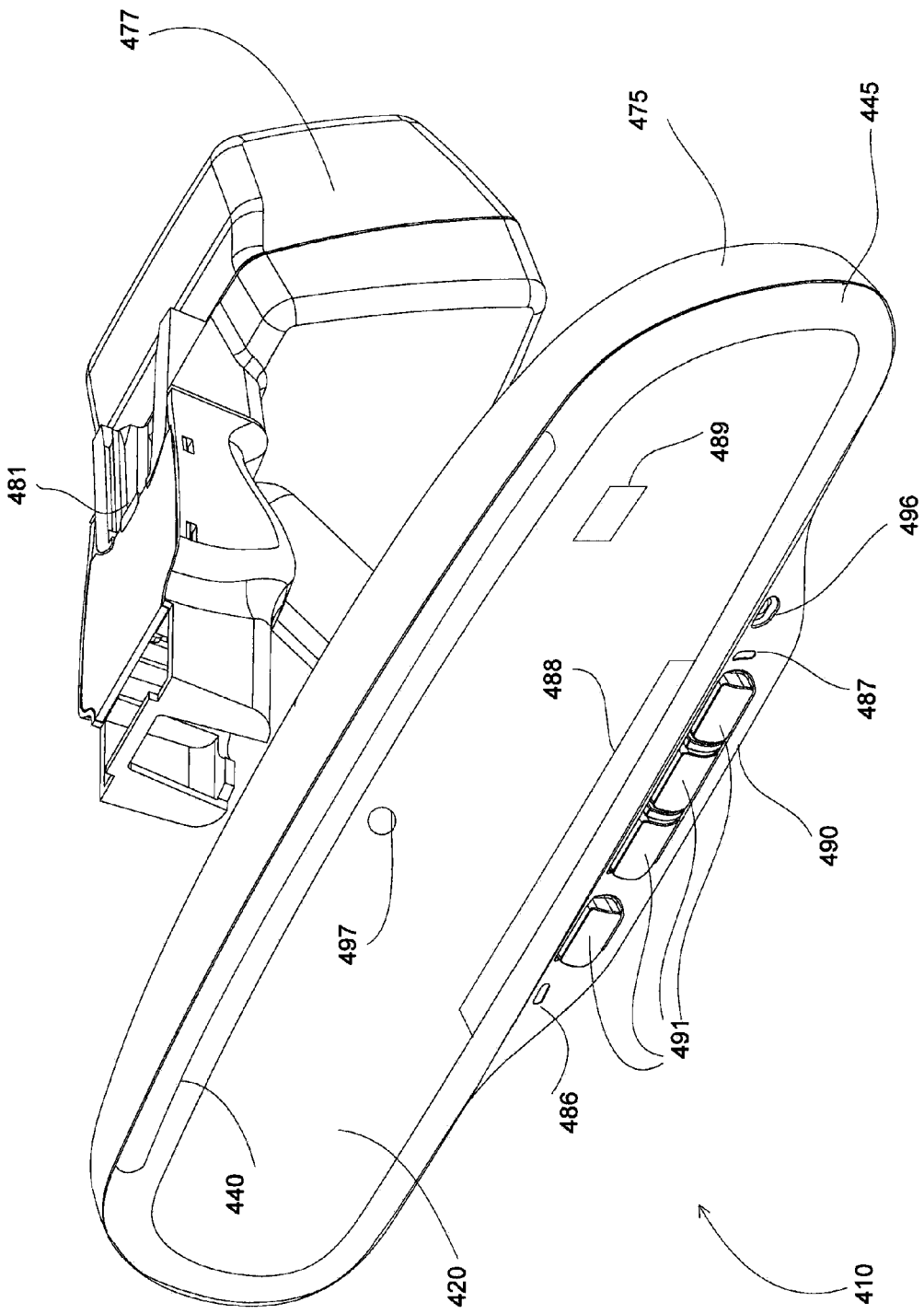
FIG. 4 depicts an inside rearview mirror assembly incorporating an electro-optic element.

Turning now to FIG. 4, there is shown an inside (or interior) rearview mirror assembly 410, as viewed when looking at the first substrate 420, with a spectral filter material 445 positioned between the viewer and a primary seal material (not shown). The mirror element is shown to be positioned within a movable housing 475 and combined with a stationary housing 477 on a mounting structure 481. A first indicator 486, a second indicator 487, operator interfaces 491 and a first photo sensor 496 are positioned in a chin portion 490 of the movable housing. A first information display 488, a second information display 489 and a second photo sensor 497 are incorporated within the assembly behind the mirror element with respect to the viewer. As described with regard to the outside rearview mirror assembly, it is preferable to have devices 488, 489, 497 at least partially covert. For example, a "window" may be formed in third and/or fourth surface coatings of the associated mirror element and configured to provide a layer of a platinum group metal (PGM) (i.e. iridium, osmium, palladium, platinum, rhodium, and ruthenium) only on the third surface. Thereby, light rays impinging upon the associated "covert" photo sensor "glare" will first pass through the first surface stack, if any, the first substrate, the second surface stack, the electro-optic medium, the platinum group metal and, finally, the second substrate. The platinum group metal functions to impart continuity in the third surface conductive electrode, thereby reducing electro-optic medium coloring variations associated with the window.

Figure 5:
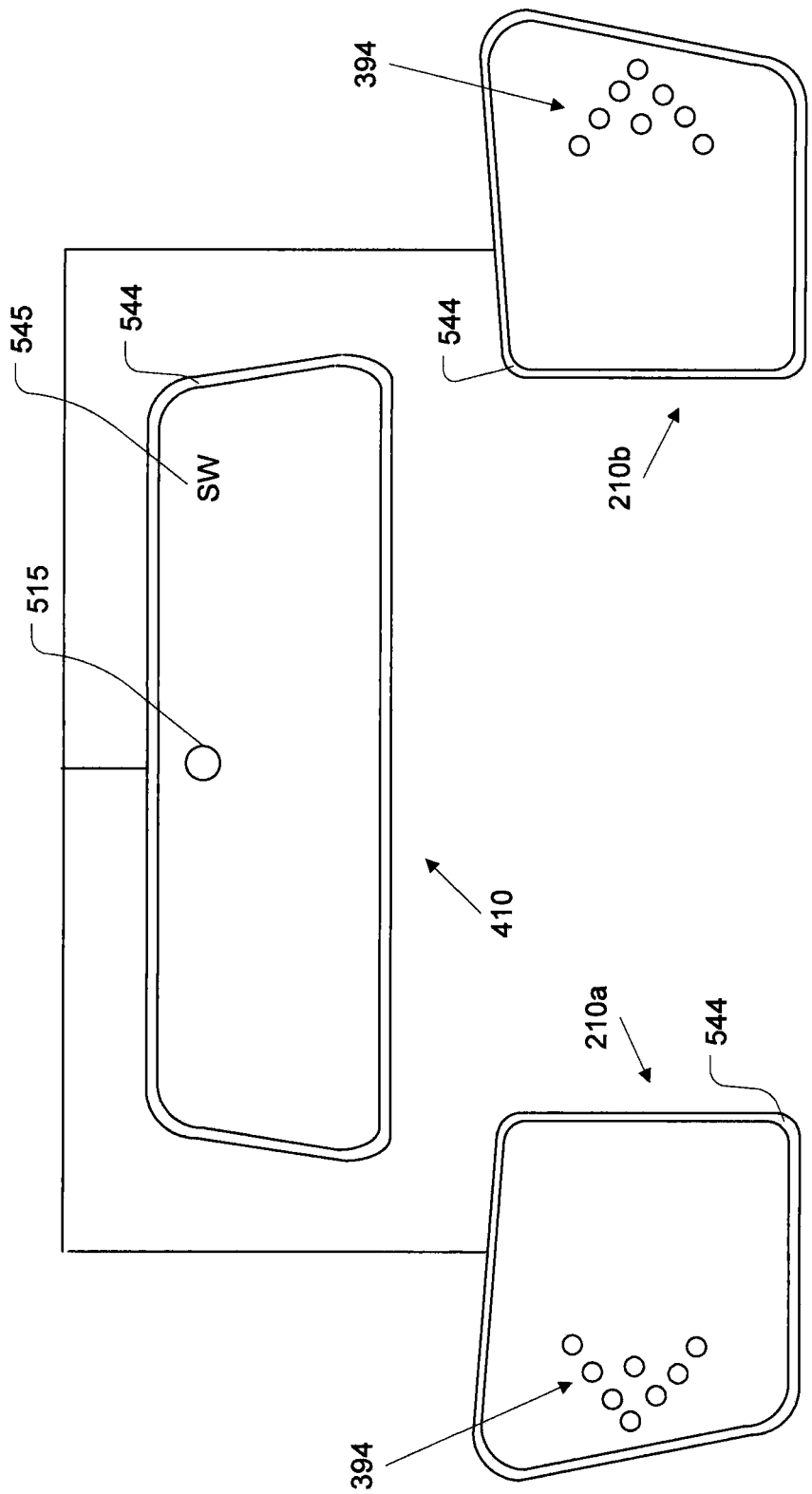
FIG. 5 is a front elevational view schematically illustrating a rearview mirror system constructed in accordance with the present invention.

FIG. 5 shows a front elevational view schematically illustrating an interior mirror assembly 510 and two exterior rearview mirror assemblies 210a and 210b for the driver side and passenger side, respectively, all of which are adapted to be installed on a motor vehicle in a conventional manner and where the mirrors face the rear of the vehicle and can be viewed by the driver of the vehicle to provide a rearward view. As mentioned above, the interior mirror assembly 410 and exterior rearview mirror assemblies 210a and 210b may incorporate light-sensing electronic circuitry of the type illustrated and described in the Canadian Patent No. 1,300,945, U.S. Pat. Nos. 5,204,778, 5,451,822, 6,402,328, or 6,386,713 and other circuits capable of sensing glare and ambient light and supplying a drive voltage to the electro-optic element. The disclosure of each of these patent documents is incorporated herein by reference in its entirety.

Mirror assemblies 410, 210a, and 210b are essentially similar in that like numbers identify components of the inside and outside mirrors. These components may be slightly different in configuration, but they function in substantially the same manner and obtain substantially the same results as similarly numbered components. For example, the shape of the front glass element of inside mirror 410 is generally longer and narrower than outside mirrors 210*a* and 210*b*. There are also some different performance standards placed on inside mirror 410 compared with outside mirrors 210*a* and 210*b*. For example, inside mirror 410 generally, when fully cleared, should have a reflectance value of about 70 percent to about 85 percent or even higher, whereas the outside mirrors often have a reflectance of about 50 percent to about 65 percent. Also, in the United States (as supplied by the automobile manufacturers), the passenger-side mirror 210*b* typically has a spherically bent or convex shape, whereas the driver-side mirror 210*a* and inside mirror 410 are presently required to be flat. In Europe, the driver-side mirror 210*a* is commonly flat or aspheric, whereas the passenger-side mirror 210*b* has a convex shape. In Japan, both outside mirrors have a convex shape. While the focus of the invention is generally towards exterior mirrors, the following description is generally applicable to all mirror assemblies of the present invention including inside mirror assemblies. Moreover, certain aspects of the present invention may be implemented in electro-optic elements used in other applications such as architectural windows, or the like, or even in other forms of electro-optic devices.

An embodiment of a rearview mirror of the present invention may include a housing having a bezel 544, which may extend around the entire periphery of each of individual assemblies 410, 210*a*, and/or 210*b*. However, as discussed below, the scope of the present invention also includes embodiments having no bezel. When present, the bezel 544 visually conceals and protects the buss connector and the seal. A wide variety of bezel designs are well known in the art, such as, for example, the bezel taught and claimed in above-referenced U.S. Pat. No. 5,448,397.

EXAMPLES OF EMBODIMENTS

Various Embodiments, Including Embodiments of Electrical Interconnects.

In the following description of various embodiments, accompanied by FIGS. 6 through 16, references are made to only those elements and components that are necessary for understanding of a particular feature of an embodiment being discussed. Corresponding drawings illustrate only these referenced elements and components while other elements (such as additional thin-film coatings, for example) are omitted from the drawings for clarity of the presentation. It would be understood, however, that such other elements are implied and not excluded from the scope of a particular embodiment being described, unless stated otherwise.

Figure 6A:
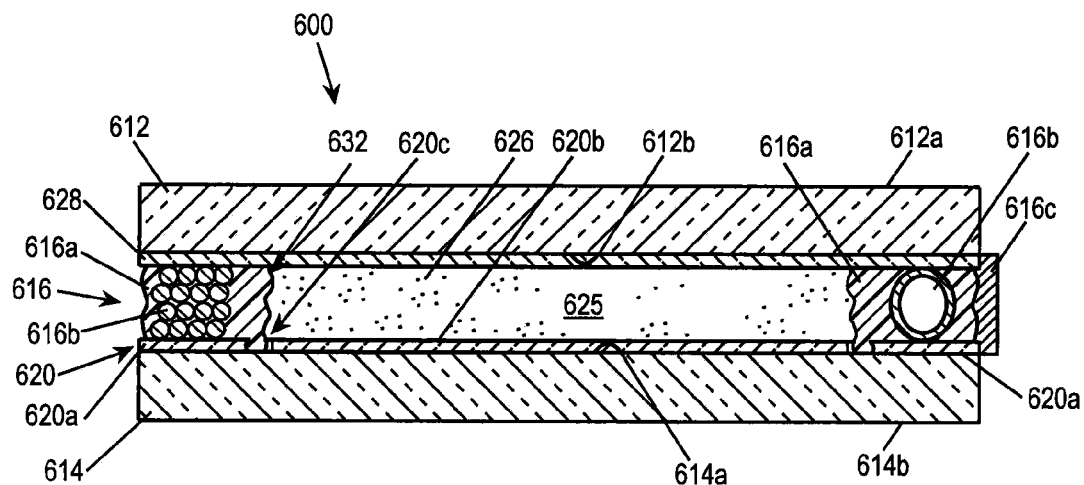
FIG. 6A is an enlarged cross-sectional view, along the line III-III of FIG. 5, of an embodiment of the present invention.

FIG. 6A shows a cross-sectional view 600 of an exterior mirror assembly 210 (a or b) of FIG. 5, constructed in accordance with at least one embodiment of the present invention. A shown, an embodiment of FIG. 6A includes a front substantially transparent element (such as a glass substrate, for example) 612 that corresponds to the outer, or front, portion of the mirror assembly 210 facing the driver and a rear element 614 (such as another glass substrate, for example) that corresponds to the back portion of the mirror assembly 210. The front element 612 has a front surface 612*a* and a rear surface 612*b*, and a rear element 614 has a front surface 614*a* and a rear surface 614*b*. For clarity of description of such a structure, the following designations will be generally used hereinafter in this disclosure. The front surface 612*a* of the front glass element 612 will be referred to as the first surface, and the back surface 612*b* of the front glass element 612 as the second surface. The front surface 614*a* of the rear glass element 614 will be referred to as the third surface, and the back surface 614*b* of the rear glass element as the fourth surface. Generally, therefore, the first surface corresponds to a front of the mirror element while the fourth surface corresponds to a back of the mirror element. Similar designations are used throughout this disclosure in description of any embodiment. A chamber or gap 625 between the two elements 612 and 614 is defined by an inner circumferential wall 632 of sealing member 616*a* and lined with a layer of substantially transparent conductor electrode 628 (carried on second surface 612*b*) and a reflecting electrode 620 (carried on third surface 614*a*). An electrochromic medium 626 is contained within the chamber 625. The edges of the elements 612 and 614 preferably have a "zero offset" in a transverse direction, which as used herein means they are on average less than about 1-mm from being in perfect alignment, or more preferably are within about 0.5-mm from being in perfect alignment. The zero offset may extend (and be maintained) completely around the elements 612 and 614, or, alternatively, may extend along portions thereof, such as along edge portions having a bus connector or electrical conductor for the electrochromic material circuit. In embodiments of the invention, such small or zero offset is employed to further reduce a total width or size of the edge bezel (see, for example, items 3944 of FIG. 39, 4044*a* of FIG. 40, 2282 of FIG. 22B, 2282*b* of FIG. 22E, 1366 of FIG. 23, or 4244-4244P of FIGS. 42-59).

The front transparent element 612 may be made of any material which is substantially transparent to visible light and has sufficient strength to be able to operate in the conditions commonly found in the automotive environment (e.g., varying temperatures and pressures). The front element 612 is preferably a sheet of glass and may comprise any type of borosilicate glass, soda lime glass, float glass, or any other material, such as, for example, a polymer or plastic, that is transparent in the visible region of the electromagnetic spectrum. The rear element 614 must meet the operational conditions outlined above, except that it does not need to be transparent in all applications, and therefore may comprise polymers, metals, glass, ceramics. In a preferred embodiment, however, the rear element 614 is a sheet of glass.

As shown in FIG. 6A, the electrode 620 on the third surface 614*a* is sealably bonded to the electrode 628 on the second surface 612*b* by a seal member 616 disposed near the outer perimeter of both the second surface 612*b* and the third surface 614*a* so as to keep the substrates 612, 614 in a spaced-apart and parallel relationship. The seal member 616 may incorporate any material that is capable of adhesively bonding coatings on the second surface 612*b* to coatings on the third surface 614*a* in order to seal the perimeter of the chamber 625 to prevent the leakage of the electrochromic material 626 from the chamber 625. In alternative embodiments, as described below, the layer of transparent conductive coating 628 and/or the layer of electrode 620 may be removed from a portion of the chamber where the seal member is disposed. In such a case, the seal member 616 should be configured to bond well to glass.

The performance requirements for a perimeter seal member 616 used in an electrochromic device are similar to those for a perimeter seal used in a liquid crystal device (LCD), which are well known in the art. The seal must have good adhesion to glass, metals and metal oxides; must have low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes, titanates, or sulfur or phosphorous compounds can be used to improve the seal's hydrolytic stability and adhesion, and spacers such as glass or plastic beads or rods can be used to control final seal thickness and substrate spacing. Suitable epoxy resins for use in a perimeter seal member 616 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 21Z, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 2049, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif. The seal may be constructed in accordance with the teachings in U.S. Pat. Nos. 5,790,298 and 6,157,480, the disclosure of each of which is incorporated herein by reference in its entirety.

Another suitable way to maintain precision spacing between the two pieces of glass is by adding plastic fibers to the seal material. These fibers if cut from monofilament in an aspect ratio of about 2.5-3 to 1 (length to diameter) are particularly effective in keeping the two substrates from sliding during the seal cure process. The glass spheres act as ball bearings that can enable movement between the substrates during seal cure. Plastic fibers made of high temperature polyester (PEN) or polyetherimide (Ultem) when added to the seal material at around a 1% by weight loading help prevent substrate movement because they are randomly orientated and some will not be positioned to roll. These plastic spacers have another benefit in that they more closely match the thermal expansion of cured organic seal material and consequently will generate less seal stress during thermal cycling.

In further reference to FIG. 6A, the layer 628 of a substantially transparent electrically conductive material is deposited on the second surface 612b to act as an electrode of the electrochromic device. The substantially transparent conductive material 628 may be any material which bonds well to the front element 612, is resistant to corrosion caused by any materials within the electrochromic device, is resistant to corrosion by the atmosphere or road salts, has minimal diffuse or specular reflectance, high light transmission, near neutral coloration, and good electrical conductance. The transparent conductive material used for the layer 628 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany; it may further include the materials described in above-referenced U.S. Pat. No. 5,202,787, such as TEC 20 or TEC 15, available from Libbey Owens-Ford Co. of Toledo, Ohio, other transparent conductive metal oxides, or other transparent conductors. Generally, the conductivity of the transparent conductive layer 628 will depend on its thickness and material composition. In one embodiment, the layer 628 may include an insulator-metal-insulator (IMI) film structure (or stack) that generally has superior conductivity compared with the other materials. The IMI stack, however, is known to undergo more rapid environmental degradation and suffer from interlayer delamination. The thicknesses of the various layers in the IMI structure may vary, but generally the thickness of the first insulator layer (e.g., ITO) ranges from about 10 Å to about 200 Å, the thickness of the metal layer ranges from about 10 Å to about 200 Å, and the thickness of the second insulator layer (e.g., ITO) ranges from about 10 Å to about 200 Å. If desired, an optional layer or layers of a color suppression material (not shown) may be deposited between the layer 628 and the second surface 612b to suppress the reflection of any unwanted portions of the electromagnetic spectrum.

In further reference to FIG. 6A, a reflector/electrode (or, reflecting electrode) 620 includes reflecting layer(s) and electrically conducting layer(s), referred to herein as a reflector/electrode or reflecting electrode and is preferably disposed on the third surface 614a. The reflector/electrode 620 comprises at least one layer of a reflective material, which serves as a reflecting layer and also forms an integral electrode in contact with and in a chemically and electrochemically stable relationship with any constituents in an electrochromic medium. The reflector/electrode 620 may be mostly reflective or may be partially transmissive/partially reflective (or "transflective") as disclosed in commonly-assigned U.S. Pat. No. 6,700,692, the entire disclosure of which is incorporated herein by reference. As an alternative, the electrochromic device could incorporate a transparent electrically conductive material on the third surface, which acts as an electrode, and incorporate a reflector on the fourth surface of an embodiment. However, combining the "reflector" and "electrode" into a reflecting electrode 620 and placing both on the third surface is preferred because it makes the device manufacture less complex and allows the device to operate at higher performance levels. The combined reflector/electrode 620 on the third surface generally has higher conductivity than a single conventional transparent electrode used on the third surface.

With respect to the transparent electrode 628, its material composition may be changed to generally lower its conductivity while maintaining coloration speeds of the EC-element that are similar to those obtainable with a fourth surface reflector device (this results in a substantial decreased of the overall cost and time of production of an electrochromic device). Improvement of performance of the device, on the other hand, may require a transparent electrode 628 on the second surface to have moderate to high value of conductivity. For this purpose, materials such as ITO or IMI may be used for the construction of the electrode 628. The combination of a high conductivity (i.e., the conductivity corresponding to sheet resistance of less than 250 Ω/square, preferably less than 15 Ω/square and most preferably between approximately 15 Ω/square and approximately 0.01 Ω/square) of the reflector/electrode 620 on the third surface and a high conductivity of the substantially transparent electrode 628 on the second surface will not only result in an electrochromic device having more even distribution of color across the device, but will also allow for increased speed of coloration. Furthermore, in mirror assemblies utilizing a fourth surface reflector, both the electrode on the second surface and the electrode on the third surface are substantially transparent electrodes with relatively low conductivity. In previously used mirrors having third-surface reflector, there is a substantially transparent electrode and a reflector/electrode with relatively low conductance and, as such, a long bus bar on the front and rear element to bring current in and out is necessary to ensure adequate coloring speed and coloring uniformity. In contradistinction, the third surface electrode of at least some embodiments of the present invention are metallic and may have a higher conductance and therefore has a very even voltage or potential distribution across the conductive surface, even with a small or irregular contact area. Thus, the present invention provides greater design flexibility by allowing the electrical contact for the third surface electrode to be very small (if desired) while still maintaining adequate coloring speed and coloring uniformity.

In construction of outside rearview mirrors it is desirable to use thinner glass substrates in order to decrease the overall weight of a mirror so that the mechanisms used to manipulate the orientation of the mirror are not overloaded. Decreasing the weight of the device additionally improves the dynamic stability of the mirror assembly when it is exposed to vibrations. Alternatively, decreasing the weight of the mirror element may permit more electronic circuitry to be provided in the mirror housing without increasing the weight of the mirror housing. Thin glass may be prone to warpage or breakage, especially when exposed to extreme environments. In embodiments of the present invention substantially this problem is substantially alleviated by the use of two thin glass elements and an improved gel material. Such improved electrochromic device is disclosed in commonly assigned U.S. Pat. No. 5,940,201, the entire disclosure of which is incorporated herein by reference.

The addition of the combined reflector/electrode onto the third surface of the device further helps to remove any residual double or spurious imaging resulting from the two glass elements having non-parallel surfaces. Thus, chamber 625 preferably contains a free-standing gel that cooperatively interacts with thin glass elements 612 and 614 to produce a mirror that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium" 626). This allows one to construct a rearview mirror with thinner glass in order to decrease the overall weight of the mirror while maintaining sufficient structural integrity so that the mirror will survive the extreme conditions common to the automobile environment. This also helps maintain uniform spacing between the thin glass elements, which improves uniformity in the appearance (e.g., coloration) of the mirror. This structural integrity results because the free-standing gel 626, the first glass element 612, and the second glass element 614, which individually have insufficient strength characteristics to work effectively in an electrochromic mirror, are coupled in such a manner that they no longer move independently but act as one thick unitary member. This structural integrity leads to increased mechanical stability of the mirror that includes, but is not limited to, resistance to flexing, warping, bowing and breaking, as well as improved image quality of the reflected image, e.g., less distortion, double image, color uniformity, and independent vibration of each glass element. However, while it is important to couple the front and rear glass elements, it is equally important (if not more so) to ensure that the electrochromic mirror functions properly. To assure such performance, the free-standing gel must bond to the electrode layers of the electrochromic element (including the reflector/electrode if the mirror has a third surface reflector) on the walls of such a device, but at the same time not interfere with the electron transfer between the electrode layers and the electrochromic material(s) disposed in the chamber 625. Further, the gel must not shrink, craze, or weep over time such that the gel itself causes poor image quality. Ensuring that the free-standing gel bonds well enough to the electrode layers to couple the front and rear glass elements and does not deteriorate over time while allowing the electrochromic reactions to take place as though they were in solution, is an important aspect of the present invention. When using a $1^{st}$ surface reflector around the perimeter of an electro-optic mirror where the primary reflector is on one of the other surfaces, the distance between the two reflective surfaces causes a dark shadow area to be formed when viewing the mirror from an angle. The shadow increases in size with thicker substrates and decreases in size for thinner substrates. The shadow creates a region on discontinuous reflection and is undesirable when viewing an object in the mirror. To minimize this shadow, the first substrate 612 with a thickness of less than 2.0 mm may be used. It is more preferred to use the first substrate of approximately 1.8 mm or less, and most preferred to use a first substrate of approximately 1.1 mm or less.

To perform adequately, a mirror must accurately represent the reflected image, and this cannot be accomplished when the glass elements (to which the reflector is attached) tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives has varying coefficients of thermal expansion that will expand and shrink to varying degrees during heating and cooling and will exert stress on the glass elements 612 and 614. On very large mirrors, hydrostatic pressure becomes a concern and may lead to double imaging problems when the front and rear glass elements bow out at the bottom and bow in at the top of the mirror. By coupling the front and rear glass elements, the thin glass/free-standing gel/thin glass combination acts as one thick unitary member (while still allowing proper operation of the electrochromic mirror) and thereby reduces or eliminates the bending, bowing, flexing, double image, and distortion problems and non-uniform coloring of the electrochromic medium.

The cooperative interaction between the freestanding gel and the thin glass elements of the present invention also improves the safety aspects of an electrochromic mirror having thin glass elements. In addition to being more flexible, thin glass is more prone to breakage than thick glass. By coupling the free-standing gel with the thin glass, the overall strength is improved (as discussed above) and further restricts shattering and scattering and eases clean-up in the case of breakage of the device.

An improved cross-linked polymer matrix used in at least one embodiment of the present invention is disclosed in commonly assigned U.S. Pat. No. 5,928,572, the entire disclosure of which is incorporated herein by reference.

Typically, electrochromic mirrors are made with glass elements having a thickness of about 2.3-mm. The preferred thin glass elements according to at least one embodiment of the present invention have thicknesses of about 1.1 mm, which results in a substrate weight savings of more than 50 percent. This decreased weight ensures that the mechanisms used to manipulate the orientation of the mirror, commonly referred to as carrier plates, are not overloaded and further provides significant improvement in the vibrational stability of the mirror.

Therefore, in at least one embodiment, the front transparent element 612 is preferably a sheet of glass with a thickness ranging from 0.5 mm to about 1.8 mm, preferably from about 0.5 mm to 1.6 mm, more preferably from about 0.5 mm to 1.5 mm, even more preferably from about 0.8 mm to about 1.2 mm, with the presently most preferred thickness about 1.1 mm. The rear element 614 preferably is a sheet of glass with a thickness in the same ranges as element 612.

Vibrations that result from the engine running and/or the vehicle moving affect the rearview mirror, such that the mirror essentially acts as a weight at the end of a vibrating cantilever beam. This vibrating mirror causes blurring of the reflected image, which is a safety concern as well as a phenomenon that is displeasing to the driver. As the weight on the end of the cantilever beam (i.e., the mirror element attached to the carrier plate on the outside mirror or the mirror mount on the inside mirror) is decreased, the frequency at which the mirror vibrates increases. If the frequency of the mirror vibration increases to around 60 Hertz or greater, the blurring of the reflected image is not visually displeasing to the vehicle occupants. Moreover, as the frequency at which the mirror vibrates increases, the distance the mirror travels while vibrating decreases significantly. Thus, by decreasing the weight of the mirror element, the complete mirror becomes more vibrationally stable and improves the ability of the driver to view what is behind the vehicle. When both glass elements are made thin, the resistance to vibrations of an interior or exterior mirror improves, which is particularly important for exterior mirrors. For example, an interior mirror with two glass elements having a thickness of 1.1 mm has a first mode horizontal frequency of about 55 Hertz whereas a mirror with two glass elements of 2.3 mm has a first mode horizontal frequency of about 45 Hertz. This 10 Hertz difference produces a significant improvement in how a driver views a reflected image.

A resistive heater (not shown in FIG. 6A) may be disposed on the fourth glass surface 614b to heat the mirror and thereby clear the mirror of ice, snow, fog, or mist. The resistive heater may optionally be a layer of ITO, fluorine-doped tin oxide applied to the first and, or, fourth surface, or may be other heater layers or structures well known in the art.

An electrical circuit such as those taught in the above-referenced Canadian Patent No. 1,300,945 and U.S. Pat. Nos. 5,204,778, 5,434,407, 5,451,822, 6,402,328, and 6,386,713, is connected to and allows control of the potential to be applied across electrode 620 and transparent electrode 628, such that electrochromic medium 626 will darken and thereby attenuate various amounts of light traveling therethrough and thus vary the reflectance of the mirror containing electrochromic medium 626. The electrical circuit used to control the reflectivity of the electrochromic mirrors preferably incorporates an ambient light sensor (not shown) and a glare light sensor 515 of FIG. 5, the glare light sensor being positioned either behind the mirror glass and looking through a section of the mirror with the reflective material completely or partially removed, or the glare light sensor can be positioned outside the reflective surfaces (e.g., in the bezel 544) or, as described below, behind a uniformly deposited transflective coating. Additionally, in some some area(s) of the mirror element the electrodes 628, 620 may be partially or completely removed to permit a light-emitting display 545 of FIG. 5 (corresponding to a compass, clock, or other indicia) to show through the mirror element to the driver of the vehicle. Alternatively, as described below, this light-emitting display assembly can be shown through a uniformly deposited transflective coating. In one embodiment of the invention, a mirror utilizes only one video chip light sensor to measure both glare and ambient light and is equipped with means for determination of the direction of glare. An automatic mirror on the inside of a vehicle, constructed according to this invention, can also control one or both outside mirrors as slaves in an automatic mirror system wherein the individual mirror elements are independently controllable.

Figure 6B:
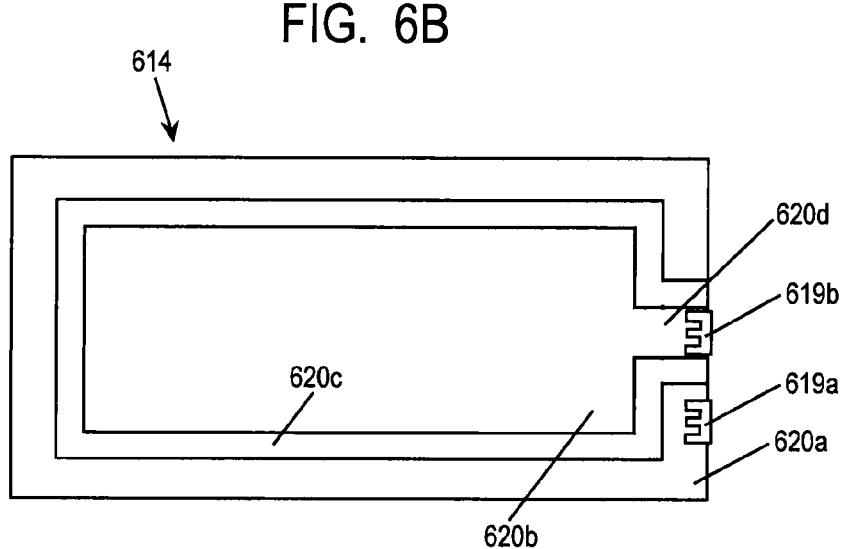
FIG. 6B is a top plan view of a second substrate, as may be used in an embodiment of FIG. 6A, having an electrode formed thereon.

FIG. 6B shows a top plan view of the second transparent element 614 with then reflecting electrode 620 deposited thereon, as may be used with the structure shown in FIG. 6A. As shown, the electrode 620 is separated into two distinct electrode areas—a first portion 620a and a second portion 620b that are electrically isolated and physically separated by an area 620c, which is devoid of electrode material or any other electrically conductive material. As a result, no current flows from the first portion 620a to the second portion 620b of the electrode 620. Removal of the electrode material 620 from the area 620c may be achieved, for example, by chemical etching, laser ablation, or scraping. Alternatively, the deposition of the electrode material in the area 620c can also be initially avoided by masking the area 620c during the deposition process.

As shown in FIG. 6A, the second portion 620b of the electrode 620 is in electrical contact with the electrochromic medium 626 at the third surface 614a of the electrochromic device. At the same time, the first portion 620a of the electrode 620 is physically isolated from the electrochromic medium 626 by either the area 620c, seal 616, or both. The first portion 620a, however, is electrically coupled to a portion of the transparent electrode 628 on the second surface 612b of the electrochromic device by means of an electrical conductor, which may extend around some or most of the periphery of the seal 616. Thus, a short circuit is effectively provided between portions of the electrode layers 620, 628. This short circuit allows the bus clip normally attached to a peripheral edge of the first transparent element 612 to be attached instead to the second element 614. More specifically, as shown in FIG. 6B, an electrical connection between the power supply and transparent electrode 628 on the second surface may be made by connecting the bus bars (or clips 619a) to the first portion 620a of electrode layer 620. An electrical connection to the second portion 620b may be made using a clip 619b that is attached to an extension 620d, of the portion 620b, that extends to the peripheral edge of the element 614. Such configuration is advantageous in that it provides an electrical connection to and communication with the transparent conductive material 628 nearly all the way around the circumference of the electrochromic element, which improves the speed of dimming and clearing of the electrochromic media 626. As will be described further below with respect to other embodiments, clips 619a and 619b may be replaced with other types of electrical connectors.

FIG. 6A is drawn to simultaneously show two different implementations of electrical conductors providing for electrical coupling of the first portion 620a of the electrode 620 to a portion of electrode 628. Specifically, the left side of an embodiment 600 of FIG. 6A demonstrates that conductive particles 616b may be distributed through at least part of the seal material 616 such that a portion of the seal 616 is electrically conductive. In one embodiment, the seal 616 is not electrically conductive across its entire width, but rather has a non-conductive portion that electrically insulates the conductive portion containing the conductive particles from the electrochromic medium 626 and prevents a short circuit between the electrode 628 and second portion 620b of the electrode 620. In this manner, the drive potential from the power supply is provided through the first portion 620a of the electrode 620 and conductive particles 616b in the seal 616 before reaching the transparent conductor 628. In such a configuration, the seal 616 comprises a typical sealing material (e.g., epoxy 616a), with the conductive particles 616b interdispersed therein. The conductive particles may be small, such as, for example, gold, silver, copper, metal-coated plastic particles with a diameter ranging from about 5 microns to about 80 microns, in which case there must be a sufficient number of particles to ensure sufficient conductivity between the first portion 620a of electrode 620 and the transparent electrode 628. Alternatively, the conductive particles may be large enough to act as spacers, such as, for example, gold, silver, copper, or metal-coated glass or plastic beads. The conductive particles may further be in the form of flakes or other suitable shapes or combination of different shapes.

To ensure that no conductive particles 616b are in contact with the area 620b of the reflecting electrode, a variety of methods may be used. For example, a non-conductive material may be disposed into the area 620c separating the portions 620a and 620b of the electrode 620. A dual dispenser could be used to deposit the seal 616 with conductive particles 616b onto the first portion 620a of the electrode 620 and to simultaneously deposit the nonconductive material into the area 620c. One general method of ensuring that no conductive particles reach the electrode area 620b is to make sure that the seal 616 has appropriate flow characteristics such that the conductive portion 616b tends to stay behind as the sealant is squeezed out during the assembly process, and that only the non-conductive portion of the seal 616 flows into the area 620b. Another method would be to dispense the non-conductive seal material(s) between the substrates, separately cure, or partially cure, the dispensed non-conductive seal, and then inject the conductive epoxy between the two substrates.

In an alternative implementation, shown on the right side of the embodiment 600 of FIG. 6A, a larger electrical conductor 616b is provided, which may also serve as a spacer. Such a larger electrical conductor may be a single wire, a braided wire, a conductive strip, or simply large particles or beads that are either electrically conductive throughout or coated with an electrically conductive material. In this implementation, the seal 616 need not contain conductive particles or other electrical conductor 616b and, instead, a conductive member or material 616c may be placed on or in the outer edge of the seal 616 to interconnect the transparent conductive material layer 628 to the first portion 620a of the electrode 620. Alternatively, such a conductive member 616c may also be used in combination with conductors dispersed within the seal or otherwise between the elements 612 and 614.

Figure 7:
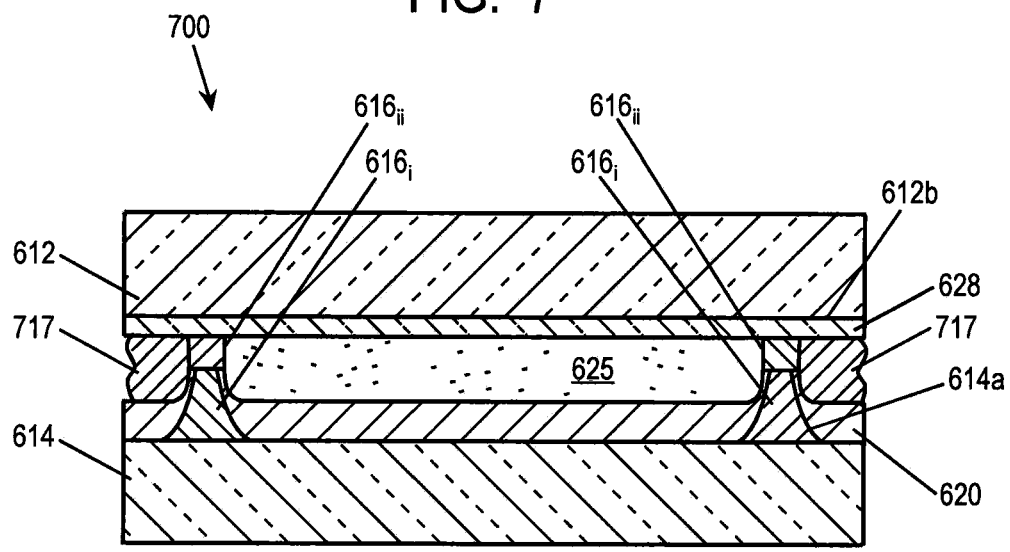
FIG. 7 is an enlarged cross-sectional view of an embodiment of an electro-optical element of the present invention.

Yet another embodiment 700 of an improved electrical interconnection technique is illustrated in FIG. 7, where a seal member 616 is applied in two steps. A first portion of a seal member is applied directly onto the third surface 614a and is cured prior to the application of the electrode 620. After the electrode 620 is deposited onto the third surface 614a over the first portion of the cured seal member 616, a portion of the cured seal member 616 is machined off to leave a sub-portion 616i, as shown, having a predetermined thickness (which will vary depending on the desired cell spacing between the second surface 612b and the third surface 614a). Generally, the cell spacing ranges from about 20 microns to about 1500 microns, and preferably ranges from about 90 microns to about 750 microns. By curing the first portion of seal member and machining it to a predetermined thickness (616i), the need for glass beads to ensure a constant cell spacing is eliminated. Although, as discussed above, glass beads are useful to provide cell spacing, they provide mechanical stress at the points of contact with the electrodes 620 and 628. In absence of glass beads, these stress points are eliminated. During the machining of the cured first portion of the seal member 616, a portion of the electrode 620 that is coated on the first portion of seal member is removed to leave an area devoid of the electrode layer 620. Subsequently, a second portion of seal member 616ii is deposited onto the machined area of the first portion of seal member 616i or, alternatively, on the coatings covering the second surface 612b in the area corresponding to 616i. The first and second substrates 612, 614 are then appropriately assembled, following by curing the second portion 616ii of the seal member 616. Finally, an outer electrically conductive seal member 717 may optionally be deposited on the outer peripheral portion of the seal member 616 to provide for an electrical contact between the outer edge of the electrode 620 and the outer peripheral edge of the transparent conductive material layer 628. This configuration is advantageous in that it provide for an electrical connection to the transparent conductive material 628 nearly all the way around the circumference of the embodiment of the device, and, therefore, improves the speed of dimming and clearing of the electrochromic media 626.

Another implementation of electrical interconnections in an embodiment of the present invention is shown in FIG. 8A. This implementation 800 differs from the embodiments of FIGS. 6A and 7 in that the electrical conductor connecting the first portion 620a of the electrode 620 to a portion of the transparent electrode 628 is a wire or a strip 850 that may be coated with a conductive material 852 to improve contact to the electrode layers 620, 628 and to thereby ensure contact stability. The conductive material 852 may be conductive pressure-sensitive adhesive (PSA), conductive ink or an epoxy either of which may loaded with conductive particles, flakes, or fibers made of materials such as silver, gold, copper, nickel, or carbon. If the conductive material 852 has sufficient conductivity, a wire/strip 850 would not be needed. For coloring uniformity it is desirable to keep the measured resistance along the long edge of a mirror element below 5 Ohms, more preferably below 1 Ohm and most preferably below 0.5 Ohm. Many conductive inks or adhesives that are formulated for the electronics industry are suitable for this application. The ink or adhesive is preferably filled with conductive flakes, fibers or particles or a combination thereof to have a sufficient filler loading and is deposited with sufficient width and thickness to achieve the desired level of conductivity. An epoxy adhesive formulation with suitable conductivity is (by weight) between approximately 10% and approximately 20%, most preferably approximately 13.5%, epoxy resin D.E.R. 354 or 354 LV (Dow Chemical Company), between approximately 3% and approximately 7%, and most preferably approximately 4.5%, Ancamine 2049 (Air Products and Chemicals Inc.) and between approximately 70% and approximately 85%, and most preferably approximately 82%, sliver flake LCP 1-19 (Ames-Goldsmith). It is preferable to keep the bulk conductivity of the filler material below approximately 20 microOhm-cm, more preferably below approximately 10 microOhm-cm and most preferably below approximately 5 microOhm-cm. Similarly to the embodiments of FIGS. 6B and 7, the electrode 620 of the embodiment of FIG. 8 is separated into the first and second portions 620a, 620b by an area 620c that is devoid of any electrically conductive material.

FIG. 8B provides, in the same drawing, a showing of two alternative implementations of electrical interconnections that are related to the embodiment 800 of FIG. 8A. One implementation is shown on the left side of a structure 860. Here, at least one portion of the peripheral edge of the front surface 614a of the element 614 may be beveled to provide a heavy seam 854 between the elements 612 and 614. By forming this large seam 854, a larger diameter wire 850 may be inserted between the elements 612 and 614, without otherwise having to increase the spacing between the elements 612 and 614 which would result in increase of the width of the chamber 625. Such a heavy seam 854 may be provided by beveling either the front surface 614a of the element 614 or the rear surface 612b of the front element 612. An alternative second implementation is shown on the right side of the structure 860. Here, rather than providing a single large diameter wire 850, a plurality of smaller-diameter wires 850' or wire strands of a braided wire may be provided as the electrical conductor between portions of the electrodes 620 and 628. The use of wires twisted together makes it easier to apply the adhesive 852. The wires 850' need not be made of the same material. For instance, a copper wire could be twisted with a stainless steel, nylon, KEVLAR, or carbon fiber or wire to impart strength or other desirable properties to the seal region of the embodiment of a mirror element. The seam 854 could extend, for example, 0.020 inch in from side edges of the elements 612 and 614. Using the left portion of the structure 860 as an example, although the seam could extend far enough into the device such that the nonconductive seal portion 616 would cover the beveled portion of the electrode 620b, it still would be beneficial to laser etch the region 620c to ensure there is no electrical shorting between the electrodes 628 and 620b through the conductive material 852. It should be noted that if conductive adhesive 852 were of sufficient conductivity, the wire 850 would not be necessary. In this case, the heavy seam 854 would allow for use of a greater amount of the conductive material 852 between the substrates 612, 614 to improve the overall conductivity of the contact area.

Figure 8C:
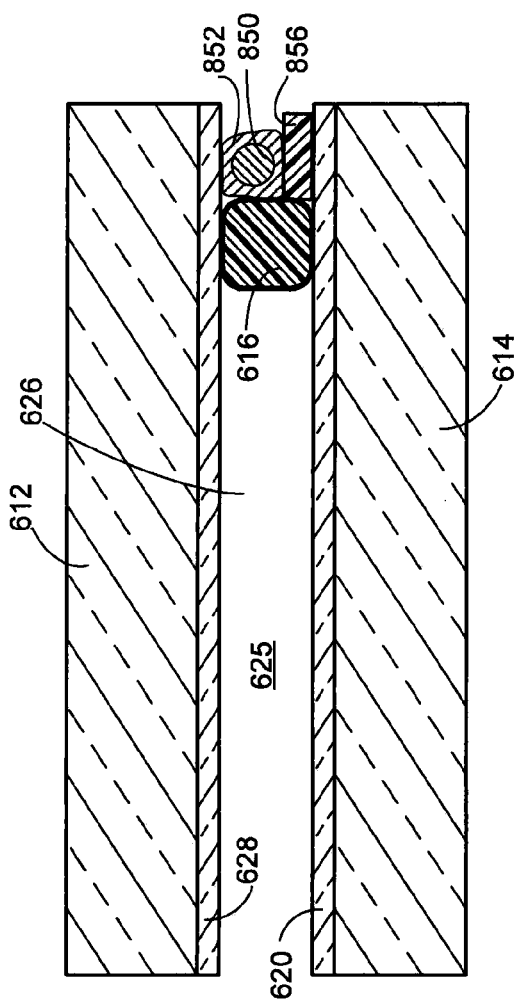
FIG. 8C is an enlarged cross-sectional view of an alternative embodiment of an electro-optic mirror element of the invention.

FIG. 8C illustrates yet another embodiment of the present invention that is similar to that shown in FIG. 8A. However, in comparison with the embodiment 800 of FIG. 8A, rather than etching a portion of electrode 620 to provide for separate electrode regions 620a and 620b, an electrically nonconductive coating or material 856 is disposed between the electrode 620 and the coated wire 850. The coating or material 856 could be formed of a thin layer of organic resin such as epoxy, polyester, polyamide, or acrylic, or of inorganic material such as $SiO_2$, $Ta_2O_5$, etc. Such a nonconductive material may also help to hold the wire in place.

Figure 8D:
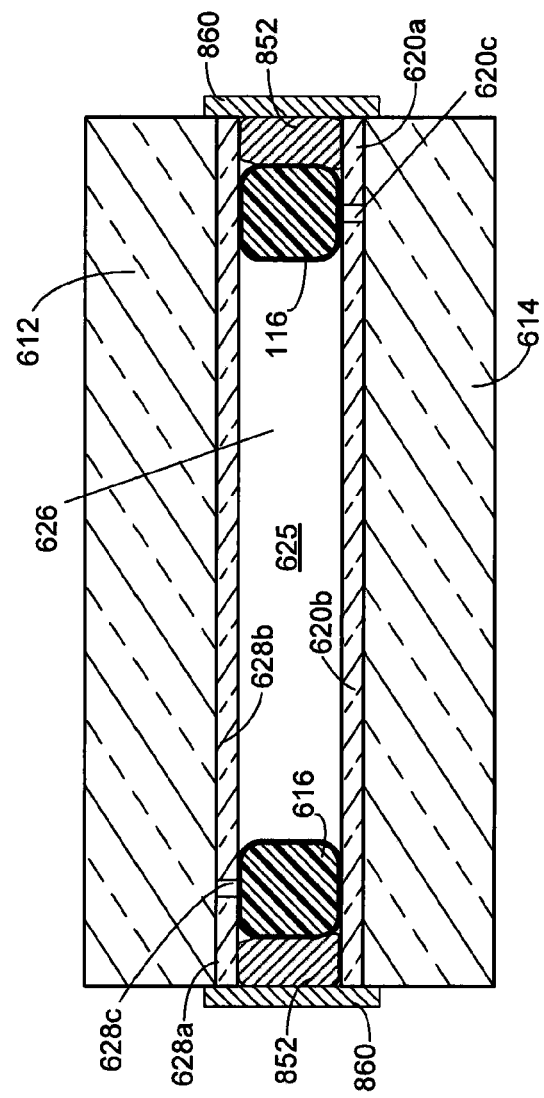
FIG. 8D is an enlarged cross-sectional view of yet another alternative embodiment of an electro-optic mirror element of the invention.

FIG. 8D shows another embodiment of the present invention. As shown, not only is the second substrate reflective electrode 620 etched in one region along a perimeter portion on the third surface, but also the transparent electrode 628 on the second surface is configured in a similar way. Specifically, the electrode 628 is etched to form a first portion 628a and a second portion 628b separated by an area 628c that is devoid of conductive material. The transparent electrode 628 may be etched along any perimeter portion of the second surface which does not coincide with the etching of electrode 620 over it's entire length. The front transparent electrode 628 may be etched along any side other than that on which electrode 620 is etched. Here, the edges of the elements 612 and 614 would be even with one another (i.e., have zero-offset). An electrically nonconductive seal 616 would thus be formed about the periphery and over the etched portions 628c and 620c of the two electrodes. The epoxy seal 616 would preferably be dispensed in from the edges of elements 612 and 614 approximately 0.010 to 0.015 inch on the top and bottom and even with the glass edges on the sides. The conductive material 852 could then be dispensed into the 0.010-0.015 inch channel at the top and bottom of the device. A foil, copper webbing material, or other highly conductive material 860 could then be adhered to the conductive epoxy/adhesive for each of the top and bottom regions to provide for electrical contact to electrodes 620 and 628. The webbing with its high surface area, or a foil, or thin conductive material with holes in it or roughened up exterior would enhance the adhesion of such a material to the conductive material 852 and to the edges of the device.

Additional description of establishing the electrical interconnections within the described-above embodiments of a mirror element is further provided with respect to FIGS. 9 (A, B) and 10(A-D), in reference to top views of the first and/or second substrates of the embodiments of a mirror element.

FIG. 9A shows a top plan view of the rear element 614 having the electrode coating 620 deposited thereon. To create the first and second portions 620a, 620b, a portion of the electrode material may be removed with the use of, e.g., laser ablation, chemical etching, physical scraping, or similar methods to form may be used to remove a portion of the electrode material to form the area 620c that is devoid of any electrically conductive material. The area 620c may be shaped differently, e.g. as a thin line that has a trench-like profile in the electrode 620. As shown in FIG. 9A, the first portion 620a is defined along one side of the element 614. FIG. 9B shows the electrically non-conductive seal 616 that is further disposed about the entire periphery of the substrate 614 to define the outer bounds of the chamber 625 in which the electrochromic medium 626 is disposed. The conductive material 852, which may in some embodiment also function as a sealing member, is then disposed with or without a wire/strip 850 along the peripheral edge of the substrate 614 on which the first portion 620a of the electrode 620 has been defined. Generally, the conductive material 852 may be deposited prior to or after substrates 612 and 614 are assembled together.

An alternative implementation of the electrical interconnections discussed in reference to FIGS. 6A and 8 (A, B) is shown in top views of the substrate 614 in FIGS. 10A and 10B, where two first portions 620a, 620a' are defined at opposite sides of element 614 and separated by two corresponding nonconductive separation areas 620c, 620c'. Such an arrangement would allow for an electrical connection to the electrode 628 at two opposite sides of the element 614. The non-conducting seals 616 and the material 852, which is also an electrically conducting seal in this embodiment, would be disposed in a similar manner but with the conducting seal 852 being dispensed over all or part of both portions 620a and 620a'. The electrical wire(s) 850 (not shown) may extend from the conductive seal material 852 and be soldered to electrical clips or directly to a circuit board through which power is supplied to the electrochromic mirror. To coat the wire and deposit it between the substrates 612 and 614, the wire 850 may be fed through the middle of a dispensing nozzle that is used to dispense the seal material 852 directly onto the required portion of coated element 614.

FIGS. 10C and 10D provide additional illustrations of an embodiment having a two-part (conductive and non-conductive) seal. Specifically, FIG. 10C illustrates etching of both electrodes 620 and 628, while FIG. 10D shows the two portions 616' and 616" of the seal 616. The outer portion of the seal is conductive and the inner portion is nonconductive similar to the seal portions 616a,b shown in FIG. 6A. (Although, in an alternative embodiment, the entire seal 616 could be conductive and the electrochromic device would function, such alternative construction is not preferred with solution-phase electrochromic devices because of the segregation of the electrochromic species is enhanced when coloration of the electrochromic media occurs on the inside edge of the conductive seal and exposed portion of electrodes 628a and 620a.) As shown in FIG. 10D, there are two fill ports 1095 and 1096, provided at opposite ends of the electrochromic device, that allow for filling the chamber 625 with electrochromic material and additionally provide for electrical isolation of the corresponding conductive portions of seal portions 616' and 616". The plug material 1097 used to plug the fill ports 1095 and 1096 would also be made of an electrically nonconductive material to provide for the necessary electrical isolation. A fill port is typically plugged with an adhesive that is preferably UV-curable but that may also be a hot-melt or thermally-curable, or a combination of UV- and thermal-cure adhesive. The UV-curable adhesive generally is an acrylate base, epoxy base or vinyl ether base or a combination thereof and is generally cured by free radical or cationic polymerization.

FIG. 11 shows another embodiment 1100 of the present invention. This embodiment, which would apply to both electrochromic mirror and window applications, includes the conductive seal material 852 deposited and cured on each of the electrodes 620 and 628. The electrically nonconductive seal 616 is then dispensed between the two portions of the conductive seal 852, which are applied respectively to the second and third surfaces. The nonconductive seal 616 would be dispensed inward the gap 625 so as to provide for electrical isolation, if desired, between the seal 852 and the electrochromic medium 626. Alternatively, a dual dispense could be used for simultaneously dispensing the conductive and non-conductive seal materials. As a result, a portion of the height of an aggregate seal is used as both the seal and the electrically conductive bus. An advantage of this construction is that the seal/conductive bus 852 may extend about the entire periphery of the electrochromic device for each of the two electrodes 620 and 628. Preferably, the conductive seal material 852 would be formed of epoxy loaded with silver.

Embodiment 1200 of FIG. 12 shows a slight variant to the embodiment 1100 depicted in FIG. 11. Specifically, if the conductive material added to the epoxy seal portions 852 is less environmentally friendly than silver, the nonconductive seal could be formed either in two stages or using two separate nonconductive seal materials. For example, the nonconductive epoxy seal 616 could be provided in the conventional manner between the electrochromic medium 626 and the two conductive seals 852. Subsequently, a nonconductive material 1262 could be used to fill the gap between the conductive seal portions 852 and could extend along the edge of glass elements 612 and 614. A benefit of using this process is that the seal material 816 may be selected from those materials that are least susceptible to degradation from the electrochromic medium while seal material 1262 could be selected from materials that are perhaps more moisture and oxygen impermeable.

FIG. 13 shows yet another embodiment of the present invention. This embodiment, which would be equally suitable for mirrors or windows, provides for a nonconductive seal 616 between the electrodes 628 and 620 while defining the outer bounds of the chamber 625 in which electrochromic medium 626 is disposed. Between the seal 616 and the edge of elements 612 and 614 is provided an electrically insulating material 1364 made of ethylene-propylene-diene monomer (EPDM), polyester, polyamide, or other insulating material, and having conductive materials 1366 such as a foil or copper web or other highly conductive material attached to opposite sides thereof. Conductors 1366 may be secured to opposite sides of the insulator 1364 using a PSA. A conductive ink or epoxy 852 could be used to increase the contact stability between the conductors 1366 and electrodes 628 and 620. The seal 616 is not necessary if materials 852, 1366, and 1364 provide for adequate environmental protection and do not interfere with the electrochromic medium.

Concealment of the Seal.

FIG. 14 shows an enhancement to the embodiment described above with respect to FIG. 8D. It will be appreciated, however, that this enhancement approach may be used with any of the other embodiments described above or below. Specifically, as shown in an embodiment 1400, the structure of FIG. 8D is modified such that the first surface 612a is beveled around its periphery to provide for a beveled peripheral edge surface 1470 that is of sufficient width to obscure the view of the dual seal 616/852. With such a design, it may be possible to completely eliminate the need in a bezel in an embodiment of the invention. As will be appreciated by those skilled in the art, the conductive foil or web 860 may extend rearwardly and wrap around the second substrate 614 for electrical contact to a printed circuit board or the heater circuit through which power may be supplied to selectively vary the reflectivity of the mirror element. To further mask the view of the seal, a reflective coating 1472 may be applied to the beveled surface 1470.

Figure 15:
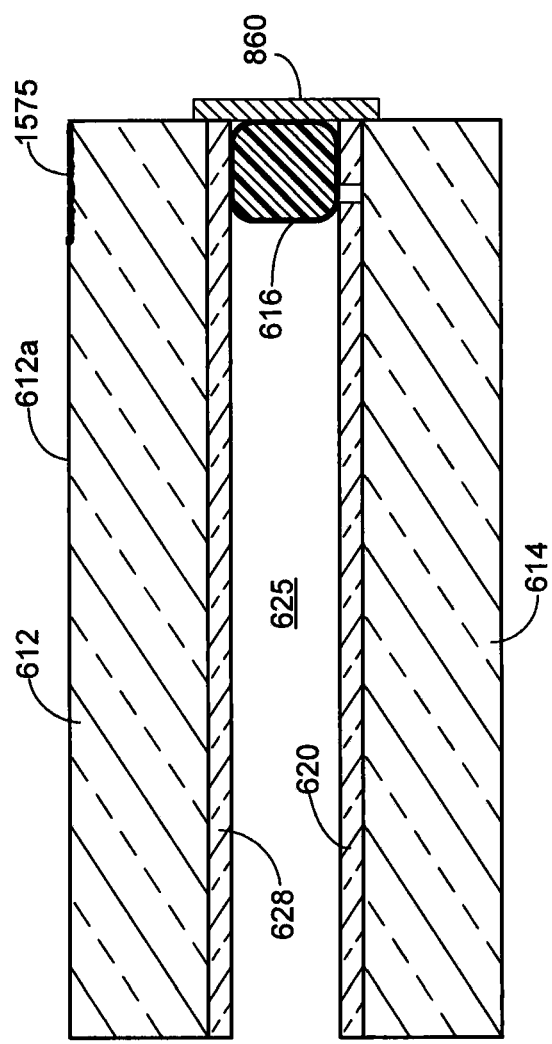
FIG. 15 is an enlarged cross-sectional view of an alternative embodiment of an electro-optic mirror element incorporating means for visually hiding a seal.
Figure 16A:
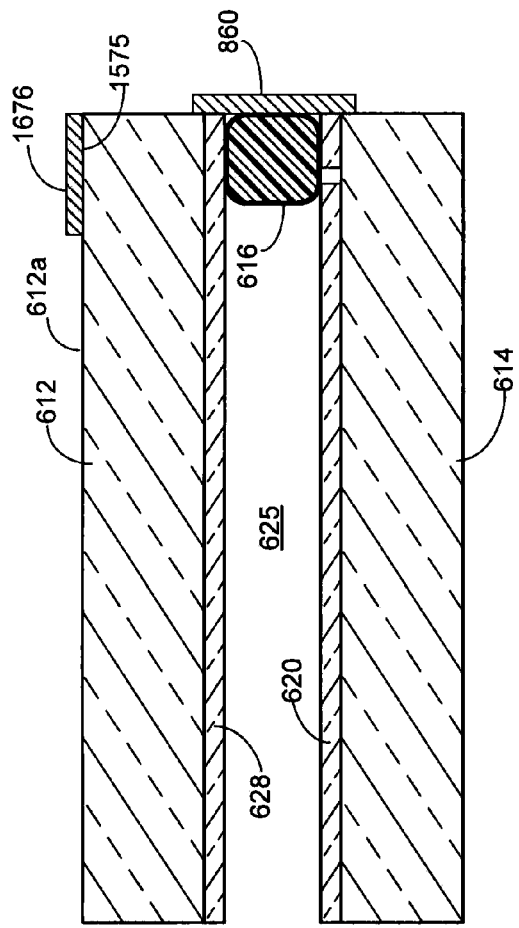
FIG. 16A is an enlarged cross-sectional view of another alternative embodiment of an electro-optic mirror element incorporating means for visually hiding a seal.
Figure 16B:
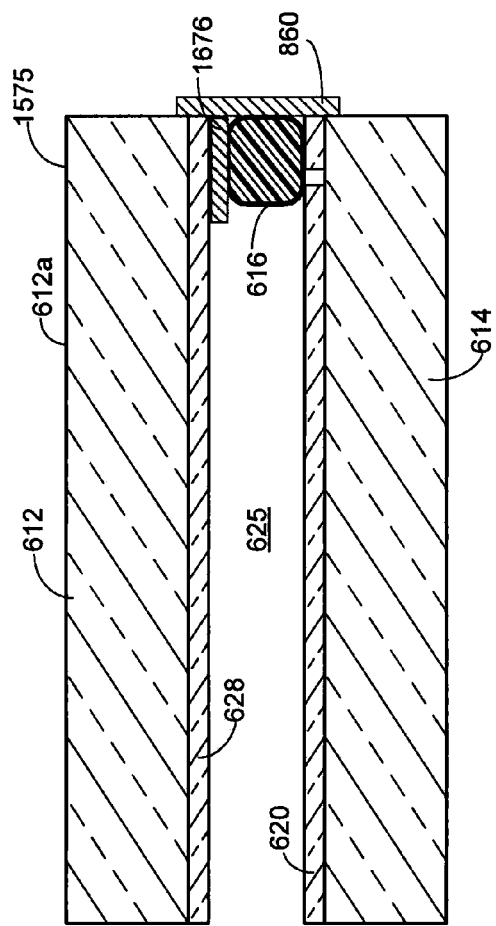
FIG. 16B is an enlarged cross-sectional view of yet another alternative embodiment of an electro-optic mirror element incorporating means for visually hiding a seal.

FIG. 15 shows a slightly different approach for obscuring the view of the seal (as shown, a non-conductive seal 616). Specifically, a peripheral portion 1575 of the first surface 612a of the front element 612 is sandblasted, roughened, or modified to obscure the view of the portion of the device where the seal could otherwise be seen. Yet another approach is shown in FIG. 16A where a reflective or opaque paint/coating 1676 is provided on the peripheral region 1575 of the first surface 612a of the front element 612. Alternatively, as shown in FIG. 16B, such a reflective or opaque coating, paint, or film 1676 could be provided on the second surface 612b.

Yet another way to conceal the seal is to use a seal material that is transparent as disclosed in commonly assigned U.S. Pat. No. 5,790,298, the entire disclosure of which is incorporated herein by reference.

Each of the different methods for obscuring the view of the seal described above in connection with FIGS. 14-16B may be combined or used separately, and may be used with any of the other embodiments described herein. For example, the beveled surface 1470 shown in FIG. 14 could be sandblasted. Likewise, the sandblasted portion 1575 of the surface 612a could be painted or coated with a reflective or high refractive index material. Paint or other material could be applied by silk-screening or other suitable methods. The reflective material in combination with the roughened surface provides a diffuse reflector.

Peripheral Ring and Sealing Material.

Turning now to FIGS. 17(A-E) and 18, a discussion of additional features of the present invention is provided. FIG. 17A depicts an embodiment of the rearview mirror element 1700a, as viewed from the first substrate 1702a, with a spectral filter material 1796a positioned between the viewer and a primary seal material 1778a. A first separation area 1740a that is devoid of any electrically-conductive material is provided to substantially electrically insulate a first conductive portion 1708a from a second conductive portion 1730a. A perimeter material 1760a is applied to the edge of the element. FIG. 17B depicts the same embodiment of a rearview mirror element, now labeled as 1700b, as viewed from the second substrate 1712b with a primary seal material 1778b positioned between the viewer and a spectral filter material 1796b, disposed as a peripheral ring. A second separation area 1786b is provided to substantially electrically insulate a third conductive portion 1718b from a fourth conductive portion 1787b. A perimeter material 1760b is applied to the edge of the element. FIG. 17C depicts the same embodiment of a rearview mirror element, now labeled as 1700c, viewed from a section line FIG. 17C-FIG. 17C of either the element of FIG. 17A or 17B. In this view, a first substrate 1702c is shown to be secured to a second substrate 1712c in a spaced-apart relation via a primary seal material 1778c. A spectral filter material 1796c is positioned between the viewer and the primary seal material 1778c. First and second electrical clips 1763c, 1784c, respectively, are provided to facilitate electrical connections to the element. A perimeter material 1760c is applied to the edge of the element 1700c. It should be understood that the primary seal material 1778c may be applied by means commonly used in the LCD industry such as, e.g., by silk-screening or dispensing. U.S. Pat. No. 4,094,058 to Yasutake et al., the disclosure of which is incorporated in its entirety herein by reference, describes applicable methods. Using these techniques, the primary seal material may be applied to an individually cut-to-shape substrate or it can be applied as multiple primary seal shapes on a large substrate. The large substrate with multiple primary seals applied may then be laminated to another large substrate and the individual mirror shapes can be cut out of the laminate after at least partially curing the primary seal material. This multiple processing technique is a commonly used method for manufacturing LCDs and is sometimes referred to as an array process. Electro-optic devices can be made using a similar process. All coatings such as the transparent conductors, reflectors, spectral filters and, in the case of solid state electro-optic devices, the electro-optic layer or layers may be applied to a large substrate and patterned if necessary. The coatings can be patterned using a number of techniques such as by applying the coatings through a mask, by selectively applying a patterned soluble layer under the coating and removing it and the coating on top of it after coating application, laser ablation or etching. These patterns can contain registration marks or targets that can be used to accurately align or position the substrates throughout the manufacturing process. This is usually done optically, for instance, with a vision system using pattern recognition technology. The registration marks or targets may also be applied to the glass directly such as by sand blasting, or laser or diamond scribing if desired. Spacing media for controlling the spacing between the laminated substrates may be placed into the primary seal material or applied to a substrate prior to lamination. The spacing media or means may be applied to areas of the laminate that will be cut away from the finished singulated mirror assemblies. The laminated arrays can be cut to shape before or after filling with electro-optic material and plugging the fill port if the devices are solution phase electro-optic mirror elements.

FIG. 17D depicts a plan view of a second substrate 1712d comprising a stack of materials on a third surface, or a fourth surface, or both third and fourth surfaces. In at least one embodiment, at least a portion 1720d1 of a stack of materials, or at least the substantially opaque layers of a stack of materials, is removed, or masked, beneath the primary seal material. At least a portion 1720d2 of at least a layer of the stack of materials extends substantially to the outer edge of the substrate or extends to an area to facilitate electrical contact between the third surface stack and an element drive circuit (not shown). Related embodiments provide for inspection of the seal and, or, plug viewing and, or, plug curing the rear of the element subsequent to element assembly. In at least one embodiment, at least a portion of an outer edge 1720d1 of a stack of materials 1720d is located between an outer edge 1778d1 and an inner edge 1778d2 of a primary seal material 1778d. In at least one embodiment, the portion 1720d1 of a stack of materials, or at least the substantially opaque layers of a stack of materials, are removed, or masked, beneath the primary seal material between approximately 2 mm and approximately 8 mm wide, preferably approximately 5 mm wide. At least a portion 1720d2 of at least a layer of the stack of materials extends substantially to the outer edge of the substrate or extends to an area to facilitate electrical contact between the third surface stack and an element drive circuit (not shown) between approximately 0.5 mm and approximately 5 mm wide, preferably approximately 1 mm. It should be understood that any of the first, second, third and fourth surface layers or stacks of materials may be configured as disclosed either below or in the references incorporated herein by reference.

FIG. 17E depicts a plan view of the second substrate 412E comprising a third surface stack of materials. In at least one embodiment, at least a portion of an outer edge 1720e1 of a third surface stack of materials 1720e is located between an outer edge 1778e1 and an inner edge 1778e2 of a primary seal material 1778e. In at least one related embodiment, a conductive tab portion 1782e extends from an edge of the second substrate inboard of an outer edge 1778e1 of a primary seal material 1778e. In at least one related embodiment, a conductive tab portion 1782e1 overlaps with at least a portion of a third surface stack of materials beneath a primary seal material 1778e. In at least one embodiment, a substantially transparent conductive layer (not shown individually), such as a conductive metal oxide, of a third surface stack of materials extends beyond an outer edge 1720e1 of a remainder of the third surface stack and is in electrical communication with a conductive tab portion as depicted in FIG. 35K. It should be understood that the conductive tab may be deposited along any of the substrate peripheral areas as shown in FIGS. 35D-35N. In at least one embodiment, a conductive tab portion comprises chrome. It should be understood that the conductive tab portion improves conductivity over the conductive electrode; as long as a conductive electrode layer is provided with sufficient conductivity, the conductive tab portion is optional. In at least one embodiment, the conductive electrode layer imparts the desired color-specific characteristics of the corresponding reflected light rays in addition to providing the desired conductivity. Therefore, when the conductive electrode is omitted, color characteristics are controlled via the underlayer material specifications. It should be understood that any of the first, second, third and fourth surface layers or stacks of materials may be as disclosed herein or within the references incorporated elsewhere herein by reference.

Figure 18:
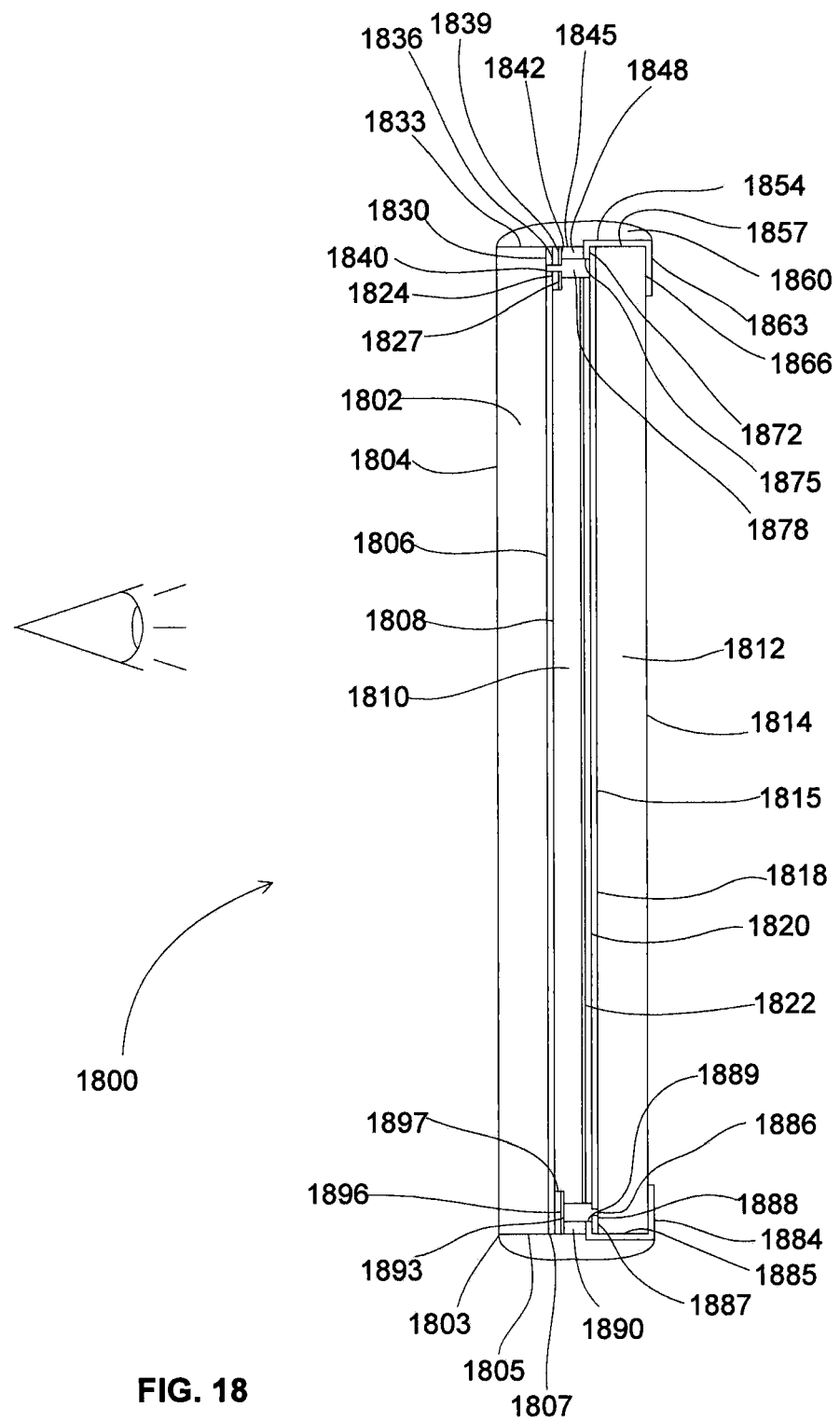
FIG. 18 depicts an enlarged view of FIG. 17C.

FIG. 18 depicts an embodiment 1800 of a rearview mirror element, which is an enlarged view of the element depicted in FIG. 17C to provide greater detail. The embodiment 1800 comprises a first substrate 1802 having a first surface 1804 and a second surface 1806. A first conductive electrode portion 1808 and a second conductive electrode portion 1830 applied to the second surface 1806 are substantially electrically insulated from one another via a first separation area 1840. As can be seen, in at least one embodiment the separation area is located such that the spectral filter material 1896 and a corresponding adhesion promotion material 1893 are also substantially electrically insulated to define first and second spectral filter material portions 1824, 1836, respectively, and first and second adhesion promotion material portions 1827, 1839, respectively. A portion of the first separation area 1840, (1740a, 1740b, 1740c in FIG. 17) is shown to be extending parallel within a portion of the primary seal material 1878 located near the center thereof. It should be understood that this portion of the separation area 1840 may lie such that a viewer would not readily perceive a line within the spectral filter material; for example, a portion of the separation area may be substantially aligned with an inboard edge 1897 of spectral filter material 1896. It should be understood that when any portion of the separation area 1840 is located inboard of the primary seal material, as is described in more detail elsewhere herein, a discontinuity in the electro-optic material coloring and, or, clearing may be observed. This operational characteristic may be manipulated to derive a subjectively visually appealing element.

With further reference to FIG. 18, the embodiment 1800 is depicted to comprise a second substrate 1812 having a third surface 1815 and a fourth surface 1814. It should be noted that the first substrate may be larger than the second substrate to create an offset along at least a portion of the perimeter of the mirror. Third and fourth conductive electrode portions 1818, 1887, respectively, are shown proximate the third surface 1815 and are substantially electrically insulated from one another via the second separation area 1886. A portion of the second separation area 1886 (1786a, 1786b, 1786c in FIG. 17) is shown to be extending parallel within a portion of the primary seal material 1878 located near the center thereof. It should be understood that this portion of the separation area 1886 may lie such that a viewer would not readily perceive a line within the spectral filter material; for example, a portion of the separation area may be substantially aligned with an inboard edge 1897 of spectral filter material 1796. As further shown in FIG. 18, a reflective material 1820 may be applied between an optional overcoat material 1822 and the third conductive electrode portion 1818. It should be understood that any of the materials as disclosed in commonly assigned U.S. Pat. Nos. 6,111,684, 6,166,848, 6,356,376, 6,441,943, 6,700,692, 5,825,527, 6,111,683, 6,193,378, 6,816,297, 7,064,882 and 7,324,261, the disclosure of each of which is incorporated herein by reference, may be employed to define a unitary surface coating, such as a hydrophilic coating on a first surface, or a composite stack of coatings, such as conductive electrode material, spectral filter material, adhesion promotion material, reflective material, overcoat material applied to the first, second, third and fourth surfaces. It should be additionally understood that a hydrophobic coating, such as a fluorinated alkyl saline or polymer, a silicone containing coating or a specially textured surface may be applied to the first surface. Either a hydrophilic or hydrophobic coating will alter the contact angle of moisture impinging upon the first surface relative to glass with no such coating and will enhance rear vision when moisture is present. It should be understood that both third surface and fourth surface reflector embodiments are within the scope of the present invention. In at least one embodiment, the materials applied to the third surface and, or, fourth surface are configured to provide a partially reflective/partially transmissive characteristic for at least a portion of the corresponding surface stack. In at least one embodiment, the materials applied to the third surface are integrated to provide a combination reflector/conductive electrode. It should be understood that additional "third surface" materials may extend outboard of the primary seal, in which case, it should be understood that the corresponding separation area extends through the additional materials. Having at least a portion of the primary seal visible from the fourth surface, as depicted in FIG. 17D for example, facilitates inspection and UV curing of plug material. In at least one embodiment, at least a portion of a stack of materials 1720d, or at least the substantially opaque layers of a stack of materials, are removed, or masked, beneath the primary seal material to provide for inspection of at least 25 percent of the primary seal width around at least a portion of the perimeter. It is more preferred to provide for inspection of 50 percent of the primary seal width around at least a portion of the perimeter. It is most preferred to provide for inspection of at least 75 percent of the primary seal width around at least a portion of the perimeter. Various embodiments of the present invention will incorporate portions of a particular surface having a coating or stack of coatings different from other portions; for example, a "window" in front of a light source, information display, a photo sensor, or a combination thereof may be formed to selectively transmit a particular spectral band or bands of wavelengths as described in many of the references incorporated herein.

With further reference to FIGS. 17 (A, B) and 18, the first separation area 1840 cooperates with a portion of the primary seal material 1878 to define the second conductive electrode portion 1830, the second spectral filter material portion 1836 and the second adhesion promotion material portion 1839 substantially electrically insulated from the first conductive electrode portion 1808, the first spectral filter material portion 1824 and first adhesion promotion material portion 1827. This configuration allows for placement of an electrically conductive material 1848 such that the first electrical clip 1863 is in electrical communication with the third conductive electrode portion 1818, the reflective material 1820, the optional overcoat 1822 and the electro-optic medium 1810. It should be apparent, particularly in embodiments wherein the electrically conductive material 1848 is applied to the element prior to placement of the first electrical clip 1869, that electrically conductive material may at least partially separate the interfaces 1857, 1866, 1872, 1875. Preferably, the material, or composition of materials, forming the third conductive electrode portion 1818, the first electrical clip 1863 and the electrically conductive material 1848 are chosen to promote durable electrical communication between the clip and the materials leading to the electro-optic medium. The second separation area 1886 cooperates with a portion of the primary seal material 1875 to define the fourth conductive electrode portion 1887 substantially electrically insulated from the third conductive electrode portion 1818, the reflective layer 1820, the optional overcoat material 1822 and the electro-optic medium 1810. This configuration allows for placement of an electrically conductive material 1890 such that the second electrical clip 1884 is in electrical communication with the first adhesion promotion material portion 1893, the first spectral filter material portion 1896, the first conductive electrode portion 1808 and the electro-optic medium 1810. It should be apparent, particularly in embodiments wherein the electrically conductive material 1890 is applied to the element prior to placement of the first electrical clip 1884, that electrically conductive material may at least partially separate the interfaces 1885, 1888, 1889. Preferably, the material, or composition of materials, forming the first conductive electrode portion 1808, the first electrical clip 1884, the adhesion promotion material 1893, the spectral filter material 1896 and the electrically conductive material 1890 are chosen to promote durable electrical communication between the clip and the materials leading to the electro-optic medium.

Preferably, the perimeter material 1860 is selected such that the resulting visible edge surface is visually appealing and such that good adhesion is obtained at interfaces 1833, 1845, 1854. It should be understood that at least a portion of the first substrate 1802 in the areas proximate the first corner 1803, the edge 1805, the second corner 1807 and combinations thereof may be treated to smooth protrusions and depressions noticeable to a viewer. It is within the scope of the present invention to treat at least a portion of a surface, a corner, an edge or a combination thereof to define "beveled," "rounded," or combinations thereof. Commonly assigned U.S. Pat. Nos. 7,064,882 and 7,324,261 describe various mechanisms for carrying out the edge treatment. The corresponding treatment improves the visual appearance and durability of the element.

Figure 19:
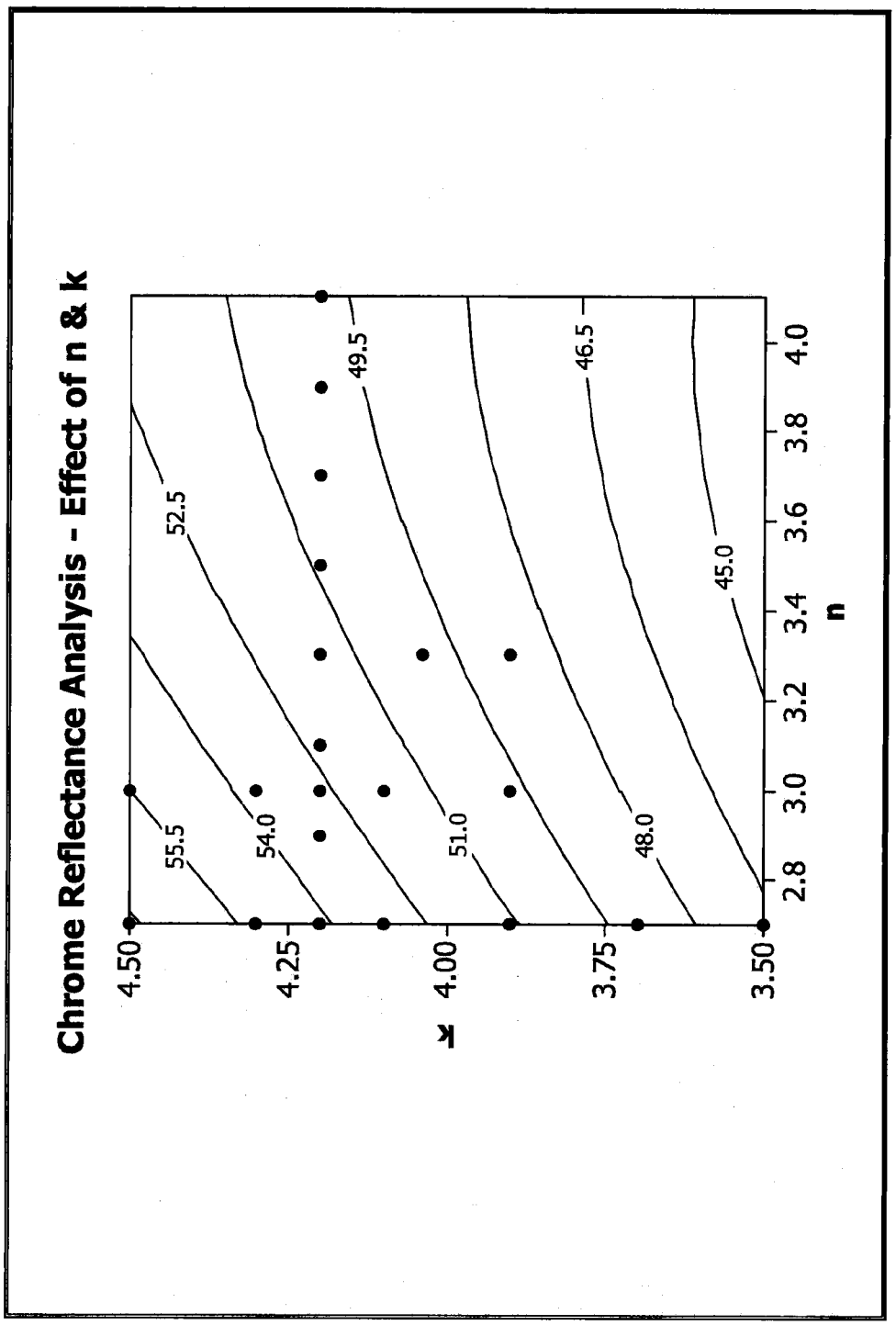
FIG. 19 depicts a graph of color-related characteristics for various electro-optic element components.

Turning to FIG. 19 and Tables 1-4-a, the color rendered as a result of having an indium-tin-oxide (ITO) conductive electrode between the second surface of the first substrate and a spectral filter material (also referred to herein as a "ring") is described. In the example mirror element description contained herein, the reflectivity associated with the spectral filter material with respect to that of the third surface reflector results, in at least one embodiment, in a more blue hue for the spectral filter material when the electro-optic medium is in a "clear" sate. As depicted in the tables contained herein, the b* associated with the reflector is higher than the b* associated with the spectral filter material. When there is mismatch between the hue of the main reflector and spectral filter material, it is often desirable to have a spectral filter material with a lower b* value than the main reflective area. Many outside mirrors are designed to have a bluish hue in the main reflective area. As described in at least one embodiment herein, the use of aluminum in combination with, or in lieu of, chrome for the spectral filter material provides additional color rendering options. Other options, or embodiments, are depicted which provide a better match between the ring and the mirror viewing area. In these other cases the spectral filter or ring has virtually identical reflectance and color allowing a seamless match between the viewing area and the ring.

Table 1 summarizes various color characteristics, namely, Y specular (specular reflectance, R) included (A10); a*; b*; C* and Y specular (specular reflectance, R) excluded, for seven uniquely configured spectral filter materials, second surface conductive electrode and related materials.

TABLE 1

| Reflectance Trial | A10 Y | D65-2 (specular included) a* | b* | C* | D65-2 Macbeth Color Eye 7000 Y specular excluded |
|---|---|---|---|---|---|
| 1  856csito | 11.665 | 2.088 | −5.491 | 5.874 | 0.01 |
| 2  cswchr | 38.312 | −3.477 | 4.183 | 5.439 | 0.133 |
| 3  cswchral | 61.366 | −3.108 | 6.965 | 7.627 | 0.186 |
| 4  halfchral | 61.679 | −4.484 | 12.279 | 13.072 | 0.376 |
| 5  halfchr | 41 | −5.929 | 12.809 | 14.114 | 0.073 |
| 6  Tec15Chr | 23.76 | 0.984 | 8.603 | 8.659 | 1.322 |
| 7  Tec 15 | 11.284 | −3.363 | 0.442 | 3.392 | 0.162 |

1—Glass/856 Ang. A1203/Half wave (Optical thickness) ITO
2—1 plus opaque chrome layer
3—1 plus approx 30 Ang. Chrome/250 Ang. Aluminum
4—Glass/Half wave ITO/30 Ang. Chrome/250 Ang. Aluminum
5—Glass/Half wave ITO/Opaque Chrome layer
6—Glass/Tec 15/Opaque chrome
7—Tec 15

Tables 1a through 1d contain variations for the spectral filter materials. The reflectance is shown for a CIE-D65 standard illuminant. Individual layer thicknesses are shown in nanometers. Table 1a shows the effect of chrome thickness on the stack Glass/ITO/Cr/Ru/Rh. The reflectance of the stack increases as the thickness of the chrome is thinned. In this example the refractive index of the chrome is n=3.4559 and k=3.9808, where n represents the real portion and k represents the imaginary portion of a complex number. The refractive index of the chrome in part defines the reflectivity of the stack and will be discussed in more detail later. Also, as the chrome is thinned, the reflected a* values increase, leading to a better match for the ring material.

In at least one embodiment, the reflectivity of the spectral filter is increased by putting rhodium next to the first chrome layer instead of ruthenium. Table 1b shows the effect of chrome thickness on the reflectance and color of the ring as the chrome thickness is changed. Similarly to the previous example, the reflectance increases as the chrome layer is thinned. This embodiment is preferred when the reflectance of the center of the mirror reflectance is relatively high.

Typical production mirror properties are shown below:

| Full Mirror Reference Color | | | |
|---|---|---|---|
| | Reflectance | a* | b* |
| Typical Outside Mirror | 56.3 | −2.2 | 2.4 |
| Typical Inside Mirror | 85.0 | −3.0 | 5.0 |

TABLE 1a alternate stacks - chrome thickness with ruthenium

| Run # | ITO | Cr | Ru | Rh | Cr | Ru | Rh | R % (CIE-D65) | a* | b* |
|---|---|---|---|---|---|---|---|---|---|---|
| 1 | 118 | 60 | 20 | 3.5 | | | | 45.5 | −6.1 | −3.1 |
| 2 | 118 | 20 | 20 | 3.5 | | | | 47.5 | −4.9 | −2.8 |
| 3 | 118 | 10 | 20 | 3.5 | | | | 50.24 | −4.3 | −2.3 |
| 4 | 118 | 5 | 20 | 3.5 | | | | 51.16 | −4.3 | −2.1 |
| 5 | 118 | 2.5 | 20 | 3.5 | | | | 51.17 | −4.3 | −1.9 |

TABLE 1b alternate stacks - chrome thickness with rhodium/ruthenium

| Run # | ITO | Cr | Ru | Rh | Cr | Ru | Rh | R % (CIE-D65) | a* | b* |
|---|---|---|---|---|---|---|---|---|---|---|
| 17 | 118 | 0 | | | | 5 | 30 | 59.82 | −3.3 | −0.14 |
| 18 | 118 | 2.5 | | | | 5 | 30 | 57.36 | −3.2 | −0.6 |
| 19 | 118 | 5 | | | | 5 | 30 | 54.9 | −3.3 | −1.1 |
| 20 | 118 | 7.5 | | | | 5 | 30 | 52.64 | −3.6 | −1.6 |
| 21 | 118 | 10 | | | | 5 | 30 | 50.66 | −3.9 | −2.2 |
| 22 | 118 | 12.5 | | | | 5 | 30 | 49.02 | −4.3 | −2.6 |

Table 1c depicts the effect of ruthenium thickness when a thin rhodium layer is used next to a thin chrome layer. A particular benefit is attained when the ruthenium layer is approximately 20 nm. The minimum requirement for ruthenium will vary with rhodium thickness, the thin chrome thickness and the target reflectivity value.

TABLE 1c alternate stacks - varying ruthenium behind rhodium

| Run # | ITO | Cr | Ru | Rh | Cr | Ru | Rh | R % (CIE-D65) | a* | b* |
|---|---|---|---|---|---|---|---|---|---|---|
| 11 | 118 | 5 | 2.5 | | | | 0 | 19.63 | −8.5 | −3.4 |
| 12 | 118 | 5 | 2.5 | | | | 10 | 44.46 | −4.7 | −2.8 |
| 13 | 118 | 5 | 2.5 | | | | 20 | 52.9 | −3.7 | −1.6 |
| 14 | 118 | 5 | 2.5 | | | | 30 | 53.97 | −3.6 | −1.3 |
| 15 | 118 | 5 | 2.5 | | | | 40 | 53.4 | −3.9 | −1.6 |

Table 1d depicts the how the reflectance will change with rhodium thickness at a fixed chrome and ruthenium thickness. The intensity of the reflectance increases with increasing rhodium thickness and the reflected a* increases. The increase in a* value of reflected light may be exploited to help improve the color match between the center of glass and the ring. The change in reflectance with changing rhodium thickness will differ depending on the thickness of the chrome layer between the rhodium and the ITO. The thicker the chrome layer, the more the rhodium reflectance will be dampened. Also in Table 1d are alternate metals between a thin and thick chrome layer. Palladium, iridium, cadmium and platinum are shown. The reflectance versus metal thickness is shown along with the effect of changing the thin chrome base layer thickness.

TABLE 1d alternate stacks - varying rhodium thickness

| Run # | ITO | Cr | Ru | Rh | Cr | Ru | Rh | R % (CIE-D65) | a* | b* |
|---|---|---|---|---|---|---|---|---|---|---|
| | 118 | 5 | | | | | 30 | 52.59 | −4 | −1.6 |
| 14 | 118 | 5 | 2.5 | | | | 30 | 53.97 | −3.6 | −1.3 |
| 16 | 118 | 5 | 5 | | | | 30 | 54.9 | −3.3 | −1.1 |
| 19 | 118 | 5 | 7.5 | | | | 30 | 55.5 | −3.1 | −0.9 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| IRIDIUM | 3 | 6 | 9 | 12 | 15 | 18 |
| CR | 40 | 40 | 40 | 40 | 40 | 40 |
| R (cap Y) | 50.5 | 52.8 | 54.3 | 55.4 | 56.0 | 56.4 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Chrome | 1 | 2 | 4 | 6 | 8 | 10 |
| IRIDIUM | 15 | 15 | 15 | 15 | 15 | 15 |

TABLE 1d-continued alternate stacks - varying rhodium thickness

| CR | 40 | 40 | 40 | 40 | 40 | 40 |
|---|---|---|---|---|---|---|
| R (cap Y) | 55.3 | 54.5 | 53.3 | 52.2 | 51.4 | 50.8 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Palladium | 3 | 6 | 9 | 12 | 15 | 18 |
| CR | 40 | 40 | 40 | 40 | 40 | 40 |
| R (cap Y) | 50.9 | 53.6 | 55.6 | 57.0 | 58.0 | 58.7 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Chrome | 1 | 2 | 4 | 6 | 8 | 10 |
| Palladium | 15 | 15 | 15 | 15 | 15 | 15 |
| CR | 40 | 40 | 40 | 40 | 40 | 40 |
| R (cap Y) | 56.5 | 55.2 | 53.0 | 51.5 | 50.4 | 49.6 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Platinum | 3 | 6 | 9 | 12 | 15 | 18 |
| CR | 40 | 40 | 40 | 40 | 40 | 40 |
| R (cap Y) | 49.7 | 51.3 | 52.3 | 52.9 | 53.1 | 53.2 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Chrome | 1 | 2 | 4 | 6 | 8 | 10 |
| Platinum | 15 | 15 | 15 | 15 | 15 | 15 |
| CR | 40 | 40 | 40 | 40 | 40 | 40 |
| R (cap Y) | 52.3 | 51.6 | 50.5 | 49.7 | 49.2 | 48.9 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Cadmium | 3 | 6 | 9 | 12 | 15 | 18 |
| CR | 40 | 40 | 40 | 40 | 40 | 40 |
| R (cap Y) | 52.3 | 56.5 | 59.9 | 62.5 | 64.6 | 66.1 |

| Glass | 1.2 mm | 1.2 mm | 1.2 mm | 1.2 mm | 1.2 mm | 1.2 mm |
|---|---|---|---|---|---|---|
| ITO | 120 | 120 | 120 | 120 | 120 | 120 |
| Chrome | 1 | 2 | 4 | 6 | 8 | 10 |
| Cadmium | 15 | 15 | 15 | 15 | 15 | 15 |
| CR | 40 | 40 | 40 | 40 | 40 | 40 |
| R (cap Y) | 62.2 | 60.1 | 56.6 | 54.0 | 52.0 | 50.7 |

Different metals or mixtures of metals may be used next to the thin chrome layer. The thin chrome layer may be considered optional. Generally, the thin chrome layer is used when an adhesion promoter layer is desired. Alternate adhesion promoting metals or materials may fulfill a comparable function. The different metals are selected to alter the reflectance, either higher or lower, depending on the match desired with respect to the center of the viewing area. The metal can have another benefit, that of altering the color or hue of the ring area. The presence of the ITO or other dielectric layer under the metals tends to move the color to a more negative b* direction. The use of a "red" high reflectance metal such as copper may enhance reflectivity while simultaneously facilitating a color match to the viewing area. Table 1e shows the effect of a thin copper layer placed between two chrome layers. The reflectance is substantially increased while simultaneously making the ring color more neutral. A copper gold alloy has similar properties.

TABLE 1e

Color and reflectance effects of copper addition to stack

| ITO | 114 | 114 |
|---|---|---|
| Chrome | 1 | 1 |
| Copper | 0 | 15 |
| Chrome | 40 | 40 |
| R | 47.3 | 56.2 |
| a* | −5.2 | −0.7 |
| b* | −3.5 | 2.3 |

Suitable metals, which will result in increased reflectance, include cadmium, cobalt, copper, palladium, silver, gold, aluminum and iridium or other high reflectance metals, their alloys and/or mixtures of metals.

Table 2 summarizes various color characteristics, namely, a*; b*; C* and reflectance (Y specular included (A10)) for the combinations of various indium-tin-oxide second surface conductive electrodes positioned between a first substrate and a substantially opaque chrome spectral filter material. The data contained in this table depict the ability to control the resulting b* value by varying the ITO thickness from approximately 65 percent to approximately 100 percent of a half-wave thickness. Specific thicknesses anticipated to obtain a given color may vary somewhat based on deposition parameters that affect the optical constants. The color of a particular stack may vary, to some degree, based on choice of process parameters, as well as process fluctuations that result in small but sometimes significant shifts in the optical constants of the materials used. For example, the half-wave optical thickness of ITO will correspond to a lesser physical thickness if the physical density of the coating is increased and an increase in absorption in the ITO coating would decrease the reflectivity of a second surface ITO plus chrome stack. This does not negate the fact that over the range of optical constants usually associated with ITO, a half wave optical thickness of ITO (relative to 550 nm) when coated with, for example, chrome, will tend to produce a reflection having a yellowish hue. Table 2a shows the same effect over a narrower range of ITO thicknesses and with a modified metal stack. As the ITO is increased in thickness, the reflectance increases providing a better intensity match. The a* value decreases and the b* value increases. The net effect is that the color match will be improved with the appropriate ITO thickness. Or, if a color mismatch is chosen, the color of the spectral filter material can be made to have a lower b* value than the main reflective area.

TABLE 2

TCO plus Chrome Specular Included

| Trial | a* | b* | C* | A10Y |
|---|---|---|---|---|
| 85CHR | −6.801 | 2.486 | 7.241 | 44.829 |
| 80CHR | −6.717 | −0.829 | 6.768 | 44.375 |
| 75CHR | −6.024 | −4.031 | 7.248 | 43.759 |
| 70CHR | −5.613 | −5.426 | 7.807 | 42.917 |
| 65CHR | −5.227 | −6.639 | 8.45 | 42.64 |
| 100CHR | −7.06 | 12.85 | 14.662 | 45.255 |

TABLE 2a

Effect of ITO with modified metal stack

| Run # | ITO | Cr | Ru | Rh | Cr | Ru | Rh | R % (CIE-D65) | a* | b* |
|---|---|---|---|---|---|---|---|---|---|---|
| | 108 | 5 | 2.5 | | | | 30 | 52.3 | −2.5 | −4.5 |
| | 113 | 5 | 2.5 | | | | 30 | 53.2 | −3.1 | −3.0 |
| | 118 | 5 | 2.5 | | | | 30 | 54.0 | −3.6 | −1.3 |
| | 123 | 5 | 2.5 | | | | 30 | 54.5 | −4.1 | 0.6 |
| | 128 | 5 | 2.5 | | | | 30 | 54.9 | −4.5 | 2.6 |
| | 133 | 5 | 2.5 | | | | 30 | 55.1 | −4.7 | 4.7 |

Table 3 summarizes various color characteristics, namely, a*; b*; C* and reflectance R (Y specular included (A10)) for various indium-tin-oxide second surface conductive electrodes. The data contained in this table depicts the resulting values produced by varying the ITO thickness from approximately 65 percent to approximately 100 percent of a half-wave thickness.

TABLE 3

TCO Specular Included

| Trial | a* | b* | C* | Y (A10) | Thickness (Å) |
|---|---|---|---|---|---|
| 65CLR | −0.988 | 15.535 | 15.567 | 15.678 | 1095 |
| 100CLR | 13.588 | −17.765 | 22.366 | 8.967 | 1480 |
| 85CLR | 8.376 | 2.896 | 8.863 | 11.352 | 1306 |
| 80CLR | 4.481 | 11.34 | 12.193 | 12.892 | 1253 |
| 75CLR | 1.565 | 15.019 | 15.101 | 14.275 | 1194 |
| 70CLR | −0.276 | 15.654 | 15.656 | 15.259 | 1135 |

Materials used for transparent second surface conductive electrodes are typically materials with an approximately 1.9 index of refraction, or greater. It is known to minimize color impact of these conductive electrode materials by using half wave thickness multiples, using the thinnest layer possible for the application or by the use of one of several "non-iridescent glass structures." Non-iridescent structures will typically use either a high and low index layer under the high index conductive coating (see, for example, U.S. Pat. Nos. 4,377,613 and 4,419,386 by Roy Gordon), or an intermediate index layer (see U.S. Pat. No. 4,308,316 by Roy Gordon) or graded index layer (see U.S. Pat. No. 4,440,822 by Roy Gordon) to minimize color impact. The intensity of the ring with a color suppression layer is lower than the center of the part. The color suppression layer helps the color of the ring but the ring would still be visible because of the intensity contrast. The color suppressed ITO would therefore benefit from the use of a different sequence of metal layers on top of the ITO. Table 3a shows the color for a range of different metal options. The top chrome layer is optional and it does not contribute to the color or reflectance match of the ring. The top chrome layer is added to minimize the transmittance of the layer stack and to minimize the amount of UV light that would reach the seal, thus extending the lifetime of the product. A chrome/rhodium/ruthenium stack is shown but it is understood that other metals, alloys, and high reflectors described elsewhere in this document can be used.

The results of varying the thickness of the ITO with and without a color suppression layer are shown in Table 3a2. The colors shown in the table represent the changes which occur with an ITO thickness between 100 and 300 nm. Therefore, the use of a color suppression layer allows a broader thickness range for the ITO layer without causing the strong color variations experienced without the color suppression layer.

TABLE 3a

Effect of metal layers with color suppressed ITO - Reflectance in CIE-D65

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Color Suppression Layer | 80 | 80 | 80 | 80 | 80 | 80 | 80 | 80 | 80 | 80 | 80 |
| ITO ½ Wave | 148.7 | 148.7 | 148.7 | 148.7 | 148.7 | 148.7 | 148.7 | 148.7 | 148.7 | 148.7 | 148.7 |
| Chrome Layer | 0 | 3 | 5 | 5 | 5 | 5 | 5 | 4 | 3 | 2 | 60 |
| Rhodium | 0 | 0 | 0 | 3 | 6 | 9 | 12 | 12 | 12 | 12 | 0 |
| Ruthenium | 30 | 30 | 30 | 30 | 30 | 30 | 30 | 30 | 30 | 30 | 30 |
| Chrome Layer | 25 | 25 | 25 | 25 | 25 | 25 | 25 | 25 | 25 | 25 | 0 |
| Reflectance Cap Y | 48.8 | 49.2 | 49.3 | 51.1 | 52.2 | 52.9 | 53.2 | 54.3 | 55.5 | 56.8 | 45.7 |
| a* | −2.2 | −1.6 | −1.4 | −0.9 | −0.5 | −0.2 | 0.0 | 0.0 | −0.1 | −0.2 | −1.8 |
| b* | 2.1 | 0.5 | −0.3 | −0.3 | −0.3 | −0.2 | −0.2 | 0.4 | 1.0 | 1.7 | −3.3 |

TABLE 3a2

Effect of color suppressed ITO thickness on color - 200 nm ITO +/− 100 nm

| Stack | Case 1 | Case 2 | Case 3 | Case 4 | Case 5 | Case 6 | Case 7 | Case 8 |
|---|---|---|---|---|---|---|---|---|
| 1.670 | 80 | 80 | 80 | 80 | 80 | 80 | 80 | 80 |
| ITO | 100 | 130 | 150 | 180 | 210 | 240 | 270 | 300 |
| Chrome | 2 | 2 | 2 | 2 | 2 | 2 | 2 | 2 |
| Rhodium | 5 | 5 | 5 | 5 | 5 | 5 | 5 | 5 |
| Ruthenium | 30 | 30 | 30 | 30 | 30 | 30 | 30 | 30 |
| a* | 1.15 | 0.54 | −0.76 | −1.5 | 0 | 0.54 | −0.84 | −1.1 |
| b* | 0.9 | 0.14 | 1.7 | 3.22 | 0.92 | −0.16 | 2.17 | 3.1 |
| Stack | Case 1 | Case 2 | Case 3 | Case 4 | Case 5 | Case 6 | Case 7 | Case 8 |
| 1.670 | 0 | 0 | 0 | 0 | 0 | 0 | 0 | 0 |
| ITO | 100 | 130 | 150 | 180 | 210 | 240 | 270 | 300 |
| Chrome | 2 | 2 | 2 | 2 | 2 | 2 | 2 | 2 |
| Rhodium | 5 | 5 | 5 | 5 | 5 | 5 | 5 | 5 |
| Ruthenium | 30 | 30 | 30 | 30 | 30 | 30 | 30 | 30 |
| Stack | Case 1 | Case 2 | Case 3 | Case 4 | Case 5 | Case 6 | Case 7 | Case 8 |
| a* | −1 | −3.9 | −3.4 | 5.5 | 8 | −4 | −10.1 | −0.9 |
| b* | −5.4 | 3.19 | 9.9 | 3.8 | −8.6 | −4.3 | 7.6 | 5.5 |

A partially transmissive layer such as thin chrome adjacent to the glass may be used to provide adhesion benefits compared to metals that might be used for better reflectivity compared to chrome such as a platinum group metal (PGM) (i.e. iridium, osmium, palladium, platinum, rhodium, and ruthenium), silver, aluminum and various alloys of such metals with each other, such as silver-gold, white gold, or other metals. When these other metals or alloys are placed behind the partially transmissive adhesion promoting layer, some of the improved reflectance of the second material will be realized. It may also be beneficial to overcoat the spectral filter material with a material that improves the durability of the spectral filter material whether it is in contact with a transparent conductor overcoat or if it is in direct contact with the electro-optic medium. It should be understood that the reflector may be a dichroic stack. The spectral filter material may comprise a single material such as chrome or may comprise a stack of materials such as: 1) chrome, rhodium, ITO; 2) moly; 3) chrome, rhodium, TCO; 4) chrome, platinum group metal, ITO; 5) ITO, silver, ITO; 6) ITO, silver alloy, ITO; 7) $Z_NO$, silver/silver alloy, $Z_NO$; 8) transparent conductor, metal reflector, transparent conductor; silicon, ITO; 9) silicon, $Z_NO$; 10) chrome, ruthenium, ITO and 11) chrome/rhodium/ruthenium/ITO or other metals, metal alloys or combinations described elsewhere in this document can be used.

There may also be advantages to applying the transparent conductive oxide(s) on the second surface of the mirror in more than one step. For example, a zinc oxide layer may be deposited initially to form a layer to which silver or its alloys bond well. This is preferably chosen at a thickness that produced a desirable color and reflectivity when combined with silver, silver alloy or other metals and their alloys. Then the metal layer(s) are applied around the perimeter of the part followed by additional transparent conductive oxide(s) over at least the electrochromic area. The additional applications of oxides improve the conductivity in the electrochromic area and may be chosen at a thickness which yields a desirable range of hue when going from bright state to dark state, in the electrochromic area, but particularly in the fully darkened state. If the conductive oxide adjacent to the electrochromic medium has sufficient conductivity, not all of the metal oxides in the stack would necessarily need to be conductive.

For example, using an optical model, opaque silver deposited over 100 nm of ITO, the color of a reflective ring would be about, using CIELAB D65 standard illuminant, 2 degree observer a*=−1, b*=−2 and Y value of 89. For purposes of this discussion, the silver is masked such that it is only applied in a ring around the electrochromic area. The color of the electrochromic area with only the 100 nm ITO on glass using a material of index 1.43 as the electrochromic medium and no reflection from a $3^{rd}$ or $4^{th}$ surface models as a*=−3, b*=8 with a Y value of 8. To make the electrochromic area less yellow and more conductive, 40 nm of ITO coating may be added in the electrochromic area. This brings the coating in the electrochromic area to about half wave optical thickness, which is approximately the second surface coating thickness that most electrochromic elements have. The model for the electrochromic area then yields a color of a*=11, b*=−14, and Y value of 5. Either, or both, of these applications of transparent conductive oxides may be of another material such as aluminum doped zinc oxide. There might also be additional layer(s) such as nickel chromium or nickel chromium suboxide, niobium or niobium suboxide, titanium or titanium suboxide, as well as other means known in the art that would protect or preserve a metal layer such as silver during subsequent steps of the coating and assembly process such as thermal processing steps.

Note that by using such a stack, the reflective ring will more closely match the brightness of electrochromic areas in the undarkened state that are more highly reflective such as devices that have $3^{rd}$ surface coatings incorporating silver or silver alloys. In particular, aluminum that is in direct contact with the electro-optic medium tends to degrade upon being subjected to multiple coloring/clearing cycles. An overcoat of chrome has been demonstrated to improve that durability. When an ITO overcoat is used, a material such as silicon may improve the strength of the bond between the ITO and the substances closer to the glass. Other materials, such as a platinum group metal (PGM) (i.e. iridium, osmium, palladium, platinum, rhodium, and ruthenium), may be overcoated to improve any of adhesion, reflection, conductivity, and electrode stability characteristics of an embodiment. Not all material have adequate durability to be used in configuring a peripheral ring on the second surface of the EC-element, which is usually maintained as an anode. For example, silver is known to be susceptible to de-plating when deposited on the anodic side of an EC-cell and when exposed to EC-medium, but has adequate mechanical and electro-chemical stability when used as part of a reflective electrode on the third surface of the EC-cell that is typically maintained as a cathode. Therefore, in order to expand a group of materials practically usable for construction of a peripheral ring, in one embodiment of the invention the transparent electrode of an EC-cell is maintained as a cathode, while the reflective electrode of the EC-cell is maintained as an anode.

As revealed in the above figures and tables, the thickness of ITO may be chosen to produce a desired reflection color. If the ITO coating is about 25 percent thinner, that is about 120 Å. Instead of 140 Å, then a more bluish hue results (i.e. lower b*). This, however, will also result in decreased conductivity of the ITO coating. The reflectivity of the coating will also be slightly to somewhat higher than for coatings of the traditional half-wave optical thickness where the reference is to a minimum reflectivity near 550 nm.

The compromise between optimal color and sheet resistance of the ITO may be mitigated by the use of partial deletion of the ITO layer. For instance, the ITO may be applied to any thickness needed to give adequate color in the center of the viewing area and the required sheet resistance. Then, the ring portion of the ITO coating may be ion etched or removed in any other viable method so that the final thickness of the ITO in the ring is at a point where we have the desired aesthetics. The etching or removal process for the ITO may be conducted in the same process as the deposition of the subsequent metal layers or it may be done in a separate step.

It is known in the art that a chrome layer may be applied beneath the ITO layer to provide a marginal match between the viewing area and the ring. The degree of match between the ring in this case and the viewing area is a function of the reflectance in the viewing area and properties of the chrome.

What has not been taught in the art is how the properties of the chrome layer affect the match of the ring to the viewing area. For instance, in some cases, the reflectance of the viewing area may be specified by law to be greater than 55 percent. The reflectance of the chrome ring is a function of the thickness of the chrome and, more importantly, the refractive index of the chrome. For a given refractive index dispersion formula, the reflectance can be dropped from its maximum value by reducing the thickness of the chrome layer. This can have a detrimental effect because the transmittance of the chrome layer will increase thus allowing more UV light to penetrate to the EC unit seal. The UV light can damage the seal leading to a shorter lifetime of the product.

The reflectance of the ring may be enhanced by tuning the optical properties of the chrome layer. Table 3b shows the dependence of the reflectance of chrome under ITO on the optical properties of the chrome layer. Two sets of optical constants were obtained from the open literature and were mixed in different proportions to assess the effect of the optical constants on the reflectivity. The optical constants vary with wavelength and the values in Table 3b are values at 550 nm for reference. The thickness of the chrome layer is 80 nm and the ITO is 148.7 nm. In at least one embodiment, the glass thickness is 1.2 mm and the reflectance quoted is for viewing through the glass to the coating stack.

The reflectance, in this example, varies from a low of 48.6 to a high of 54.2 percent. This clearly demonstrates that some chrome layers may not necessarily attain the reflectance needed for a match to the reflectance in the viewing when relatively high reflectance is present in the viewing area. In addition, there is a finite maximum reflectance attainable by a single layer of chrome under the ITO. The preferred chrome layers are defined by the refractive indices of the chrome layer.

TABLE 3b

Performance of the chrome layer under ITO versus chrome for various chrome optical constants

| Chrome Layer | 80 | 80 | 80 | 80 | 80 | (nm) |
|---|---|---|---|---|---|---|
| Chrome n | 3.456 | 3.366 | 3.279 | 3.196 | 3.116 | @550 nm |
| Chrome k | 3.981 | 4.089 | 4.199 | 4.310 | 4.423 | @550 nm |
| ITO-B18 | 148.7 | 148.7 | 148.7 | 148.7 | 148.7 | (nm) |
| Reflectance | 48.6 | 49.9 | 51.3 | 52.8 | 54.2 | (percent) |

In order to define the appropriate optical constants for the chrome layer, a series of calculations were performed. A simplified analysis was conducted where the refractive index of the chrome is held constant over the visible region. The analysis shows the relationship between the real and imaginary refractive indices of the chrome and the resultant reflectance. In actual practice, this may deviate from theoretical analysis by up to +/−20 percent to account for the effects of the dispersion in the chrome optical constants. Table 3c shows the reflectance for various combinations of n and k and the ratio of n/k.

TABLE 3c

Reflectance for chrome under ITO as a function of the optical constants of the chrome @550 nm

| Example | n | k | ratio | Reflectance |
|---|---|---|---|---|
| 1 | 3.00 | 3.90 | 0.77 | 49.8 |
| 2 | 3.00 | 4.10 | 0.73 | 51.7 |

TABLE 3c-continued

Reflectance for chrome under ITO as a function of the
optical constants of the chrome
@550 nm

| Example | n | k | ratio | Reflectance |
|---|---|---|---|---|
| 3 | 3.00 | 4.20 | 0.72 | 52.7 |
| 4 | 3.00 | 4.20 | 0.71 | 52.7 |
| 5 | 3.00 | 4.30 | 0.70 | 53.7 |
| 6 | 3.00 | 4.50 | 0.67 | 55.5 |
| 7 | 2.70 | 4.20 | 0.64 | 54.2 |
| 8 | 2.90 | 4.20 | 0.69 | 53.1 |
| 9 | 3.00 | 4.20 | 0.71 | 52.7 |
| 10 | 3.00 | 4.20 | 0.72 | 52.7 |
| 11 | 3.10 | 4.20 | 0.74 | 52.2 |
| 12 | 3.50 | 4.20 | 0.83 | 50.9 |
| 13 | 3.70 | 4.20 | 0.88 | 50.4 |
| 14 | 3.90 | 4.20 | 0.93 | 50.1 |
| 15 | 4.10 | 4.20 | 0.98 | 49.8 |
| 16 | 3.30 | 4.20 | 0.79 | 51.5 |
| 17 | 3.30 | 3.90 | 0.85 | 48.7 |
| 18 | 2.70 | 3.50 | 0.77 | 46.8 |
| 19 | 2.70 | 3.70 | 0.73 | 49.0 |
| 20 | 2.70 | 3.90 | 0.69 | 51.2 |
| 21 | 2.70 | 4.10 | 0.66 | 53.2 |
| 22 | 2.70 | 4.30 | 0.63 | 55.2 |
| 23 | 2.70 | 4.50 | 0.60 | 57.2 |
| 24 | 3.30 | 4.04 | 0.82 | 50.0 |

Analysis of this data set was conducted to determine an equation relating n and k to reflectance. Again, the reflectance is calculated when viewed through the glass.

Reflectance=$9.21972-8.39545*n+20.3495*k+1.76122*n^2-0.711437*k^2-1.59563*n*k$.

The results can also be shown graphically. Using the equation and/or graph we can determine the needed n and k values necessary to attain a desired degree of reflectivity for a chrome layer.

Aesthetically, it is desirable for the ring to match the viewing area as closely as possible. The eye is then not drawn to the ring and can better focus on the object in the viewing area. It is somewhat subjective what difference in appearance between the ring and viewing area is objectionable. The intensity between the ring and viewing area is preferably within 10 percent, more preferably within 6 percent and most preferably within 3 percent. Similarly, the color of the ring may be objectionable. The color difference between the ring and viewing area should be less than 30, preferably less than 15 and most preferably less than 10 C* units.

There may be situations where, due to processing limitation or restrictions, it is not possible to attain the desired chrome optical constants, but a match is still desired between the ring and the viewing area. In other situations it may be desirable to attain a reflectance for the ring which is higher than what is possible with chrome alone. In these circumstances an approach similar to what was discussed above for the case of the metals on top of the chrome may be applied. To attain higher reflectance, a relatively thin layer of chrome is applied to the glass followed by a higher reflecting metal layer such as rhodium, ruthenium, iridium, cadmium, palladium, platinum or other appropriate metal or alloy which has an inherent higher reflectance than chrome.

Table 3d shows the effect of chrome thickness on the reflectance for a fixed n and k value for the chrome layer. The optical constants for the chrome were selected to produce a reflectance less than 50 percent with the goal to match a viewing area reflectance of 56 percent. The reflectance varies with the thickness of the first chrome layer with, essentially, a perfect match when the chrome layer thickness is reduced to 2.5 nm.

TABLE 3d

Chrome thickness effect on reflectance
Modified stack to compensate for change in chrome properties

| Chrome optical constants | n | 3.456 | k | 3.981 | | |
|---|---|---|---|---|---|---|
| Chrome Layer | 40 | 30 | 20 | 10 | 5 | 2.5 (nm) |
| Ruthenium | 35 | 35 | 35 | 35 | 35 | 35 (nm) |
| Chrome Layer | 0 | 10 | 20 | 30 | 35 | 37.5 (nm) |
| ITO-B18 | 148.7 | 148.7 | 148.7 | 148.7 | 148.7 | 148.7 (nm) |
| Reflectance | 48.4 | 48.5 | 49.7 | 52.8 | 54.9 | 55.8 (percent) |

The optical constants of the chrome layer also have an effect on the reflectance of this stack. The reflectance may be attenuated significantly with the optical constants of the chrome but with the use of a thin chrome layer backed by a higher reflectance metal layer, ruthenium in this case, the reflectance may be significantly increased compared to the case where the high reflectance metal is not present. Table 3e shows the effect of optical constants of the chrome on the reflectance.

TABLE 3e

Effect of Chrome optical constants on reflectance
Effect of Chrome base layer optical constants on reflectance

| Chrome Layer | 10 | 10 | 10 | 10 |
|---|---|---|---|---|
| Ruthenium | 35 | 35 | 35 | 35 |
| Chrome Layer | 30 | 30 | 30 | 30 |
| ITO-B18 | 148.7 | 148.7 | 148.7 | 148.7 |
| Reflectance | 53.5 | 54.9 | 55.9 | 56.9 |
| Chrome n | 3.366 | 3.279 | 3.196 | 3.116 |
| Chrome k | 4.089 | 4.199 | 4.310 | 4.423 |

Another option for enhancing the reflectance of the ring and improving the aesthetic match to the viewing area consists of putting a low index material between the ITO and the metal layers. The low index layer may be silica, alumina, MgO, polymer or other suitable low index material. At least options for the low index material exist. A first is to control the thickness of the silica layer to provide an interferential increase in reflectance. Table 3f compares the color of the ring with and without the addition of the low index layer. In this case, the low index layer is silica but, as mentioned above, any appropriate low index material is suitable for this application. The thickness of the ITO and low index layers may be adjusted to alter the color while simultaneously increasing the reflectance. The reflectance may be further increased by combining this technique with the different metal stacks described elsewhere in this document.

TABLE 3f

Effect of addition of low index layer between the ITO and metal layers

| | Case 1 | Case 2 |
|---|---|---|
| ITO | 125 | 125 |
| SIO2 | 0 | 55 |
| Chrome | 60 | 60 |
| R | 46.6 | 54.2 |
| a* | −6.6 | −0.5 |
| b* | 0.9 | 3.0 |

Another option is to insert a relatively thick low index material between the ITO and the metal reflectors of the ring. In this case, it is desirable that the low index layer be thick enough to act as a bulk layer. The necessary thickness is dependent, at least in part, on the material properties of the bulk layer, particularly if the inhomogeneities help to eliminate the phase information of the light. The thickness of the layer may be as thin as ¼ micron or thicker to get the desired effect.

Other options to provide a match between the ring and the viewing area include the use of a High/Low/High dielectric stack. A series of dielectric layers with alternating refractive indices may be used to provide a high reflectance coating. For example, TiO2/SiO2/TiO2 alternating layers may be used. Table 3g shows a stack consisting of TiO2, SiO2 and ITO (thicknesses in nm) which provides a reflectance of the ring of 60.5 percent with a neutral color. The color and reflectance may be modified by adjusting the thickness of the layers. A second option, with ITO as the base layer, is also shown in Table 3g. The stack may be adjusted with both configurations to give both the desired color and reflectance values. The thickness of the ITO may be adjusted to provide for a more conductive layer. The thickness and indices of the other layers may be adjusted to compensate for the changes in the ITO thickness. This increases the utility of this design option.

it does impose limitations on the IMI stack which are not present when the reflectors are between the IMI and the glass.

In the IMI stack the insulator may be a dielectric layer such as TiO2, SiO2, ZnO, SnO2, Niobium oxide, silicon metal, ZrOx, SiN or other suitable material. Mixed oxides, oxynitrides or other composites may be used. The metal is preferably Ag or an alloy of Ag. The Ag may be alloyed or doped with Au, Pd, Pt, Si, Ti, Cu or other materials selected to provide the proper electrochemical, chemical or physical properties. Protective layers may be placed between the metal layer and the dielectrics to improve adhesion, chemical stability of the metal or thermal stability of the IMI coating during heat treatment. Multiple different dielectrics may be used to attenuate color and reflectance in the viewing area and in the ring.

TABLE 3h

IMI stacks and ring reflectance.

| Glass | 1.6 mm | Glass | 1.6 mm | Glass | 1.6 mm | Glass | 1.6 mm | Glass | 1.6 mm | Glass | 1.6 mm |
|---|---|---|---|---|---|---|---|---|---|---|---|
| Cr | 45.0 | Cr | 30.0 | Cr | 20.0 | Cr | 0.0 | Cr | 0.0 | Cr | 40.0 |
| ZnO | 39.8 | ZnO | 39.8 | Ru | 15.0 | Ru | 0.0 | Ru | 0.0 | Ru | 0.0 |
| Ag | 9.0 | Ag | 9.0 | ZnO | 39.8 | ZnO | 39.8 | TiO2 | 23.5 | TiO2 | 23.5 |
| ITO | 52.8 | ITO | 52.8 | Ag | 9.0 | Ag | 9.0 | ZnO | 10.5 | ZnO | 10.5 |
| Cr | 0.0 | Cr | 0.0 | ITO | 52.8 | ITO | 52.8 | Ag | 9.0 | Ag | 9.0 |
| R | 54.2 | R | 53.2 | Cr | 0.0 | Cr | 10.0 | ITO | 35.7 | ITO | 35.7 |
| a* | -4.9 | a* | -5.6 | R | 55.9 | AL | 40.0 | Ru | 0.0 | Ru | 0.0 |
| b* | 0.5 | b* | 1.3 | a* | -4.3 | R | 57.5 | Cr | 25.0 | Cr | 0.0 |
|  |  |  |  | b* | 0.9 | a* | -1.5 | R | 54.3 | R | 55.1 |
|  |  |  |  |  |  | b* | 8.4 | a* | -3.4 | a* | -5.0 |
|  |  |  |  |  |  |  |  | b* | -0.2 | b* | 0.8 |

Thicknesses are in nm unless noted

TABLE 3g

High/Low/High stack for ring match

| Glass | 1.6 mm | Glass | 1.6 mm |
|---|---|---|---|
| TIO2 | 55.3 | ITO | 148.7 |
| SIO2 | 94.5 | SIO2 | 90 |
| TIO2 | 55.3 | TIO2 | 50 |
| SIO2 | 94.5 | SIO2 | 90 |
| ITO | 148.7 | TIO2 | 55 |
| Reflectance | 60.5 | Reflectance | 60.7 |
| a* | -5.3 | a* | -4.9 |
| b* | 5.64 | b* | -1.9 |

Another option for the ring is the use of an IMI, or insulator/metal/insulator, stack for the electrode. Some particular IMI stacks and ring materials are noted below but other versions are also viable. In the context of this invention, it may be assumed that an IMI stack may be substituted for ITO or another TCO. A metal or dielectric stack is then put between the IMI stack and the substrate or the seal material. Both scenarios will work well. When the reflecting stack is put between the IMI and the glass, a more flexible situation for the IMI stack is achieved, particularly if the metal reflectors are essentially opaque. The IMI is shielded by the metal reflectors and may be adjusted as needed for the center viewing area. When the IMI is in between the glass and the reflecting stack, it is desirable to ensure that the requirements in the viewing area and ring are compatible. This may be accomplished but When the ITO thickness is increased from a half-wave to the point where a bluish color is achieved for the ITO plus chrome stack, the color is much more susceptible to shifts due to thickness variations during deposition and/or due to viewing angle differences in actual use. ITO coatings deposited intentionally thinner than half-wave optical thickness, per the discussion above, also exhibited relatively low levels of haze when overcoated with chrome as depicted in Table 2.

The difference between coatings may be measured by using the specular excluded option available on some reflectance spectrophotometers. It is important to check that such measurements are actually measuring scattered light and not primarily small amounts of the specular component. In general, shorter wavelengths of light scatter more readily. That fact is a good indicator when used to determine whether a given reading is actually the expected scattered light intensity being measured. A MacBeth Color Eye 7000 is one spectrophotometer that gives good haze measurement results in this regard.

As used herein, the terms "haziness" and "haze" should be understood to refer to the property of scattering, or non-specular reflection, in thin films. Haziness may be caused by a number of factors, including, less than fully oxidized layers, crystal sizes within a layer, surface roughness, layer interface properties, quality of cleaning of the substrate, subcombinations thereof and combinations thereof.

These properties may vary due to processing conditions and/or the materials. This is especially true with processing conditions, in that the level of haze may vary substantially even within a single process "batch" or "load" of coatings. Nonetheless, for an ITO layer overcoated with chrome and viewed through the glass, whether with or without color suppression or anti-iridescent underlayers, it has been shown to be possible to produce coatings much less hazy than those similarly obtained with Tec 15 glass from Libbey-Owens-Ford.

Aluminum oxide may be used as an underlayer to assist in controlling the hue of the spectral filter material stack, as well as mixtures of oxides yielding an appropriate refractive index. It may be particularly advantageous to use a mixture of ITO and $SiO_2$ and/or SiO as an underlayer for ITO to control the resulting hue of the spectral filter material stack. The use of ceramic targets for ITO is often considered capable of tighter process control for properties such as film thickness. A sputter target comprising ITO and Si and/or Si in a mixture of oxidation states may be employed. Such an underlayer potentially enables one to use an in-line coating system that does not have substantial gas flow isolation from either pumping or intervening doors between the cathodes used for depositing the underlayer and the ITO layer. A mixture of ITO and $SiO_2$ to at least some percentage of $SiO_2$ will retain sufficient conductivity such that RF sputtering is not necessary. Radio Frequency (RF) sputtering, as compared to Medium Frequency (MF) sputtering or direct current (DC) sputtering, often requires electrical isolation and impedance matching that is not trivial to include in a thin film coating system.

Since there are regulatory requirements for 35 percent (40 percent in many European countries) reflectivity for vehicular rearview mirrors (clear state for electro-optic mirror elements), in order for the perimeter area to be included in the field of view calculations, it needs to have such a level of reflectance. In the data provided herein with respect to chrome over Tec 15 glass, this minimum is not met.

Use of a measurably hazy CVD deposited flourine doped tin oxide that is part of an anti-iridescent structure for use in electro-optic devices is known. Various thicknesses of ITO are known for providing a conductive electrode. It has not previously been known that the b* of an indium-tin-oxide conductive electrode and chrome spectral filter material stack may be predictably controlled by varying the thickness of the ITO. Pyrolitically deposited fluorine doped tin oxide with an anti-iridescent structure (Tec 15 from L.O.F) is substantially more hazy when overcoated with chrome compared with ITO deposited over a layer of aluminum oxide as shown in Table 1.

In embodiments where the spectral filter material is located proximate the first surface, it can be advantageous to minimize the distance between the first surface and the third or fourth surface reflector. The greater the distance between the reflector and the first surface, the greater the discontinuity will be in the image reflected by the element when transitioning from the main reflector to the spectral filter material. This will be accentuated as the viewing angle increases.

In embodiments where a spectral filter material is located proximate the second surface of the element and an additional coating, such as a hydrophilic coating, is on the first surface, the optical properties of both coatings will affect the appearance of the perimeter of the device and may require adjustments to the layers for optimal appearance of the perimeter. In the case of an electro-optic element with a hydrophilic coating as described in commonly assigned U.S. Pat. Nos. 6,447,123, 6,193,378 and 6,816,297 hereby incorporated in their entireties by reference, the first surface coating will have a reflectance substantially lower than the reflectance of the preferred embodiments of a second surface spectral filter material as described herein. This will result in the hue and/or chroma of the color of the perimeter of the device being more dependent on the second surface coatings than those on the first surface. Nonetheless, especially when color is chosen near a point of transition from perceived yellowish to bluish, +b* to −b*, respectively, or reddish to greenish, +a* to −a*, respectively, these differences tend to become more perceivable. When attempting to match the hue of the spectral filter material to that of the overall field of view of the reflector, small differences in the materials that result in transitions from more yellow to less yellow, or less blue to more blue, when compared to the overall field of view of the element may be avoided by practicing the teachings herein. A similar contrast in reddish or greenish hue may be managed.

For example, the color and reflectance of the ring and viewing area with and without a hydrophilic surface coating were modeled with a thin film program. The spectral filter ring consists of 126 nm of ITO, 3 nm of Cr, 5 nm of Rh, 30 nm of Ru and 40 nm of Cr. The exit medium or material next to the metals and dielectric layers is an electrochromic fluid with an index of approximately 1.365. The hydrophilic layer consists of a 65 nm color suppression layer next to the glass, a 234 nm TiO2 layer with a surface morphology and 10 nm of SiO2.

Table 4a shows the reflectance and color of various portions of the mirror. The first two rows show the effect of the presence or absence of the hydrophilic layer on the appearance of the ring. The color and reflectance are essentially unchanged with the application of the hydrophilic layer on the first surface of the mirror. In rows 3 and 4 we see the change of color in the viewing area when the mirror is in the darkened state. In the undarkened state the higher reflectance of the back reflector dominates the appearance. The reflectance increases with the hydrophilic layer which may have advantages in certain markets. The color of the viewing area without the hydrophilic layer in this case is somewhat objectionable because the thickness of the ITO is selected to optimize the color of the ring. This results in a somewhat compromised color in the viewing area. By adding the hydrophilic coating on surface one, the color becomes more neutral, a positive benefit to the combination. The fifth row shows the color of the hydrophilic layer without any other coatings on surface two of the glass and with an electrochromic fluid as the exit medium for reference.

TABLE 4a

Color and reflectance of different mirror components

| Structure | R | a* | b* |
| --- | --- | --- | --- |
| Hydro/Glass/ITO/Cr/Rh/Ru/Cr | 58.46 | −4.20 | 3.23 |
| Glass/ITO/Cr/Rh/Ru/Cr | 58.23 | −4.20 | 1.96 |
| Hydro/Glass/ITO | 13.50 | 0.69 | −3.10 |
| Glass/ITO | 5.65 | 4.69 | 1.92 |
| Hydro/Glass | 12.47 | −1.70 | −4.60 |

Example

Mirror Element Description

A particularly advantageous element configuration in conformance with FIGS. 17A-17C and 18 comprises a first substrate of glass approximately 1.6 mm thick having a conductive electrode approximately 0.4 wavelengths (approximately 80 percent of half-wave) thick of indium-tin-oxide applied over substantially the entire second surface by sputtering. At least a portion of the first corner, the edge and the second corner are treated such that approximately 0.25 mm of material is removed from the second surface and approximately 0.5 mm of material is removed from the first surface. It should be apparent that a portion of conductive electrode is removed during treatment. A spectral filter material approximately 400

Å thick of chrome is applied approximately 4.5 mm wide near the perimeter of the first substrate proximate the conductive electrode. An electrical conduction stabilizing material approximately 100 Å thick of a platinum group metal (PGM) (i.e., iridium, osmium, palladium, platinum, rhodium, and ruthenium) is applied approximately 2.0 cm wide near the perimeter of the first substrate proximate the spectral filter material. A first separation area is laser etched approximately 0.025 mm wide with a portion thereof extending parallel to, and within the width of, a portion of a primary seal material area to substantially electrically insulate the first and second conductive electrode portions, spectral filter material portions and adhesion promotion material portions. A second substrate of glass approximately 1.6 mm thick having a conductive electrode approximately 0.5 wavelengths thick over substantially all of the third surface is provided. A second separation area is laser etched approximately 0.025 mm wide with a portion thereof extending parallel to, and within the width of, a portion of a primary seal material to substantially electrically insulate the third and fourth conductive electrode portions. A reflective material approximately 400 Å thick of chrome is applied proximate the third conductive electrode portion substantially defined by the inboard edge of the primary seal. An optional overcoat approximately 120 Å thick of ruthenium is applied proximate the reflective material substantially defined by the inboard edge of the primary seal. A primary seal material, comprising an epoxy having a cycloaliphatic amine curing agent and approximately 155 µm substantially spherical glass balls, is provided to secure the first and second substrates together in a spaced apart relation to define a chamber. A substantially rigid polymer matrix electro-optic medium, as taught in many commonly assigned U.S. Pat. Nos. 5,679,283, 5,888,431, 5,928,572, 5,940,201, 6,545,794, and 6,635,194, the disclosures which are incorporated in their entireties herein by reference, is provided between the first conductive electrode portion and the optional overcoat material within the chamber through a plug opening in the primary seal material. The plug opening is sealingly closed using ultra-violet light curable material with UV light irradiating the plug bottom through the third and fourth surface. The cured primary seal material and the plug material are inspected by viewing the element looking toward the fourth surface. An electrically conductive material comprising a bisphenol F epoxy functional resin, viscosity of approximately 4000 cP having a cycloaliphatic amine curing agent, viscosity of approximately 60 cP, and a silver flake, tap density approximately 3 g/cc and average particle size of approximately 9 µm is applied proximate the outboard edge of the primary seal material between the second adhesion promotion material portion, the third conductive electrode portion and the first electrical clip. This same electrically conductive material is applied proximate the outboard edge of the primary seal material between the first adhesion promotion material portion, the fourth conductive electrode portion and the second electrical clip. A double sided, pressure sensitive, adhesive material is provided between the electrical clip and the fourth surface of the second substrate. The electrically conductive material is cured after placement of the first and second electrical clips. The primary seal material is partially cured prior to application of the electrically conductive material; additional primary seal material curing coincides with curing the electrically conductive material. This curing process is beneficial to prevent warping of the element and improves overall related adhesion, sealing and conductivity characteristics.

This example mirror element description is provided for illustrative purposes and in no way should be construed to limit the scope of the present invention. As described throughout this disclosure, there are many variants for the individual components of a given element and associated rearview mirror assembly.

In embodiments of the present invention having a highly reflective spectral filter material applied between the second surface of the first substrate and the primary seal, it has proven advantageous to use specifically selected spacer material to eliminate bead distortion. Glass beads are typically added to the primary seal material to control the spacing between the substrates that form the chamber containing the electro-optic medium. The diameter of preferably substantially spherically shaped glass beads is a function of the desired "cell" spacing.

These glass beads function well as spacers in electro-optic devices that have two transparent substrates, a transparent front substrate and a reflector positioned on surface three or four. These spacers also function well in devices with a spectral filter material on the first surface or within the first substrate. However, when the spectral filter material is applied proximate the primary seal material and the second surface, "dimples", or small distortions in the chrome spectral filter material, are created by typical glass spacer beads and are visible in the seal area of a resulting mirror element. These dimples are also visible in mirror elements having a third surface reflector; however, they can only be seen if the mirror element is viewed looking at the fourth surface. These third surface dimples in a reflector are not visible in a resulting mirror element when viewed once installed in a vehicle.

In contrast, these dimples are readily visible in a resulting mirror element when the spectral filter material is proximate the second surface and covers the primary seal material area. These dimples are created, at least in part, by high stress areas proximate the glass spacer beads. Typically, the primary seal material comprises a substantially rigid thermal curing epoxy; preferably comprising a cycloaliphatic amine curing agent. The curing temperature of the epoxy material is often greater than 150 degrees Centigrade. There is often a significant difference in thermal expansion between the customarily used ceramic glass bead (low coefficient of thermal expansion) and the epoxy material (high coefficient of thermal expansion). At least a portion of the glass spacer beads are in contact with the top material of a respective stack of materials proximate the second and third surfaces of the substrates when the seal solidifies and cures at high temperatures. As the mirror element cools in the post primary seal material cure cycle, the seal material shrinks much more than the spacer beads and stress develops around the bead creating a distorted area, or dimple, in the substrate stack. When the substrate comprises a reflector on a surface that is in contact with the primary seal material, these distorted areas or dimples are visually perceptible.

These distorted areas can be eliminated in a number of ways. A more elastomeric or flexible primary seal material may be used that inherently does not build areas of high stress. A spacer that is more compressible may be used such that the spacer flexes as stress develops. A breakable spacer may also be used such that the spacer breaks to relieve the localized stress during primary seal material curing. A room or low temperature curing seal material with low cure shrinkage may be used that will eliminate or minimize the thermal expansion-related stress. A seal material and spacers that are a closer match in thermal expansion may be used to eliminate or minimize the thermal expansion-related stress, such as plastic spacer beads and plastic seal material, ceramic spacer beads and ceramic seal material or seal material and/or spacer beads containing a thermal expansion modifying filler. The spacer beads in the seal material may be eliminated altogether if proper methods of element manufacturing are used to control the element gap ("cell" spacing). For example, a spacing media, such as a PMMA bead or fiber that dissolves in the electro-optic media, could be applied to the area internal the primary seal to control the element gap during primary seal material curing. The element substrates may also be held apart mechanically until the seal solidifies.

Example 1

Primary Seal with Spacers

A master batch of thermal cure epoxy was made using 96 parts by weight Dow 431 epoxy novolac resin, 4 parts fumed silica and 4 parts 2 ethyl 4 methyl imidazole. To small portions of the above master batch 2 parts by weight of the following spacer materials were added. A dab of the epoxy/spacer mixture was then put on a 1"×2"×0.085" thick piece of chrome coated glass such that the epoxy mixture was in contact with the chrome reflector. A 1"×1"×0.85" piece of ITO coated glass was placed on top and the glass sandwich was clamped such that the glass pieces bottomed out to the spacer material. The element was then cured at about 180 degrees Centigrade for about 15 minutes. Subsequently, once the element returned to room temperature, it was visually inspected for dimples looking at the chrome as if it were on surface two.

Example 2

Primary Seal Material

Using the thermal cure epoxy of Example 1 with 140 um glass beads caused a very heavy dimple pattern to be visible.

Example 3

Primary Seal Material

Using the thermal cure epoxy of Example 1 with plastic beads (Techpolymer, Grade XX-264-Z, 180 um mean particle size, Sekisui Plastics Co. Ltd., Tokyo, Japan) caused no dimple pattern to be visible.

Example 4

Primary Seal Material

Using the thermal cure epoxy of Example 1 with plastic fibers (Trilene, 140 um diameter monofilament line cut to 450 um lengths, Berkley, Spring Lake, Iowa) caused no dimple pattern to be visible.

Example 5

Primary Seal Material

Using the thermal cure epoxy of Example 1 with hollow ceramic beads (Envirospheres, 165 um mean particle size, Envirospheres PTY Ltd., Lindfield, Australia) caused very slight, but acceptable, dimple pattern to be visible.

Example 6

Primary Seal Material

Using an epoxy cured at room temperature caused no dimple pattern to be visible after 1 week at room temperature.

Example 7

Primary Seal Material

Using two parts by weight glass beads (140 um) added to a UV curable adhesive, Dymax 628 from Dymax Corporation, Torrington, Conn., and compressing the adhesive between two glass substrates as described above caused a very slight, but acceptable, dimple pattern to be visible. The adhesive was UV cured at room temperature.

Figure 20A:
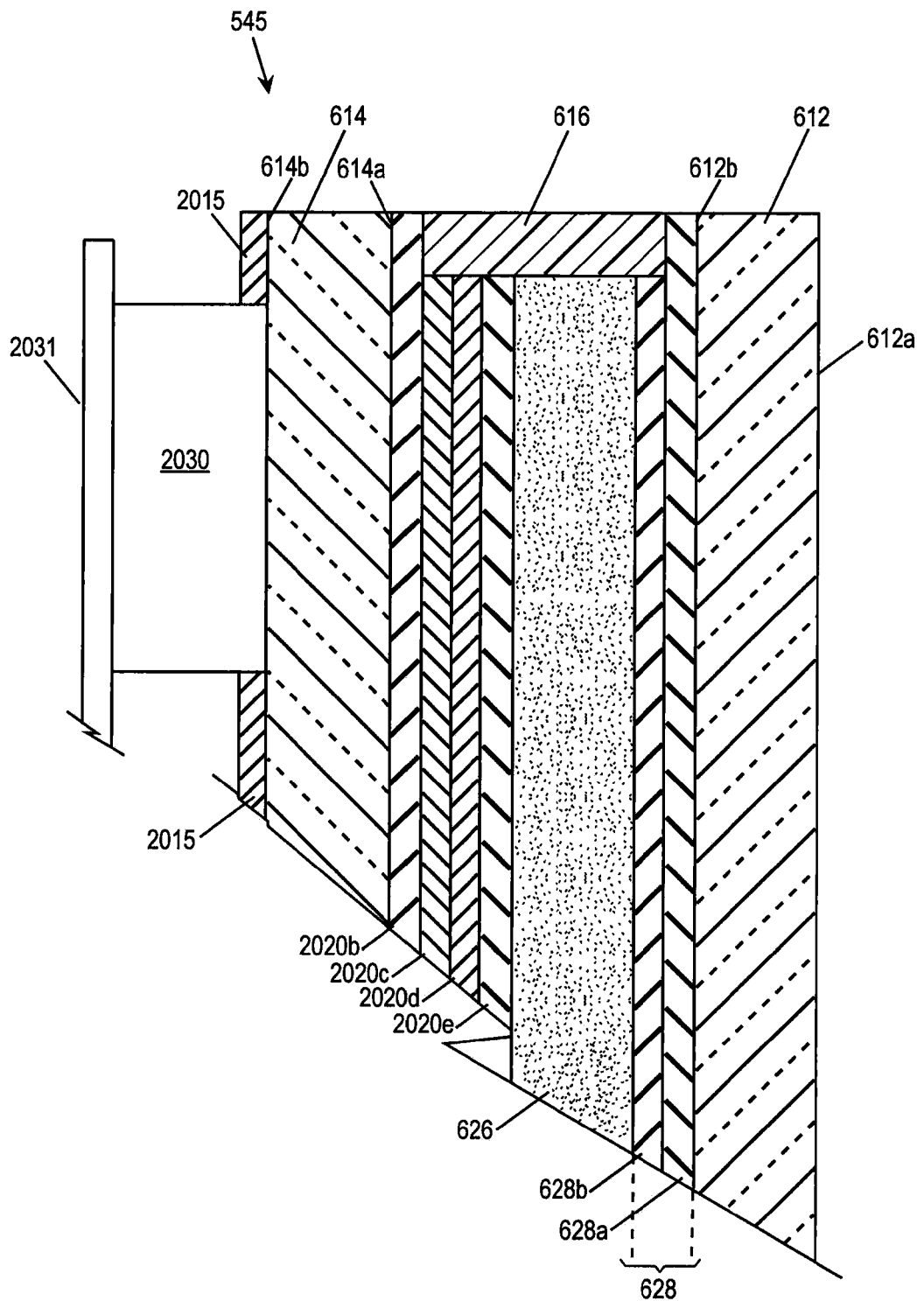
FIG. 20A depicts a cross-sectional view of an embodiment of an electro-optic mirror element incorporating a light source.

Turning now to FIG. 20A, a cross sectional view of an embodiment of an electro-optic mirror element 545 is depicted to include a light source 2030 mounted to a circuit board 2031 positioned such that light rays emitted by the light source 2030 are transmitted through the element 545 to a viewer (not shown) observing the first surface 612a. In a preferred embodiment of the electro-optical mirror element of the invention, where high dimming/clearing speeds and/or short electrical contacts are desired, the substantially transparent layer 628 (which in an alternative embodiment may comprise multiple layers, such as, e.g., layers 628a and 628b as shown) on the second surface must have high conductivity (which corresponds to a low sheet resistance). Therefore, the sheet resistance of the electrode layer 628a (or layers 628 a,b) is preferably chosen to be between approximately 1 Ω/square and approximately 10 Ω/square, preferably between approximately 2 Ω/square and approximately 6 Ω/square, and most preferably approximately 3 Ω/square. Typically ½ wave ITO or full wave SnO(F) with a sheet resistance of 10 to 15 Ω/aresqu is used on the second surface in electro-optic mirrors made today. Such low sheet resistance can be achieved by providing thicker layers of conventional materials such as ITO, tin-oxide, zinc-oxide, or combinations thereof. If the optical thickness of the coatings is two waves or greater, there are also benefits in the color intensity and color variation that is contributed to the low end reflectance of the associated mirror element when compared to thinner coatings that are not color suppressed thicker layers, approximately two wave or above, provide benefits with regard to manufacturing variances. Other suitable low sheet resistance substantially transparent conductors can be made by combining layers of conductive metal oxides with metals or metal alloys. These stacks may be ITO/silver/ITO or ITO/silver alloy/ITO or may be stacks such as those used as low E coatings in the IG industries such as ZnO/Ag/ZnO/Ag/ZnO. Unlike low E-coatings for windows, to be useful in an electrochromic device, the conductivity interlayer should be continuous and the conductivity must reach the surface. To improve interlayer conductivity, dopants may be added such as aluminum or gallium. These dopants enhance the conductivity of the zinc oxide layers. To prevent the oxidation of the metal or metal alloy, thin layers of a protective metal such as titanium or zinc can be applied during the deposition process. The embodiment 2000 shown in FIG. 20 comprises a four layer stack coating 2020b, 2020c, 2020d, 2020e applied to the third surface 614a of the second substrate 614. A layer of opaque material 2015 is applied to the fourth surface 614b with a cut-out for the light from the light source 2030 to be projected through. Many alternate coatings and reflective, transflective and substantially transparent layers are disclosed in various U.S.

patents and U.S. patent applications incorporated herein by reference. It should be understood that a lower sheet resistance coating may be provided in an area proximate the associated electrical contact or around a perimeter area and allow the sheet resistance to increase as the distance from the electrical contact increases; this is particularly applicable when point contacts are utilized.

Figure 20B:
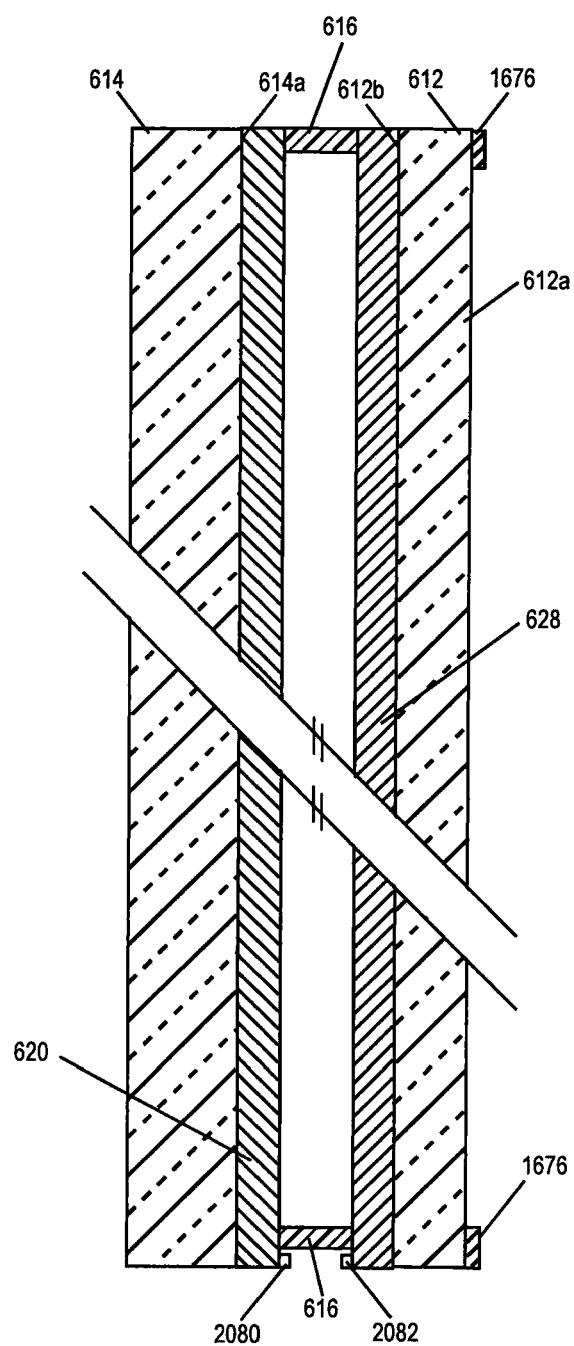
FIG. 20B depicts a cross-sectional view of an embodiment of an electro-optic element incorporating tab portions for making contact to the associated electrical conductive layers.

Turning now to FIG. 20B, a cross sectional view of an embodiment of an mirror element is shown to include the first substantially transparent substrate 612 in a spaced-apart relationship to the second substrate 614 with the seal member 616 therebetween. The substantially transparent electrically conductive layer 628 is applied to the second surface 612b and the reflective electrode layer 628 is applied to the third surface 114a. Preferably, the substantially opaque material 1676 is applied to the first surface 612a substantially circumferentially (i.e., configured as a ring) in a peripheral area of the first surface such that ambient light incident through the first surface 612a is prevented from impinging upon the seal member 616. Electrical contacts 2080, 2082 are provided to facilitate electrical connection to the electrically conductive layers on the third and second surfaces, respectively. In a preferred embodiment, the substantially opaque material 1676 has a reflectivity substantially equivalent to that of the reflective electrode layer 620 disposed on the third surface. In an alternative embodiment, the substantially opaque material 1676 may be transmissive to all wavelengths of light except those in the ultra-violate and/or the infrared region(s) of the spectrum, while the seal material 616 is substantially transparent. In another alternative embodiment, the substantially opaque material 1676 may be provided on the second surface 112b (not shown) in lieu of the first surface 112a or it may be embedded in the first substrate. The use of such substantially opaque material 1676 applied to the perimeter of a mirror on the first surface or the second surface of the front substrate 612 the edge of which has been properly treated may allow for production of an EC-mirror assembly that requires no bezel or a bezel with a vary narrow lip. Materials such as, for instance, chrome, molybdenum, stainless steel, nickel or titanium applied can be chosen to form the element 1676. The chosen material needs to exhibit good adhesion to glass or to coatings on the glass, and if used on surface one, good abrasion resistance and good environmental stability (water, salt, etc.). It is also desirable to have the ring of material 1676 closely match the color and reflectivity of the interior of the EC-mirror system. If the EC mirror proper has a reflectivity between around 50% to 70%, a front surface chrome perimeter coating 1676 matches well. If the EC-mirror system has a reflectivity greater than 70%, it may be necessary to increase the reflectivity of the perimeter ring. The latter can be done without compromising the abrasion resistance and chemical durability by making the ring out of highly reflective hard metals (hardness of 5 mhos or above) such as metals from the platinum metals group that includes rhodium, platinum and ruthenium. Because these metals do not adhere well to glass or glass like metal oxide coatings it is preferred that these highly reflective metals are put over a layer such as chrome that has good glass adhesion. Therefore a combination such as a base layer of chrome, molybdenum or nickel over coated with a hard high reflectance material such as rhodium, ruthenium or platinum will adhere well to glass like materials, resist abrasion and have good environmental durability. If a ring with low reflectivity that is dark or black is desired a coating of materials such as "black chrome" or oxides of Cr, Cu, Mn, Mo, and Fe or their combinations can be used. A ring that is a particular color can be made in a similar fashion.

Figure 21A:
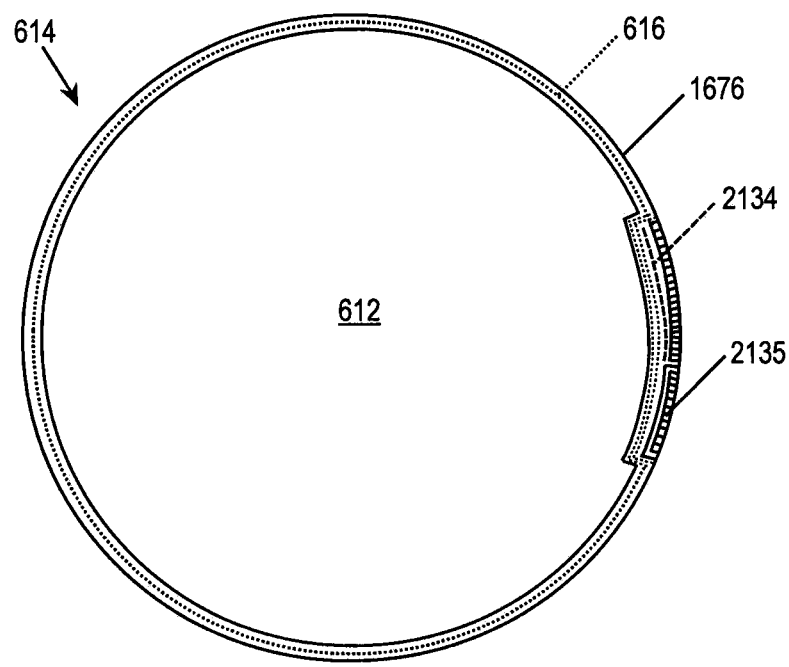
FIG. 21A is a front plan view of an embodiment of an electro-optic mirror element incorporating a substantially continuous perimeter edge and having tab/recess portion for contact areas for connection to the associated electrically conductive layers.
Figure 21B:
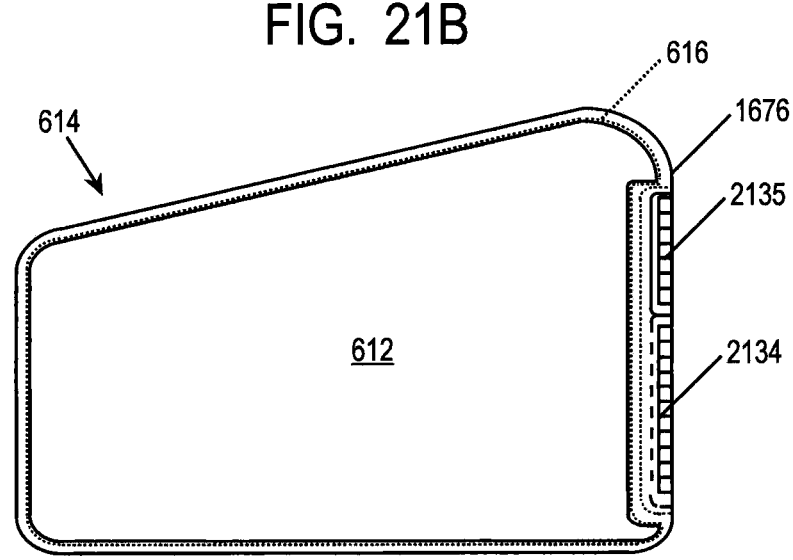
FIG. 21B is a front plan view of an embodiment of an electro-optic mirror element similar to that of FIG. 21A but having a more rectangular-shaped perimeter and having tab/recess portions on an inboard edge thereof.

FIGS. 21A and 21B depict plan views of mirror elements having substantially zero positional offset between the front substrate 612 and the rear substrate 614 except for in the tab/recess areas 2134, 2135 where contact is made to corresponding second and third surface conductive layers (not shown). The first and second substrates are secured in spaced apart relationship with one another via seal member 616. The substantially opaque material 1676 is provided as described with reference to FIG. 20B. In a preferred embodiment, low sheet resistance stacks, as described herein, are provided on both the second and third surface such that relatively short electrical contacts, leading to the electrically conductive layers on the second and third surfaces, are sufficient. In at least one preferred embodiment, the length of the contacts to the second and third surfaces combined are less than approximately 50 percent, and preferably less than approximately 25 percent, of the length of the perimeter of the associated mirror element. In at least one alternate embodiment, a point contact is provided to either the second surface conductive layer, the third surface conductive layer or both the second and third surface conductive layers. In at least one embodiment, the contact to the second electrically conductive layer is approximately 60 to approximately 75 percent of the total length of both contacts combined. In at least one embodiment anyone of these, "short electrical contact" systems may be combined with a carrier with integrated bezel as described herein with regard to FIGS. 60 and 61. Optionally, a substantially transparent seal member and, or, a substantially opaque material may be provided, as described herein, in combination with the short electrical contact(s). U.S. Pat. No. 5,923,457, the entire disclosure of which is incorporated herein by reference, discloses optional structures for mirror elements in accordance with various embodiments of the present invention.

Edge Treatment.

If any coating and/or a reflective peripheral ring of material is applied around the perimeter of the mirror on the first or second surface to mask the seal and/or contact areas, as discussed in reference to FIGS. 20A, 20B, 21A, 21B and other embodiments described herein, the aesthetics of this ring and edge of the ring become very important. Appearance of the edge of the first substrate plays a special role in assuring that the user's perception of the mirror is satisfying. Following the practical consideration and the trends in users' preferences in appearance of the vehicular rearview assemblies, the edge of the first substrate should be configured to be optically diffusive for at least two reasons.

1) In majority of cases, glass substrates of a mirror element of a rearview assembly are produced through scribing and breaking process that generally results in a reflective perimeter edge having specular reflective properties and reflecting about 4 percent of the incident light. (It is understood that this reflectivity level is inevitably increased if the specularly reflecting edge is overcoated with a peripheral ring of material such as Chrome.) The smooth specular reflective edge can give a bright or shiny appearance to the glass edge in many ambient light conditions, which is generally aesthetically objectionable.

1) Moreover, if the edge of a mirror element is chipped or cracked and is overcoated with a reflective peripheral ring of spectral filter material (such as chromium, for example), the chipping becomes extremely visible and stands out like a beacon scattering incident light in all different directions. This shortcoming becomes particularly aggravated if a chip or a crack extends onto the perimeter of the first or second surface. Similarly, if the perimeter and/or edge is chipped after the chrome peripheral ring coating is applied, the chip visually stands out in reflected light as a dark void on otherwise a smooth bright surface.

It is appreciated that both the specularly reflecting edge and imperfections associated with chipping of the edge of the mirror element become especially problematic in embodiments having either a narrow bezel or no bezel at all, because in such embodiments the chipping are not concealed. At least for the reasons discussed above it is preferred, therefore, to configure the first substrate so as to improve both the mechanical quality and the visual appearance of the edge of the mirror element in order to produce a high quality mirror. Both of these goals may be achieved by modifying the surface properties of the edge of the first substrate. Required modifications are produced, for example, by re-shaping the edge either after the coating has been applied to the edge or, preferably, right after the mirror substrates are cut to shape. Re-shaping may be performed by grinding, sanding, or seaming the edge with flat or contoured wheels containing abrasive particles or with a moving belt coated with abrasive particles. Depending on a configuration of the carrier and whether or not a bezel component extends onto the first surface of the mirror element, a light edge treatment that removes as little as 0.005"—or as much as 0.010" to 0.075"—of the front edge of the first may be all that is necessary to achieve a desired result.

Abrasive materials include but are not limited to diamond, silicon carbide or oxides of aluminum, cerium, zirconium and iron in the size range of about 100 to 1-200 mesh. The size of the particles used affects the roughness of the finished glass edge. The larger the abrasive particle the rougher the surface that is created. Generally 80 to 120 mesh size abrasive particles produce a very rough surface, 300 to 500 mesh size particles produce a smooth surface and 600 mesh and above produce a near polished finish. The abrasive particles can be embedded in a metal, resin or rubber medium. An example of abrasives loaded in metal or resin binder are diamond wheels available from GlassLine Corp., 28905 Glenwood Rd., Perrysburg, Ohio 43551 or Salem Corp., 5901 Gun Club Rd., Winston-Salem, N.C. 27103. An example of abrasives loaded in a rubber binder are Cratex M or Cratex F wheels available from Cratex/Brightboy Abrasives Co., 328 Encinitas Blvd. Suite 200, Encinitas, Calif. 92024. Abrasive coated belts are available from 3M Corp., St. Paul, Minn. 55144. Modification of the surface properties of the edge not only increases the mechanical durability of the edge by removing the microcracks but also makes the edge optically diffusive. The re-shaping is generally done in the presence of a coolant to remove the heat generated during grinding or seaming. The edge can also be reshaped by rubbing the glass against a substrate flooded with an abrasive slurry loaded with particles such as diamond, silicon carbide or oxides of aluminum, cerium, zirconium and iron. Equipment for edge polishing using the abrasive slurry method is available from SpeedFam Co., Kanagawa, Japan. Alternatively, the edge can be reshaped by cutting or blasting the edge with a high pressure liquid containing abrasive particles of diamond, silicon carbide or oxides of aluminum, cerium, zirconium and iron. Equipment for frosting glass using this method is available from Bystronic, 185 Commerce Dr., Hauppauge, N.Y. 11788. Alternative way of reshaping the edge may include blasting the edge with abrasive particles of diamond, silicon carbide or oxides of aluminum, cerium, zirconium and iron carried by a high velocity gas stream. A modified glass edge can also be produced by chemically etching the glass with a chemical solution designed to leave a frosty surface such as Superfine Glass Frosting Powder which a mixture of ammonium hydrogen fluoride and barium sulfate that is mixed with HCl available from Above Glass Corp., 18341 $4^{th}$ Ct., Miami, Fla. 33179. A modified glass edge can also be produced by coating the glass edge with a diffuse or pigmented paint such as 935 UV Series available from Ruco, Wood Dale, Ill. or UV 420 Series available from Fluorital Italy, Italy or Ultraglass UVGO Series available from Marabu, Germany or Crystal GLS Series available from Sun Chemical, Parsippany, N.J. or SpecTruLite UV Series available from Ferro Corp., Cleveland, Ohio.

Figure 21C:
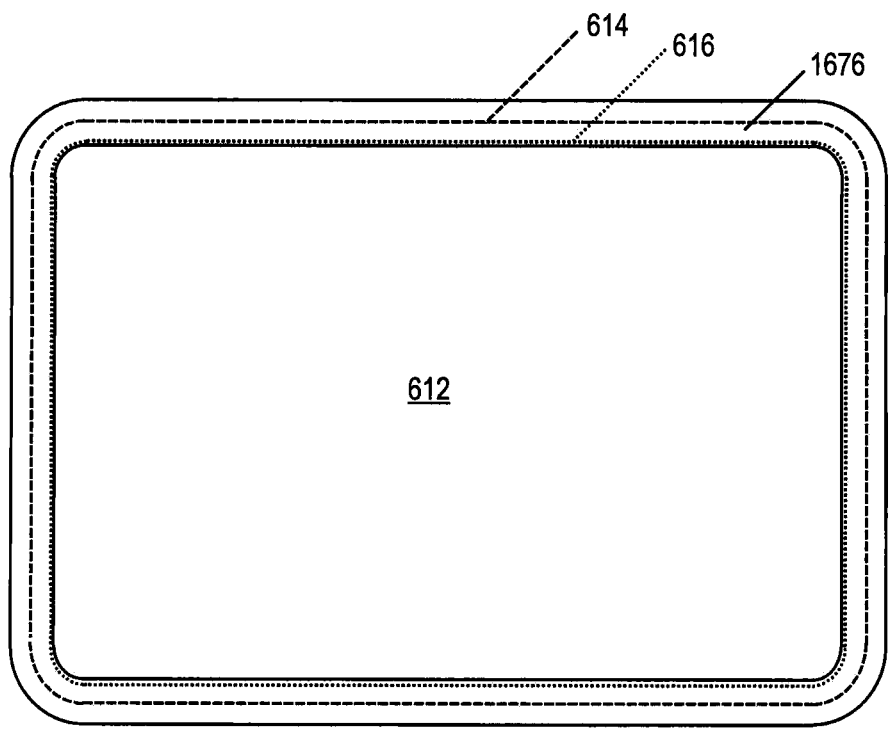
FIG. 21C depicts an electro-optic mirror element having a front substrate that is larger than the associated rear substrate.

Turning now to FIG. 21C, an embodiment of a mirror element is shown to have the first substrate 612 that is larger than the second substrate 614 such that an electrical contact to the second and third surface electrically conductive layers (not shown) is made inside the perimeter of the first substrate and is not visible when the element is viewed from the front of the mirror element. A seal member 616, and optionally, a substantially opaque material 1676 is provided as described with regard to other embodiments. It should be understood that alternate embodiments may be provided with a front substrate that is in positional alignment with the rear substrate on all put one edge and that contact to the second and third surface electrically conductive layer(s) is made on the edge having the extended front substrate. In addition to the "J" and "C" type electrical contact clips described and depicted below, a "Z" type contact clip may be provided (which is especially useful in an embodiment having a larger first substrate). The Z-type clip has a portion of one end secured to the second surface of the front substrate where the front substrate extends beyond the rear substrate, the Z clip then steps up along the edge of the rear substrate and the opposing end of the Z clip then extends along the fourth surface. In at least one embodiment, a Z clip is provided to make contact to the second surface and a J or C clip is employed to make contact to the third surface. For embodiments with larger, wide, clips that are bonded to the substrate, the thermal coefficient of expansion of the clip(s) and the thermal coefficient of the substrate are substantially matched, for example, if the substrate is glass, a Kovar, stainless steel or a laminate of Mo/Cu/Mo clip may be employed.

Additional Embodiments of Electrical Connectors.

Figure 22C:
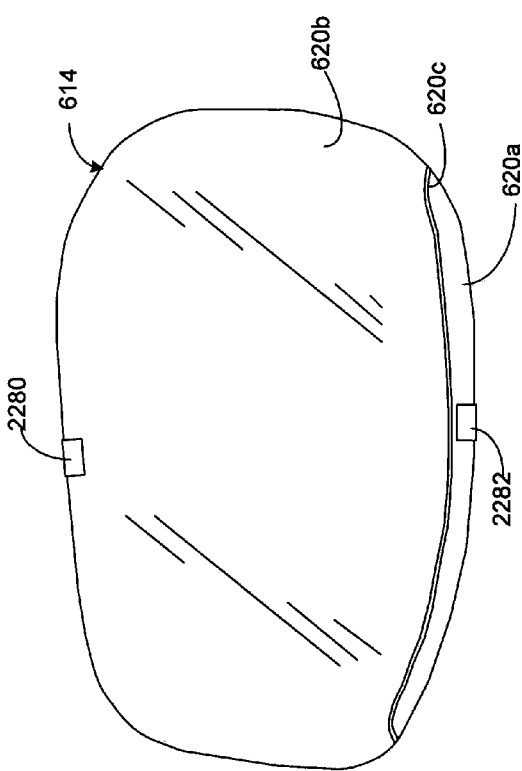
FIG. 22C is a top plan view of a rear substrate having an electrode formed thereon, as may be used in the electro-optic mirror element shown in FIG. 22B.
Figure 22D:
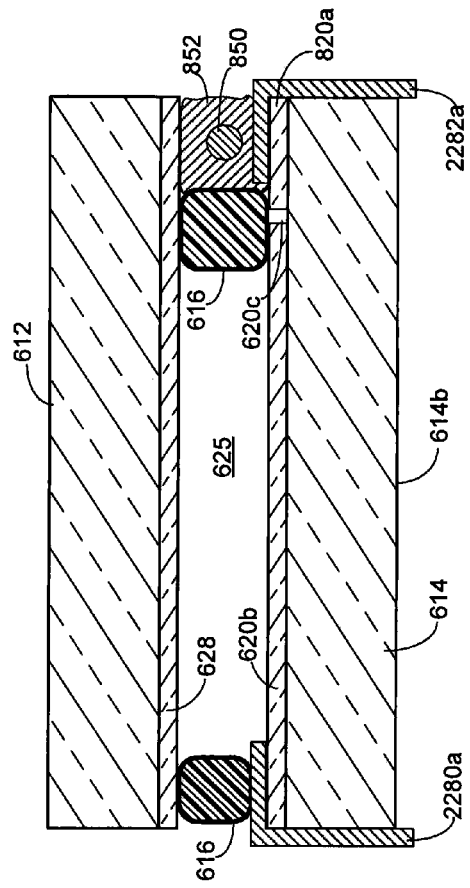
FIG. 22D is an enlarged cross-sectional view of an electro-optic mirror element incorporating an edge seal in accordance with an alternative embodiment of the present invention.
Figure 22E:
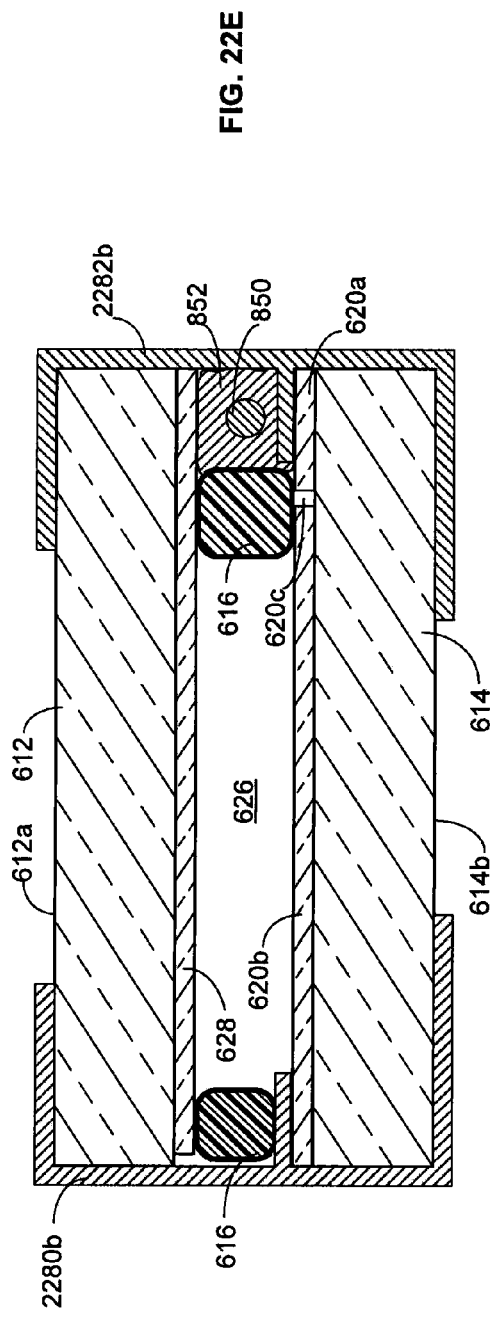
FIG. 22E is an enlarged cross-sectional view of an electro-optic mirror element incorporating an edge seal in accordance with another embodiment of the present invention.

FIG. 22A illustrates one technique for providing for electrical coupling to an electrochromic device such as that of the first embodiment. As shown, a first electrically conductive clip 2280 is clipped to element 614 so as to be in electrical contact with second portion 620*b* of electrode 620. A second electrically conductive clip 2282 is provided that clips around the entire device and thus contacts front surface 612*a* of front element 612 and rear surface 614*b* of rear element 614. Electrical contact is made to electrode 628 via first portion 620*a* of electrode 620, and via electrically conductive material 852. A variation of this construction is shown in FIG. 22B in which 2282 is made of an identical construction as that of clip 2280 so as to clip only to rear element 614. Again, electrical coupling between clip 2282 and electrode 628 is through electrically conductive seal 852 and any wire 850 that may be disposed therein. As shown in FIG. 22C, one or a plurality of such clips may be provided for electrical connection to each electrode 620 or 628. Clips 2280 and 2282 may be directly soldered or otherwise connected to a circuit board or wires extending therebetween may be soldered to clips 2280 and 2282. FIGS. 22D and 22E show two additional variants of the clips 2280 and 2282 discussed above. In FIG. 22D, clips 2280*a* and 2282*a* are modified such that they do not extend around rear surface 614*b* of rear element 614. In FIG. 22E, clips 2280*b* and 282*b* are modified so as to extend over and around front surface 612*a* of front element 612 while also extending around rear surface 614*b* of rear element 614. As will be apparent to those skilled in the art, various modifications can be made to the disclosed clip designs without departing from the scope of the present invention.

Figure 23:
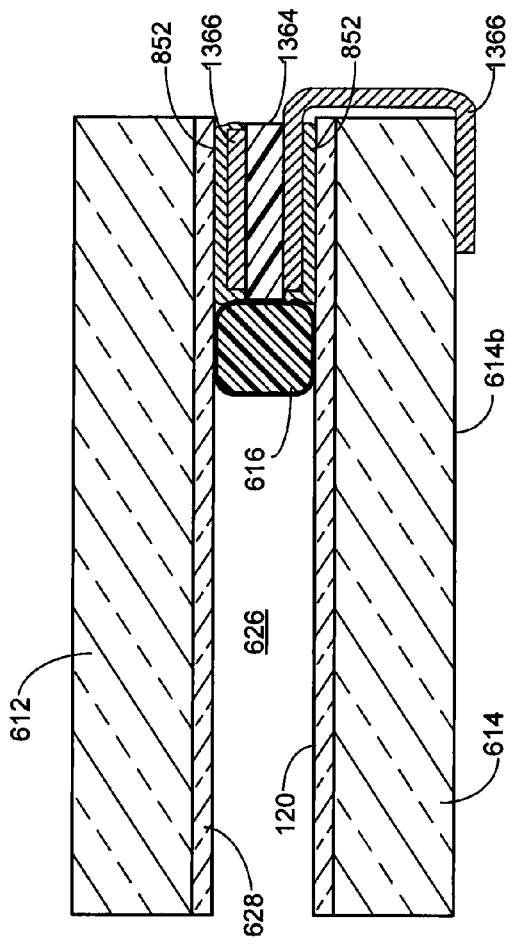
FIG. 23 is an enlarged cross-sectional view of an electro-optic mirror element incorporating aspects of yet another embodiment of the present invention.

FIG. 23 shows a variation of the embodiment shown in FIG. 13 described above. The structure shown in FIG. 23 differs in that one of the layers of conductive foil or web 1366 extends outward beyond the edges of elements 612 and 614 and wraps around element 614 for connection to either a printed circuit board or a heater circuit. Additionally, the rear surface 614b of rear element 614 may be patterned with conductive electrodes for supplying power to foil 1366. The foil 1366 on the opposite side of insulator 1364 may likewise extend outward for connection to the other of electrodes 628 and 620. Foil 1366 may be cut using pinking shears and effectively bent to form one or more connector clips. Foil 1366 may be configured as an electrical bus with tabs extending into the seal.

Figure 24:
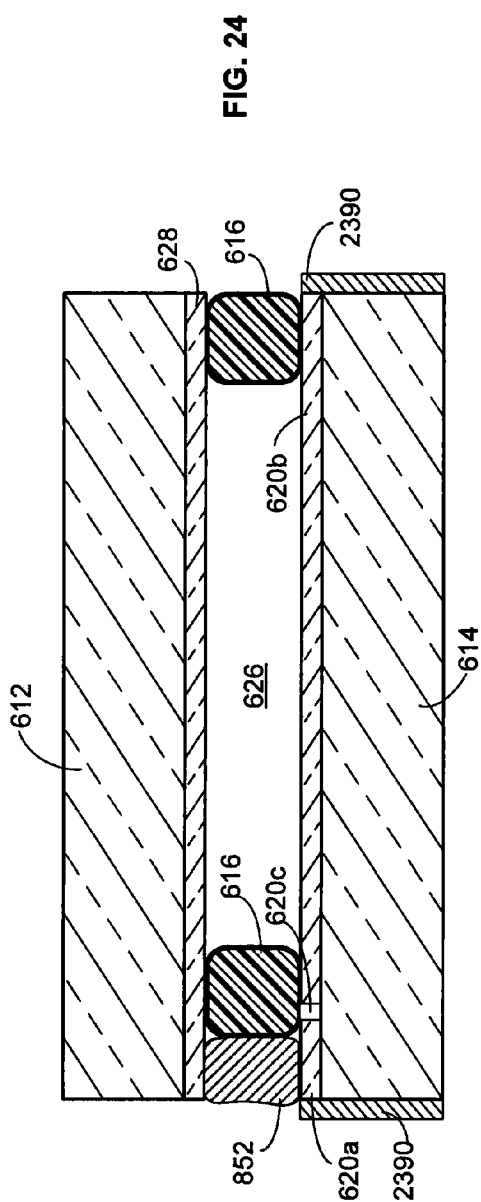
FIG. 24 is an enlarged cross-sectional view of an electro-optic mirror element incorporating aspects of an additional embodiment of the present invention.

FIG. 24 shows yet another embodiment in which a conductive coating 2390 is deposited on the peripheral edge of rear element 614. Such a coating may be made of metal and applied with solder. Alternatively, the material may be rolled onto the edge of element 614. Such a construction allows contact merely to the edges of element 614 to provide electrical coupling to one or both of electrodes 620 and 628.

Figure 25:
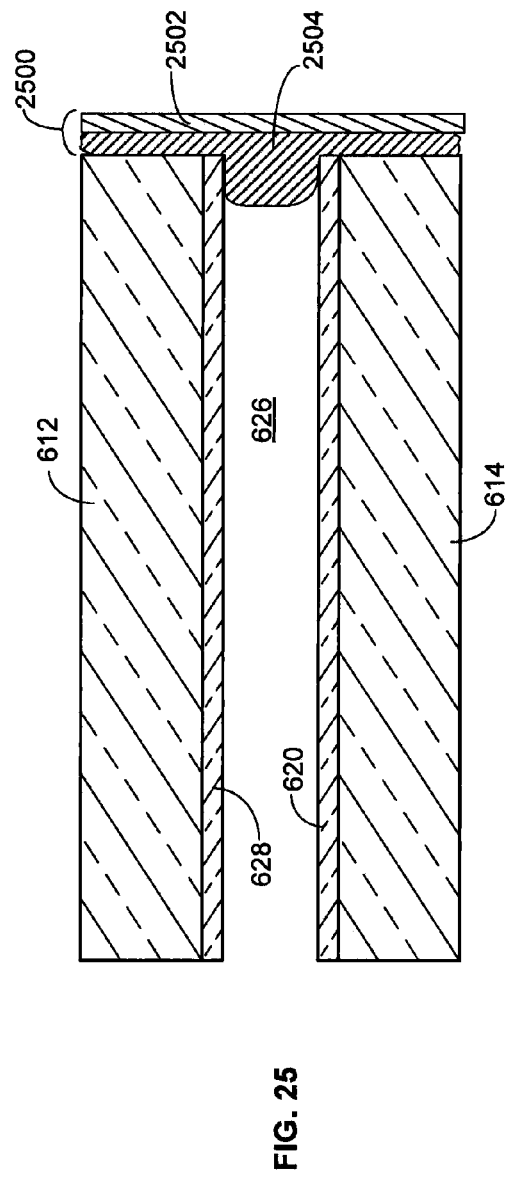
FIG. 25 is an enlarged cross-sectional view of an electro-optic mirror element incorporating an edge seal in accordance with a supplementary embodiment of the present invention.

Yet another embodiment is shown in FIG. 25. In this embodiment, the majority of the sealing member is moved from between the front and rear elements 612 and 614 to the edge of the front and rear elements. Thus, the seal is provided predominately on the peripheral edges of the front and rear elements. As shown in FIG. 25, the seal 2500 contacts the front element 612 both on the peripheral edge and the rear surface of the front element. Likewise, the seal 2500 contacts the rear element 614 both on the peripheral edge and the front surface of the rear element. A first contact area in which seal 2500 contacts the peripheral edge of front element 612 is larger than a second contact area in which seal 2500 contacts the rear surface of front element 612. Likewise, a third contact area in which seal 2500 contacts the peripheral edge of rear element 614 is larger than a fourth contact area in which seal 2600 contacts the front surface of rear element 614. As a result, an interface between seal 2600 and front element 612 defines an oxygen penetration path length through which oxygen would have to travel to enter chamber 626, wherein the portion of the path length extending along the peripheral edge of front element 612 is longer than the portion of the path length extending along the rear surface of front element 612. Similarly, an interface between seal 2500 and rear element 614 defines another oxygen penetration path length through which oxygen would have to travel to enter chamber 626 wherein the portion of this path length extending along the peripheral edge of rear element 614 is longer than the portion of the path length extending along the front surface of rear element 614. By forming seal 2500 of a thin member 2502 of a first material having an oxygen permeability of less than 2.0 $cm^3 \cdot mm/m^2 \cdot day \cdot atm$ and/or by increasing the oxygen penetration path length as compared to other electrochromic cells, the amount of oxygen penetration into chamber 626 may be significantly reduced. Typical prior art seals are made of epoxy resins, which have oxygen permeabilities of 2.0-3.9 $cm^3 \cdot mm/m^2 \cdot day \cdot atm$ and water permeabilities of 0.7-0.94 $gm \cdot mm/m^2 \cdot day$, and are predominately positioned between the front and rear elements thereby having a shorter oxygen penetration path length.

First material forming thin member 2502 may be made of a material selected from the group of: metal, metal alloy, plastic, glass, and combinations thereof. First material 2502 is adhered to the peripheral edges of the front and rear elements with a second material 2504. The second material may have a higher oxygen permeability than said first material, and may be an electrically conductive adhesive or an electrically conductive epoxy that makes electrical contact with at least one of first and second electrically conductive layers 620 and 628.

In the preferred embodiment of the invention, the sealing member 2500 includes a thin member 2502 with low gas permeability that is adhered to the edge of the front and rear elements. An adhesive 2504 such as an epoxy adhesive, PSA or hot melt can be applied in a thin film to a thin member 2502 with low gas permeability such as a metal foil or plastic film. Examples of materials that may be used as thin member 2502 include polycarbonate (oxygen permeability of 90.6-124 $cm^3 \cdot mm/m^2 \cdot day \cdot atm$ and water permeability of 3.82-4.33 $gm \cdot mm/m^2 \cdot day$), polyvinylidene chloride (oxygen permeability of 0.0152-0.2533 $cm^3 \cdot mm/m^2 \cdot day \cdot atm$ and water permeability of 0.01-0.08 $gm \cdot mm/m^2 \cdot day$), and a multilayer film of plastic and/or metal. Such a film may include inorganic layers or a coating such as $SiO_2$, $Al_2O_3$, $Ta_2O_5$, Al, chrome, etc. that is bonded to the edges of the front and rear glass elements with an adhesive or glass frit. An example of a suitable multilayer film is the SARANEX brand PE/PVC-PVDC film, which has an oxygen permeability of 0.2-0.79 $cm^3 \cdot mm/m^2 \cdot day \cdot atm$ and water permeability of 0.06-0.16 $gm \cdot mm/m^2 \cdot day$.

Figure 26:
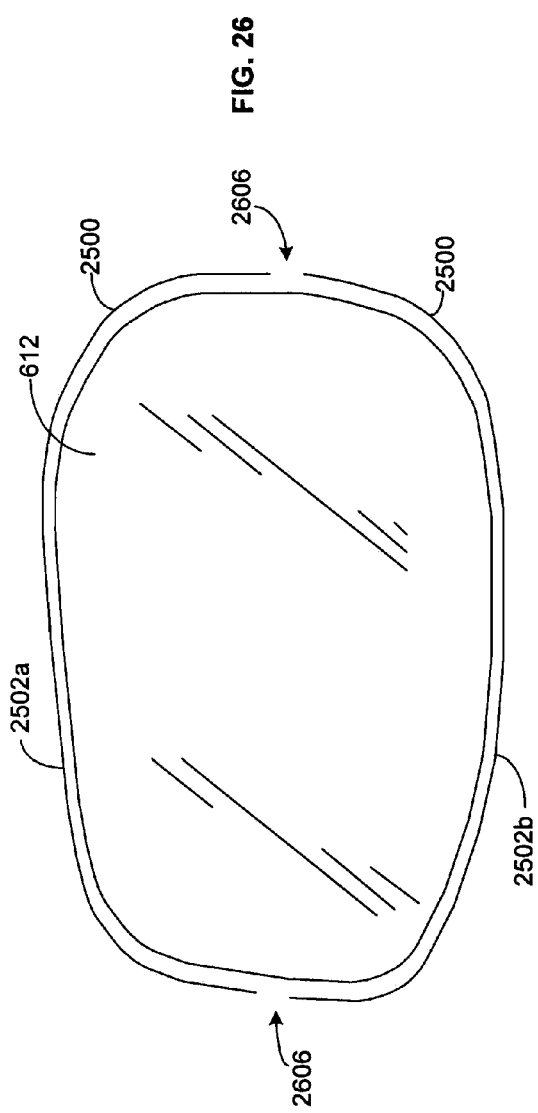
FIG. 26 is a top plan view of an electro-optic mirror element showing the provision of an edge seal as utilized in various embodiments of the present invention.

This foil or film 2502 is then wrapped around the front and rear substrates that are held in the proper spaced apart relationship. The adhesive 2504 bonds the foil or film 2502 primarily to the substrate edges to form a gas and liquid tight seal around the perimeter of the electrochromic device. A fill port 2606 (FIG. 26) could be added by leaving a gap in the foil or film edge sealing member or punching a hole through it. The fill hole could be soldered shut if a metal foil is used for the edge-sealing member. Alternatively, the fill hole could be plugged with an UV or visible light curing adhesive or hot melt or an additional thin sealing member such as a foil or film could be glued over the fill hole. If a light transparent film is used, a UV or visible light curing adhesive could be used to adhere the film. If a non-transparent metal foil is used a hot melt, PSA or other self-curing adhesive can be used. In this way the area that is required for a seal that is primarily between the substrates is eliminated and a bezel that had been designed to cover that area can be made narrower or eliminated.

Figure 27:
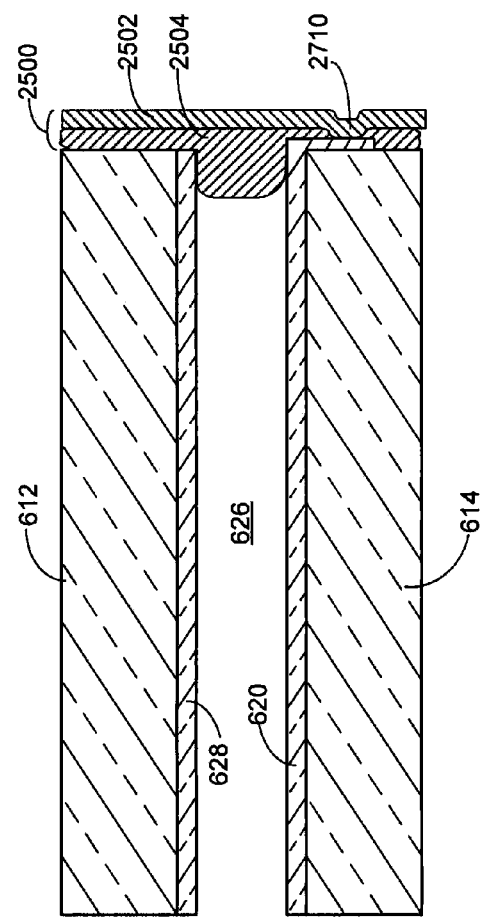
FIG. 27 is an enlarged cross-sectional view of an electro-optic mirror element incorporating an edge seal in accordance with yet another embodiment of the present invention.

If the low gas permeability member adhered to the side of the substrates has areas that are electrically conductive this member could also serve as an electrical bus to make contact to the conductive electrodes of the electrochromic device. Electrical isolation of the electrodes could be maintained by creating gaps in the electrical continuity of the edge seal member. For example, if a metal foil was used, small slits or gaps 2606 (FIG. 26) could be created in the foil such as one to be used as a fill hole and another opposite the fill hole to electrically isolate top and bottom electrode buses. Electrical continuity between the conductive edge sealing member and the electrode could be established in any number of ways. The conductive electrode coating(s) 620 and/or 628 could wrap around the side of the substrate(s) (FIGS. 27 and 28) or an electrically conductive coating or adhesive 3008 (FIG. 30A-33) could be applied in areas that electrical connection to the edge bus is desired. The conductive sealing member 2502 could have a dimple or crease 2710 (FIG. 27) or include an inward protruding extension 2914 (FIG. 29) to make contact through the adhesive bonding of the sealing member to the side of the substrate to make contact to the electrode coating or edge coating 620,628. Conductive particles in the adhesive or a conductive adhesive 3008 could be used to make electrical contact between the conductive edge sealing member and the electrode coating or edge coating. A wire (2812 in FIG. 28), metal clip (3416 in FIG. 34) or other conductor could then be used to make contact between the electrically conductive edge seal 2502 and the electrochromic device drive electronics. An electrochromic device made in this manor would require little or no bezel to cover the seal and contact area. A more detailed discussion of FIGS. 30A-34, is provided below.

As shown in FIGS. 30(A, B), thin seal member 2502 may be secured to the peripheral edges of elements 612 and 614 using both an electrically conductive material 3008 and a nonconductive material 2504. As depicted in FIG. 30A, the conductive material 3008 provides an electrical connection from conductive layer 628 to a first portion 2502a (see FIG. 26) of seal member 2502. As depicted in FIG. 30B, the conductive material 3008 provides an electrical connection from conductive layer 620 to a second portion 2502b of seal member 2502. As mentioned above, fill ports, gaps or slits in the thin seal member and conductive material 3008 may be used to electrically isolate portions 2502a and 2502b of thin seal member 2502.

In the embodiment shown in FIG. 31, conductive layers 628 and 620 are configured and oriented as shown in FIG. 10C, such that the conductive material 3008 provides an electrical connection from conductive layer 628 to a first portion 2502a (see FIG. 26) of seal member 2502, and the conductive material 3008 also provides an electrical connection from conductive layer 620 to a second portion 2502b of seal member 2502. As mentioned above, fill ports, gaps or slits in the thin seal member and conductive material 3008 may be used to electrically isolate portions 2502a and 2502b of thin seal member 2502.

FIG. 32 shows an embodiment similar to FIG. 31 with the exception that regions 628a and 620a of conductive layers 120 and 628 are eliminated.

Figure 33:
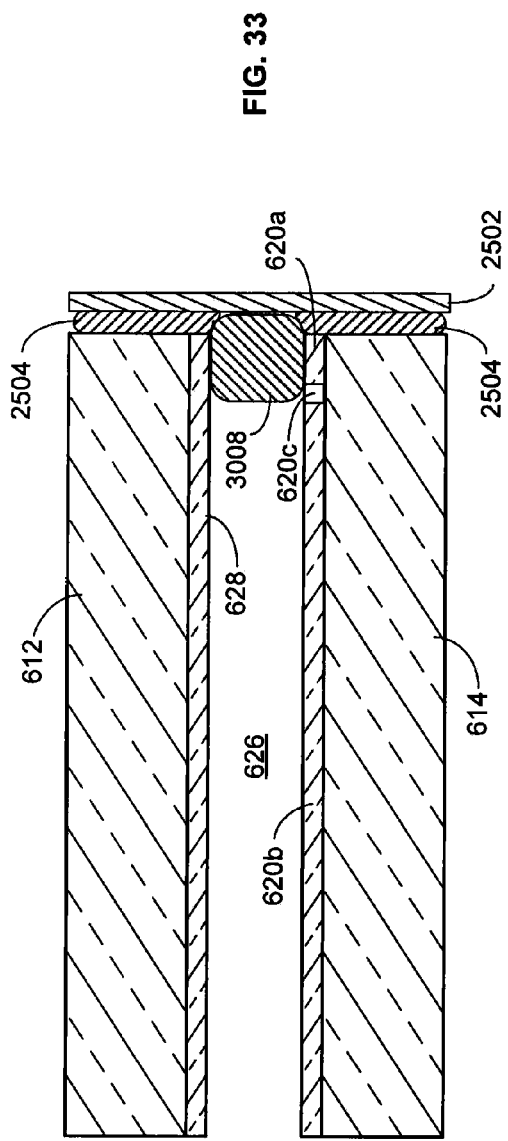
FIG. 33 is an enlarged cross-sectional view of an electro-optic mirror element incorporating an edge seal in accordance with a related embodiment of the present invention.

FIG. 33 shows an embodiment wherein only the center portion of the adhesive material disposed between layers 620 and 628 is electrically conductive, while nonconductive is used to adhere seal member 2502 to the peripheral edges of elements 612 and 614. This provides the advantage that electrically conductive material 3008 may not need to be as effective as an adhesive with respect to thin member 2502.

Figure 34:
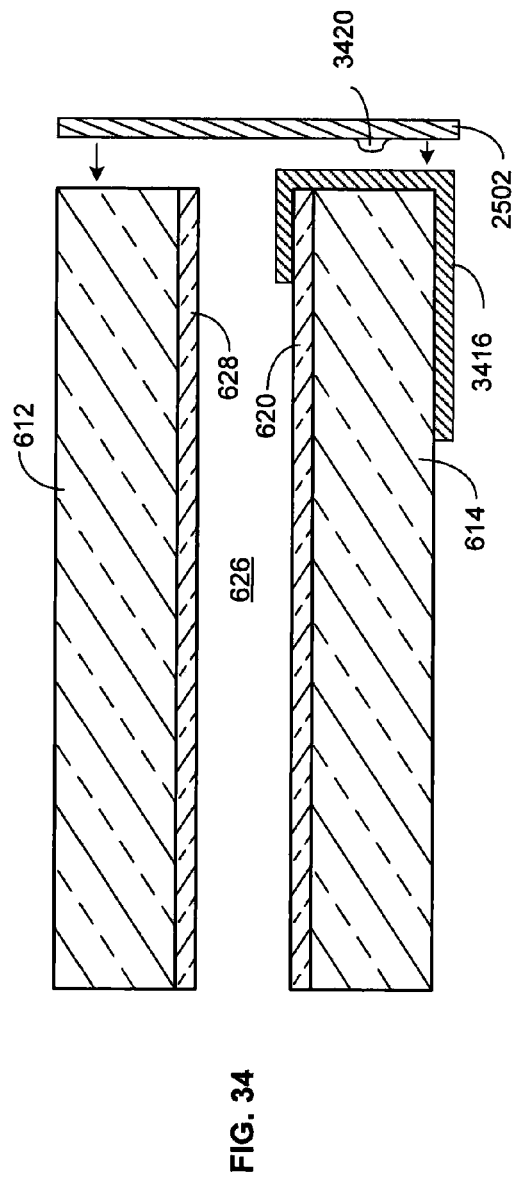
FIG. 34 is an enlarged cross-sectional view of an electro-optic mirror element incorporating an edge seal in accordance with another related embodiment of the present invention.

FIG. 34 shows an embodiment wherein a clip 3416 (similar to clip 2282 in FIGS. 22B and 22C) used in combination with thin seal member 2502, which may be a metal foil or the like. As illustrated, a solder bump 3420 may be provided for soldering thin foil 2502 to clip 3416.

Electrical Communication with the Back of the Mirror System.

As follows from the description of the embodiment shown in FIG. 18, the electrically conductive material (e.g., 1848) may be in electrical contact with either of the second and third surface conductive electrode portions. Turning to FIGS. 35(A-N), there are shown various options for selectively contacting a particular portion of the second and third surface conductive electrode portions 3505, 3510.

The element construction depicted in FIG. 35(A) comprises a first substrate 3502a having a second surface stack of materials 3508a and a second substrate 3512a having a third surface stack of materials 3522a. The third surface stack of materials is shown to have an isolation area 3583a such that a portion of the third surface stack of materials that is in contact with a conductive epoxy 3548a is isolated from the remainder of the third surface stack of materials. The first and second substrates are held in spaced-apart relationship to one another via a primary seal material 3578a. It should be understood that another side of the element may have a similar isolation area associated with the second surface stack of materials for providing contact to the third surface stack of materials within the viewing area. It should be understood that either the second or third surface stack of materials may be a single layer of on materials as described elsewhere herein and within references incorporated herein by reference.

The element construction depicted in FIG. 35(B) comprises a first substrate 3502b having a second surface stack of materials 3508b and a second substrate 3512b having a third surface stack of materials 3522b. The first and second substrates are held in a spaced-apart relationship with respect to one another via a primary seal material 3578b. An electrically conductive epoxy 3548b is in contact with the third surface stack of materials and electrically insulated from the second surface stack of materials via the insulating material 3583b. It should be understood that another side of the element may have a similar isolation area associated with the second surface stack of materials for providing contact to the third surface stack of materials within the viewing area. It should be understood that either the second or third surface stack of materials may be a single layer of on materials as described elsewhere herein and within references incorporated herein by reference.

The element of FIG. 35(C) comprises a first substrate 3502c having a second surface stack of materials 3508c and a second substrate 3512c having a third surface stack of materials 3522c. The first and second substrates are held in spaced apart relationship with respect to one another via a primary seal material 3578c. The second surface stack of materials extends toward the edge of the first substrate beyond the primary seal material such that it is in electrical contact with a first electrically conductive epoxy, or first solder, 3548c1. The third surface stack of materials extends toward the edge of the second substrate beyond the primary seal material such that it is in electrical contact with a second electrically conductive epoxy, or second solder, 3548c2. It should be understood that another side of the element may have a similar isolation area associated with the second surface stack of materials for providing contact to the third surface stack of materials within the viewing area. It should be understood that either the second or third surface stack of materials may be a single layer of on materials as described elsewhere herein and within references incorporated herein by reference.

FIG. 35(D) depicts the second surface electrical contact 3548d1 being made on an opposite side of the element from a third surface electrical contact 3548d2. FIG. 35(E) depicts the second surface electrical contact 3548e1 being made on a side of the element and the third surface electrical contact being made on an end of the element. FIG. 35(F) depicts the second surface electrical contact 3548f1 being made on one side and continuously with one end of the element and the third surface electrical contact 3548f2 being made on an opposite side and continuously with an opposite end of the element. FIG. 35(G) depicts the second surface electrical contact 3548g1 being made on opposite sides of the element and the third surface electrical contact 3548g2 being made on an end of the element. FIG. 35(H) depicts the second surface electrical contact 3548h1 being made on opposite sides of the element and the third surface electrical contact 3548h2 being made on opposite ends of the element. FIG. 35(I) depicts the second surface electrical contact 3548i1 being made continuously on opposite ends and one side of the element and the third surface electrical contact 3548i2 being made on one side of the element. It should be understood that, in at least one embodiment, the longer electrical contact will correspond to the surface having the highest sheet resistance stack of materials.

It should be understood that the electrical contact may be via electrical conductive epoxy, solder or an electrically conductive adhesive.

FIG. 35(J) depicts an element comprising a first substrate 3502*j* having a second surface stack of materials 3508*j* and a second substrate 3512*j* having a third surface stack of materials 3522*j*. The first and second substrates are held in spaced apart relationship with respect to one another via perimeter first and second primary seals 3548*j*1, 3548*j*2. The first primary seal functions to make electrical contact with the second surface stack of materials and the second primary seal functions to make electrical contact with the third surface stack of materials. The first and second primary seals hold the first and second substrates in a spaced apart relationship with respect to one another and preferably both primary seals are substantially outside the edge of each substrate.

With reference to FIG. 35(K), a profile view of a portion of a rearview mirror element is depicted comprising a first substrate 3502*k* having at least one layer 3508*k* of a substantially transparent conductive material deposited on the second surface and a second substrate 3512*k* having a stack of materials deposited on the third surface secured in a spaced apart relationship with respect to one another via a primary seal material 3578*k* to define a chamber there between. In at least one embodiment, an electro-optic medium 3510*k* is located within said chamber. In at least one embodiment, the third surface stack of materials comprises an underlayer 3518*k*, a conductive electrode layer 3520*k*, a metallic layer 3522*k* and a conductive tab portion 3582*k* having an overlap portion 3583*k* underneath the metallic layer and primary seal material. It should be noted that the conductive tab portion 3582*k* could alternatively be deposited over the metallic coating 3522*k* to create the overlap portion. In at least one embodiment, the underlayer is titanium-dioxide. In at least one embodiment, the underlayer is not used. In at least one embodiment, the conductive electrode layer is indium-tin-oxide. In at least one embodiment, the conductive electrode layer is omitted. In at least one embodiment, the conductive electrode layer emitted and the underlayer is either a thicker layer of titanium-dioxide or some other substantially transparent material having a relatively high index of refraction (i.e., higher index of refraction than ITO), such as, silicon carbide. In at least one embodiment, the conductive tab portion comprises chrome. It should be understood that the conductive tab portion may comprise any conductive material that adheres well to glass and is resistant to corrosion under vehicular mirror testing conditions. As can be appreciated, when the third surface stack of materials, or at least those layers within the stack that are susceptible to corrosion, are kept within an area defined by an outer edge of the primary seal material, the element will be substantially immune to problems associated with third surface corrosion. It should be understood that the layer, or layers, susceptible to corrosion may extend beyond the primary seal material provided a protective overcoat or sealant is incorporated, such as, conductive epoxy or an overcoat layer. It should be understood that any of the first, second, third and fourth surface layers or stacks of materials may be as disclosed herein or within the references incorporated elsewhere herein by reference. It should be understood that the conductive tab portion improves conductivity over the conductive electrode; as long as a conductive electrode layer is provided with sufficient conductivity, the conductive tab portion is optional. In at least one embodiment, the conductive electrode layer imparts the desired color specific characteristics of the corresponding reflected light rays in addition to providing the desired conductivity. Therefore, when the conductive electrode is omitted, color characteristics are controlled via the underlayer material specifications.

Turning to FIG. 35(L), a profile view of a portion of a rearview mirror element is depicted comprising a first substrate 3502*l* having at least one layer 3508*l* of a substantially transparent conductive material deposited on the second surface and a second substrate 3512*l* having a stack of materials deposited on the third surface secured in a spaced apart relationship with respect to one another via a primary seal material 3578*l* to define a chamber there between. In at least one embodiment, an electro-optic medium 3510*l* is located within said chamber. In at least one embodiment, the third surface stack of materials comprises an underlayer 3518*l*, a conductive electrode layer 3520*l*, a metallic layer 3522*l* and a conductive tab portion underneath the primary seal material. In at least one embodiment, a void area 3583*l* is defined between the metallic layer and the conductive tab portion, the conductive electrode provides electrical continuity there between. In at least one embodiment, the underlayer is titanium-dioxide. In at least one embodiment, the underlayer is not used. In at least one embodiment, the conductive electrode layer is indium-tin-oxide. In at least one embodiment, the conductive tab portion comprises chrome. It should be understood that the conductive tab portion may comprise any conductive material that adheres well to glass and is resistant to corrosion under vehicular mirror testing conditions. As can be appreciated, when the third surface stack of materials, or at least those layers within the stack that are susceptible to corrosion, are kept within an area defined by an outer edge of the primary seal material, the element will be substantially immune to problems associated with third surface corrosion. It should be understood that any of the first, second, third and fourth surface layers or stacks of materials may be as disclosed herein or within the references incorporated elsewhere herein by reference.

With reference to FIG. 35(M), a profile view of a portion of a rearview mirror element is depicted comprising a first substrate 3502*m* having at least one layer 3508*m* of a substantially transparent conductive material deposited on the second surface and a second substrate 3512*m* having a stack of materials deposited on the third surface secured in a spaced apart relationship with respect to one another via a primary seal material 3578*m* to define a chamber there between. In at least one embodiment, an electro-optic medium 3510*m* is located within said chamber. In at least one embodiment, a first metallic layer 3518*m* is deposited over substantially the entire third surface. In at least one embodiment, a second metallic layer 3520*m* is deposited over the first metallic layer such that an outer edge of the second metallic layer is located within an area defined by an outer edge of a primary seal material 3578*m*. In at least one embodiment, the first metallic layer comprises chrome. In at least one embodiment, the second metallic layer comprises silver or a silver alloy. It should be understood that any of the first, second, third and fourth surface layers or stacks of materials may be as disclosed herein or within the references incorporated elsewhere herein by reference.

Turning to FIG. 35(N), a second substrate 3512*n* is depicted comprising a stack of materials having an eyehole 3522*n*1 substantially in front of a light sensor or information display. In at least one embodiment, a first metallic layer 3518*n* is provided with a void area in the eyehole area. In at least one embodiment, a second metallic layer 3520*n* is provided with a void area in the eyehole area. In at least one embodiment, a third metallic layer 3522*n* is provided. In at least one embodiment, only the third metallic layer is deposited in the eyehole area. In at least one embodiment, the first metallic layer comprises chrome. In at least one embodiment, the second metallic layer comprises silver or silver alloy. In at least one embodiment, the third metallic layer comprises a thin silver, chrome or silver alloy. It should be understood that any of the first, second, third and fourth surface layers or stacks of materials may be as disclosed herein or within the references incorporated elsewhere herein by reference.

One way the spectral filter material 3515, proximate a first surface conductive electrode, can be electrically insulated from other conductive electrode portions is by overcoating at least portions of the spectral filter material with an organic or inorganic insulating material as depicted in FIG. 35(B).

When a spectral filter material, such as chrome metal, is applied on top of the transparent conductor of the second surface through a mask in a coating operation (e.g., by vacuum sputtering or evaporation), a non-conductive coating may be applied through a mask in the same process to electrically isolate the second surface conductive electrode from the third surface conductive electrode in the conductive seal area.

Example 1 Insulating Material:

A spectral filter material comprising metal, metal alloy, layers of metals, layers of metal alloys or combinations thereof, such as chrome, molybdenum, stainless steel, or aluminum, rhodium, platinum, palladium, silver/gold, white gold and ruthenium, often over an adhesion promotion material such as chrome, is vacuum deposited through a mask over a transparent conductor (such as ITO) to cover the seal area. An insulating material such as silicon, silicon dioxide, chromium oxide, aluminum oxide, titanium oxide, tantalum oxide, zirconium oxide, or yttrium oxide can be applied with use of a mask over the top of the metal layer to electrically isolate the desired spectral filter material area from other conductive portions. This electrical insulation material is not applied to, or removed from, portions of the spectral filter material or admission/conductivity promotion material where electrical conductivity is desired.

One method to reduce the size of, or to eliminate the need for, the bezel is to make an element with substantially no offset between the peripheral edges of the first and second substrates using an electrically conductive material as a portion of the electrical bus. In order to use the preferred electrically conductive material, an isolation of a portion of the conductive materials on the second and/or third surfaces needs to take place. The second and third surfaces would be shorted together by the electrically conductive material if one portion of each surface were not isolated in non-overlapping areas. The third surface may be electrically isolated on one side of the element and the second surface would be electrically isolated on an opposite or adjacent side of the element. Preferably, a laser is employed to remove conductive material from the desired areas. The laser separation is preferably located between the electrically conductive material and the visibly active area of the element. More preferably the separation area is located such that an anode and cathode are not coexistent on the same surface and in contact with the electro-optic medium. When an anode and cathode are located on the same surface with the addition of an anode or a cathode on the adjacent surface, a residual slow to erase color will be present along the separation area. Additionally, with an anode on the second surface and the third surface between the seal and the separation area, the color produced by the anode is visible between the primary seal material and the separation area. Likewise, if a cathode is located on the third surface and the second surface between the primary seal material and the separation area, the color produced by the cathode is visible from the front between the separation area and the primary seal material.

In mirror elements having a spectral filter material between the viewer and the primary seal material, a separation area may be incorporated. With the spectral filter material on the first surface, the mirror element is made much the same as described with regards to elements that do not include a spectral filter material. The separation areas are not visible when looking at the first surface. When the spectral filter material is proximate the second surface, the separation area is visible when looking at the first surface.

A typical laser defined separation area is between 0.005-0.010 inches wide. By making the separation area 0.002-0.004 inches wide, it is much less noticeable. Even more preferable would be an isolation line of less than 0.002 inches so as to be virtually unnoticeable from the driver's perspective. Material can be removed to create an electrical isolation line using a variety of techniques including masking during coating deposition, media blasting, laser ablation, mechanical abrasion, chemical etching, or other methods known in the art. Photolithography in combination with chemical, reactive ion or other etching method could produce isolation lines below 1 um in width. It should also be noted that shorter wavelength lasers can be focused to create a smaller spot size. This provides for a more narrow and less visible electrical isolation line. As the isolation line becomes more narrow, it may become increasingly difficult to achieve complete electrical isolation between the first and second conductive portions. The resistance between the two conductive portions can be easily measured using an ohmmeter. For a typical electro-optic mirror element, it is preferred that this resistance is greater than 30 ohms. It is more preferred that this resistance is greater than 100 ohms. Complete electrical isolation is most preferred. The separation area is preferably located within the primary seal material area and extends the length of the element to provide a large electrical contact area. When the separation area is located over the top of the primary seal material area, the color or transparency of the seal can be adjusted to help hide the separation area. This separation area may be incorporated into artwork or text on the mirror element. A separation area may be incorporated into a disclaimer on the mirror element, a manufacturer's emblem, or other graphic and/or text. It should be understood that the laser line may be positioned along the inner edge of the spectral filter material. In this configuration, the majority of the laser line is not visible because the laser line coincides with the edge of the spectral filter material. Some residual color is present after clearing the electro-optic media on the same substrate; however, most of the colored area is hidden from view behind the spectral filter material. The only laser line portions that are visible are short line segments made through the spectral filter material near the edge in two places.

It is also generally desirable to position the electrode isolation line, such as a laser ablation line in an area of the mirror, outside of the specified field of view of the mirror. There are legal guidelines in the United States, Europe and in other countries for the minimum area to the side and rear of a vehicle that must be visible in a mirror. This area can be projected onto the surface of the mirror and objects that are within the boundaries of that projection must be visible to the driver. This projection generally takes the shape of a triangle and the size of the projection can be larger or smaller depending on whether the mirror surface is flat or bent. FIG. 3(A) details the shape (identified with dashed line 311a) of a typical specified minimum field of view projection for a left hand outside electrochromic mirror with a bezel. Since the bezel area is not reflective it cannot be included in the field of view of the mirror. However, the bezel area can be covered with a spectrally reflective coating such as a metallic ring on surface two. As long as this reflective ring has a high enough reflectance to meet the minimum reflectance standards for the particular country, this area could be considered field of view. As described previously, the mirror could then be made smaller by the bezel width while maintaining the same specified field of view. Again, it would be preferable to locate any visible electrode isolation lines outside of the projection of the specified field of view of the mirror.

Another way to isolate the electrically conductive material is to use a nonconductive layer between the electrically conductive material and the surface to be isolated, such as a vacuum deposited dielectric ink, or a thinned layer of a nonconductive epoxy or other resin. It may be desirable to employ a separation area proximate the third surface because the separation area is not visible looking at the first surface. By using a nonconductive material on the second surface, there is no need for a first separation area. This is particularly desirable when the second surface has a spectral filter material. By thinning a nonconductive epoxy, a very thin layer can be obtained. This is important because enough area needs to be provided to apply the electrically conductive material. Preferably, the nonconductive epoxy is only flash cured. For example, place the material in an 85° C. oven for approximately two minutes. If the nonconductive epoxy is fully cured and is partially covering an area that is in contact with the primary associated spacer beads, an undesirable, non-uniform cell spacing may be created. By not curing the nonconductive material completely, the spacer beads will more easily penetrate the layer during the final cure, and not affect the cell spacing.

An external electrical connection may be made to the third surface of an electro-optic mirror element having a second surface spectral filter material by extending at least a portion of the third surface conductive electrode under the primary seal material area and over the perimeter edge of the second substrate. When coating (such as by vacuum sputtering) over the edge of a piece of glass, the conductivity of the coating tends to decrease over a sharp edge or rough surface. Also, the coating process does not typically provide a durable coating on the side or edge of the glass. To do this without losing conductivity, a good seam or polish on the substrate corner and/or edge is helpful to provide a smooth transition from the third surface to the edge. A rough ground surface without polishing has lower conductivity at a typical third surface coating thickness. The smoother the surface and transition from the third surface to the edge, the better the conductivity. A sputter target mounted to coat the edge of the glass during the coating process is also helpful to provide a more uniform and durable coating.

It is conceivable that the coating could be extended over the edge of the glass and onto the back of the glass such that the electrical connection to the third surface could be made on that back of the mirror element. A reflective third surface is typically more conductive than a second surface conductive electrode; therefore, an electrically conductive material may not be needed. Therefore, the primary seal material may be dispensed up to the edge of the substrate. Having the third surface material extending onto the edge may only be on one side. The opposite substrate may comprise a separation area and electrically conductive material to the third surface since it is not visible.

With the third surface material extended onto the edge of the substrate, an L clip in lieu of a J clip can be used since there is no need to have a clip portion inserted between the second and third surfaces. The L clip only needs to be long enough to contact the conductive portion on the edge. A conductive epoxy could be used to bond to the third surface material on the edge to the L clip. A pressure sensitive adhesive could be used on the back of the L clip to secure it to the fourth surface. Alternatively, solder could be applied directly to the coating on the edge or back of the mirror. In one embodiment, the solder could be used as both the contact and as a conductive bus system.

One advantage of making external electrical contact to the third surface material extended onto the edge of the substrate is that a conductive material is no longer required adjacent to the primary seal for filter material on the first or second surface may be narrower while still covering the primary. Although a typical spectral filter material may vary from 4 to 8 mm in width, it may be aesthetically pleasing to reduce this width below 4 mm. As the width of the primary seal is reduced, the width of the spectral filter material may also be reduced. Using assembly and sealing techniques previously disclosed, it is possible to reduce the primary seal with to less than 1 mm which allows for a spectral filter width of less than 1 mm.

Another way to make electrical connection to the third surface isolated from the second surface is to use a conductive ink or epoxy to connect the third surface to the edge. Thinning the conductive ink or epoxy and applying it to the edge of the substrate contacts the third surface without contacting the second surface. With this thinned conductive epoxy, a conductive path can be applied such that contact is made on the edge or the back of the mirror element. An L clip may be applied contact and cured in place. A pressure sensitive adhesive may be used to secure the L clip in place during the curing process and to provide strain relief with connecting wires.

If the corrosive effects of the environment on the metal can be minimized, very thin metal films or foils can be used to establish a stable interconnect to the conductive adhesive or bus. This metal foil or metal film on a plastic foil could be conformed to the shape of the J clip or other desired shape (without the need of expensive forming dies) and adhered to the substrate with an adhesive such as a pressure sensitive. This metal foil or metal film on plastic foil may be in the form of a roll of adhesive tape that is cut to size and applied to the EC element substrate such that one end comes in contact with the conductive bus that is in contact with the front and/or back electrode(s). A spade connect or wire may be attached to the other end of the metal foil or film by traditional methods such as soldering or conductive adhesive, or the end of the metal foil or tape may connect directly to the voltage source for the EC element such as a printed circuit board.

At least one embodiment of a formable contact comprises 0.001" palladium foil (Aldrich chemical Milwaukee, Wis.) laminated to 0.002" acrylic double-sided adhesive tape with a release liner (product 9495 200 MP series adhesive 3M Corporation, Minneapolis, Minn.). The metal foil tape may be cut to an acceptable size for application on an electrochromic device. The metal foil or metal film on plastic foil tape may also be precut to a form or shape if desired.

At least one embodiment of a formable contact may be made from a plastic film and metallized with a metal such as gold, silver, titanium, nickel, stainless steel, tantalum, tungsten, molybdenum, zirconium, alloys of the above, or other metals or metal alloys that resist salt spray corrosion. Also, palladium or other platinum group metals such as rhodium, iridium, ruthenium, or osmium may be used.

At least one embodiment of a formable contact uses a polymer carrier comprising 0.002" polyimide tape (#7648A42 McMasterCarr, Chicago, Ill.) coated with chrome and with any platinum group metal such as rhodium, indium, ruthenium, or osmium as the base, and then coated with a layer of silver, gold or alloys thereof. This system is solderable and has sufficient flexibility to wrap around the glass edge from one substrate surface to another surface.

At least one embodiment comprises a conductive coated polymer film—produced for the flexible circuit industry. In at least one embodiment, Sheldahl (Northfield, Minn.) produces combinations of polyimide (Kapton) and polyester films coated with ITO, aluminum, copper, and gold. Polyimide tapes coated with a base metal may be plated or coated with different metals or alloys to improve durability and/or solderability. These films can be coated with an adhesive or laminated to double-sided tape as described above. This metallized foil can be bent around a glass edge and maintain good conductivity.

At least one embodiment using a fibrous substrate is comprised of a solvent-based ink placed onto a fiber backing. The conductive ink is comprised of 10 parts methyl carbitol (Aldrich Milwaukee, Wis.), 2 parts Bis A-epichlorhydrin copolymer (Aldrich Milwaukee, Wis.), and 88 parts of LCP1-19VS silver epoxy flake. The conductive ink may be applied to fibrous material such as those comprising glass, metal, or cellulose. The system is heated sufficiently to evaporate the solvent. The conductive and flexible formable contact is then applied to one surface, wrapping around to another surface.

At least one embodiment of a polymeric formable contact incorporates a construction mechanism to either protect the metal, hide the metal color, or offer another color more appealing to the outside appearance of the glass edge. This construction would incorporate a polymeric film on the outside, followed inwardly by the metal coating, and followed inwardly by an adhesive. The metal coating within the system would need to have an exposed edge for making contact to one of the glass inside conductive surfaces. Contact to this end could be made with an applied conductive adhesive, solder, or other method to make a stable electrical contact. The opposite end could have contact made with conductive adhesive, solder, or other mechanical means.

In relation to the conductivity of a conductive polymer or composite, there are methods to describe the conductive polymer or composite's conductivity. Those skilled in the art of Isotropic and anisotropic conductive adhesives commonly use a 4-pin probe for the resistance measurement. A common unit of measurement in the field of conductive adhesives is ohms/square/mil. This measurement is expressed as not only a factor of width, but also of thickness. This measurement, when performed on a nonconductive substrate, expresses the linear conductivity of a conductive polymer or composite such as a metal or carbon or metal oxide conductive particle-filled epoxy.

Another method by which to determine conductive polymer effectiveness for use as a bus is to utilize isolated conductive pads and bridge these isolated pads using the conductive polymer. A particular way to perform this test is to isolate conductive coatings on glass with laser ablating, physical scoring, or chemical removal. The uncured conductive polymer is applied to bridge the conductive pads so that the current path must pass through multiple contact interfaces, but is still isolated from itself so as to not short the bridges together. A resistance reading is taken at the ends across the test piece.

Not all conductive polymers with high conductivity measured by the ohm/sq/mil method have adequate interfacial electric contact to the electrode surfaces used in an electrochromic device. Based on the above coupon using an ITO electrode as the isolated conductive pad, an acceptable resistance would be less than 1000 ohms. A more preferred resistance is less than 500 ohms, and an even more preferred resistance is less than 200 ohms.

There are methods to affect this interfacial conductivity through the selection of conductive polymer components. The shape of the metal powder or flake can affect the interfacial contact. Additives can also affect the interfacial contact. Coupling agents, curing catalysts or cross linkers, epoxy resin systems, and methods by which to process the silver epoxy can have an affect on the conductive polymer's ability to make electrical contact to an adjacent conductive surface.

In at least one embodiment, a silver epoxy comprises 3 parts Hexahydrophthalic anhydride (Aldrich, Milwaukee, Wis.), 2.14 parts Aniline glycidyl ether (Pacific Epoxy Polymers), 0.1 parts Benzyl dimethyl amine (Aldrich chemical, Milwaukee, Wis.), and 23.9 parts silver flake LCP1-19VS (Ames Goldsmith, Glens Falls, N.Y.). When tested using an ohm/square/mil conductivity measurement, results are acceptable (approximately 0.020 ohm/sq/mil).

In another embodiment, U.S. Pat. Nos. 6,344,157 and 6,583,201 disclose the use of corrosion inhibitors, oxygen scavengers or metal chelating agents for use in conductive adhesives.

In some cases, additives can be added to silver epoxies to stabilize or improve conductivity. In at least one embodiment, a silver epoxy comprising 3.4 parts Bis F epoxy resin (Dow Corporation, Midland, Mich.), 1.1 parts (Air Products and Chemicals, Allentown, Pa.), 20.5 parts silver flake (Ames Goldsmith, Glens Falls, N.Y.), and 0.03 parts Diethanolamine (Aldrich, Milwaukee, Wis.). Results are acceptable for both conductivity (approximately 0.020 ohms/square/mil) and interfacial contact (approximately 190 ohms).

As mentioned elsewhere in this patent, a sputtered or vacuum-applied metal coating can be extended beyond the seal and over the edge of the glass to be used as an electrical connection. The metal coating should meet the criteria of corrosion-resistant metals listed above. The electrical connection to this coating could be made with a spring clip, or solder could be applied directly to the metal coating.

At least one embodiment of a solderable metal coating on glass, chrome is coated as the base layer then coated with any platinum group metal such as rhodium, irridium, palladium, ruthenium, or osmium, or copper, silver or gold, or alloys of the above are solderable using tin/lead solders.

In another embodiment, chrome is coated as the base layer, then coated with any platinum group metal such as rhodium, irridium, palladium, ruthenium, or osmium, then coated with copper, silver or gold or alloys of the above are solderable using tin/lead solders.

In current automotive construction, restrictions exist using lead-based components such as solders. Other solders such as tin/zinc tin/silver, indium-based solders containing silver, bismuth, tin, zinc, copper, and or antimony; silver solders or other non-lead containing alloys may be used as a solder material. Soldering systems that may be employed are inductive heat, IR heat, ultrasonic, wave soldering or a soldering iron.

Another advantage to having a thinner conformable conductive bus clip material as an electrical interconnect to the conductive epoxy is to reduce distortion in the reflection of the first substrate particularly when the first element is larger than the second element. Distortion can be generated as a result of high temperature seal curing and differences in the coefficients of thermal expansion between the seal and the conductive clips. The thicker the clip material, the more distortion is seen, particularly when using more flexible substrates. A thinner clip material also has the advantage of being less noticeable if it is used to wrap around the 3$^{rd}$ surface to the back of the mirror. This is particularly relevant if the first and second elements are aligned at the point the clip wraps around. When the first element extends past the second element, the clip can be hidden entirely from view.

Example: An electrochromic mirror was made with flat 1.6 mm thick glass for both front and rear elements. The front element was cut 0.040" larger (offset) on three sides. The inboard side (the side closest to the driver) had no offset to facilitate easier filling and plugging of the part. A 0.001"× 0.5"×0.75" silver foil with 0.002" thick pressure sensitive adhesive was applied on the top and bottom of the second element. The conformable conductor contacted 0.010"-0.030" of surface three then wrapped around to the fourth surface. A primary seal material was then dispensed around the perimeter of the first element leaving approximately 0.040" for an offset on three sides and an additional 0.040" between the seal material and the edge of the glass element on both the top and bottom edge of the second surface of the first element. The second element was then attached to the first element leaving a 0.006" space between the elements. The seal material was cured to fix the elements in this spaced-apart relationship. After cure of the primary seal, a conductive epoxy was then injected into the part from the edge on the top and bottom of the part, thereby encapsulating and making electrical contact with the third surface portion of the conformable conductor. It should be noted that this process of dispensing a primary seal and a conductive seal could be accomplished more readily and easily on a dual dispense system, dispensing both epoxies at the same time. The conductive epoxy was then cured. The mirror was inspected for distortion of the first surface reflection over the conformable conductor, and no distortion was found. When similar mirrors were constructed using either nickel, stainless steel or copper clips with a 0.003" thickness, visual distortion can be seen near the perimeter of the first surface in the area directly above the clip.

As mentioned elsewhere herein, establishing electrical contact to the second and third surface conductive electrodes typically involves coordination of a number of individually designed components. Turning to FIGS. 36(A-I), various options for electrical clips are depicted. The placement of the electrical clips is discussed throughout this disclosure in concert with the electrically conductive material.

A preferred electrically conductive material comprises 27.0 g Dow 354 resin—a bis phenol F epoxy functional resin. Viscosity is preferably ~4000 cP 9.03 g Air Products Ancamine 2049—a cycloaliphatic amine cure agent. Viscosity preferably is ~60 cP, 164 g Ames Goldsmith LCP 1-19VS silver—a silver flake with tap density ~3 g/cc and average particle size ~6 microns.

As described herein, at least one embodiment comprises a perimeter material surrounding the periphery of the element. A preferred perimeter material comprises 120 g Dymax 429 with some fillers added (i.e., 0.40 g 6-24 silver flake available from Ames Goldsmith, 1.00 g silver-coated glass flake (i.e., Conduct-o-fil available from Potters Industries), 12.0 g crushed SK-5 glass filler available from Schott Glass or a combination thereof crushed into a powder and sieved with a 325 mesh). This material can be applied to the mirror edge using a number of techniques. One technique is to load the material into a 30 cc syringe with a needle (~18 gage). The needle can be oriented in a vertical position such that the perimeter material is dispensed with air pressure (<50 psi) onto the edge of the element while the element is being mechanically rotated on a robot arm or other mechanical device. The applied edge material can then be cured with UV light. Complete cure can be accomplished in 20 seconds or less. A robot may also be employed to rotate the part as it is being cured to prevent sagging.

The intent of the perimeter material is to protect the bus components; hide visible components like electrically conductive materials, clips, seals, glass edges; to protect the cut edge of glass and offer an appealing visual appearance of the mirror element. This may also be achieved with use of conventional plastic bezels, grommets, elastomeric bezels and the like.

Many different materials (such as epoxy, silicone, urethane, acrylate, rubber, hotmelt) and cure mechanisms can be used for this edge treatment. The preferred cure method is by UV radiation. If fillers, dyes, or pigments that are partially opaque to UV radiation are used, a combination UV thermal cure can be used. Fillers such as glass or reflective silver aid the penetration of UV light by transmission, scattering or internal reflection, and are preferred for good depth of cure. Preferably the perimeter material has a gray color or appearance similar to that of a ground glass edge or is dark or black in color. Colors may be varied by use of organic dyes, micas, impregnated micas, pigments, and other fillers. A darker, more charcoal appearance may be achieved by selecting different fillers and different amounts of filler. Less crushed glass will darken and flatten the color of the above formulation. Use of only crushed glass (or flakes or other glass particle) with a different refractive index than the edge material resin binder will give the appearance of a ground glass edge, or rough pencil edge. Some additives are denser than the media they are contained in. Fumed silicas can be added to help prevent settling of the heavier components (metal and glass particles); 2 percent by weight of fumed silica was found to be sufficient in the preferred method.

Other ways to apply the perimeter material to the element edge include applying the material with a roll, wheel, brush, doctor bar or shaped trowel, spraying or printing.

The perimeter edge materials chosen for a vehicular exterior application preferably meet the following test criteria. These criteria simulate the exterior environment associated with a typical motor vehicle: UV stability (2500 kJ in UV weatherometer)—no yellowing or cracking or crazing of material when exposed to direct UV; heat resistance—little or no color change, no loss of adhesion; humidity resistance—little or no color change, no loss of adhesion; thermal-cycling—no loss of adhesion, no cracking; CASS or salt spray—protection of the underlying metal coatings and conductive epoxy systems, no loss of adhesion and no visible sign of underlying corrosion; and high pressure water test (Steam Autoclave Test, at least 200 F/10 psi—described in more detail elsewhere in this document)—no loss of adhesion after parts have been tested in previous stated testing.

With further reference to FIGS. 35(A-N), various embodiments for configuration of second and third surface electrode contacts are shown. FIGS. 35(A-N) depict configurations similar to that discussed elsewhere herein having a first surface stack of materials, a second surface stack of materials, a third surface stack of materials and/or a fourth surface stack of materials. The word "stack" is used herein to refer to materials placed proximate a given surface of a substrate. It should be understood that any of the materials as disclosed in commonly assigned U.S. Pat. Nos. 6,111,684, 6,166,848, 6,356,376, 6,441,943, 6,700,692, 5,825,527, 6,111,683, 6,193,378, 6,816,297, 7,064,882 and 7,324,261, the disclosures of which are incorporated herein by reference, may be employed to define a unitary surface coating, such as a hydrophilic coating. Preferably, second, third and fourth surface stacks are as disclosed herein or in commonly assigned U.S.

Pat. Nos. 5,818,625, 6,111,684, 6,166,848, 6,356,376, 6,441,943 and 6,700,692, the disclosure of each is incorporated in its entirety herein by reference.

FIGS. 36(D-I) depict various embodiments for configuration of the anode and cathode connections to the second and third surface conductive electrodes, respectively. Preferably, the sheet resistance of the third surface conductive electrode is less than that of the second surface conductive electrode. Therefore, the cathode contact area may be substantially less than the anode contact area. It should be understood that in certain embodiments, the anode and cathode connections may be reversed.

The configuration of FIG. 35(J) may be used to construct a no-bezel or narrow-bezel rearview mirror assembly that does not incorporate a spectral filter. If the perimeter seal and electrode contact means 3548j1, 3548j2 were both substantially moved to the mirror edge, there is not a requirement for a spectral filter material to cover the seal/contact area. When this approach to mirror element construction is used, the mirror element darkens substantially completely to the perimeter edge during glare conditions. In this approach most or all of the seal and contact area can be substantially moved from the perimeter of mirror substrate one, surface two and substrate two, surface three, to the edges of substrate one and substrate two.

In at least one embodiment, the top edge of the first substrate and the bottom edge of the second substrate were coated with a conductive epoxy to transfer electrically conductivity from the conductive electrode on each substrate to the substrate edge. The conductive epoxy is preferably formulated using: 3.36 g D.E.R. 354 epoxy resin (Dow Chemical, Midland, Mich.), 1.12 g Ancamine 2049 (Air Products and Chemicals, Reading, Pa.) and 20.5 g of silver flake with an average particle size of 7 microns tap density of 3.0-4.0 g/cc was thoroughly mixed into a uniform paste. This conductive epoxy mixture was thinned with enough toluene to produce a low viscosity conductive paint that could easily be applied to the substrate edge. The coated substrates were put in a 60° C. oven for 15 to 20 minutes to evaporate the toluene.

A uniform layer of an epoxy that was sparsely filled with conductive particles (Z-axis conductor) was applied to 0.001" thick copper foil. The Z axis epoxy (5JS69E) was formulated as follows: 18 g of D.E.N. 438, 2 g D.E.N. 431 (Dow Chemical, Midland, Mich.), 1.6 g of US-206 fumed silica (Degussa Corporation, Dublin, Ohio), 6.86 g Ancamine 2049 and 10.0 g silver flake FS 28 (Johnson Matthey, Royston, Hertfordshire, UK) was blended into a uniform paste. The silver flake filler had a tap density of 2.3 g/cc and an average particle size of 23 microns. A cured thin film of this epoxy formulation becomes conductive in the z-axis and not in the x or y axis. This z-axis conductive epoxy was thinned with enough toluene or THF solvent to produce a viscosity suitable to spread into a thin uniform thickness onto the copper foil. The solvent was then evaporated off in a 60° C. oven for approximately 5 minutes. The epoxy remained slightly tacky after solvent evaporation. The edges of the two substrates were aligned with virtually no offset. The gap between the substrates was accurately maintained by using precision sized PMMA beads as spacers. A small piece of Kapton tape approximately 2 mm wide was used on one end extending across the edges of both substrates and the cell spacing. The Kapton tape would eventually be removed from the cell after assembly and the Kapton tape area, which was not wetted with epoxy, would be used as a fill port. The copper foil with the z-axis conductive epoxy was then applied to the peripheral edge of the part such that the epoxy wetted both substrate edges completely. The element was then cured in an oven at 200° C. for 15 minutes.

After the cure, a small separation was made in the copper foil on each side to electrically isolate the copper foil on the top from the copper foil on the bottom of the part. The copper foil covering the Kapton tape and the Kapton tape were removed. The opening created by the removed Kapton tape was used to fill the part. The opening was then plugged with an UV curable adhesive. The opening on the opposite side was also plugged with an UV curable adhesive but before filling.

FIGS. 36(A-N) depict various embodiments for configuration of an electrical clip. Generally, the individual clips are depicted to define substantially a "J" shaped cross section.

Figure 38A:
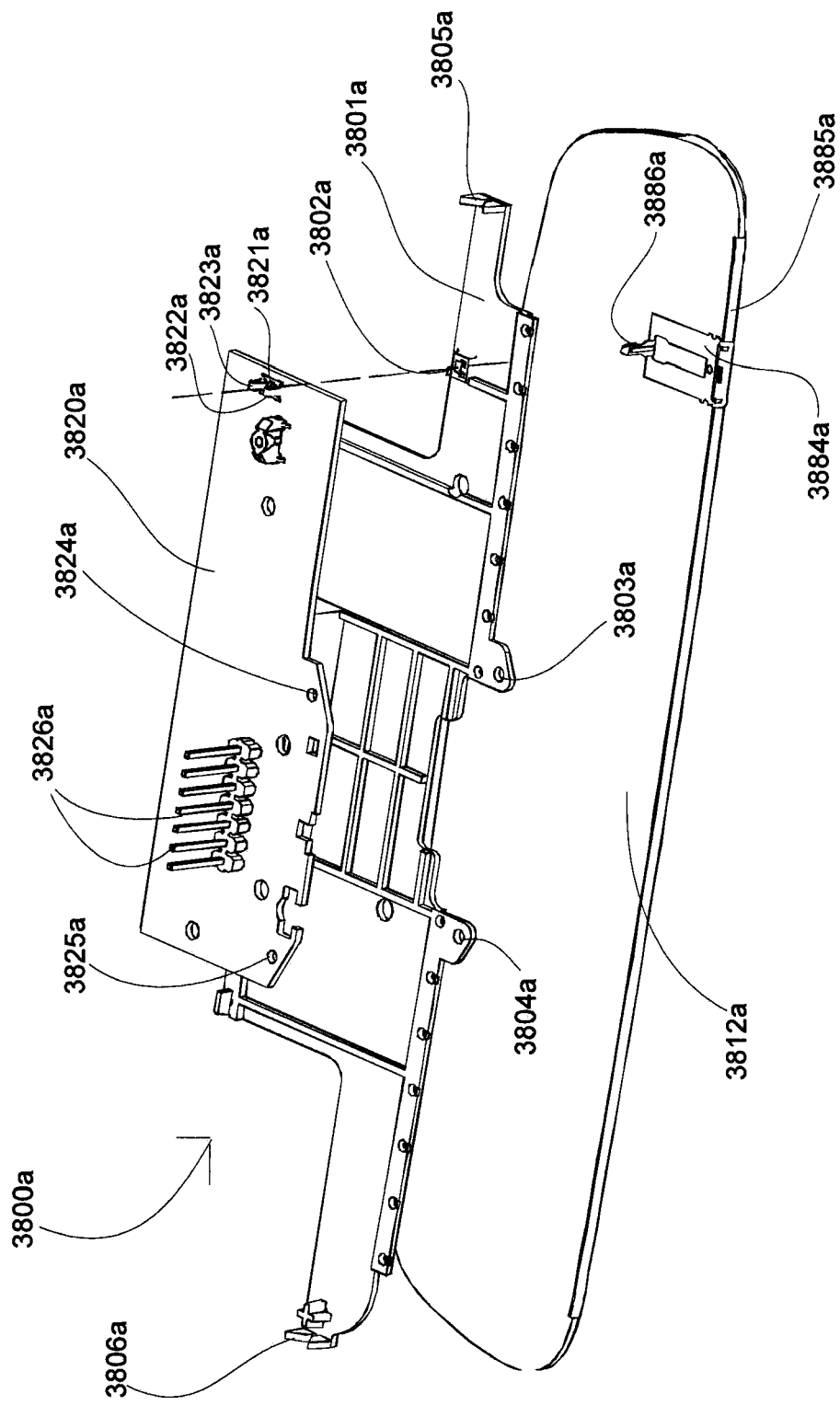
FIGS. 38 (A-C) depict various views of an electro-optic element/electrical circuit board interconnection.

The embodiment of FIG. 36(A) depicts a J-clip 3684a configured to accommodate an electrical connection post (not shown) fixed thereto. In at least one embodiment, the first and second electrical clips are configured in combination with a carrier plate (as described in detail herein with respect to FIGS. 38(A)-38(C)) to form a "plug" type electrical connector. The J-clip comprises an edge portion 3683a and an inner element portion 3682a. The inner element portion is configured to be positioned between a first and second substrate and to be in electrical contact with an electrically conductive epoxy, solder or conductive adhesive to make electrical contact with either a second or third surface stack of materials.

FIG. 36(B) depicts a series of apertures 3685b extending through an inner element portion 3682b in order to facilitate, at least in part, a mechanical and/or electrical contact with an electrically conductive material. The J-clip 3684b comprises a wire connection feature 3686b and an edge portion 3683b. The wire connection feature may be configured to either accommodate a solder or a crimp-type wire connection.

FIGS. 36(C-E) depict various J-clip configurations 3684c, 3684d, 3684e comprising an electrical connection stab 3686c, 3686d, 3686e having a friction fit hole 3687c, 3687d, 3687e. Each J-clip has an edge portion 3683c, 3683d, 3683e and an inner element portion 3682c, 3682d, 3682e. FIG. 36(C) depicts having a portion 3685c of the J-clip folded such that the J-clip is not as long and is taller than the J-clip of FIG. 36(D). FIG. 36(E) depicts a series of apertures 3681e extending through a third portion of the clip to provide a stress relief area to accommodate variations in material coefficients of expansion.

FIG. 36(F) depicts a raised portion 3685f on a J-clip 3684f along with a wire crimp 886f configured to spatially separate the wire contact area from the element. This J-clip comprises an edge portion 3683f and an inner element portion 3682f.

FIG. 36(G) depicts a J-clip 3684g comprising a wire crimp 3686g, an edge portion 3683g and an inner element portion 3682g. FIG. 36(H) depicts a J-clip 3684h comprising a wire crimp 3686h, an edge portion 3683h and an inner element portion 3682h. The inner element portion comprises a series of apertures 3681h to facilitate enhanced mechanical and/or electrical contact. FIG. 36(I) depicts a J-clip 3684i comprising a wire crimp 3686i, an edge portion 3683i and an inner element portion 3682i. FIG. 36(J) depicts a J-clip 3684j comprising a wire crimp 3686j, an edge portion 3683j and an inner element portion 3682j.

Figure 36L:
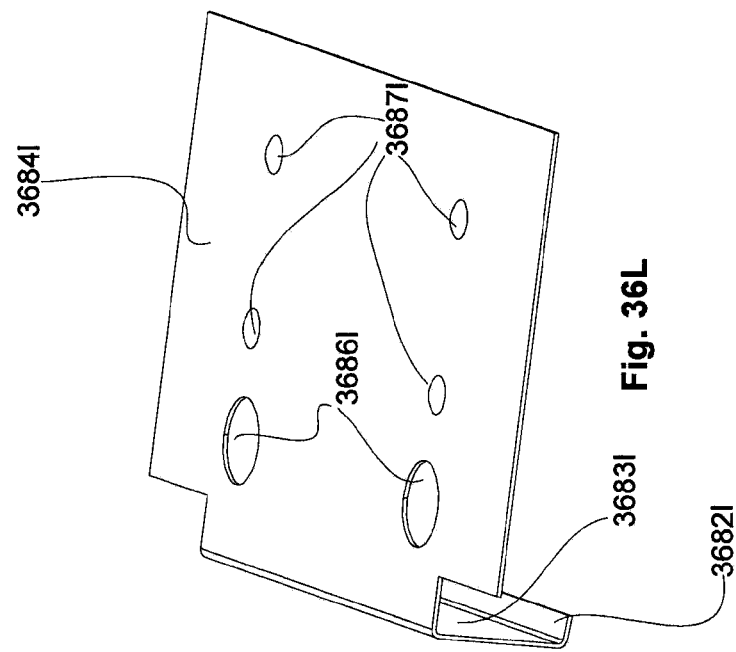
FIGS. 36 (A-N) depict various embodiments of electrical clips for establishing external electrical connections to the second and third surface conductive electrodes.
Figure 36K:
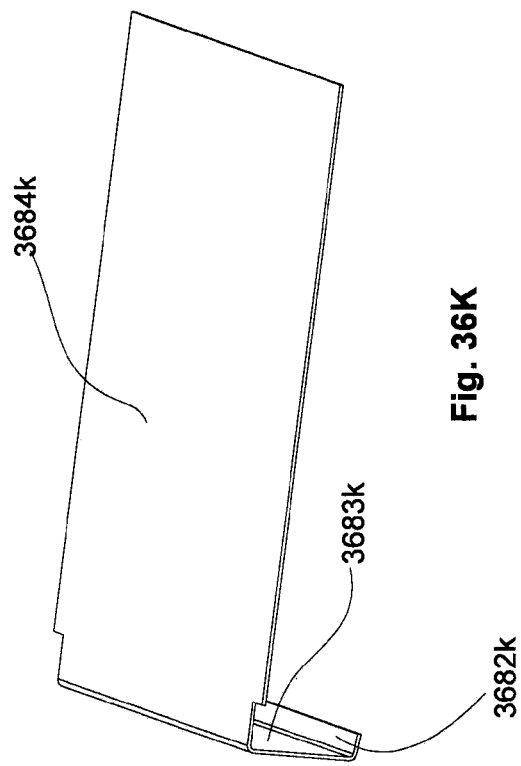

FIG. 36(K) depicts a J-clip 3684k similar to that of FIG. 36(A) except having a longer portion for adhering to a substrate. This J-clip comprises an edge portion 3683k and an inner element portion 3682k.

FIG. 36(L) depicts a J-clip 3684l having two large apertures 3686l for stress relief along with four bumps 3687l for enhancing electrical connection placement. This J-clip comprises an edge portion 3683l and an inner element portion 3682l.

Figure 36N:
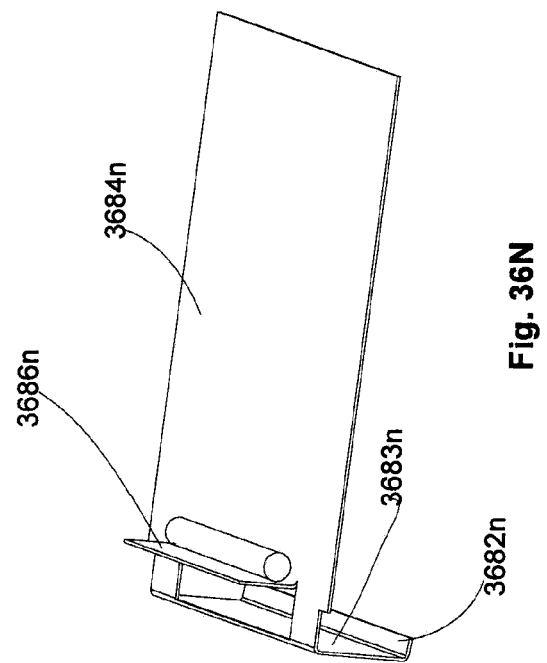
Figure 36M:
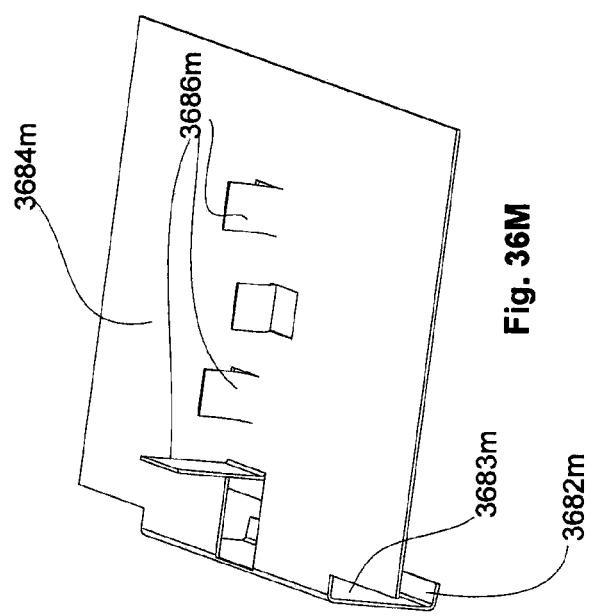

FIG. 36(M) depicts a J-clip 3684m comprising a wire crimp 3686m, an edge portion 3683m and an inner element portion 3682m. FIG. 36(N) depicts a J-clip 3684n comprising a wire crimp 3686n, an edge portion 3683n and an inner element portion 3682n.

Electro-optic mirrors often incorporate a bezel that covers the edge of the mirror element and the electrical bus connections. In addition, the mirror edge and bus connection are often encapsulated in a potting material or sealant. As long as the mirror remains functional, the aesthetics of the mirror edge and bus connection are not a concern. In contrast, Electro-optic mirrors without a bezel typically have both the mirror element edge and the associated electrical bus connections exposed to the environment. The bus connection typically utilizes a metal member (the term "metal" throughout this discussion on corrosion can represent a pure metal or a metal alloy) such as a formed clip or strip. Electro-optic mirrors with bezels often have formed metallic clips or strips made of copper or copper alloy. The appearance and corrosion resistance of these formed clips or strips becomes important if good aesthetics are to be maintained over the life of the vehicle. Copper and copper alloys tend to corrode and turn green in the salty wet environments to which an EC outside mirror is exposed. This is not aesthetically acceptable. Even if the metal bus cannot be viewed directly, the formed metal clips or strips are typically made of thin material, usually less than 0.010" thick and more typically 0.005" or less in thickness. These thin metal pieces can corrode quickly resulting in structural failure, loss of spring electrical contact force or loss of electrical continuity. This issue can be minimized if the edge of the mirror and/or back of the mirror is covered with a paint or coating. The metal clip could also be protected from the environment with a coating such as a conformal coating, paint or varnish or metal plating or cladding. Examples of suitable conformal coatings are:

1. UV curing epoxy system comprising of 354 bis F resin (Dow Chemical) with percent (by weight) of US-206 (Degussa) and 3 percent (by weight) of UVI-6992 (Union Carbide Corporation—subsidiary of Dow Chemical). 0 . . . 3 percent (by weight) of US-206 and 2 to 5 percent (by weight) of UVI-6992.
2. Solvated urethane conformal coating like Humiseal 1A33 (Chase Corporation, Woodside N.Y.).
3. Solvated polyisobutylene comprising of 3 parts (by weight) pentane and 1 part (by weight) Vistanex LM-MS-LC (Exxon Chemical).

Examples of protective metal platings include gold, palladium, rhodium, ruthenium, nickel and silver. In general these coatings or surface platings retard the corrosion and extend the useful life of the electrical bus; however, corrosion often eventually occurs. Another approach to extending useful bus life is to make the bus clip or strip out of a metal or metal alloy that has good corrosion resistance in salty environments. Suitable metals include the noble metals and noble metals alloys comprising gold, platinum, iridium, rhodium, ruthenium, palladium and silver as well as metals and metal alloys of titanium, nickel, chromium, molybdenum, tungsten and tantalum including stainless steel, Hastalloy C, titanium/aluminum alloys, titanium palladium alloys, titanium ruthenium alloys. Zirconium and its alloys also perform well under certain circumstances. A table ranking a number of these metals and metal alloys after the copper accelerated salt spray (CASS) testing is included herein. The rankings have the following meanings: 4—unacceptable corrosion, 3—corrosion evident but acceptable, 2—light corrosion evident, and 1—very light/no corrosion.

Corrosion Ranking Table

| Material | Plating | Ranking |
|---|---|---|
| Olin 725 (Cu—Ni—Sn) | None | 4 |
| Olin 638 (Cu—Al—Si—Co) | None | 4 |
| Olin 194 (Cu—Fe—P—Zn) | None | 4 |
| Olin 510 Phos. Bronze (Cu—Sn—P) | None | 4 |
| Olin 713 | None | 4 |
| Phos. Bronze | Tin | 4 |
| Olin 770 German Silver (Cu—Zn—Ni) | None | 3 |
| Olin 752 (Cu—Zn—Ni) | None | 3 |
| Monel (Ni—Cu) | None | 3 |
| Brush Wellman (Cu—Be) | None | 4 |
| 174-10 | Palladium | 3 |
| 174-10 | Silver | 3 |
| 174-10 | Tin | 4 |
| 302 Stainless Steel | None | 2 |
| 302 Stainless Steel | Tin | 3 |
| 302 Stainless Steel | Silver | 3 |
| 302 Stainless Steel | Rhodium | 2 |
| 302 Stainless Steel | Nickel Strike | 1 |
| 302 Stainless Steel | Passivated Surface by JS | 2 |
| 316 Stainless Steel | None | 2 |
| Tin Foil | None | 3 |
| Silver Foil | None | 1 |
| Nickel | None | 1 |
| Titanium Unalloyed (grade 1) | None | 1 |
| Titanium Unalloyed (grade 2) | None | 1 |
| Titanium Unalloyed (grade 4) | None | 1 |
| Ti—6Al—4V (grade 5) | None | 1 |
| Ti—3Al—2.5V (grade 9) | None | 1 |
| Ti—0.15—Pd (grade 11) | None | 1 |
| Ti—0.15Pd (grade 16) | None | 1 |
| Ti—0.1Ru (grade 26) | None | 1 |
| Ti—3Al—2.5V—0.1Ru (grade 28) | None | 1 |
| Ti—6Al—4V—0.1Ru (grade 29) | None | 1 |
| Molybdenum Foil | None | 2 |
| Gold Foil | None | 1 |
| Rhodium Foil | None | 1 |
| Lead Foil | None | 3 |
| Tungsten Foil | None | 1 |
| Palladium Foil | None | 1 |
| Cobalt Foil | None | 4 |
| Tantalum Foil | None | 1 |
| Nickel Foil | None | 1 |
| Nickel Foil | Silver | 1 |
| 316 Stainless Steel | Tin | 3 |

When the bus interconnection technique incorporates the use of two or more different metals in close contact with one another, the effects of galvanic corrosion are preferably considered. Many interconnection techniques utilize conductive adhesives. These adhesives generally are organic resins such as epoxy, urethane, phenolic, acrylic, silicone or the like that are embedded with conductive particles such as gold, palladium, nickel, silver, copper, graphite or the like. Unlike a metal solder joint, organic resins breathe. Moisture, oxygen and other gasses can diffuse through organic resins and cause corrosion. When dissimilar metals are in contact with one another, this corrosion may be accelerated by the difference in the electrochemical potential of the metals. Generally, the greater the difference in electrochemical potential between the metal, the greater the probability of galvanic corrosion. It is therefore desirable to minimize the difference in electrochemical potential between metals selected for use in a bus system, especially when a naturally non-hermetic electrically conductive adhesive is used. When one or both of the metals are plated, it is preferred that a plating material is selected that has an electrochemical potential in between the electrochemical potentials of the two metals. For office environments that are humidity and temperature controlled, the electrochemical potentials differences between the metals are preferably no more than 0.5 V. For normal environments, the potential difference is preferably no more than 0.25 V. For harsh environments, the potential difference is preferably no more than 0.15 V. Many conductive adhesives use silver particulate or flake as the conductive filler. Silver represents a good compromise between cost and nobility. Silver also has excellent conductivity. As described in metals galvanic compatibility charts such as those supplied by Engineers Edge (www.engineersedge.com) and Laird Technologies (www.lairdtech.com), silver has an anodic index of 0.15 V. Tin-plated copper or copper alloy that is typically used for bus connections in bezeled mirrors has an anodic index of 0.65 V. When tin plated copper is used in contact with silver, the large 0.5 V anodic potential difference is acceptable for use in controlled office-like environments. The environment associated with outside vehicular mirrors is by no means a controlled environment. A potential difference of less than 0.45 V is desirable, a difference of less than 0.25 V is preferred and a difference of less than 0.15 V is most preferred.

| Metals Galvanic Compatibility Chart | |
|---|---|
| Metal Surface | Anodic Index |
| Gold, solid and plated, gold-platinum alloy, graphite carbon | 0.00 |
| Rhodium plated on silver | 0.05 |
| Rhodium plating | 0.10 |
| Silver, solid or plated; high silver alloys, monel, high nickel-copper alloys | 0.15 |
| Nickel, solid or plated, titanium and s alloys, monel, nickel-copper alloys, titanium alloys | 0.30 |
| Copper, beryllium copper, cooper; Ni—Cr alloys; austenitic; corrosion-resistant steels; most chrome-poly steels; specialty high-temp stainless steels, solid or plated; low brasses or bronzes; silver solder; German silvery high copper-nickel alloys | 0.35 |
| Commercial yellow brass and bronzes | 0.40 |
| High brasses and bronzes, naval brass, Muntz metal | 0.45 |
| 18 percent chromium type corrosion-resistant steels, common 300 series stainless steels | 0.50 |
| Chromium plated; tin plated; 12 percent chromium type corrosion-resistant steels; Most 400 series stainless steels | 0.60 |
| Tin-plate; tin-lead solder | 0.65 |
| Lead, solid or plated, high lead alloys | 0.70 |
| Aluminum, wrought alloys of the 2000 Series | 0.75 |
| Iron, wrought gray or malleable, plain carbon and low alloy steels; armco iron; cold-rolled steel | 0.85 |
| Aluminum, wrought alloys other than the 2000 Series aluminum, cast alloys of the silicon type; 6000 Series aluminum | 0.90 |
| Aluminum, cast alloys other than silicon type, cadmium, plated and chromate | 0.95 |
| Hot-dip zinc plate; galvanized steel or electro galvanized steel | 1.20 |
| Zinc, wrought; zinc-base die-casting alloys; zinc plated | 1.25 |
| Magnesium & magnesium-base alloys, cast or wrought | 1.75 |
| Beryllium | 1.85 |
| High brasses and bronzes, naval brass, Muntz metal | 0.45 |
| 18 percent chromium type corrosion-resistant steels, common 300 series stainless steels | 0.50 |

It should be noted that the potential differences between metals depends, at least in part, on the nature of the corrosive environment they are measured in. Results measured in, for example, seawater may be slightly different than for fresh water. It should also be noted that there can be large differences between passive and active surfaces of the same material. The anodic potential of a stainless steel surface may be substantially reduced by a passivation treatment using nitric acid and/or solutions of oxidizing salts. The anodic potential difference may be kept within the most preferred 0.15 V if silver is used in combination with, for example, gold, gold/ platinum alloys, platinum, zirconium, carbon graphite, rhodium, nickel, nickel-copper alloys, titanium and monel. The potential difference may be kept within the preferred 0.25 V with, for example, beryllium copper, brass, bronze, silver solder, copper, copper-nickel alloys, nickel-chrome alloys, austenitic corrosion resistant steels, and most chrome-moly steel. The potential difference may be kept within the desired 0.40V by using, for example, 18-8 stainless steel or 300 series stainless steel, high brasses and bronzes, naval brass and Muntz metal. When a plating is used, it is desirable to have the plating material within these anodic potential ranges and most preferably have a potential between the two base materials in close contact with each other. For example, gold, palladium, rhodium, ruthenium, nickel or silver plating generally meets these requirements. The electrical bus is generally connected to the EC mirror drive voltage source by use of a spade connector or soldered joint. When a soldered joint or connection is used, the bus metal is preferably solderable. Platings such as gold, palladium, rhodium, ruthenium, nickel, silver and tin can enhance the solderability of the bus clip. For instance, even though tin is not a preferred plating, a tin-plated stainless steel bus clip solders easily when compared to a plain stainless steel clip. A solder-friendly, more preferred substrate/plating combination is stainless steel with palladium, silver, nickel or rhodium plating. Stainless steel with a nickel plating followed by a silver, palladium, gold, rhodium or ruthenium plating is a preferred material. Other preferred materials include metals or metal alloys comprising tantalum, zirconium, tungsten, and molybdenum with a nickel, silver, gold, palladium, rhodium and ruthenium plating. Other preferred materials are metals, or metal alloys, comprising titanium or nickel with a nickel and/or silver plating. For enhanced stability, it is desirable to passivate the surface of the base metal.

Embodiments of Mounting Elements Including Bezel and Carrier.

Figure 37D:
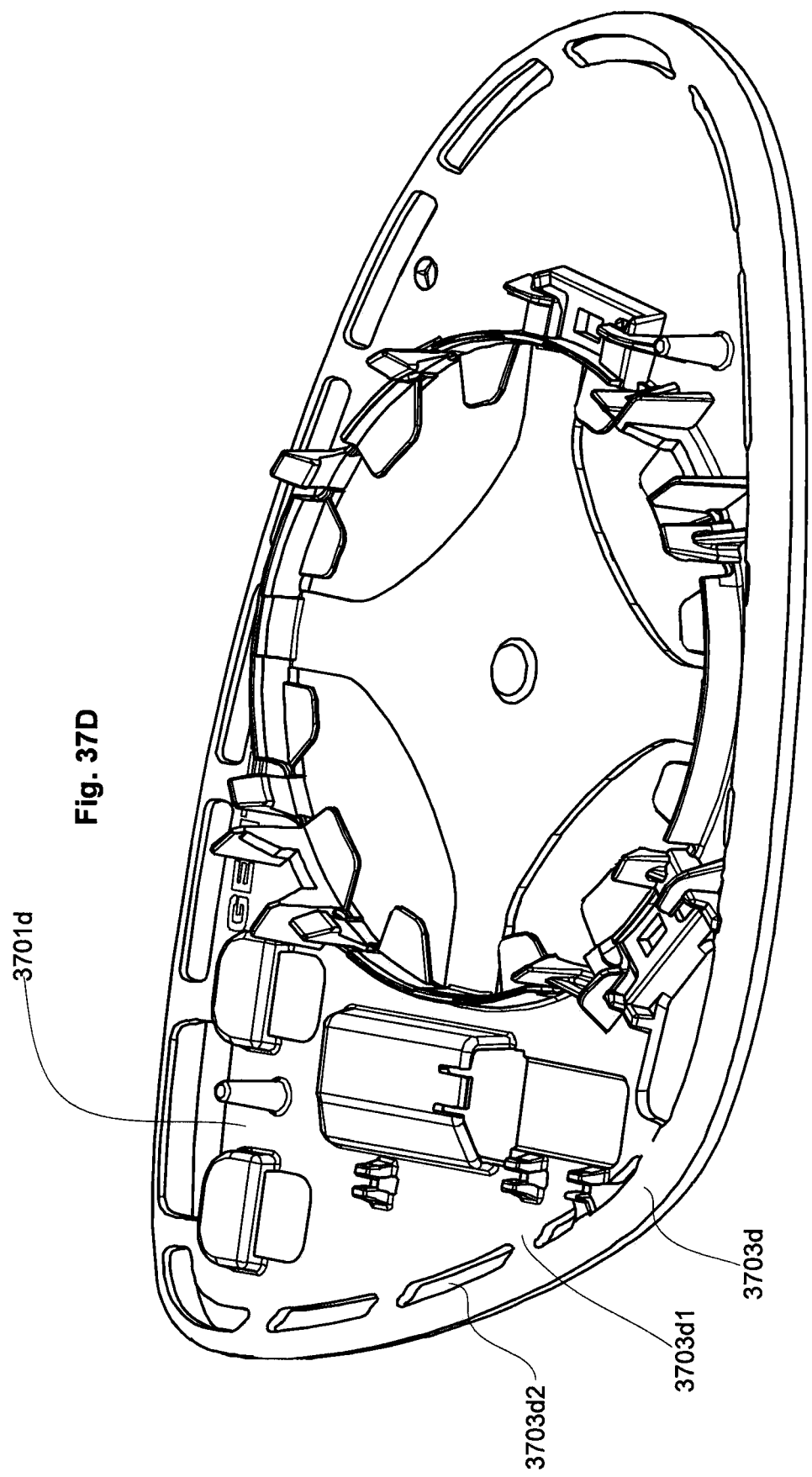
FIGS. 37(A-M) depict various views of carrier/bezel assemblies for use with electro-optic elements in a rearview mirror assembly.

Turning now to FIGS. 37(A, B), a mirror element comprising a first substrate 3712b and a second substrate 3702b is depicted subsequent to being received by a carrier assembly. The carrier assembly comprises a substantially rigid portion 3701a, 3701b integrated with a pliable peripheral gripping portion 3703a, 3703b. The substantially rigid portion and the pliable peripheral gripping portion may be co-molded, individually molded and adhered to one another, designed to friction fit together, designed to interference fit together, individually molded and melted together, or a combination thereof. In any event, the pliable peripheral gripping portion 3703a, 3703b is preferably designed to result in an interface 3709 between the pliable peripheral gripping portion and the perimeter material beyond the crown 3713 such that from near the crown to near the tip 3707 there is a restraining force generated that, at least in part, retains the element proximate the carrier assembly as desired. An additional adhesion material 3705a, 3705b may be utilized to further retain the element proximate the carrier assembly. It should be understood that the perimeter portion 3703a, 3703b may be constructed, at least in part, from a material that adheres to the perimeter material 3760 such that the retentive force is also generated along the interface 3711 on the rigid portion 3701a, 3701b side of the crown 3703a, 3703b; in such a case, the perimeter portion 3703a, 3703b may extend short of the crown or just beyond the crown as depicted in FIG. 37(B). Preferably, the perimeter portion tip 907 is tapered slightly to provide a visually appealing transition to the element irrespective of whether the perimeter portion extends beyond the crown. It should be understood that the shape of the perimeter material may be altered to provide at least one edge substantially parallel to surface 3715 and the perimeter portion may be designed to impart a more pronounced transition between the crown and the interface 3709.

FIG. 37(C) depicts an element comprising a first substrate 3712c and a second substrate 3702c positioned within a carrier 3701c and perimeter portion 3703c. This configuration typically represents the as-molded condition of the pliable peripheral gripping portion. FIG. 37(B) would typically represent the installed position of the pliable peripheral gripping portion. The installed position allows the pliable peripheral gripping portion to conform to the potential irregularities of the glass profile. FIG. 37(B) is depicting a mechanical interlock between the rigid portion of the carrier and the pliable peripheral gripping portion. This is useful for materials that are not intended to be bonded together whether adhered or bonded through a molding process. The mechanical interlocks can be spaced around the perimeter of the assembly as needed. FIG. 37(C) is depicting a cross-section without a mechanical interlock. Both sections can be used as needed. Another difference between FIGS. 37(B, C) is the height of the pliable peripheral gripping portion off of the back side of the carrier. FIG. 37(B) limits the height off of the back of the carrier of the pliable peripheral gripping portion by placing some of the pliable peripheral gripping portion between the glass and carrier in place of the heater/foam assembly. This potentially eliminates clash conditions inside the housing. FIG. 37(C) can be used to allow the heater/foam assembly to be placed to the edge of the glass perimeter. This allows heating of the glass assembly all the way out to the edge. However, it could potentially create clash conditions of the mirror assembly in the mirror housing.

Turning now to FIGS. 37(D-M), various carrier plates are depicted with perimeter gripping portions. FIGS. 37(D-G) depict a carrier plate 3701d, 3701e, 3701f, 3701g having an integral perimeter gripping portion 3703d, 3703e, 3703f, 3703g. In at least one embodiment, the perimeter gripping portion comprises a "goose neck" cross-section shape and comprises a series of alternating lands 3703d1, 3703e1, 3703f1 and apertures 3703d2, 3703e2, 3703g2. The combination of the goose neck shape and the alternating lands and apertures provides hoop stress relief to account for differences in expansion coefficients between the element and the carrier plate/perimeter gripping portion.

FIG. 37(H) depicts an element comprising a first substrate 3612h and a second substrate 3602h held in spaced-apart relationship with respect to one another via a primary seal material 3678h within a carrier plate 3601h and perimeter gripping portion 3603h. In this embodiment, the perimeter gripping portion comprises a compressible material that is sandwiched between the element and an outer part of the carrier plate to allow for the variations in expansion coefficients between the element and the carrier plate/perimeter gripping portion.

FIG. 37(I) depicts an element comprising a first substrate 3712i and a second substrate 3702i held in spaced-apart relationship with respect to one another via a primary seal material 3778i within a carrier plate 3701i and perimeter gripping portion 3703i. In this embodiment, the perimeter gripping portion comprises a compressible material 3704i that is sandwiched between the carrier plate and the perimeter gripping portion to allow for the variations in expansion coefficients between the element and the carrier plate/perimeter gripping portion.

FIG. 37(J) depicts a carrier plate 3701j having a swivel portion 3701j1 for pivotally attaching a perimeter gripping portion 3703j. The fact that the perimeter gripping portion is allowed to Opivot about the swivel portion accounts for variations in expansion coefficients between the element and the carrier plate/perimeter gripping portion.

FIG. 37(K) depicts a carrier plate 3701k having a perimeter gripping portion 3703k. The perimeter gripping portion is preferably molded such that it is tilted toward an associated element (not shown). A compression material 3704k is provided to account for variations in expansion coefficients between the element and the carrier plate/perimeter gripping portion.

FIG. 37(L) depicts a carrier plate 3701l having a perimeter gripping portion 3703l. The perimeter gripping portion is preferably molded such that it is tilted toward an associated element (not shown). A series of vertically extending compression elements 3704l is provided to account for variations in expansion coefficients between the element and the carrier plate/perimeter gripping portion.

FIG. 37(M) depicts a carrier plate 3701m having a perimeter gripping portion 3703m. The perimeter gripping portion is preferably molded such that it is tilted toward an associated element (not shown). A series of horizontally extending compression elements 3704m is provided to account for variations in expansion coefficients between the element and the carrier plate/perimeter gripping portion.

Turning now to FIGS. 38(A-C), an element 3812a is depicted proximate an alignment plate 3801a, 3801b and an electrical circuit board 3820a, 3820b. In at least one embodiment, an electrical clip 3884a, 3884b having a contact post 3886a, 3886c is connected to an element electrical connection 3885a, 3885b. The element electrical connection may be via an electrically conductive epoxy, solder, conductive adhesive or an edge spring clip. When the element is engaged with the electrical circuit board, the contact post is received through a hole 3821a, 3821c in the electrical circuit board and is slidingly engaged with friction fit contacts 3822a, 3822c, 3823a, 3823c. FIG. 38C depicts an enlarged view of the corresponding area 3827b of FIG. 38B. In at least one embodiment, the alignment plate comprises apertures 3803a, 3804a for alignment with apertures 3824b, 3825b, respectively, of the electrical circuit board. Preferably, alignment pins (not shown) are provided elsewhere in the associated mirror assembly, such as, in the housing or bezel to accurately position the individual components within the assembly. In at least one embodiment, the alignment plate comprises an aperture 3802a through which the contact post is received for alignment with the corresponding hole in the circuit board. In at least one embodiment, the alignment plate comprises features 3805a, 3805b, 3806a, 3806b for accurately securing the components within a complete assembly. It should be understood that the electrical circuit board may comprise components such as a microprocessor and/or other electrical components, such as a display driver, a compass sensor, a temperature sensor, a moisture detection system, an exterior light control system and operator interfaces that are at least partially shared with at least one mirror element dimming circuitry.

Considerations of Aesthetic Appearance and Styling.

The aesthetics of the rearview mirror assembly is not a tangible concept and is generally guided by customer preference. Addressing the aesthetics concerns, however, is not a trivial task that often involves balancing of design and functionality of the resulting embodiments.

The styling and appearance of a bezel of an embodiment of the invention may be improved using various techniques. FIG. 39, for example, illustrates the use of a bezel 3944, which has at least one metallic surface, e.g., a portion of the bezel made of chromium or plastic or other material that is chromium-plated. Thus, at least a portion of the front surface of the bezel 3944 would not have a black color, but rather would be reflective similar to the appearance of the mirror itself and thus be difficult to distinguish from the remainder of the mirror subassembly. Bezel 3944 may engage a carrier plate 3945 in any conventional manner.

Another reason why the bezels typically are fairly wide is to accommodate the difference in the coefficient of thermal expansion of the material from which the bezel is made relative to the materials used to form the electrochromic element. Conventional bezels are made out of strong and fairly rigid engineering plastics such as polypropylene, ABS/PC, ASA, and have thermal expansion coefficients that are much larger than glass mirrors. This expansion difference can create tremendous hoop stress as the strong rigid bezel shrinks around the mirror at cold temperatures. As a result, conventional bezels may have ribs or defined voids for accommodating the thermal expansion difference between the element and rigid bezel. A solution in this regard is illustrated in FIG. 40 in which the bezel 4044a is formed of an elastomeric material which stretches and contracts with the thermal expansion/contraction of the electrochromic element.

The elastomeric material could be injected or resin transfer molded directly around the mirror element such as with injection molded PVC or polyurethane Reactive Injection Molding (RIM). The elastomeric bezel could be injection molded separately out of elastomeric materials known as Thermoplastic Elastomers (TPE) such as thermoplastic polyurethane (TPU), thermal plastic polyolefin (TPO, TPV), Styrenic Thermoplastic Elastomer (TPS), Polyester Thermoplastic Elastomer (TPC), Nylon or Polyamide Thermoplastic Elastomer (TPA) or a vulcanized or polymerized rubber, polyurethane, silicone or fluoroelastomer and then applied to the mirror element. One approach would be to injection mold the elastomeric bezel in a "C" or "U" shape that is the mirror shape and size or preferably that is slightly smaller than the mirror shape and size and then stretch and "snap" the bezel onto the mirror. Bezels made in such a fashion fit snugly on the mirror and survive thermal shock and thermal cycling very well. One benefit of "C" or "U" shaped bezels is if they are made symmetrical from front to back, a bezel that is made for the drivers side of the vehicle, if rotated 180 degrees, will generally also fit the passenger side of the vehicle because the two mirrors are usually mirror images of one another. Since the bezels are flexible, another benefit is that a bezel made for a flat mirror will also conform to a convex or aspheric mirror shape. Only one bezel needs to be tooled to fit the left and right side flat, convex and aspheric mirrors resulting in major cost, time and inventory savings. It may be desirable to fix or fasten the bezel to the mirror or mirror back with adhesive or mechanically to avoid the bezel dislodging from the mirror if the mirror is scraped with an ice scraper. The adhesive could be a single component system such as a moisture cure silicone or urethane that is applied either around the edge on the glass or inside the "C" or "U" shaped bezel or both. The bezel could then be applied and the adhesive would cure with time. A two component or solvent-based adhesive could also be used in this manner. A hot melt adhesive could also be applied to the perimeter of the mirror or inside the "C" or "U" of the bezel or both. The bezel could then be applied to the mirror while the adhesive was still hot or the bezel/mirror assembly could be re-heated to melt the hot melt and bond the bezel to the mirror. A mechanical means to trap or engage the elastomeric bezel in place could also be used. The bezel could be made with holes or grooves in the back or side to engage with a more rigid back member. The elastomeric bezel could also be co-injected with a more rigid material that would form an elastomeric portion around the perimeter and a more rigid section around the back of the mirror to hold the elastomeric section in place. This rigid section could cover most of the back of the mirror and engage with the power pack or adjustable mirror support that holds the mirror in place in the mirror housing shell. The mirror in this arrangement could be attached to the rigid back portion with adhesive or double sided adhesive tape. The rigid portion could also only cover the perimeter of the mirror back and attach to a carrier that engages with the power pack or adjustable mirror support. In any case, the rigid portion of the mirror back would mechanically hold the elastomeric portion of the mirror back and bezel in place. An adhesive could also be used to bond the elastomeric portion of the bezel or mirror back to the more rigid portion of the mirror back to hold it in place.

Figure 41:
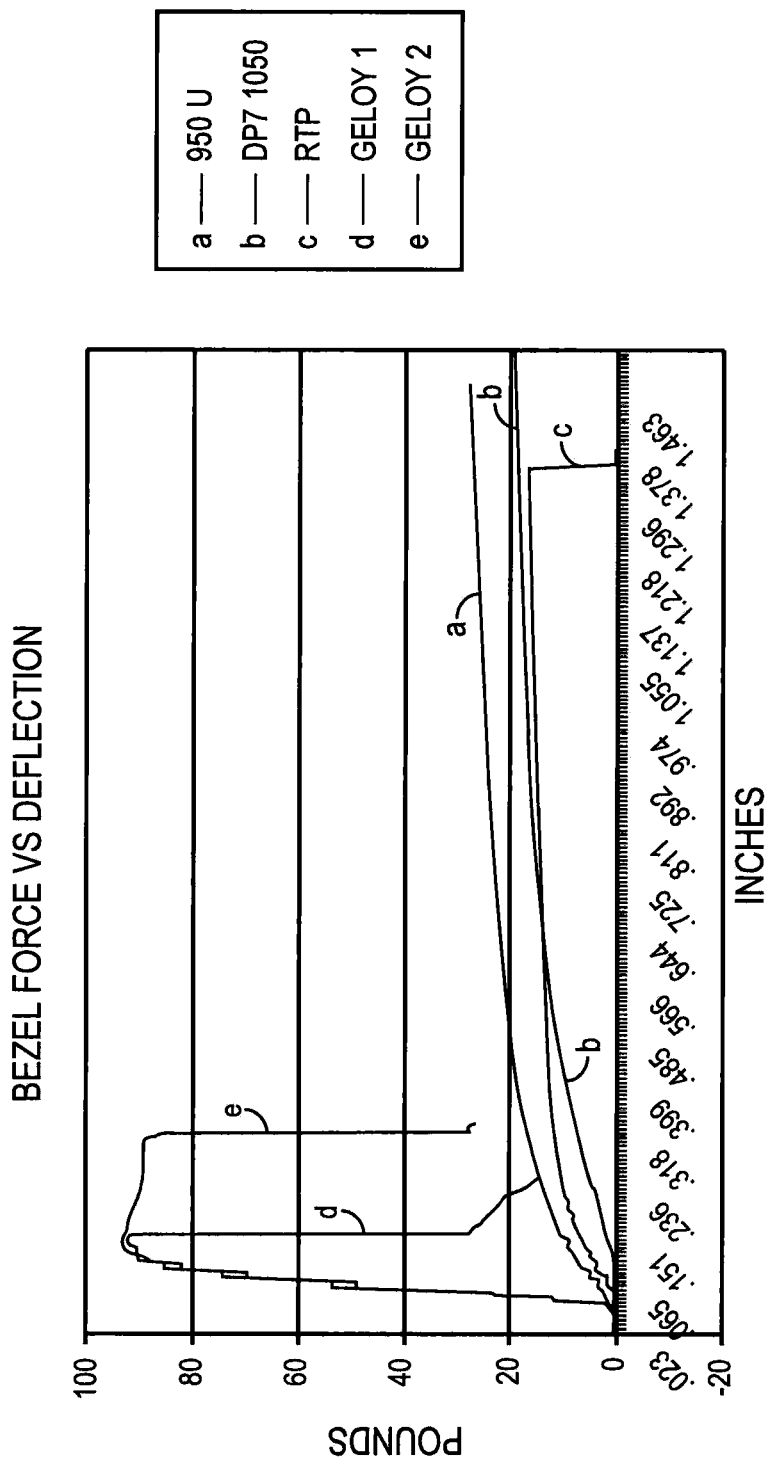
FIG. 41 is a plot of bezel force vs. deflection for various materials that may be used to construct the bezel in an embodiment of the present invention.

FIG. 41 plots Force vs. Displacement for short sections cut from a typical bezel made from different materials. The short sections were fixtured in a Chatillon (Greensboro, N.C.) device and pulled. The force vs. displacement plots show that with rigid materials typically used to make prior art bezels (Geloy, ASA/PC) the force increases rapidly with a small change in displacement when compared to bezels made from elastomers or rubbers (950 U, DP7 1050, RPT). Consequently, bezels made of these elastomeric materials that snugly fit the glass mirror at room temperature do not generate high values of hoop stress as the bezel contracts around the glass at low temperatures. By contrast, a bezel made of a rigid material like ASA/PC that fit snugly at room temperature would generate high values of hoop stress as the bezel contracts around the glass at low temperatures. The elastomeric bezel 4044a is preferably disposed around the periphery of at least the front element 612. Due to its elastic nature, the elastomeric bezel has a smaller perimeter than that of at least the front element so that the elastomeric bezel fits snugly around the mirror element.

Some of the physical properties of rigid and elastomeric bezel materials are shown below in Table 5. The tensile modulus of some prior art rigid plastic material range for a low of 72,000 psi to a high of just over 350,000 psi. By contrast, the preferred elastomeric bezel materials have a tensile modulus of from about 100 psi to 3,000 psi. Thus, the inventive elastomeric bezel materials have a tensile modulus of less than about 72,000 psi, and may have a tensile modulus less than about 3,000 psi. The lower the tensile modulus of the bezel material, the lower the hoop stress value will be in the thermal coefficient mismatched system of a glass mirror surrounded by a plastic bezel.

TABLE 5

| polymer | Tensile Modulus (100% Secant) psi | Tensile Elongation, break (%) | Tensile Elongation, yield (%) | Tensile Strength, yield (psi) | Glass Transition Temperature (° F.) | Shore Hardness (R = Rockwell R) |
|---|---|---|---|---|---|---|
| Bayer T84 PC/ABS | 336000 | 75 | 4 | 8000 | N/A | 119R |
| GE LG9000 PC/ABS | 352000 | 75 | N/A | 7900 | N/A | 118R |
| GE Geloy PC/ASA | 324000 | 25 | 4-5** | 8600 | N/A | 114R |
| Huntsman AP 6112-HS PP | 72500-1100000 | 120* | 6 | 3550 | N/A | 98R |

TABLE 5-continued

| polymer | Tensile Modulus (100% Secant) psi | Tensile Elongation, break (%) | Tensile Elongation, yield (%) | Tensile Strength, yield (psi) | Glass Transition Temperature (° F.) | Shore Hardness (R = Rockwell R) |
|---|---|---|---|---|---|---|
| Bayer Makrolon 3258 PC | 348000 | 125 | 6 | 9100 | N/A | ~115R*** |
| Texin DP7-1050 polyether | 1100 (100%) | 450 | N/A | 5000 | −47 | 90A |
| Texin 950 U polyether | 2000 (100%) | 400 | N/A | 6000 | −17 | 50D (~93A) |
| Multibase Inc. Multi-Flex A 3810 TPE | 170 (100%) | N/A | 700 | 725 | N/A | 45A |
| Multibase Inc. Multi-Flex A 4001 LC TPE | 120 (100%) | 600 | N/A | 800 | N/A | 33A |
| Multibase Inc. Multi-Flex A 4710 S TPE | 175 (100%) | 700 | N/A | 750 | N/A | 49A |
| DSM Sarlink 4139D TPE | 1550 (100%) | 588 | N/A | 2340 | N/A | 39D (~88A) |

*Value taken from "Machinery's Handbook 25"
**Data taken from www.matweb.com
*Data taken from Hardness Comparison Chart Methods for connecting electrodes of an electrochromic medium to a heater circuit or a flexible circuit board are disclosed in commonly assigned U.S. Pat. No. 6,657,767, the entire disclosure of which is incorporated herein by reference. Specifically, part of the flexible circuit board on which the heater circuit is provided may extend beyond the edges of element 614** and wrap upwardly so as to make contact with conductive material on the edge of the electrochromic device.

Another option for providing electrical contact in an embodiment (not shown) including both a conductive material 852 in the seal region and a bezel such as the bezel 3944, 4044a embracing an edge portion of the embodiment would be to dispose a conductive layer or other material on the inner surface of the bezel 3944, 4044a, in which case pressure exerted by the bezel would create the contact force between the connector and either the electrode layers themselves or the conductive portion 852 of the seal.

As apparent from the foregoing embodiments, portions of the seal may be configured to function as an electrical bus. The seal may be electrically conductive either across a portion of its width, a portion of its height, or a portion of its length. A seal may be formed of a conductive ink or epoxy and may be filled with metal flakes, fibers, particles, or other conductive materials as described above.

It should be noted that the zero offset mirror with either the majority of the seal between the substrates or on the edge of the substrates presents a very sleek profile as compared to a typical electrochromic mirror with an offset and may require no substantial bezel at all. For example, with a black or tinted seal between the substrates an aesthetically pleasing mirror can be made by just rolling black or tinted paint over the edges of the mirror. The bezel would then consist of just a thin layer coating of paint or other material on the perimeter of the mirror that would look like a bezel. Likewise, this thin coating can be applied to wrap over the edge and cover a portion, or all, of the region between the substrate seal. This process would also apply to mirrors where the majority of the seal is on the edge of the glass. A thin coating of paint or other material could be applied to the edge of the mirror to present an edge that is aesthetically pleasing and uniform in appearance. Further, by providing a wider and more uniform seal, the need to obscure the seal may be eliminated.

With respect to various embodiments discussed above, as will be apparent to those skilled in the art, each of the embodiments is advantageous in that the vertical positional offset between the front and rear elements 612 and 614 may be reduced or eliminated thereby reducing any corresponding portion of the width of the bezel (if provided). Other aspects of the invention can otherwise be used to obscure the view of the seal or provide unique bezels. It will be appreciated, however, that the various aspects may be used separately regardless of implementation of any of the other aspects, or may be used in various combinations.

As noted above, FIGS. 34-42 are enlarged fragmentary cross sectional views of the edge of eleven additional mirror constructions, each having a bezel aesthetically covering an outboard edge of an electrochromic mirror element, the bezels in FIG. 34-36B being bonded to an edge of a carrier of the mirror subassembly, and the bezels in FIGS. 37-42 being mechanically interlockingly engaged (and also potentially bonded) with an edge of a carrier in FIGS. 37-42.

In the FIGS. 34-49, similar and identical components are referred to using the same numbers, but with the addition of a letter (e.g. "A", "B", etc.). This is done to reduce redundant discussion.

More specifically, in FIGS. 34-42, the electrochromic mirror subassembly 4210 includes front and rear glass mirror elements 4212 and 4214 defining a cavity 4225 therebetween filled with electrochromic material 4226. Electrodes, clips, a seal, a reflective layer, and other structure are included as described above and as shown in previously described Figures. The illustrated elements 4212 and 4214 have edges that preferably have a "zero offset" (i.e. the edges are on average about 1-mm or less from perfect alignment, or more preferably are about 0.5-mm or less from perfect alignment, or most preferably are about 0.2-mm or less from perfect alignment). It is noted that illustrated mirrors have a zero offset that extends completely around their periphery, however, it is conceivable that some bezels could function where the zero offset extends along only part of the edges of the front and rear element assemblies.

The mirror assembly 4208 (FIG. 42) includes a carrier 4260 with a substantially flat front surface 4261, and further includes a substantially flat thin heater element 4262 and double-sticky-sided foam tape 4263 that adheringly bond the electrochromic mirror subassembly 4210 to the front surface 4261 in a laminar well-supported arrangement. The front surface 4261 of the carrier 4260 is made to be as flat as possible so that the front and rear elements 4212 and 4214 do not undergo localized deformation that would unacceptably distort reflected images. Depending on the flatness of the front surface 4261, the front and rear elements 4212 and 4214 are made thicker or thinner. It is contemplated that the carrier 4260 may be a molded plastic component, or may be a metal or other material. If the reader desires additional information on such systems, the reader's attention is directed to U.S. Pat. Nos. 6,195,194 and 7,287,868, the entire contents of both of which are incorporated herein in their entirety.

Figure 42:
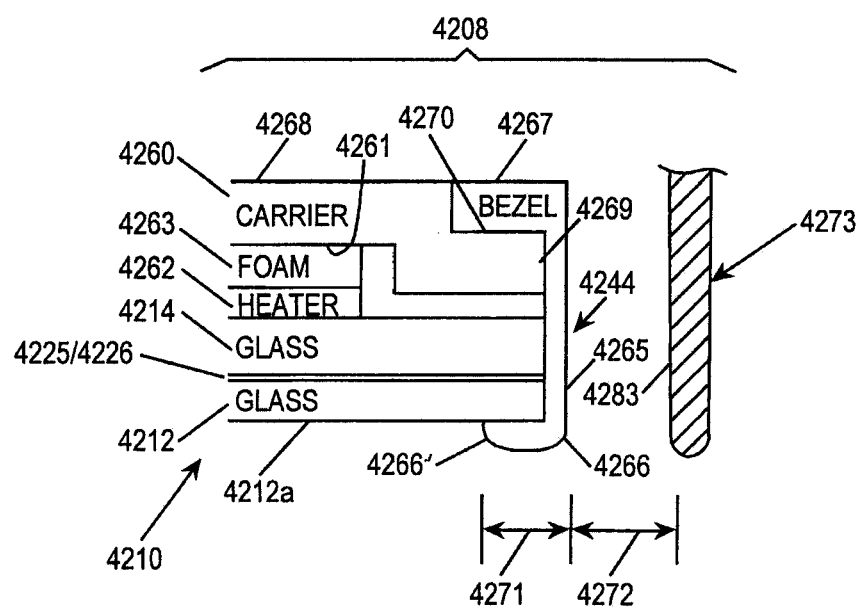
FIGS. 42, 43, 43A-50 are enlarged fragmentary cross sectional views of the edge of corresponding additional mirror constructions, each having a bezel aesthetically covering an edge of an electro-optic mirror element, the bezel being bonded to an edge of a carrier of the electro-optic mirror element in FIGS. 42-43A, 44, and mechanically interlockingly engaging an edge of a carrier in FIGS. 45-50.

A bezel 4244 (FIG. 42) is attached to the mirror assembly 4208. The bezel 4244 has a C-shaped cross section, and forms a continuous loop that extends around a perimeter of the mirror subassembly 4210 in a fashion similar to bezels 544 of FIG. 5. The bezel 4244 (FIG. 42) includes a forwardly-extending leg 4265, a front lip 4266 that extends onto an outer marginal portion of the front surface 4212a of the front element 4212, and a rear lip 4267 that extends onto an outer marginal portion of the rear surface 4268 of the carrier 4260. As illustrated in FIG. 42, an edge flange 4269 on the carrier 4260 forms a rear-facing recess 4270 that receives the rear lip 4267. The inner surface of the leg 4265 closely engages the edges of the front and rear elements 4212 and 4214, and the inner surface of the lips 4266 and 4267 closely engage the front surface 4212a of front element 4212 and the rear surface 4268 of the carrier 4260, respectively. In a preferred embodiment, the bezel 4244 is insert molded onto the carrier 4260, with the rear lip 4267 being bonded to the rear surface 4268 of the carrier 4260 as part of the molding process. Alternatively, the rear lip 4267 can be adhered or bonded as a secondary assembly process. It is contemplated that the front lip 4266 can also be bonded to the front surface 4212a of the front element 4212. The leg 4265 could also be bonded to an edge of the front and rear elements 4212 and 4214, although this is not a required or condition. Alternatively, it is contemplated that the front lip 4266 can be formed with an "over-bent" condition so that the innermost tip 4266' of the front lip 4266 resiliently engages the front surface 4212a with a bias, and is not held away by engagement of an outboard portion of the front lip 4266. By this arrangement, the bezel 4244 is an integral part of the mirror assembly 4208, and both helps retain the assembly together, and also seals an outer edge of the electrochromic mirror subassembly 4210.

The bezel 4244 has an exceptionally thin profile dimension 4271. This is a desirable condition which original equipment manufacturers are looking for, in order to allow a smaller dimension 4272 to the inner surface 4283 of the outside rearview mirror housing 4273. This is an important characteristic to original equipment manufacturers of vehicles, since larger mirror subassemblies 4210 allow greater fields of vision in a rearward direction, and smaller exterior mirror housings 4273 allow greater field of vision in a forward direction (i.e. past the mirror toward a front of the vehicle). It is contemplated that the material of bezel 4244 can be elastomer or a more rigid thermoplastic or metal material, as described above in regard to bezel 4044a (FIG. 40). It is contemplated that the front lip 4266 will be about 2-mm wide or less, and will cover a continuous perimeter strip on the front surface 4212a that is about 2-mm or less wide. However, it is contemplated that the lip 4266 can cover a strip on the front surface that is as low as about 1-mm or less wide; or can be made to extend onto the front surface 4212a only in certain areas (such as top and bottom edges and not onto the right and left sides of the face surface 4212a); or can be made to not extend onto the front surface 4212a at all. Where the bezel does not cover any of the elements 4212 and 4214, the entire front surface of the front element 4212 can be used (i.e. 100% of the front surface can be used for showing a reflected image). This is believed to be novel and non-obvious for modern mirrors with electronic options, especially electrochromic mirrors. (See, e.g., embodiments of FIGS. 6(A), 8(D), 12, 14-16, 24, 25, 27-29, 30B-34, 49 and 57.)

Bezel 4244A (FIG. 43) is similar to the bezel 4244 (FIG. 42), except that the recess 4270A is formed on a front surface of the carrier 4260A, and the rear lip 4267A is positioned in and bonded to the front surface of the carrier 4260A. As a result, the rear lip 4267A is positioned in a space 4263A' located between the edge of the carrier 4260A and the edge of the rear element 4214. The rear lip 4267A terminates outboard of an outer edge of the heater 4262 and the foam tape 4263.

Figure 43:
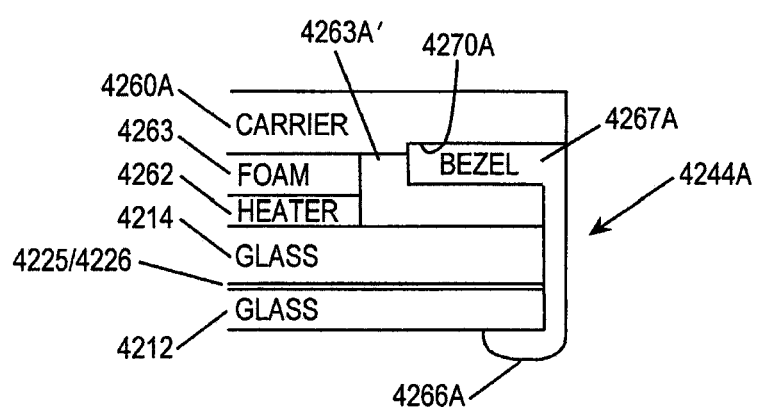
Figure 43A:
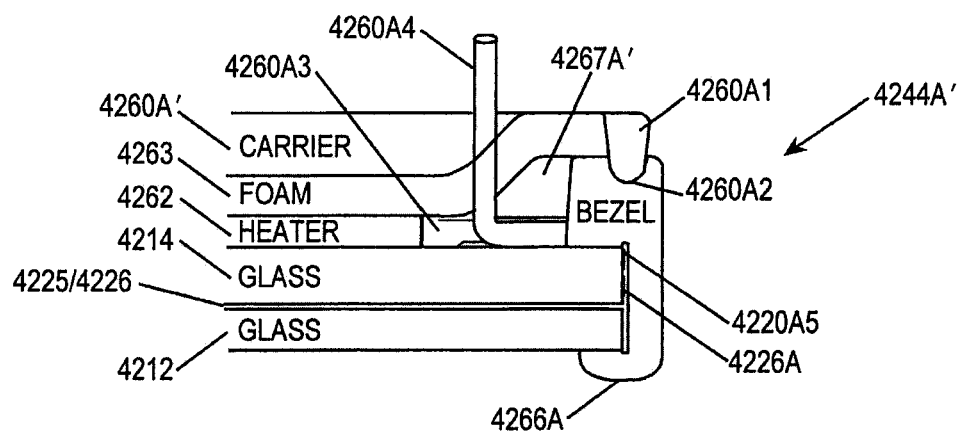
Figure 44:
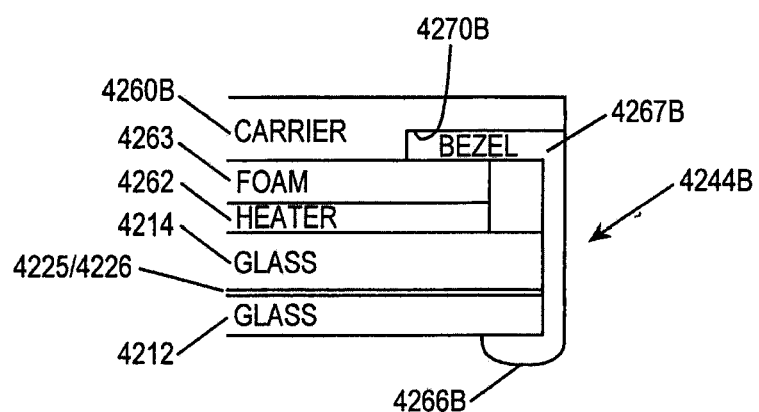
Figure 45:
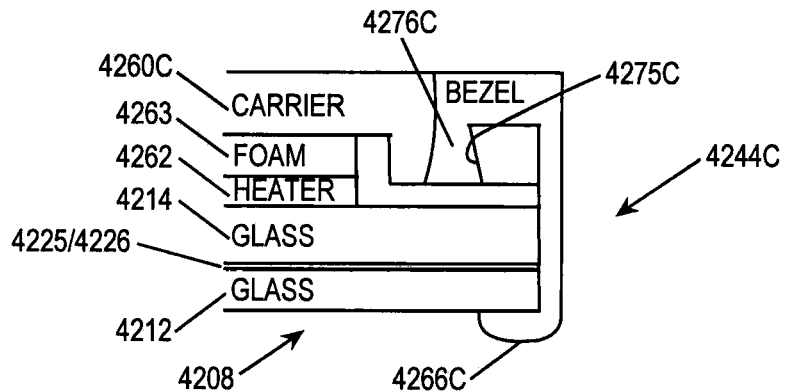
Figure 46:
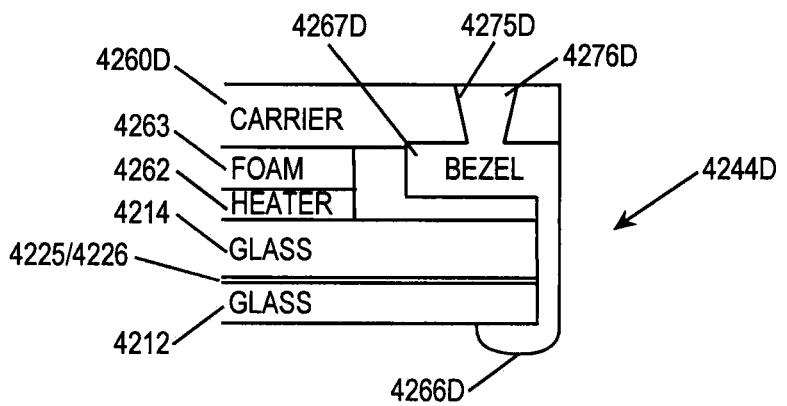
Figure 47:
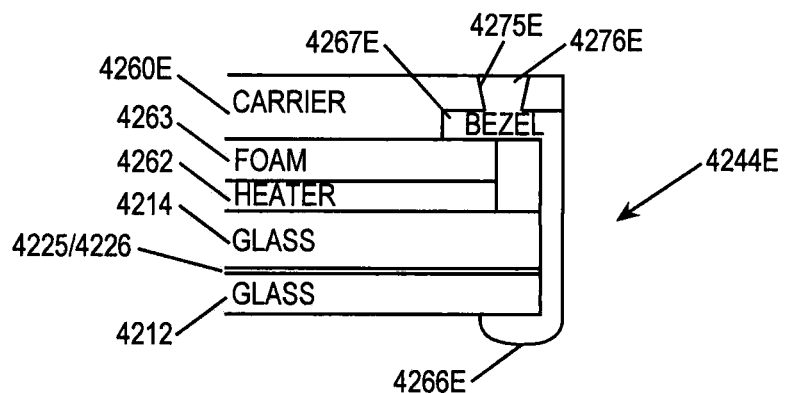

Bezel 4244A' (FIG. 43A) is similar to bezel 4244A, except in bezel 4244A', the carrier 4260A' has a forwardly extending lip 4260A1 that engages a mating recess 4260A2 in a rear of the bezel's rear lip 4267A'. Also, the carrier 4260A' is modified to include an aperture 4260A3 permitting wire 4260A4 to pass through and connect to the electrical conductor or clip 4260A5 for operating the electrochromic material 4226A.

Bezel 4244B (FIG. 44) is similar to the bezel 4244A (FIG. 43), with the recess 4270B being formed on a front surface of the carrier 4260B. However, the front surface of the rear lip 4267B of bezel 4244B is coplanar with the front surface of the carrier 4260B, and the outer edge of the foam tape 4263 (and also the heater 4262) extends onto the rear lip 4267B.

Bezel 4244C (FIG. 37) is similar to the bezel 4244 (FIG. 34) except that the carrier 4260C includes a trapezoidally-shaped keyhole 4275C, and the bezel 4244C includes a key 4276C that engages the keyhole 4275C to positively mechanically retain the bezel 4244C to the mirror assembly 4208. It is contemplated that the key 4276C is molded as part of the insert molding process of molding the bezel 4244C onto the mirror assembly 4208. However, the keyed arrangement can also be made by heat staking, or by sonic or mechanical methods of forming a protrusion into the shape of a key or rivet-like connection.

Bezel 4244D (FIG. 46) is similar to the bezel 4244C (FIG. 45), except that the keyhole 4275D faces an opposite direction (i.e. a large end opens rearwardly), and the key 4276D extends into the keyhole 4275D from a front location.

Bezel 4244E (FIG. 47) is similar to the bezel 4244D, with the key 4276E extending rearwardly. In bezel 4244E, the tape 4263 extends onto the rear lip 4267E. However, the key 4276E is preferably located at or outboard of an outboard edge of the foam tape 4263, to minimize a possibility of the key 4276E disrupting the surface that the tape 4263 is bonded to; however, this is not required.

Figure 48:
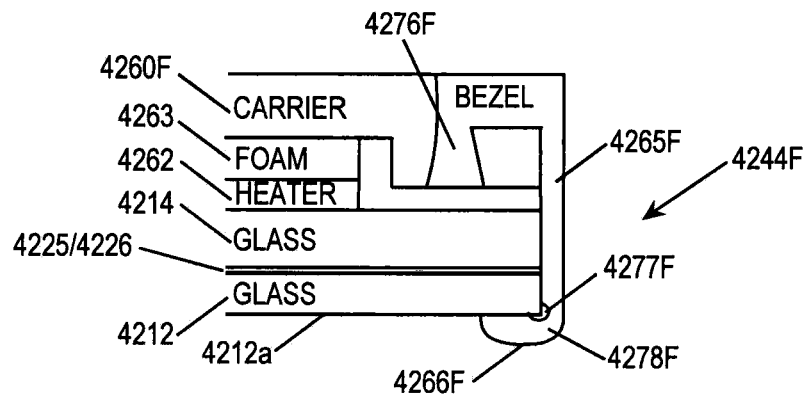
Figure 49:
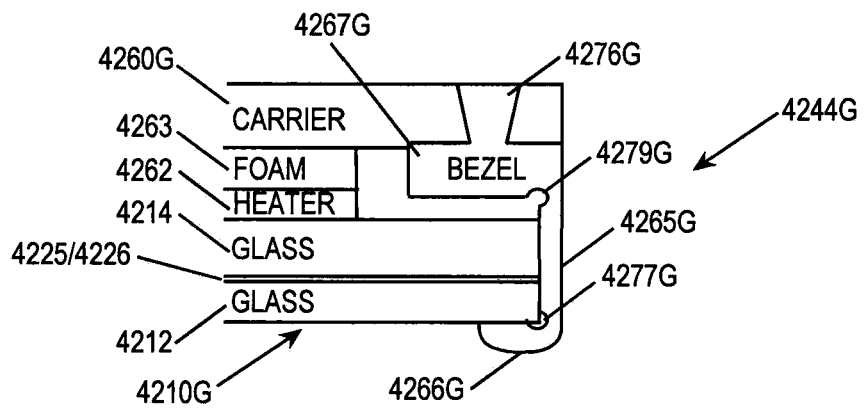
Figure 50:
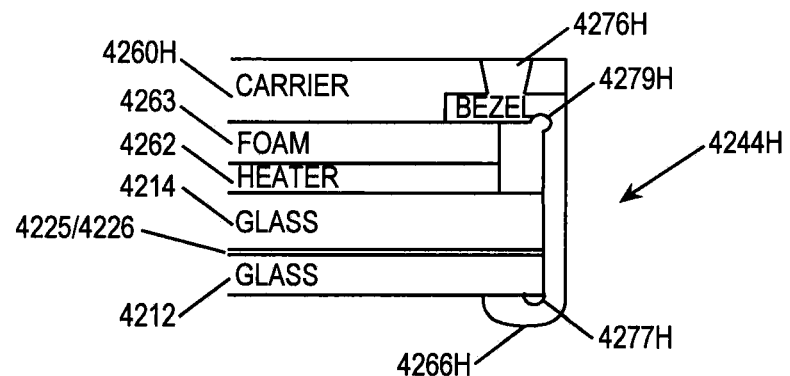
Figure 51:
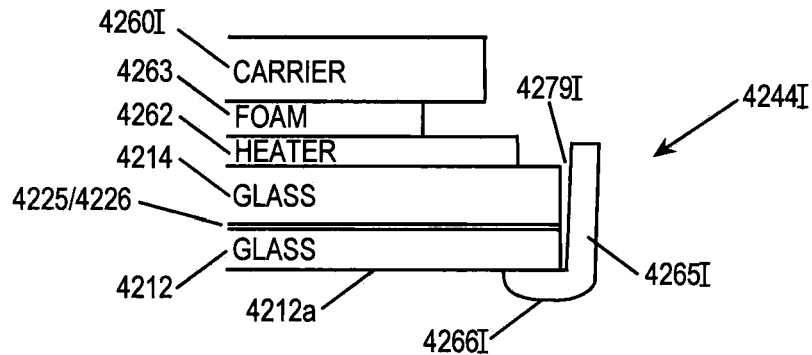
FIGS. 51-54 are enlarged fragmentary cross sectional views of the edge of six additional mirror constructions, each having a bezel aesthetically covering a front of an edge of an electro-optic mirror element, the bezel in FIGS. 51-52 also covering a side of the edge, the bezel in FIGS. 53-54 only partially covering a side of the edge.
Figure 52:
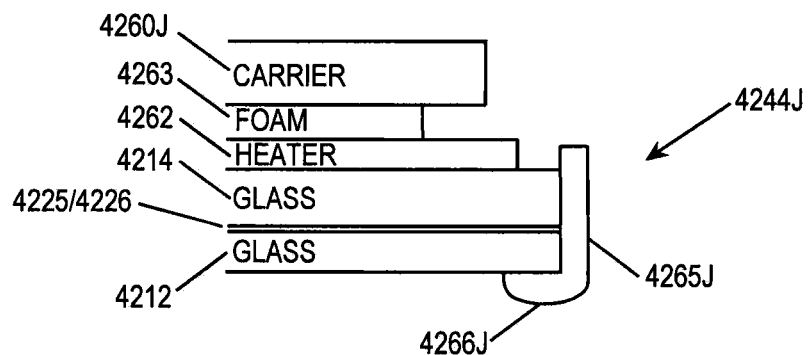
Figure 53:
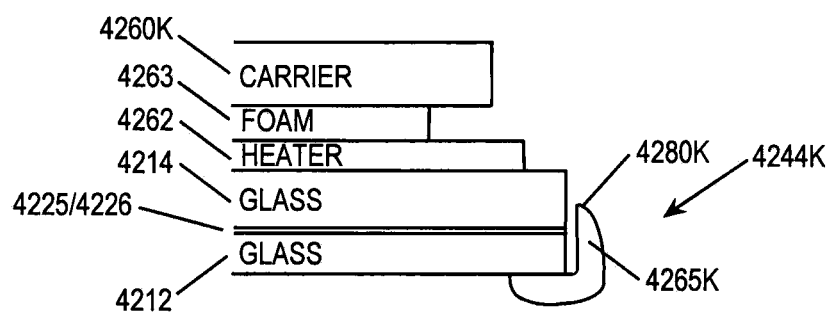

Bezel 4244F (FIG. 48) is similar to the bezel 4244C (FIG. 45), except that bezel 4244F of FIG. 48 includes a large radius 4277F on an inside corner of defined by the joint of leg 4265F and front lip 4266F. The larger radius 4277F forms a cavity that better assures that the inside corner does not engage an edge of the front element 4212 in a manner causing the front lip 4266F to stand away from the front surface 4212a. The radius 4277F also causes a thinned section on a front portion 4278F of leg 4265F that both acts as a resilient hinge point and prevents bending in other undesirable areas along leg 4265F.

Bezel 4244G (FIG. 49) is similar to bezel 4244F of FIG. 48, except that bezel 4244G includes a second large radius 4279G at the corner formed by the leg 4265G and the rear lip 4267G. This allows the leg 4265G (and front lip 4266G) to adjust to any undulations along the edge of the mirror assembly 4208G, such as may occur along a clip positioned on the edge of the mirror subassembly 4210G.

Bezel 4244H (FIG. 50) is similar to the bezel 4244G (FIG. 449), except that the front-located radius 4277H is made larger than front radius 4277G. Further, the radius 4277H is also shifted so that, instead of being at the corner, the radius 4277H is located on the underside of the front lip 366H.

As noted above, the FIGS. 51-54 are enlarged fragmentary cross sectional views of the edge of four additional mirror constructions, each having a bezel aesthetically covering a front edge of an electrochromic mirror element, the bezels in FIGS. 51-52 also covering an entire side of the edge, but the bezels in FIGS. 53-54 only partially covering a side of the edge.

More specifically, the bezel 4244I (FIG. 51) is L-shaped and includes a leg 4265I and front lip 4266I, but does not include a rear lip 4267. The leg 4265I is spaced slightly away from the edge of the front and rear elements 4212 and 4214, creating a gap 4279I. Preferably, the front lip 4266I is insert molded onto and bonded to the front surface 4212a. The gap 4279I prevents any irregularity along the edge of the front and rear elements 4212 and 4214 from deforming the leg 4265I of the bezel 4244I in a manner that reads through onto the front lip 4266I. Also, the gap 4279I allows the leg 4265I to flex and move when the elements 4212/4214 and the bezel 4244I undergo different thermal expansions/contractions. Bezel 4244J (FIG. 52) is similar to bezel 4244I (FIG. 51), except that bezel 4244J does not include any gap (4279I) between leg 4265J and the edges of the front and rear elements 4212 and 4214. If desired, leg 4265J is bonded to the side edges of the elements 4212 and 4214.

Bezel 4244K (FIG. 53) is similar to bezel 4244I (FIG. 41), except that the leg 4265K is shortened, such that it extends only slightly past the cavity 4225. Further, the end 4280K of the leg 4265K is tapered toward the rear element 4214. The bezel 4244L (FIG. 54) is similar to bezel 4244J (FIG. 52), but bezel 4244L (FIG. 54) includes an end 4280L that terminates short of the cavity 4225, and that is relatively blunt rather than being tapered. Specifically, the end 4280L terminates on an edge of the front element 4212. The end 4280L can be bonded to a side edge of the element 4212 as part of an insert molding operation, for example.

Figure 55:
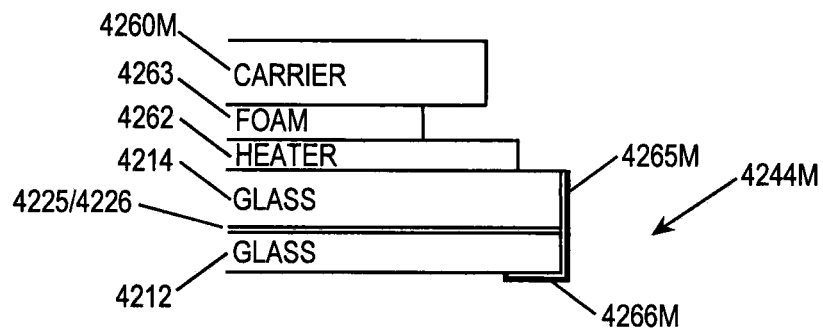
FIGS. 55-57 are enlarged fragmentary cross sectional views of the edge of three additional mirror constructions, each having an edge of an electro-optic mirror element coated by a strip of material, FIG. 55 showing the strip extending from the front surface completely across a side, FIG. 56 showing the strip extending from the front surface partially onto a side, FIG. 57 showing the strip limited to the second surface of the electro-optic mirror element.
Figure 56:
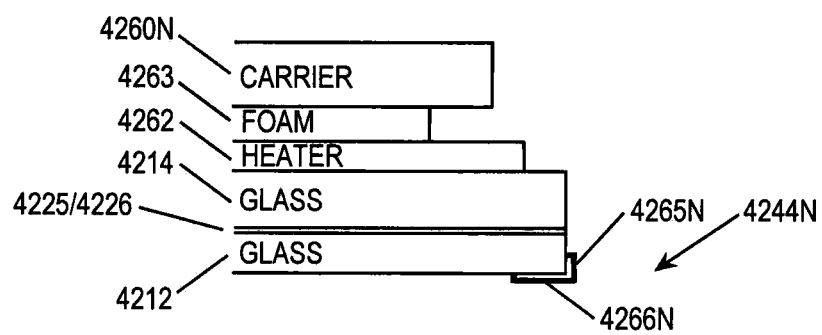
Figure 57:
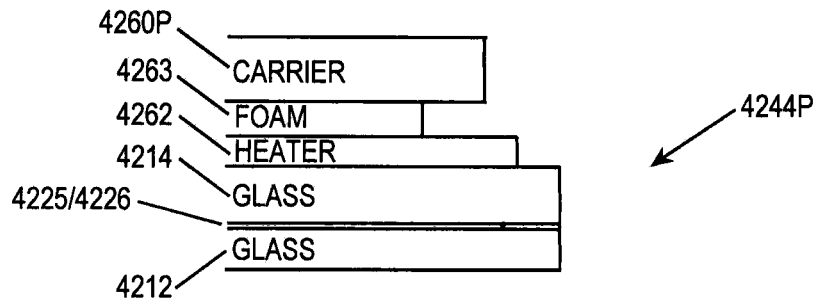

FIGS. 55-57 are enlarged fragmentary cross sectional views of the edge of three additional mirror constructions, each having an edge of an electrochromic mirror element coated by a strip of material. These arrangements are described as bezels since they provide a similar appearance, including a thin profile around a perimeter of the mirror subassembly 4210.

Bezel 4244M (FIG. 55) is similar to bezel 4244J, in that it includes an L-shaped strip of material with a front lip 4266M extending on the front surface and a leg 4265M extending across side edges of the front and rear elements 4212 and 4214. The material of bezel 4244M and examples of the process of applying the bezel 4244M are described above in regard to FIGS. 14-16(B). (For example, see coating 1676, FIG. 16(A), and see non-conductive material 1262, FIG. 12., and see elastomeric material 4044a, FIG. 40.)

Bezel 4244N (FIG. 56) is similar to bezel 4244M (and bezel 4244L) in that the bezel 4244N includes a front lip 4266N and leg 4265N. However, the leg 4265N is shortened such that it extends short of the cavity 4225.

Bezel 4244P (FIG. 57) is similar to the bezels 4244M and 4244N, in that it includes a painted strip of material located along a marginal edge of the front element 4212. However, bezel 4244P is applied to the second surface of the front element 4212 (i.e. in the cavity 4225) and does not extend onto side edges of the front or rear elements 4212 and 4214. Visually, the appearance is not unlike the bezel 4244M (FIG. 55) and bezel 4244N (FIG. 56). The material of bezel 4244P can be opaque, translucent, light-absorbing, or reflective, and dark or light color.

Figure 58:
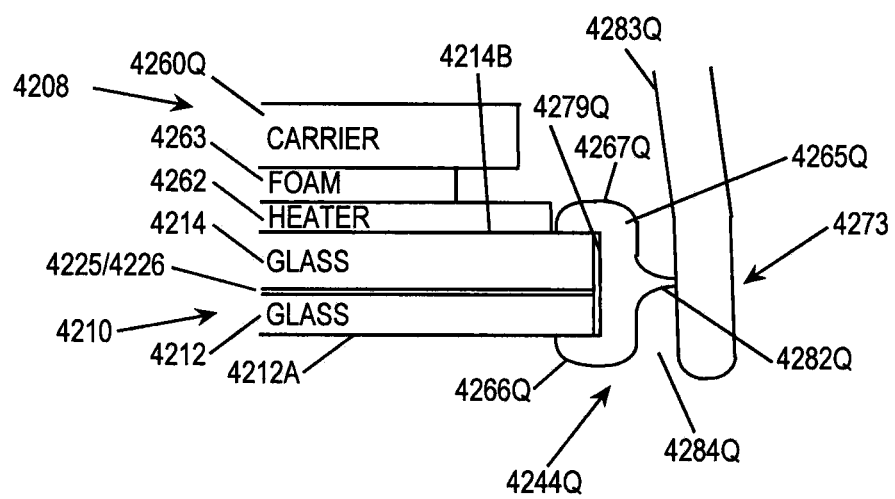
FIGS. 58-59 are enlarged fragmentary cross sectional views of a bezel having a C-shaped cross section that covers a side edge of the electro-optic mirror element and that wraps onto the first and fourth surfaces of the electro-optic mirror element, but also that includes a resiliently flexible fin that extends laterally away from the electro-optic mirror element into wiping contact with a mirror housing.
Figure 59:
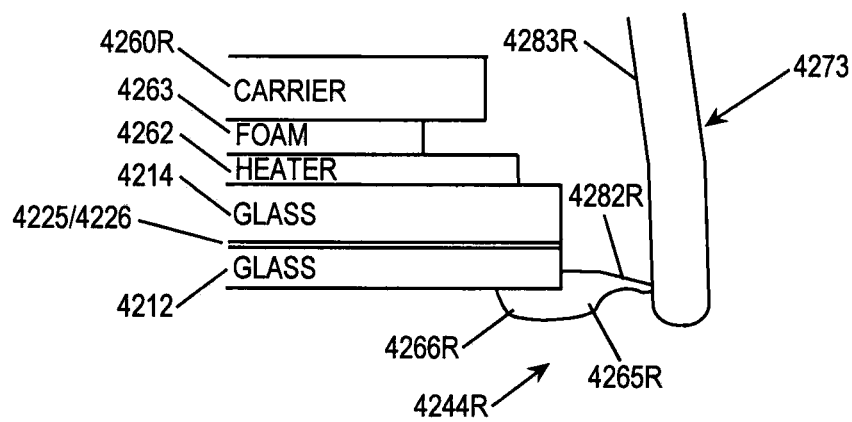

FIGS. 58-59 are enlarged fragmentary cross sectional views of bezels having a C-shaped cross section that covers a side edge of the electrochromic mirror element and that wraps onto the first and fourth surfaces of the electrochromic mirror element subassembly. However, the bezels further include a resiliently flexible fin that extends laterally away from the electrochromic mirror element into wiping contact with a mirror housing.

More specifically, the bezel 4244Q (FIG. 59) is C-shaped, and is not unlike the bezel 544 (FIG. 5), or bezel 4044a (FIG. 40) or bezel 4244 (FIG. 42). The bezel 4244Q includes a leg 4265Q creating a gap 4279Q to an edge of the front and rear elements 4212 and 4214, and further includes a front lip 4266Q that extends onto the front surface 4212a of the front element 4221, and a rear lip 4267Q that extends onto a rear surface 4214b of the rear element 4214. A flexible resilient fin 4282Q extends in a outboard direction from a midpoint on the leg 4265Q. The illustrated fin 4282Q becomes thinner and thinner as it extends to its tip, although it is contemplated that the fin can have different shapes. The mirror housing 4273 includes an inner surface 4283Q that is engaged by the fin 4282Q. It is preferable that the fin 4282Q only lightly engage the inner surface 4283Q so that minimal frictional drag is created as the mirror assembly 4208 is angularly adjusted within the mirror housing 4273. Thus, the power pack that is connected to the carrier 4260Q and that angularly adjusts the mirror assembly maintains its low energy requirement for adjustment. It is noted that the fin 4282Q can be designed to allow a small gap to occur between the fin 4282Q and the inner surface 4283Q, especially at extreme angular positions of the mirror assembly if desired. The fin 4282Q allows the vertical and horizontal dimensions of the mirror subassembly 4210 to be maximized relative to the opening 4284Q defined by the housing 4273. This is an important characteristic to original equipment manufacturers of vehicles, since larger mirror subassemblies 4210 allow greater fields of vision in a rearward direction, and smaller exterior mirror housings 4273 allow greater field of vision in a forward direction.

Figure 54:
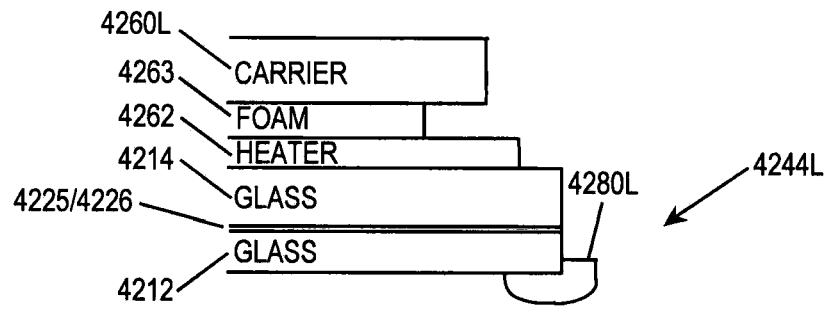

Bezel 4244R (FIG. 59) is similar to bezel 4244Q, except bezel 4244R includes a foreshortened leg 4265R and a front lip 4266R similar to the bezel 4244L (FIG. 54). A resilient fin 4282R extends laterally from the leg 4265R in an outboard direction, into light sliding contact with the inner surface 4283R of the housing 4273.

It is contemplated that the bezels 4244-4244R can be extruded onto or molded onto or adhering applied to the front surface 4212a of a front element 4212; and/or extruded or molded or applied onto the front and side surfaces of the mirror subassembly 4210 (which includes elements 4212 and 4214); and/or extruded/molded/applied onto the mirror subassembly 4210 (which includes elements 4212, 4214, carrier 4260, heater 4262, and foam tape 4263); and/or extruded/molded/applied to the carrier 4260; and/or extruded/molded/applied to the side edges of one or both of the elements 4212, 4214. For example, technology is available to extrude polymer directly onto a window glass. See Osanami U.S. Pat. No. 5,158,638, issued Oct. 27, 1992, entitled METHOD OF MAKING WINDOW GLASS WITH A GASKET, the entire contents of which are incorporated herein by reference for the purpose of teaching such a method of direct application/extruding onto a glass element.

Examples of Embodiments Including a Light Source and Other Optical Elements.

Figure 60:
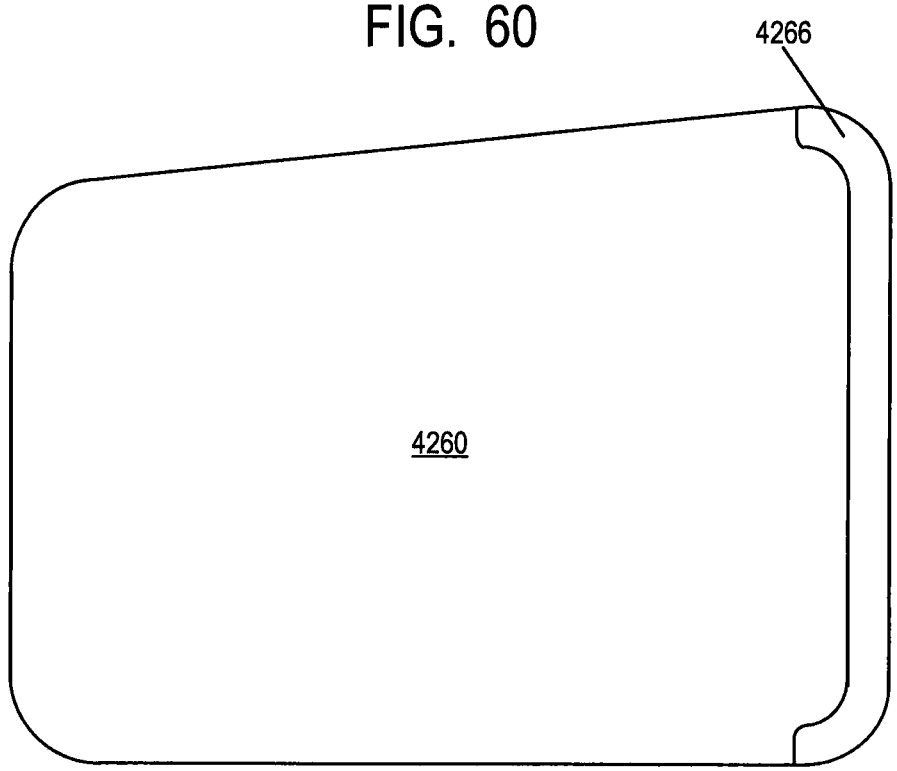
FIG. 60 depicts a plan view of a carrier plate with an integral inboard carrier.
Figure 61:
FIG. 61 depicts a profile view of the carrier plate with an integral inboard carrier of FIG. 52.

Turning now to FIGS. 60-61, a carrier 4260 with an integral bezel 4266 on only the "inboard edge" is depicted. This carrier with integral bezel is preferred for use with elements as described with regard to FIGS. 6(B), 21(A) and 21(B). A related assembly method is to provide a double sided adhesive layer, such as a tape or foam, and adhere an element to the carrier with integral bezel such that the related contacts to the associated electrically conductive layers are disposed within the bezel receptacle 4266a. Most preferably, the bezel is positioned on an edge of the element to be located closest to the associated vehicle (i.e. the inboard edge).

It is contemplated that the present inventive concepts can be used in combination with mirrors (interior and/or exterior) having many different options to create synergistic and non-obvious combinations that provide surprising and unexpected benefits not previously possible. For example, turning now to FIG. 62, an interior mirror assembly 6200 includes a bezel 6255 (similar to any of bezels 544 of FIG. 5 and/or 4244-4244R in FIGS. 42-59) and a case 6256. The bezel and the case combine to define a mirror housing for incorporation of features in addition to a reflective element and information displays. Commonly assigned U.S. Pat. No. 6,102,546; D 410,607; U.S. Pat. Nos 6,407,468; 6,420,800; and U.S. patent application Ser. No. 09/687,743, the disclosures of which are incorporated in their entireties herein by reference, describe various bezels, cases, and associated button constructions for use with the present invention.

Figure 62:
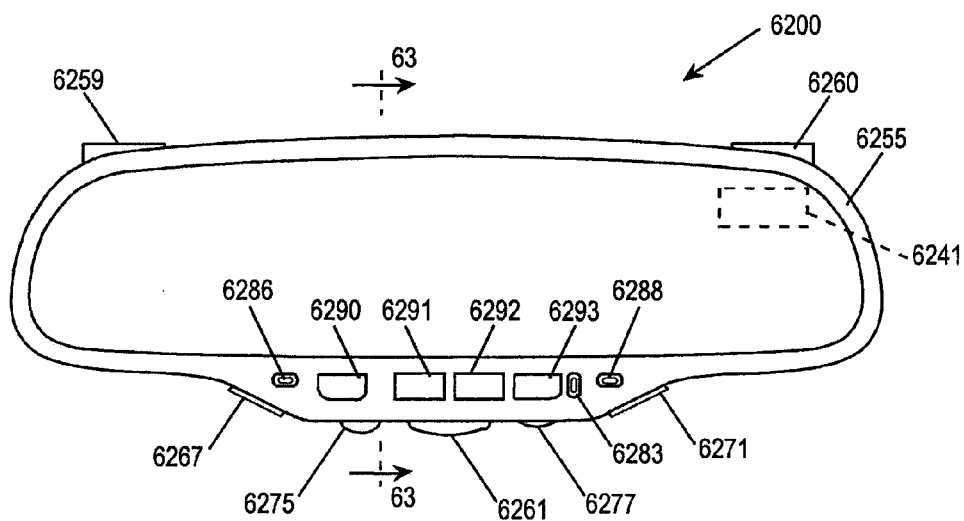
FIG. 62 depicts a front view of an interior rearview mirror assembly.

With further reference to FIG. 62, mirror assembly 6200 includes first and second illumination assemblies 6267, 6271. Various illumination assemblies and illuminators for use with the present invention are described in commonly assigned U.S. Pat. Nos. 5,803,579, 6,335,548, and 6,521,916, the disclosures of which are incorporated in their entireties herein by reference. As further depicted in FIG. 64, each illumination assembly preferably comprises a reflector, a lens, and an illuminator (not shown). Most preferably there are two illumination assemblies with one generally positioned to illuminate a front passenger seat area and the second generally positioned to illuminate a driver seat area. There may be only one or may be additional illuminator assemblies such as one to illuminate a center console area, overhead console area, or an area between the front seats.

With further reference to FIG. 62, mirror assembly 6200 includes first and second switches 6275, 6277. Suitable switches for use with the present invention are described in detail in commonly assigned U.S. Pat. Nos. 6,407,468 and 6,420,800, 6,471,362, 6,614,579, the disclosures of which are incorporated in their entireties herein by reference. These switches may be incorporated to control the illumination assemblies, the displays, the mirror reflectivity, a voice-activated system, a compass system, a telephone system, a highway toll booth interface, a telemetry system, a headlight controller, a rain sensor, etc. Any other display or system described herein or within the reference incorporated by reference may be incorporated in any location within the associated vehicle and may be controlled using the switches.

With further reference to FIG. 62, mirror assembly 6200 includes indicators 6283. Various indicators for use with the present invention are described in commonly assigned U.S. Pat. Nos. 5,803,579, 6,335,548, and 6,521,916, the disclosures of which are incorporated in their entireties herein by reference. These indicators may indicate the status of the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

With further reference to FIG. 62, mirror assembly 6200 includes first and second light sensors 6286, 6288. Preferred light sensors for use within the present invention are described in detail in commonly assigned U.S. Pat. Nos. 5,923,027 and 6,313,457, the disclosures of which are incorporated in their entireties herein by reference. The glare sensor and/or ambient sensor automatically control the reflectivity of a self-dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays.

With further reference to FIG. 62, mirror assembly 6200 includes first, second, third, and fourth operator interfaces 6290, 6291, 6292, 6293 located in mirror bezel 6255. Each operator interface is shown to comprise a backlit information display "A", "AB", "A1" and "12". It should be understood that these operator interfaces can be incorporated anywhere in the associated vehicle, for example, in the mirror case, accessory module, instrument panel, overhead console, dashboard, seats, center console, etc. Suitable switch construction is described in detail in commonly assigned U.S. Pat. Nos. 6,407,468, 6,420,800, 6,471,362, and 6,614,579, the disclosures of which are incorporated in their entireties herein by reference. These operator interfaces may control the illumination assemblies, the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may e connected to a controller and combined with a display in a rearview mirror to indicate to a driver the distance to an object; the display may be configured as a bar that has a length proportional to the given distance. In addition to or instead of the above-mentioned devices, fewer or more individual devices may be incorporated in any location within the associated vehicle and as described within the references incorporated herein.

Figure 63:
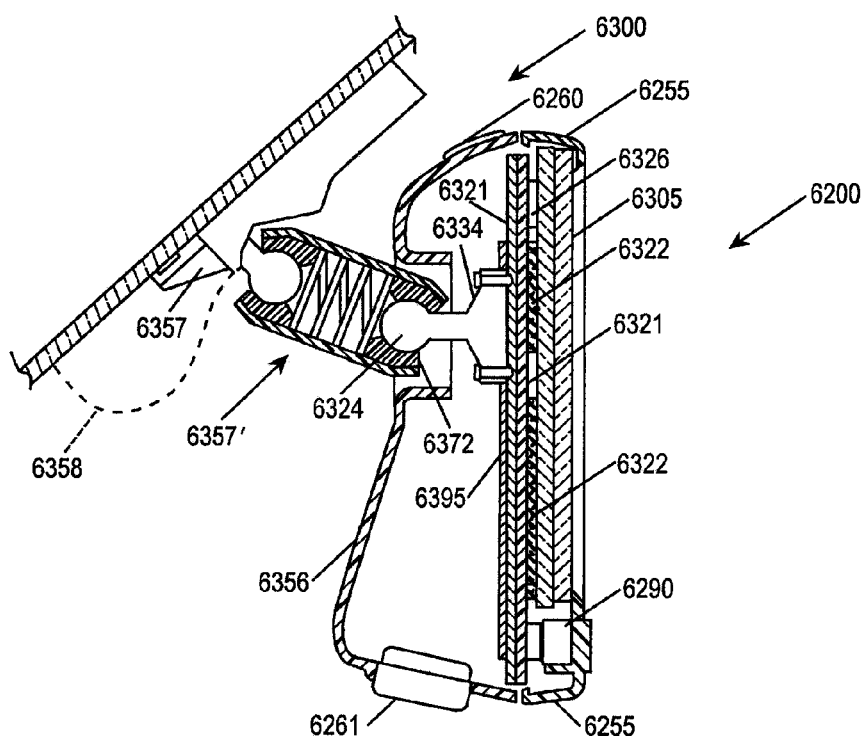
FIG. 63 depicts a sectional view of an interior rearview mirror assembly.

Turning now to FIG. 63, there is shown a section view of the mirror assembly 6300 that includes the embodiment 6200 of FIG. 62, with a reflective electrochromic mirror subassembly 6305 affixed to an internal plate frame 6321 with double-sided adhesive foam tape 622. An attachment component 6334 is screwed to (or integrally formed from) plate frame 6321 and defines a ball section 6324 that engages a crown section 6372 in the two-ball mount 6357 with tube assembly 6357'. The depicted sections of FIG. 63 are taken along a cut line VI-VI of FIG. 62. FIG. 63 shows a preferred positional relationship of information displays 6326 and/or backlighting (not specifically shown located at a bottom of the mirror subassembly 6325) with respect to reflective element 6305 within a housing defined by case 6356 and bezel 6255. In further reference to FIGS. 62 and 63, the mirror assembly 6300 is also shown to comprise a microphone 6259; first operator interface 6290 along with circuit board 6395; mirror mount 6357 and accessory module 6358. The mirror mount 6357 and/or an accessory module 6358 may comprise compass sensors, a camera, a headlight control, an additional microprocessor, a rain sensor, additional information displays, additional operator interfaces, etc.

Figure 64:
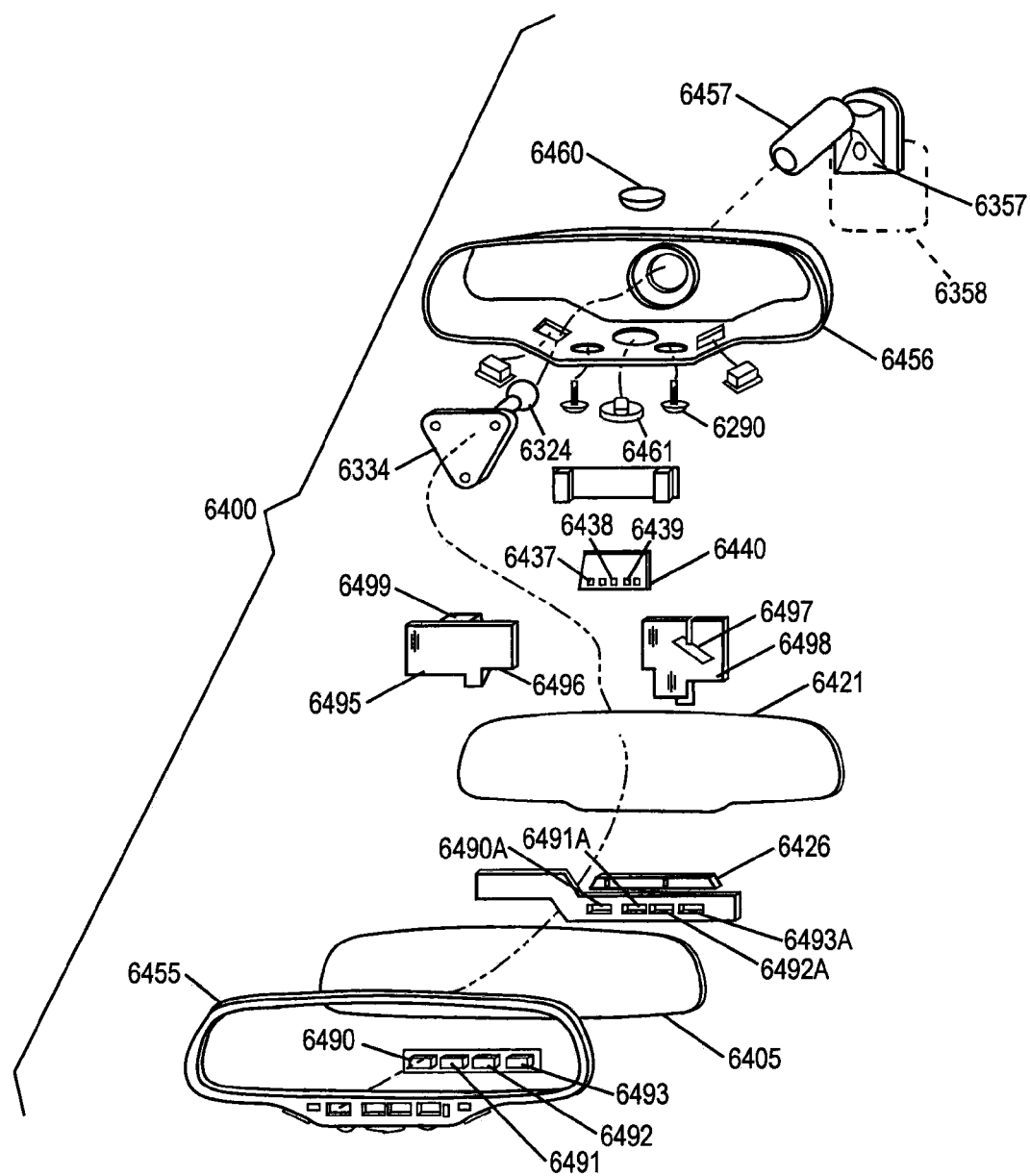
FIG. 64 depicts an exploded view of an interior rearview mirror assembly.

Turning now to FIG. 64, there is shown an exploded view 6400 of the mirror assembly 6300. FIG. 64 provides additional details with regard to one preferred positional relationship of individual components, as well as providing additional structural detail of a mirror assembly. As shown, the mirror assembly comprises a reflective element 6405 within a bezel 6455 and a mirror case 6456. Bezel 6455 can be adapted to be like any of bezels 1944 and 4244-4244R previously described. A mirror mount 6457 is included for mounting the mirror assembly within a vehicle. It is noted that a person skilled in the art of vehicle mirror design can re-design the bezel 6455, mirror case 6456, and tube mount 6457 to be replaced with the bezel 4244 (-4244R), mirror housing 4273, and carrier 4260 previously described in this application. It should be understood that a host of accessories may be incorporated into the mount 6457 and/or onto the plate frame carrier 6321 in addition to a power pack adjuster, such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

The mirror assembly is shown in FIG. 64 to further comprise third information display 6426 with third information display backlighting 6437, 6438, 6439; first and second microphones 6460, 6461; and includes other known options such as a first reflector with a first lens; a second reflector with a second lens; a glare sensor; an ambient light sensor; first, second, third, and fourth operator interfaces 6490, 6491, 6492, 6493 with first, second, third, and fourth operator interface backlighting 6490a, 6491a, 6492a, 6493a; a circuit board 6495 having a compass sensor module 6499; and a daughter board 6498 with an input/output bus interface 6497.

Preferably, the illumination assemblies with associated light source are constructed in accordance with the teachings of commonly assigned U.S. Pat. Nos. 5,803,579 and 6,335,548, as well as U.S. patent application Ser. No. 09/835,278, the disclosures of which are incorporated in their entireties herein by reference.

Preferably, the glare light sensor and the ambient light sensor are active light sensors as described in commonly assigned U.S. Pat. Nos. 6,359,274 and 6,402,328, the disclosures of which are incorporated in their entireties herein by reference. The electrical output signal from either or both of the sensors may be used as inputs to a controller on the circuit board 6440 or 6495 to control the reflectivity of reflective element 6405 and/or the intensity of third information display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 6499 is shown to be mounted circuit board 6495 in FIG. 64, it should be understood that the sensor module may be located within mount 6457, an accessory module 6458 positioned proximate mirror assembly 6400 or at any location within an associated vehicle such as under a dashboard, in an overhead console, a center console, a trunk, an engine compartment, etc. Commonly assigned U.S. Pat. Nos. 6,023,229, 6,140,933, and 6,968,273 as well as commonly assigned U.S. Patent Application 60/360,723, the disclosures of which are incorporated in their entireties herein by reference, described in detail various compass systems for use with the present invention. These systems may be integrated, at least in part, in a common control with information displays and/or may share components with the information displays. In addition, the status of these systems and/or the devices controlled thereby may be displayed on the associated information displays.

Daughter board 6498 is in operational communication with circuit board 6495. Circuit board 6495 may comprise a controller 6496, such as a microprocessor, and daughter board 6498 may comprise an information display. The microprocessor may, for example, receive signal(s) from the compass sensor module 6499 and process the signal(s) and transmit signal(s) to the daughter board to control a display to indicate the corresponding vehicle heading. As described herein and within the references incorporated by reference herein, the controller may receive signal(s) from light sensor(s), rains sensor(s) (not shown), automatic vehicle exterior light controller(s) (not shown), microphone(s), global positioning systems (not shown), telecommunication systems (not shown), operator interface(s), and a host of other devices, and control the information display(s) to provide appropriate visual indications.

Controller 6496 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor-based voice-actuation systems, and vehicle speed. The controller 6496 (or controllers) may receive signals from switches and/or sensors associated with any of the devices described herein and in the references incorporated by reference herein to automatically manipulate any other device described herein or described in the references included by reference. The controller 6496 may be, at least in part, located outside the mirror assembly, or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,399,049; 6,465,963; 6,587,573; 6,429,594; 6,379,013; 6,871,809; 6,774,988 and U.S. patent application Ser. Nos. 09/847,197; and 60/404,879, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

It is contemplated that the present invention would be useful in inside or outside rearview mirrors having electro-optic mirror elements, convex mirror elements, aspheric mirror elements, planar mirror elements, non-planar mirror elements, hydrophilic mirror elements, hydrophobic mirror elements, and mirror elements having third surface and fourth surface reflectors. It is further contemplated that the present invention will be useful on mirrors that are transflective, or that have a third or fourth surface mirror element with patterns of lines (sometimes referred to as "jail bars") thereon to optimize the effect of visible light. Further, the present invention is useful with mirrors having first surface or fourth surface heaters, anti-scratch layers, and circuit boards including flexible circuit boards, and circuit board and heater combinations, such as heaters having embedded or integrated non-heater functions such as signal ellipses and signal diffusants, locating holes or windows for light pass-through. The present invention is also useful with potted or snap-attached or elastomeric bezels, and useful with carriers having an ultra-flat front surface. Also, additional options can be integrated into the mirrors including signal lighting, key lights, radar distance detectors, puddle lights, information displays, light sensors and indicator and warning lighting, retainers with living hinges, and integrated housings for receiving and supporting said components. Still further, it is conceived that the present mirror can include a manually folding or power folding mirrors, extendable mirrors, and mirrors with a wide field of view, and with information on the mirror such as "object in mirror is closer than may appear" or other indicia, such as "heated" or "auto-dim" Still further, the present invention is useful with a blue glass mirror or "blue chemical" darkening mirror. Still further, efficiencies can be had by incorporating the present concepts with mirrors having an electrochromic mirror subassembly with front and rear glass mirror elements with edges having a "zero offset" (i.e. less than an average of about 1-mm, or more preferably, less than about 0.5-mm difference between perfect alignment of edges of the mirror elements), an edge seal, including clear reflective or opaque edge seals, and/or second surface chrome or a chrome bezel.

Although the present invention has been generally described as being used in connection with electrochromic devices, such as mirrors and architectural windows, those skilled in the art will understand that various aspects of the present invention may be employed in the construction of other electro-optic devices.

Figure 65:
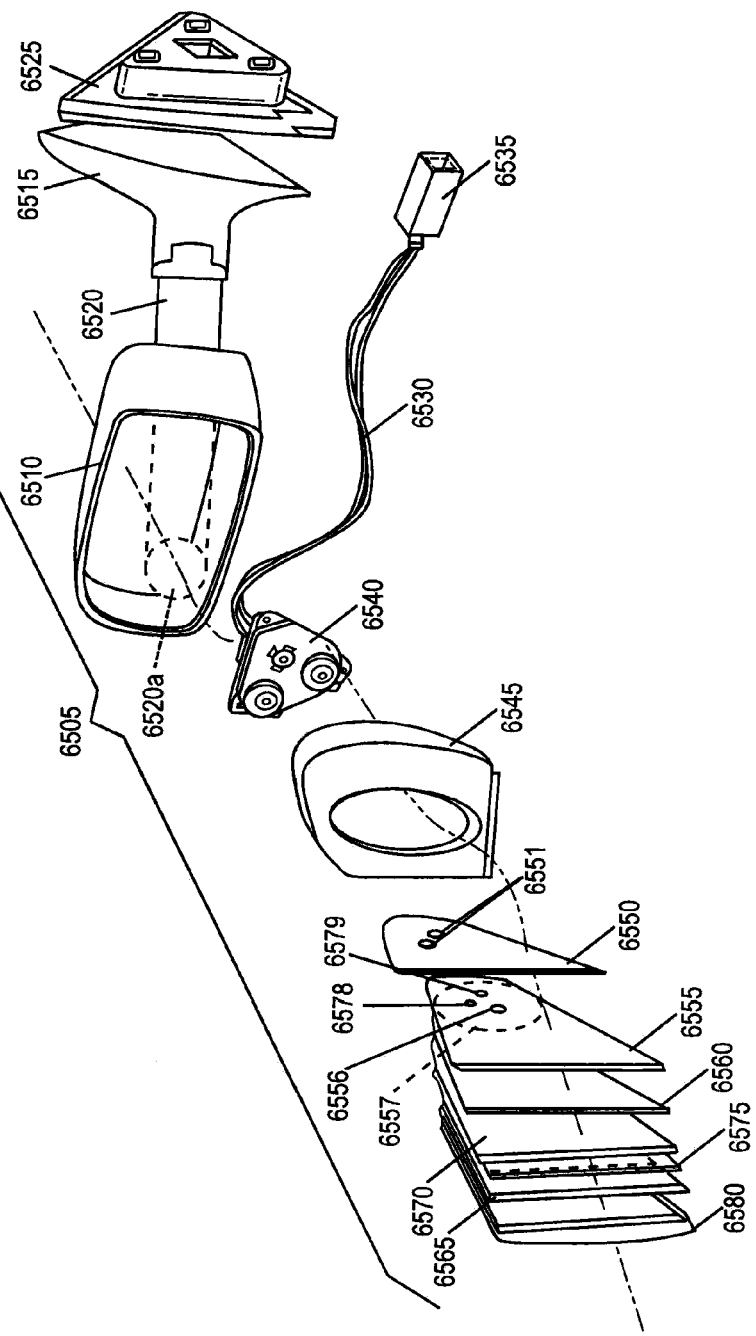
FIG. 65 depicts an exploded view of an exterior rearview mirror assembly.

Turning now to FIG. 65, there is shown an exploded view of an exterior rearview mirror assembly 6505 having a housing 6510 connected to an attachment member 6515 via a telescoping extension 6520. In at least one embodiment, the telescoping extension 6520 comprises a single arm having a linear actuator for extending and retracting the telescoping extension from within the associated vehicle. The telescoping extension 6520 may comprise a rack and pinion type linear actuator, an electrical solenoid type linear actuator, a pneumatic piston or a hydraulic actuator. The housing 6510 may be configured such that the housing axially pivots about the telescoping extension. Additionally, the telescoping extension may be configured such that the housing may be folded inward toward the associated vehicle and outward away from the associated vehicle. The attachment member 6515 is configured to be received by a vehicle mount 6525. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 6520a such that the housing pivots about the connection 6520a such that the mirror may be positioned closer or farther from the vehicle as desired; this feature may be accompanied by a power positioning mechanism such that actuation may be performed inside the vehicle. It should be understood that the mirror housing, extension and attachment member may be configured such that the telescoping, pivoting and folding requires a manual operation.

A wiring harness 6530 with a connector 6535 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 6540 is provided for aligning the associated reflective element within the housing from the interior of the associated vehicle. It should be understood that a corresponding operator interface is provided within the vehicle for positioning of the reflective element.

The positioner 6540 is mechanically connected to a carrier for providing a secure structure for supporting and moving of the associated reflective element. Examples of suitable carriers are described in U.S. Pat. Nos. 6,195,194 and 6,239,899, the disclosures of which are incorporated herein in their entireties by reference.

In at least one embodiment, a double sided adhesive foam 6550 is employed to attach the reflective element to the carrier. In certain instances, apertures 6551 may be provided in the double sided adhesive foam for accommodating positioning of various components.

In at least one embodiment, an electrical circuit board 6555 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of each of these U.S. patents are incorporated herein in their entireties by reference.

In at least one embodiment, a rearview mirror assembly is provided with a heater 6560 for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these patents are incorporated in their entireties herein by reference.

In at least one embodiment, the reflective element is has variable reflectance feature. The variable reflectance reflective element may comprise a first substrate 6565 and a second substrate 6570 secured in a spaced apart relationship by a seal 6575 to define a chamber therebetween. The reflective element may be configured to define a convex element, an aspheric element, a planar element, a non-planar element, a wide field of view element, or a combination of these various configurations in different areas to define a complex mirror element shape. The first surface of the first substrate may comprise a hydrophilic or hydrophobic coating to improve the operation. The reflective element may comprise transflective properties such that a light source, or information display, may be positioned behind the element and project light rays therethrough. The reflective element may comprise an anti-scratch layer, or layers, on the exposed surfaces of the first and, or, second substrates. The reflective element may comprise area(s) that are devoid of reflective material, such as etched in bars or words, to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527, 6,111,684 and 5,998,617, the disclosures of each of these patents are incorporated in their entireties herein by reference.

Modifications, Auxiliary and Alternative Embodiments.

Figure 1B:
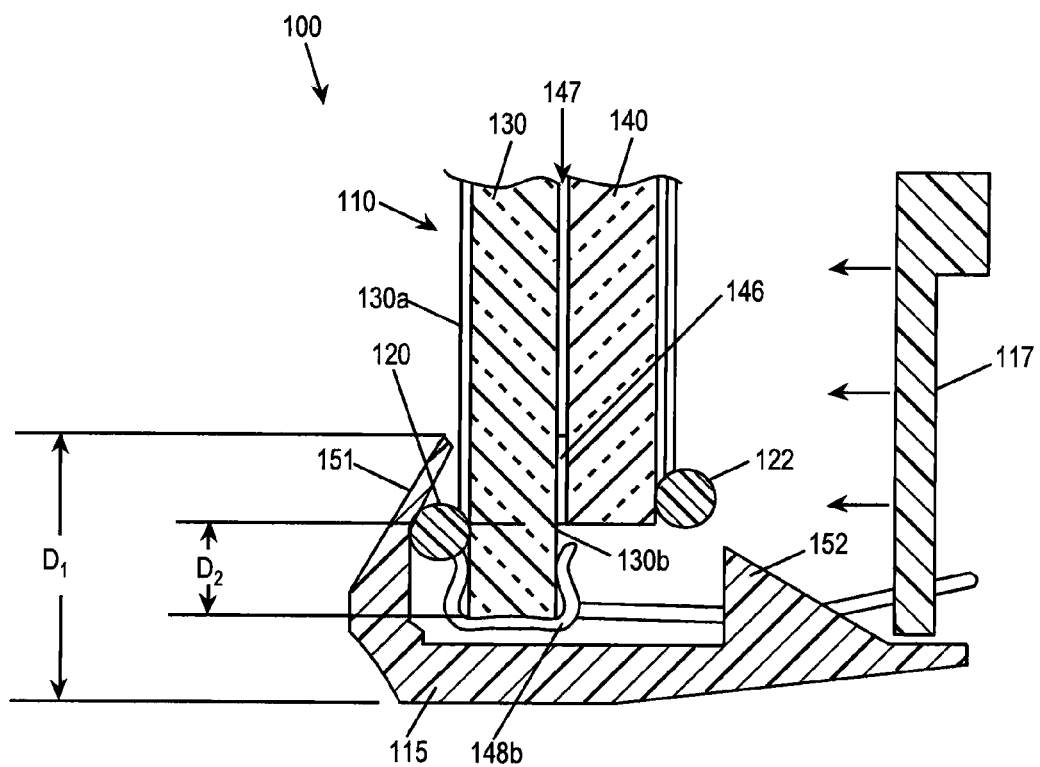
FIG. 1B is an enlarged cross-sectional view of the conventional exterior electro-optic mirror assembly shown in FIG. 1A.

As discussed above in reference to FIGS. 1 through 65, an embodiment of a rearview mirror system employing an EC-element and a source of light behind the EC-element preferably includes a ring of an optical thin-film spectral filter material that is circumferentially disposed in a peripheral area, next to a corresponding perimeter-defining edge, of either the first or the second surface of the system. It is recognized that the use of the peripheral ring is partly directed to configuring an overall mirror system in such a fashion as to make the system as aesthetically appealing to the user as possible. For example, one purpose of this thin-film ring is to hide the seal, the plug material, and, possibly, the electrical connectors of the EC-element from being visually discernable by the user through the first substrate. As such, this peripheral ring of material is usually opaque in at least a portion of visible spectrum of electromagnetic radiation and may be sufficiently wide, up to 6.5 mm. It has also been discussed in this application that such a peripheral ring must facilitate matching of spectral characteristics of ambient light reflected from the periphery of the mirror system that includes such a ring with those of ambient light reflected from a central area inside the periphery of the mirror system where the ring is not present. The better the spectral matching, e.g., matching of reflectance and color gamut, the less discernable is the area of the peripheral ring to the viewer when the EC-element is switched "off" and the rearview assembly of the invention operates purely as a mirror. Solutions to achieving various degrees of spectral matching between the ring-portion of the mirror and the central, transflective portion of the mirror have already been discussed in this application and included judicious thin-film designs of the peripheral ring with the use of such materials as chromium, nickel, stainless steel, molybdenum, silicon, platinum group metals, aluminum, silver, copper, gold or various alloys of these metals.

Also discussed was another, more tangible purpose of utilizing a peripherally deposited thin-film ring—to reduce exposure of the seal, disposed between the substrates forming an EC-cavity, to UV light that causes degradation of the seal. Clearly, then, such UV-protection measure is of particular importance in an outside rearview assembly (see, e.g., FIGS. 3 and 5) that is fully exposed to sunlight, while requirements to UV-properties of a ring of an EC-element employed within an inside rearview assembly (see, e.g., FIGS. 4 and 5) may be not as stringent.

It is recognized that the use of a peripheral ring entails certain shortcomings. For example, it must be realized that, in operation, the peripheral area of a mirror system of the assembly containing the peripheral ring does not darken, unlike the central portion of the mirror, when the voltage is applied to the electrodes of the EC-element (or other electrically darkening technology) in order to reduce the light-glare blinding the user. As a result, the difference in appearances of the peripheral ring and the central portion of the mirror when the EC-element is "on" may be quite significant, in particular in inside rearview assemblies that typically employ higher reflectance levels. Consequently, not only the size of the central portion of the mirror is accordingly reduced, as compared to the overall front surface of the minor element, by a width of the peripheral ring but the peripheral ring continues producing the undesired glare even when the EC-element is "on". Another problem arises from the fact that a typical mirror system of an inside rearview assembly contains an eye-hole (such as the elements 497 and 515 of FIGS. 4 and 5) behind which corresponding sensors (such as the sensor 396 of FIG. 3) may be positioned. When the eyehole is used in combination with a peripheral ring, appropriate positioning of the eye-hole may not be straightforward. For example, if the eye-hole is formed by creating an opening in a coating stack of the third surface, then locating such an opening within the peripheral area of the minor element will disrupt the visual continuity of the minor and will be perceived as aesthetically unpleasing, particularly in an embodiment where the height of the minor is not significant. It is appreciated that, although in description of the embodiments below mounting elements (e.g., carrier, bezel, and housing elements) as well as electrical connectors are omitted, all of these elements are implied and the described alternative and modified embodiments may be used with any combination of the mounting and electrical elements discussed in this application.

Eye-Hole Openings.

Common embodiments of automotive electrochromic minors generally include light sensors for measuring glare and ambient light levels. In certain embodiments the glare sensor is positioned behind the EC mirror element and views glare light levels through an aperture in the reflective coating. Prior art embodiments of eyehole openings for light sensors comprise single continuous openings. These openings in the reflective layer may comprise a TCO or a transflective metal layer for conductivity. In general, these openings can be several millimeters wide and are often round or elliptical in shape. The aperture must be large enough to allow glare light entering the vehicle to adequately illuminate the glare sensor for accurate light level measurement. A single, hard edged eyehole might be considered aesthetically less than optimal by certain observers. Some prior art embodiments utilize a transflective opening that is effectively stealthy and non-obvious to an observer. For certain other embodiments discussed herein, the use of a cluster of multiple, smaller openings instead one large opening may have aesthetic and/or manufacturing advantages. Non-limiting embodiments of multi-opening eyeholes are shown in FIGS. 66(A-E). These examples comprise reflective regions 6620 (reflective material present) and areas 6610 that are patterned to be essentially devoid of reflective material. As shown in FIGS. 66(A-E), these patterns may be essentially circular, rectangular or linelike and may have a regular or irregular spacing. In general, an optimized pattern of reflective and essentially non-reflective regions within the geometric boundaries of an eyehole can be less noticeable and therefore less aesthetically objectionable. The size and spacing of the openings, as they contribute to percent open area in the eyehole region, determine the transmittance of light to the glare sensor. Because the eyehole is part of the EC element, it darkens when the element is energized resulting in a change of light intensity measured by the glare sensor. It is preferable that the eyehole clear as quickly as the rest of the EC mirror element so that the measured light intensity is accurately indicative of the glare observed by the driver. If the eyehole clears slower than the rest of the mirror element then it is possible that the EC mirror will not respond to changing glare situations as intended.

Figure 66F:
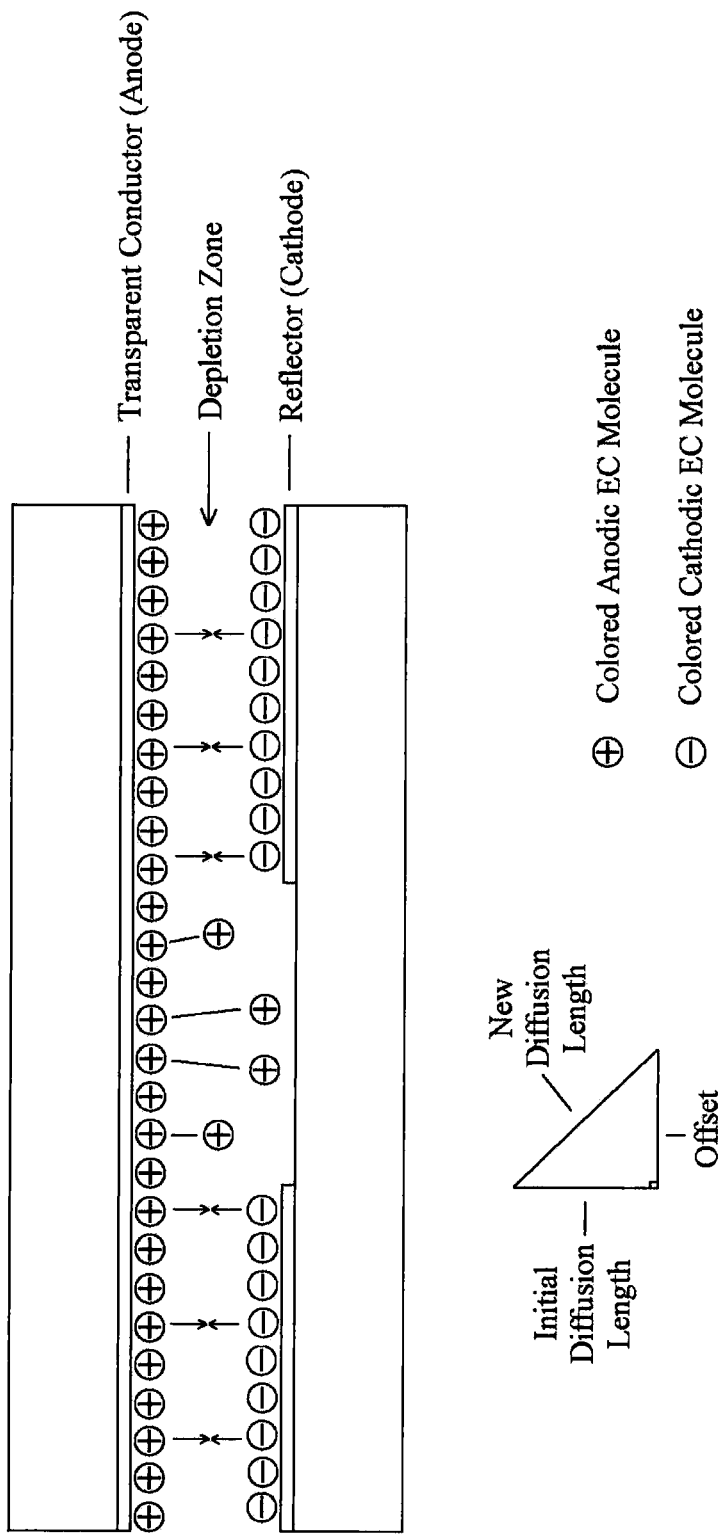
FIG. 66F provides illustration to segregation effects in an EC element.

There can be negative impacts on EC mirror element aesthetics and function caused by essentially non-conductive regions of the electrode. In the currently described electrochromic (EC) cell embodiments, the EC fluid comprises two primary coloring compounds, an anodic material, which is bleached in its normal state and becomes oxidized at the anode when the cell is energized, and a cathodic material, which is bleached in its normal state and becomes reduced at the cathode when the cell is energized. In one embodiment the anodic material is yellow/green in its colored state and the cathodic material is violet in its colored state. Because these two EC materials are dissolved in the EC fluid, they are free to diffuse through the cell. Therefore, when the operating potential is applied between the anode and cathode, the two EC active compounds proximate to the proper electrode surface are converted to their colored states. The colored state compounds diffuse away from the electrode surfaces where they were created and are replaced by more bleached state compounds which are subsequently colored. When a molecule of oxidized (colored) anodic material diffuses proximate to a molecule of reduced (colored) cathodic material, there is some probability that a charge transfer reaction will occur, converting both molecules back into their bleached state. A second potential route to bleaching of a colored state molecule is diffusion to the opposite electrode from which it was created. A molecule of anodic material that has been oxidized at the anode has some probability of diffusing proximate to the cathode surface. Once this occurs it is likely that the anodic material will be reduced back to its bleached state. Likewise, the same effect can apply to reduced cathodic material that diffuses to the anode. In this way, some time after the initial activation of the EC cell, steady state equilibrium is reached between the creation of colored state compounds and the bleaching of colored state compounds by intermolecular charge exchange and diffusion to the opposite electrode. In the equilibrium state, colored EC molecules have the highest probability of bleaching through intermolecular charge transfer with the opposite species in a depletion zone between the two electrodes where the concentration of colored species approaches zero. As described elsewhere, in a standard EC mirror cell design, surface 2 of the EC element comprises a transparent electrode which is commonly configured as the anode. Surface 3 of the EC element comprises a conductive, reflective layer which is commonly configured as the cathode. Considering the equilibrium described above, if one considers the EC cell in cross-section, there will be a somewhat higher concentration of colored anodic material proximate the anode surface and a somewhat higher concentration of colored cathodic material proximate the cathode surface. Nearer the center of the cell (in cross-section), the concentrations of the colored anodic and cathodic materials will be more similar until the concentrations fall to near zero in the depletion zone. To an observer viewing the reflective element from a position normal to its first surface, the stratification of the colored species is not apparent since the layered colors are blended by the path the light takes to the observer. Consequently, if there is a gap in one of the conductive layers generating a non-conductive or significantly less conductive region (for example, an area 6610), a localized imbalance can be caused in the equilibrium. The side of the cell still having a functional electrode will generate colored material as described above. The side of the cell with the compromised electrode will not generate colored material or will do so at a significantly reduced rate. Therefore if there is a gap in the cathode of the above described embodiment, yellow/green material will be produced at the anode without commensurate violet material being product at the opposing cathode location. This imbalance can lead to a net yellow/green appearance at the location of the compromised cathode. This color imbalance is here and elsewhere (U.S. Pat. Nos. 4,902,108 and 5,679,283 herein incorporated by reference in their entirety) referred to as segregation. This effect can lead to less than optimum aesthetics when the mirror element has been in the dark state for several minutes. The size or area of the compromised zone of the electrode affects the degree of segregation due to its effect on the diffusion length required to reach the other electrode. For example, in a non-compromised system with two parallel electrodes separated by 140 microns, the shortest diffusion path length at any position in the system must be less than or equal to 140 microns. If a segment of an electrode 500 microns wide is removed then the shortest diffusion path length can be as high as 287 microns in the compromised segment, describing the hypotenuse of the triangle running from the center of the compromised segment to its edge then across to the other electrode of the EC cell. Increasing the shortest path length will increase the effects of segregation. These effects are illustrated in FIG. 66F.

A common method of clearing the EC element involves removal of the driving potential and electrical shorting of the anode to the cathode. At this point no new EC molecules are being converted to their colored states and diffusion takes over. The high concentration of oxidized anodic species proximate the anode and reduced cathodic species proximate the cathode result in a chemical potential similar to a battery. Shorting the electrodes allows the species proximate to the electrode surfaces to rapidly return to their bleached state. Diffusion across the cell allows the remaining oxidized anodic molecules to bleach through charge transfer reactions with reduced cathodic molecules. Again, as described above, a non- or partially-conductive area of one of the electrodes means that the bleaching of one of the EC species cannot occur at the compromised electrode surface resulting in diffusion being the only route to bleaching. If only one electrode, cathode or anode, is compromised then one species may bleach more quickly than the other resulting in a color imbalance and slower than normal clearing of that species which is herein also considered a form of segregation. The sum effect of one electrode having a non- or partially-conductive region is that in the driven (darkened) state, one colored EC species increases in concentration in the compromised zone, due to lack of depletion by the opposite EC species, until it dominates the color. This dominate color persists for some time after clearing of the EC element by the method described above due to diffusion being the only route to bleaching in the compromised region. Depending on the size and shape of the compromised zone, it is possible, due to the chemical potential present during clearing, to see a small amount of the violet color, for the above described embodiment, proximate the perimeter of the compromised zone during clearing. As described above, the colored EC species persisting in the eyehole zone longer than the clearing time for the rest of the element may lead to less than optimum performance of the glare sensor.

As alluded to above, one route to minimizing the segregation effects is to compromise both the anode and cathode electrodes. So if the intent is to create openings or essentially non-conductive zones in the third surface reflector layer to enhance transmission or create a conductance break, creating an essentially equivalent opening or essentially non-conductive zone in the opposing region of the second surface conductive layer will have roughly equivalent, offsetting effects, resulting in less segregation effects. This is due to the effect that both electrodes are compromised meaning that neither EC material effectively dominates in the compromised zone. This may significantly reduce the color bias in the activated (dark) state as well as during clearing. This may also reduce the lag in clearing time but will not necessarily eliminate it.

Examples

Figure 66G:
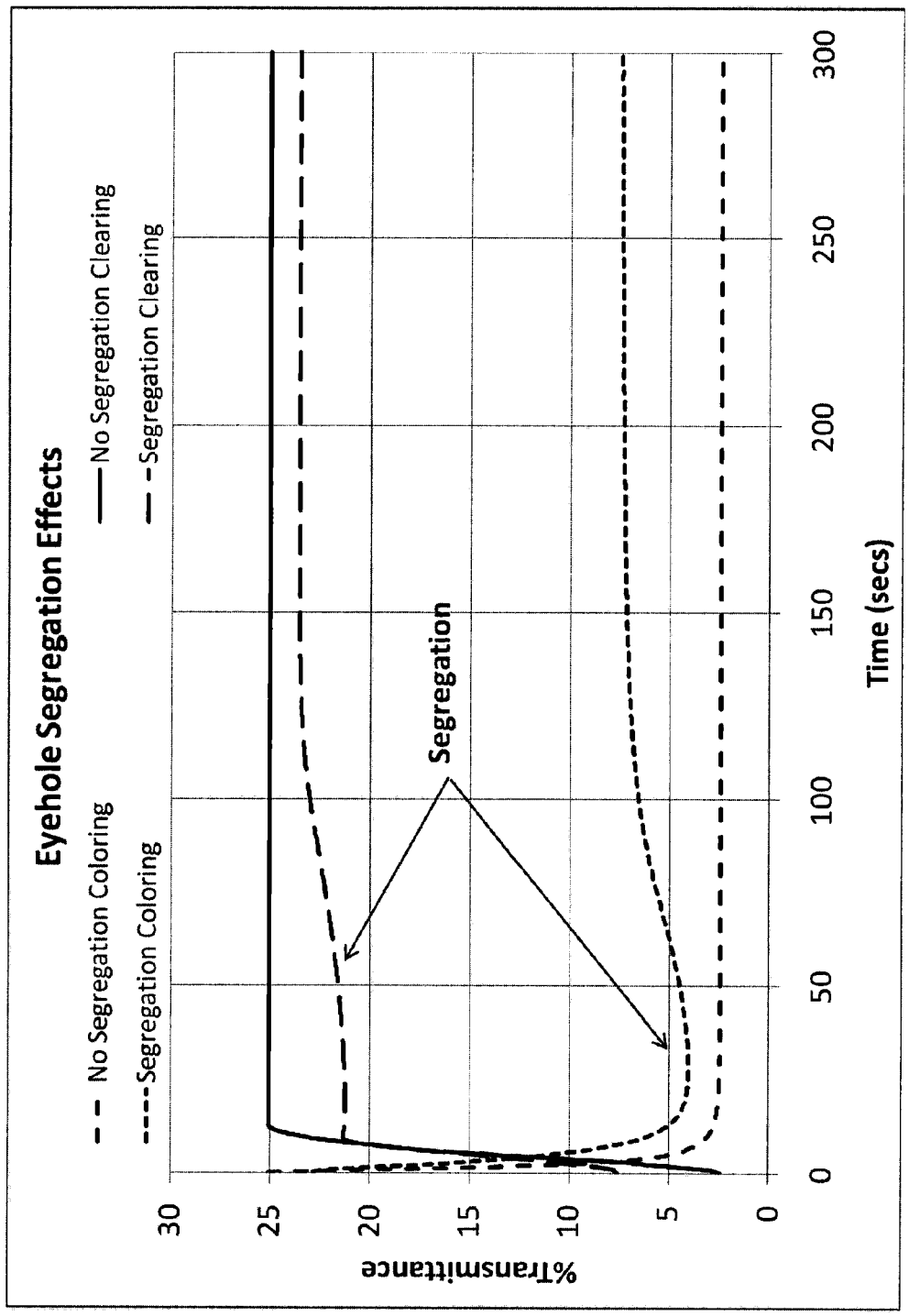
FIG. 66G shows examples of transmittance changes for EC elements with and without segregation.
Figure 66H:
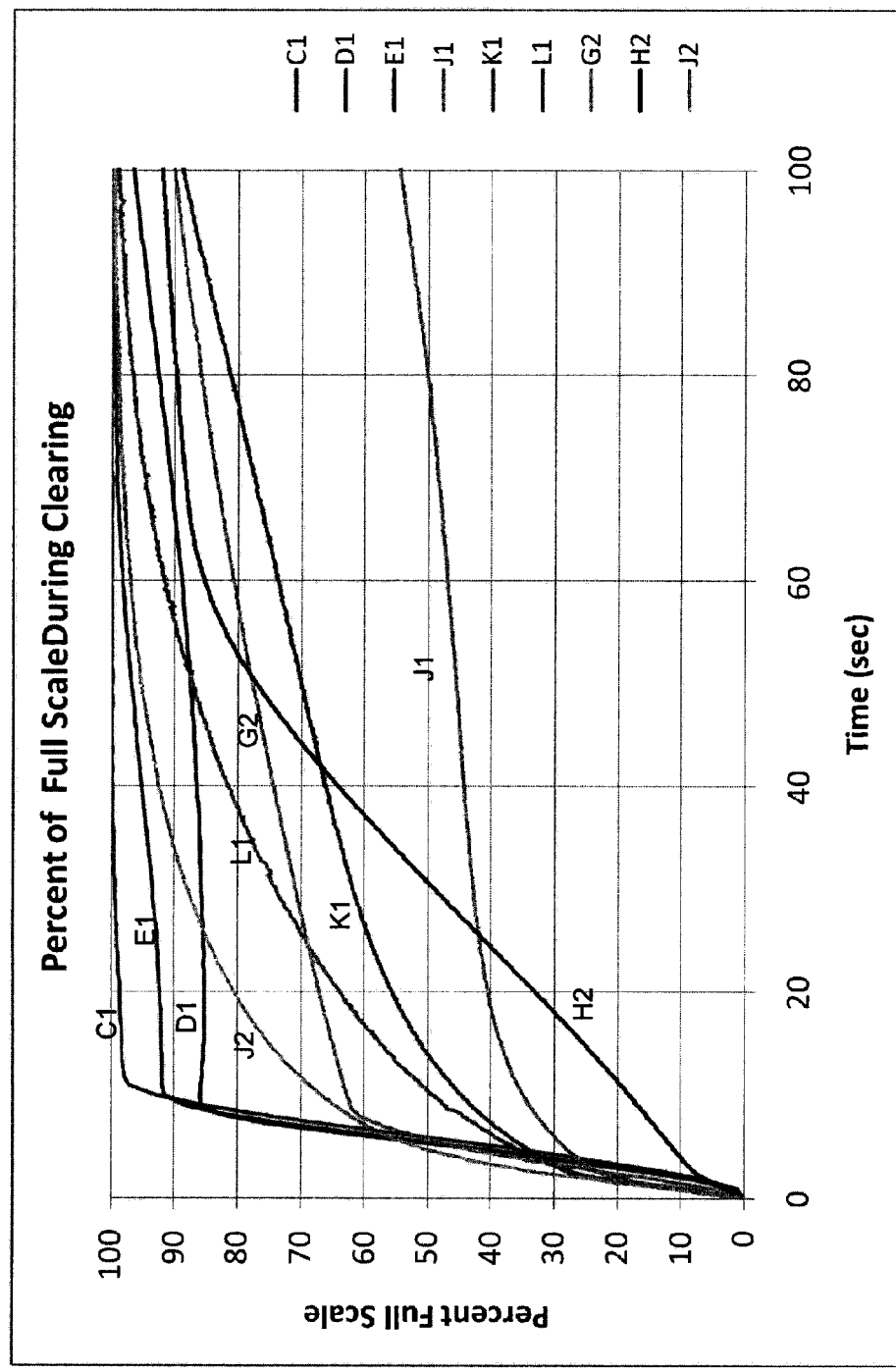
FIG. 66H provides examples of % full scale behavior of the EC element during clearing.

EC-mirror elements were fabricated with nominal cell spacing of approximately 140 microns. The eyeholes in these devices were configured by patterning the third surface metal reflector (cathode) with vertical lines created by laser ablation in a fashion similar to that of FIG. 66C. The perimeter of the ablated area approximated an oval with a length of about 5 mm and a width of about 7 mm. The width of the remaining metal traces and the width of the ablated openings in the eyehole area are shown in Table 6. Each of the samples was A1-L1 represent openings in the surface 3 reflective layer without a corresponding "opening" in the surface 2 TCO. Examples A2-L2 represent openings in surface 2 plus corresponding essentially equivalent "openings" in the surface 2 TCO. FIG. 66G demonstrates the change in transmittance at the eyehole during coloring and clearing for both an element showing segregation effects and an element not showing segregation. As can be seen from FIG. 66G, a non-compromised EC element shows relatively monotonic change between the bright and dark states while an EC element with a compromised electrode in the region of the eyehole shows a non-monotonic change both for coloring and clearing. The secondary, slow change identified as segregation in FIG. 66G is due to the slow diffusion of colored state EC molecules into and out of the compromised zone/s of the eyehole. A time measure, $t_1$, was assigned for the time at which the primary rapid clearing step transitioned to the slow segregation clearing step. A second time measure, $t_2$, was assigned to the point at which the clearing reached essentially a steady state transmittance. The difference between $t_2$ and $t_1$ was defined as the Clearing Time Delay, Delta-t. The transmittance at time $t_1$ was defined as % $T_1$. Similarly the transmittance at time $t_2$ was defined as % $T_2$. The value of % $T_2$ represents the transmittance of the eyehole in its essentially fully clear state. The attenuation of light at time $t_1$ relative to $t_2$ was defined as Delta-% I which represents the loss of light intensity reaching the glare sensor at time $t_1$ relative to the intensity of light reaching the glare sensor in the fully clear state; in other words, the attenuation of the glare sensor response due to segregation. Table 6 lists the properties of the example surface 3 eyehole ablations including whether surface 2 was also ablated, the width of the metal traces, the width of the ablated spaces, the clear state transmittance, the dark state transmittance and the variables listed above. To minimize the effects of segregation on the performance of the glare sensor it is preferable to minimize either the clearing time delay, Delta-t, or the attenuation of the glare sensor, Delta-% I. Minimizing both measures will result in a preferable embodiment however; the minimization of either measure reduces the impact of the other measure.

TABLE 6

| Label | Surf2 Ablation | Traces (um) | Ablations (um) | % Open | % T | Darkened % T | t1 sec | t2 sec | Delta-t | % T1 | % T2 | Delta-% T | Delta-% I |
|---|---|---|---|---|---|---|---|---|---|---|---|---|---|
| A1 | N | 54 | 50 | 48 | 22.1 | 4.7 | 17 | 113 | 96 | 20.7 | 22.1 | 1.4 | 6.4 |
| B1 | N | 123 | 50 | 29 | 14.1 | 2.7 | 13 | 68 | 55 | 13.6 | 14.1 | 0.5 | 3.9 |
| C1 | N | 210 | 50 | 19 | 9.2 | 1.8 | 16 | 42 | 26 | 9.1 | 9.2 | 0.1 | 0.8 |
| D1 | N | 81 | 75 | 48 | 23.6 | 7.5 | 20 | 130 | 110 | 21.2 | 23.6 | 2.4 | 10.2 |
| E1 | N | 185 | 75 | 29 | 13.8 | 4.4 | 13 | 72 | 59 | 13.1 | 13.8 | 0.7 | 5.2 |
| F1 | N | 315 | 75 | 19 | 10.1 | 3.4 | 16 | 50 | 34 | 9.8 | 10.1 | 0.3 | 2.8 |
| J1 | N | 217 | 200 | 48 | 25.4 | 16.5 | 2 | 265 | 263 | 18.8 | 25.3 | 6.5 | 25.6 |
| K1 | N | 490 | 200 | 29 | 16.1 | 10.5 | 3 | 164 | 161 | 12.2 | 16.0 | 3.8 | 23.6 |
| L1 | N | 853 | 200 | 19 | 9.4 | 6.1 | 3 | 97 | 94 | 7.1 | 9.4 | 2.3 | 24.5 |
| A2 | Y | 54 | 50 | 48 | 21.3 | 4.1 | 17 | 62 | 45 | 20.7 | 21.3 | 0.6 | 2.7 |
| B2 | Y | 123 | 50 | 29 | 13.6 | 2.4 | 20 | 42 | 22 | 13.5 | 13.6 | 0.1 | 0.9 |
| C2 | Y | 210 | 50 | 19 | 9.0 | 1.7 | 23 | 28 | 5 | 8.9 | 9.0 | 0.1 | 0.6 |
| D2 | Y | 81 | 75 | 48 | 23.8 | 6.2 | 20 | 70 | 50 | 23.3 | 23.8 | 0.5 | 2.3 |
| E2 | Y | 185 | 75 | 29 | 13.6 | 4.2 | 20 | 42 | 22 | 13.6 | 13.6 | 0.0 | 0.3 |
| F2 | Y | 315 | 75 | 19 | 9.6 | 3.1 | 18 | 22 | 4 | 9.6 | 9.6 | 0.0 | 0.4 |
| G2 | Y | 69 | 251 | 78 | 40.6 | 29.8 | 9 | 229 | 220 | 36.6 | 40.5 | 3.9 | 9.6 |
| H2 | Y | 158 | 481 | 75 | 38.9 | 25.0 | 4 | 324 | 320 | 26.6 | 38.9 | 12.3 | 31.6 |
| J2 | Y | 217 | 200 | 48 | 25.6 | 16.9 | 7 | 109 | 102 | 22.3 | 25.6 | 3.3 | 12.9 |
| K2 | Y | 490 | 200 | 29 | 15.8 | 11.2 | 9 | 109 | 100 | 14.3 | 15.7 | 1.4 | 8.9 |
| L2 | Y | 853 | 200 | 19 | 11.1 | 7.8 | 10 | 109 | 99 | 10.1 | 11.1 | 1.0 | 9.0 | activated (darkened) for 10 minutes and then shorted (cleared). During the coloring and clearing phases the eyehole region was observed by transmittance spectroscopy to track the change in transmittance versus time. Examples Another approach to quantifying the effects of segregation on the glare sensor response is to consider the lag between initiation of clearing the EC element and the time at which the eyehole transmittance reaches a predetermined value. For this purpose it is convenient to consider a normalized Percent Full Scale (% FS) transmittance scale for the eyehole. The actual transmittance of the eyehole at any time t is normalized and scaled such that the minimum transmittance of the eyehole in the fully darkened state becomes 0% FS and the maximum transmittance of the eyehole in the fully cleared state becomes 100% FS. The behavior of this measure for the clearing of selected examples is given in FIG. 66H. This normalized scale is convenient because it more accurately describes the effects of the segregation on the actual response range of the glare sensor. It is preferable that the eyehole reach a % FS value of greater than 75% within 20 seconds of the initiation of clearing. It is more preferable that the eyehole reach a % FS value of greater than 80% within 20 seconds of the initiation of clearing. It is most preferable that the eyehole reach a % FS value of greater than 90% within 20 seconds of the initiation It is appreciated that the dimension of the remaining metal traces (areas 6620) in the eyehole zone may affect the performance of the glare sensor. If the traces are not small compared to the dimensions of the glare sensor, or its optics, then the shadowing of the sensor by the metal traces might result in the response of the glare sensor being non-uniform with respect to the angle of incidence of the light. For this reason the dimension and spacing of the metal traces may require optimization beyond the requirements of the segregation effects described above. Eyeholes comprising multiple smaller apertures may be considered less obtrusive and therefore more aesthetically pleasing than larger, single aperture eyeholes. The use of laser ablation to form the above described apertures/ablations is one example of a potential manufacturing advantage over common methods used to generate conductive, single aperture eyeholes in a reflective conductive layer stack.

TABLE 7

Percent of Full Scale Transmittance.

| | % Tmin | % Tmax | 0 | 1 | 2 | 3 | 4 | 5 | 6 | 7 | 8 | 9 | 10 | 15 | 20 | 25 | 30 |
|---|---|---|---|---|---|---|---|---|---|---|---|---|---|---|---|---|---|
| A1 | 4.7 | 22.1 | 0 | 0.5 | 3.6 | 11.0 | 20.7 | 44.7 | 57.7 | 70.4 | 81.9 | 89.1 | 89.8 | 89.6 | 89.7 | 89.9 | 90.3 |
| B1 | 2.7 | 14.1 | 0 | 0.8 | 5.3 | 12.4 | 21.3 | 42.6 | 54.0 | 65.4 | 76.1 | 85.8 | 93.0 | 95.1 | 95.4 | 96.1 | 96.7 |
| C1 | 1.8 | 9.2 | 0 | 1.0 | 5.9 | 13.5 | 22.9 | 44.6 | 56.0 | 66.9 | 76.9 | 85.6 | 92.8 | 98.3 | 98.7 | 99.1 | 99.4 |
| D1 | 7.5 | 23.6 | 0 | 1.2 | 7.4 | 16.7 | 27.7 | 52.1 | 64.3 | 75.5 | 82.9 | 85.8 | 85.9 | 85.3 | 85.3 | 85.4 | 85.7 |
| E1 | 4.4 | 13.8 | 0 | 1.6 | 7.9 | 17.1 | 27.8 | 50.7 | 62.2 | 72.9 | 82.1 | 88.5 | 91.5 | 92.0 | 92.2 | 92.8 | 93.4 |
| F1 | 3.4 | 10.1 | 0 | 1.1 | 7.3 | 17.3 | 29.0 | 53.6 | 65.2 | 75.9 | 84.9 | 91.0 | 94.3 | 96.2 | 96.9 | 97.6 | 98.4 |
| J1 | 16.6 | 25.4 | 0 | 10.3 | 19.9 | 24.2 | 26.6 | 28.5 | 30.2 | 31.5 | 32.7 | 33.9 | 34.8 | 38.3 | 40.5 | 41.8 | 42.8 |
| K1 | 10.5 | 16.1 | 0 | 12.6 | 23.4 | 28.6 | 32.3 | 34.8 | 37.2 | 39.3 | 41.2 | 43.0 | 44.7 | 51.1 | 55.7 | 59.2 | 61.9 |
| L1 | 6.1 | 9.4 | 0 | 12.7 | 23.5 | 29.4 | 33.5 | 36.7 | 39.4 | 42.0 | 44.4 | 47.3 | 49.2 | 57.5 | 64.0 | 69.2 | 74.0 |
| A2 | 4.1 | 21.3 | 0 | 0.2 | 4.0 | 11.1 | 20.2 | 43.7 | 53.5 | 64.7 | 75.1 | 84.1 | 91.3 | 96.6 | 97.1 | 97.7 | 98.1 |
| B2 | 2.4 | 13.6 | 0 | 0.3 | 3.2 | 8.9 | 16.3 | 34.5 | 44.5 | 54.6 | 64.2 | 73.1 | 80.9 | 98.9 | 99.3 | 99.6 | 99.8 |
| C2 | 1.7 | 9.0 | 0 | 0.5 | 3.7 | 9.8 | 17.7 | 36.9 | 47.1 | 56.9 | 66.3 | 74.7 | 81.9 | 99.6 | 99.9 | 99.9 | 100.0 |
| D2 | 6.2 | 23.8 | 0 | 0.6 | 4.3 | 10.5 | 18.2 | 35.5 | 44.7 | 53.9 | 62.8 | 71.2 | 78.9 | 97.0 | 97.2 | 97.6 | 98.0 |
| E2 | 4.2 | 13.6 | 0 | 1.4 | 6.8 | 14.9 | 24.4 | 44.5 | 54.3 | 63.4 | 71.8 | 79.4 | 85.7 | 99.1 | 99.3 | 99.5 | 99.6 |
| F2 | 3.1 | 9.6 | 0 | 1.2 | 6.1 | 14.1 | 23.6 | 44.1 | 54.0 | 63.5 | 71.9 | 79.5 | 85.7 | 99.0 | 99.6 | 99.6 | 99.9 |
| G2 | 30.0 | 40.6 | 0 | 5.8 | 15.4 | 26.3 | 37.5 | 45.6 | 51.9 | 57.0 | 60.8 | 62.2 | 62.7 | 65.0 | 67.2 | 69.0 | 70.9 |
| H2 | 25.1 | 38.9 | 0 | 3.3 | 6.3 | 8.5 | 10.2 | 11.4 | 12.7 | 14.0 | 15.4 | 16.7 | 18.1 | 25.4 | 33.2 | 41.1 | 49.0 |
| J2 | 16.9 | 25.6 | 0 | 13.0 | 25.8 | 37.0 | 45.9 | 51.9 | 56.4 | 59.6 | 62.3 | 64.5 | 66.7 | 75.1 | 80.7 | 84.9 | 88.0 |
| K2 | 11.2 | 15.8 | 0 | 7.0 | 17.4 | 28.6 | 39.2 | 46.7 | 53.7 | 59.4 | 64.0 | 67.3 | 69.1 | 74.3 | 78.2 | 81.6 | 84.1 |
| L2 | 7.8 | 11.1 | 0 | 5.7 | 15.4 | 26.4 | 37.6 | 45.6 | 52.6 | 58.4 | 63.0 | 66.1 | 68.6 | 74.0 | 77.9 | 81.1 | 84.1 | of clearing. The Percent Full Scale transmittance data for the examples described above is given in Table 7. Tuning of the clearing speed and optical properties of the eyehole, as described above, is controlled by the conductivity of the surface 2 and surface 3 electrodes as well as the fraction open area in the surface 3 electrode within the boundaries of the eyehole zone and the selection of a metal trace (area 6620 of FIGS. 66A through 66 E) and open area (area 6610 of FIGS. 66A through 66E) dimensions and geometry. It is therefore preferable that the fraction of open area in the eyehole zone be between 5 and 75 percent. It is more preferable that the fraction of open area in the eyehole zone be between 10 and 60 percent. It is most preferable that the fraction of open area in the eyehole zone be between 15 and 50 percent. It is preferable that the minimum dimension of the metal traces be between 1 and 1000 microns. It is more preferable that the minimum dimension of the metal traces be between 10 and 500 microns. It is most preferable that the minimum dimension of the metal traces be between 20 and 250 microns. It is preferable that the maximum dimension of the openings be between 1 and 1000 microns. It is more preferable that the maximum dimension of the openings be between 10 and 500 microns. It is most preferable that the maximum dimension of the openings be between 20 and 250 microns.

Another approach to making the eyehole less noticeable is to locate at least part of the light sensor behind the peripheral ring of spectral filter material and, correspondingly, the eyehole itself within the area defined by the width of the peripheral ring. In such a configuration, the area where the reflector of the rear substrate of the EC-element is removed to form an eye-hole will be hidden from the viewer by the peripheral ring. This configuration, however, requires the peripheral ring to be sufficiently transmitting in the visible portion of the spectrum so that the light sensor could function properly. It is understood, that sufficient transmittance of a peripheral ring at a wavelength of interest may be achieved by making the ring transflective as well as by ablating a portion of the ring material or depositing the ring with the use of masking means. A transmission level of 3% to about 50% in visible light is preferred in such an application, while in the UV portion of the spectrum the peripheral ring may still be configured to remain opaque for protection of the seal and plug materials.

Similarly, mutual positioning of the light sensor and the associated eye-hole with respect to the seal is also important. For example, if the seal material is essentially opaque in visible light it should not obstruct the light that the sensor detects. On the other hand, if the seal is sufficiently translucent, the sensor can be placed behind the seal area and the associated eye-hole area may overlap with the area occupied by the sealing material. The combination of the seal and the spectral filter material should have an overall visible light transmission of 3% to 50% for the same reasons as described above.

Yet another approach to configuring the eye-hole area is to simply position the light sensor behind a rear substrate with a non-patterned reflector that is sufficiently transmissive (between 3% and 50%) as is. This level of light transmittance can be obtained through the coating directly or with a combination of light passing through the coating and through openings in the coating.

To eliminate the requirement for an eye-hole altogether, the light-glare sensor can be repositioned so that it is not screened from the viewer by the EC-element. This type of construction is known in the art. Often the eyehole is placed in an area just above or below the mirror or anywhere along the periphery. The placement of the light sensor could be in any number of locations including in the mirror mount, in the headliner of the vehicle, near to or attached to the rear window, on the side mirror, or on the rear of the vehicle. The sensor could be a simple photo-optic sensor or a more complex camera or multiple camera system.

Some drivers of vehicles equipped with an automatically dimming mirror may not be aware that they have the dimming mirror or, in some cases, they simply don't know when the device is working. To some automobile manufacturers this reduces the value of the mirror. At times indicator lights have been added to the autodimming mirror to indicate that the device is powered. Still, this indicator light does not demonstrate the function of the device. In self-dimming mirrors comprising a reflective peripheral ring, the darkening of the center of the mirror is highlighted by the contrast to the reflective peripheral ring. Alternatively, configuring the mirror to have an area that does not darken or that darkens or clears at a different rate as compared to the remaining portion of the mirror may also put the user on notice about the operation of the auto-dimming mirror.

Reduction of Width of a Peripheral Ring.

Reduction of width of a peripheral ring may alleviate a problem of residual glare produced by the non-dimming peripheral area of the mirror even when the EC-element of the EC-mirror is activated. If the ring is narrowed, then the total amount of light reflected from it in the direction of the user is reduced. Preferably, the width of the peripheral ring should be less than 4 mm, more preferably less than 3 mm, and most preferably less than 2 mm.

When the peripheral ring as narrow as 2 mm, a portion of the wide seal may become visible from the front of the rearview assembly. The visibility of the seal may be reduced or eliminated if the seal is made of clear epoxy or a sealing material the color and index of refraction of which match those of the EC-medium sufficiently enough to remove the optical interface between the seal and the EC-medium upon wetting. As a result, the "exposed" to viewing portion of the seal will be effectively hidden from view in the "clear" mode of the EC-element. When the EC-element operates in the "dark" mode, the exposed portion of the seal just as the peripheral ring itself will not color or dim, thereby improving the appearance of the mirror element.

Figure 67A:
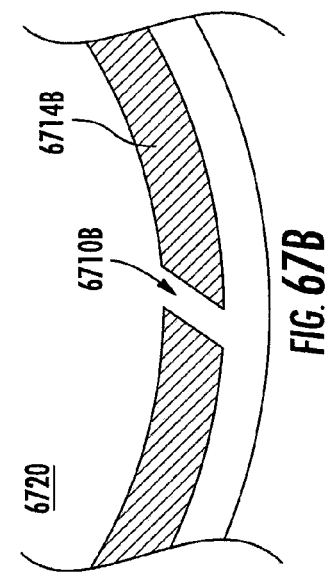
FIG. 67A: electrical contacting modalities.
Figure 67B:
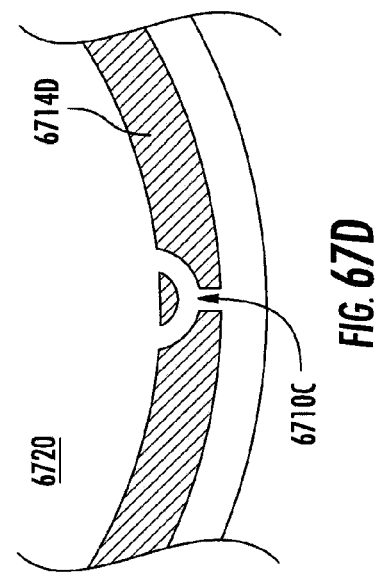
FIGS. 67(A-D) illustrate various modalities pertaining to embodiments of the invention.
Figure 67C:
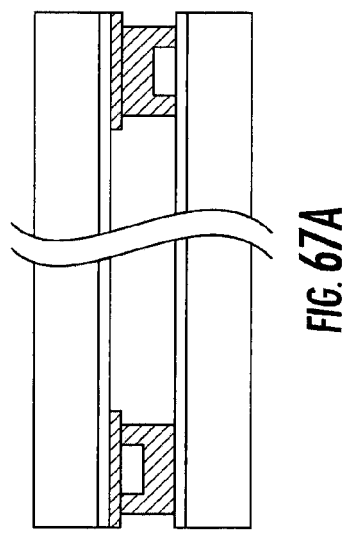
Figure 67D:
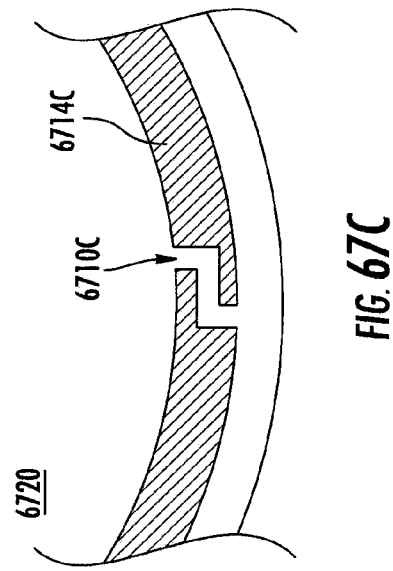

Alternatively, the reduction in width of the ring may require an appropriate reduction of the width of the seal, a dimensions of a plug in the seal, and even dimensions of buss contacts located behind and protected by the ring from UV-exposure, especially in embodiments of an outside rearview mirror. The widths of the seal, buss can be optimized as follows:

1) Keeping the seal width to a minimum required to pass the environmental durability tests;

2) Judiciously selecting conductive buss materials possessing such properties (of adhesion, low gas permeation, and others) that would the buss to either function as part of the seal or to simultaneously function as the buss and the seal. (Also, see, e.g., a discussion of element 852 in reference to FIGS. 22, 24);

3) Use electrical contacting modalities and methods that allow for incorporation of the electrical contacts within or under the seal (nanoparticle inks based on silver, nickel, copper; patterned metallic traces formed by metal deposition such as from metallo- organic systems, electroplating, or electroless plating; wire bonding of gold or aluminum wires or ribbons, as schematically shown in FIG. 67A);

4) Positioning the buss conductor primarily on the edge surface of the mirror element;

5) Optimizing or eliminating at least one of transverse offsets between the substrates of the EC-element thereby providing for extending position of the seal towards the outside edge of the peripheral ring.

The plug area can be optimized as follows:

1) Assuring that the size of the plug opening is no greater than the width of the seal, thereby enabling a controlled injection of a reduced amount of plug material;

2) Appropriately shaping a plug opening 6710*b*, 6710*c*, 6710*d* to assure that one dimension of the plug is greater than the width 6712*b*, 6712*c*, 6712*d* of the seal 6714*b*, 6714*c*, 6714*d* as shown in top view of a substrate 6720 of an EC-element in FIGS. 67(B-D);

3) Adhering a low-gas-permeability thin metal foil, plastic foil, or glass/ceramic, or adhesive along the edge surface of the EC-element or soldering metal to the edge surface to cover the fill-port opening. (Also, see, e.g., discussion in reference to FIGS. 25, 27).

Rounded Ground Edge for Internal EC-Mirrors.

European regulations of automotive design require that a non-recessed hard edge of any element have a radius of at least 2.5 mm, as a safety measure. In response to such a requirement, a non-recessed perimeter edge of an inside automotive mirror may be covered with an appropriate bezel (and multiple embodiments of a combination of a bezel with a mirror element have been discussed in this application, e.g., in reference to FIGS. 42-54 and 58, 59). To satisfy the European regulations, a front lip of a bezel extending over the perimeter edge of the mirror element is designed with an outer radius of at least 2.5 mm. As further discussed in this application, a mirrors that has an about 5-mm-wide peripheral ring covering the seal from exposure to light (such as chrome ring mirrors, for example) may have no bezel extending out onto the first surface of the mirror. For aesthetic reasons it is often desirable to either not have a perimeter bezel or have a bezel with a lip that surrounds the perimeter edge of the mirror and is substantially leveled with the front mirror element. If the bezel must meet the European edge design requirements and it is flush with the front surface of the mirror, the bezel must be configured to have an at least 2.5 mm radius curvature, which means that the overall transverse dimensions of the rearview assembly as viewed from the front of it are at least 5 mm larger than the transverse dimensions of the mirror element. Neither this rounded bezel nor a peripheral ring contributes to the auto-dimming reflective portion of the mirror and, together, the rounded bezel and the ring add an at least 7.5 mm wide non-dimmable ring around the mirror element. Moreover, the addition of a wide bezel also detracts from the sleek appearance of the mirror assembly.

Figure 68:
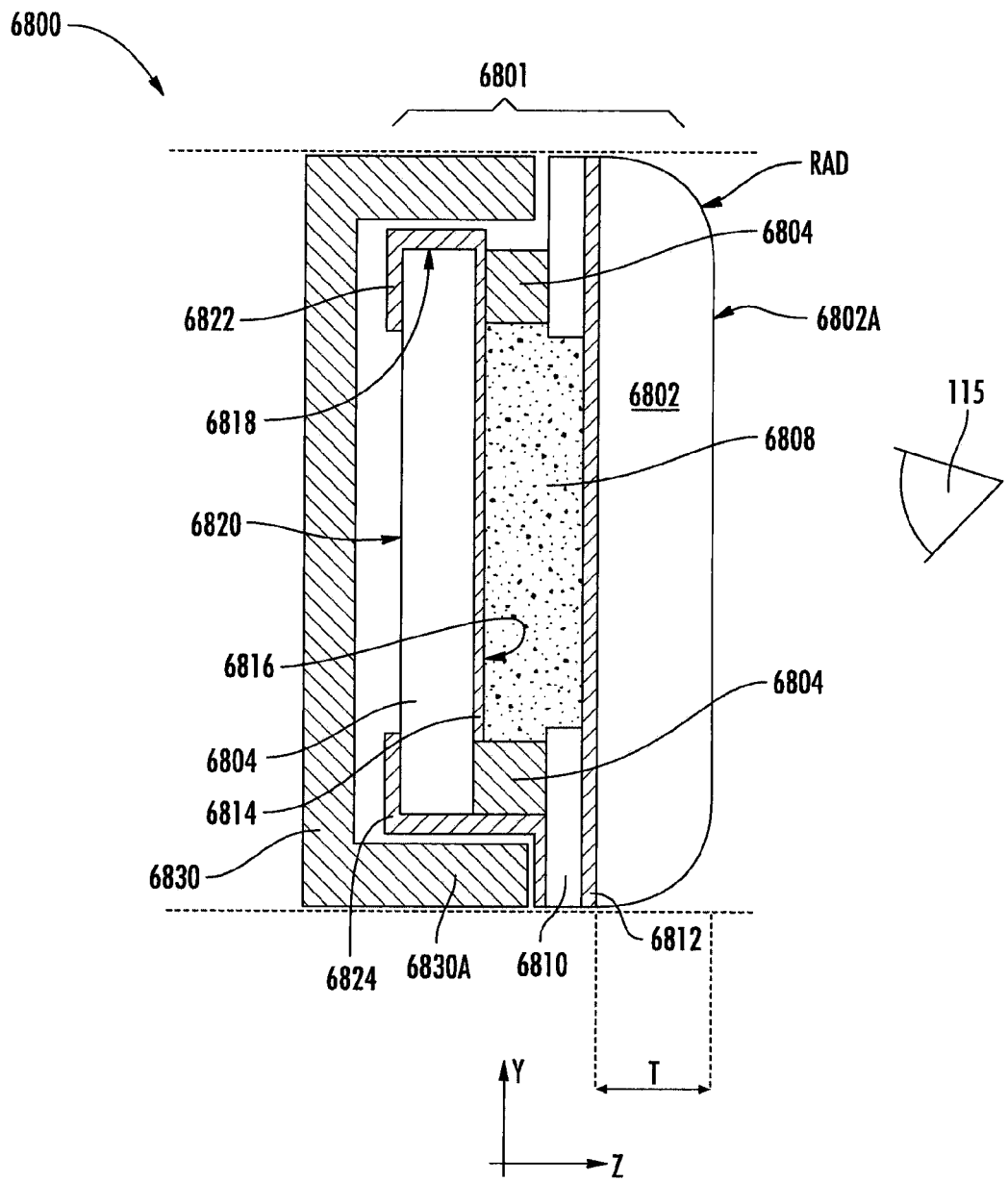
FIG. 68 shows a bezel-less embodiment having an EC-element based mirror system with a rounded edge.

One bezel-less embodiment 6800 meeting the European edge requirement and providing for a durable edge of the mirror is schematically illustrated in FIG. 68. As shown, a mirror element 6801 includes a front substrate 6802 having a thickness of t≥2.5 mm and a rear substrate 6804 that are positioned in spaced-apart and parallel relationship with respect to one another, a seal 6806 disposed around the perimeter of the element 6801 so as to sealably bond the front and rear substrates 6802, 6804 and to form a cavity 6808 therebetween. A peripheral portion of the front substrate 6802 is configured by, e.g., grinding to form a curvature, around the front edge of the front surface 6802a, with a radius Rad=2.5 mm or bigger. The rear substrate 6804 is smaller than the front substrate 6802 and is transversely offset with respect to the front substrate 6802 along most of the perimeter of the mirror element 6801. As shown, a peripheral ring 6810 is disposed circumferentially in a peripheral area of the second surface of the element 6801 on top of a transparent TCO-electrode 6812 in such a fashion as to block visible and/or UV light incident onto the first surface 6802a from illuminating the seal 6804. (It is appreciated, however, that in a related embodiment the TCO-electrode can be deposited on top of the peripheral ring, instead.) A generally multi-layer thin-film stack 6814, disposed on a third surface 6816, includes at least one electrically conductive layer that is electrically extended over an edge surface 6818 of the rear substrate 6804 to the back of the element 6801 (as shown, a fourth surface 6820) through a conductive section 6822. In a specific embodiment, a multi-layer thin-film stack may be a reflective electrode at least one electrically conductive layer of which is configured to be in electrically communication with the back of the mirror element. Another buss connection, 6824, provides for an electrical communication between the transparent electrode 6812 and the fourth surface 6820. This recessed back substrate design would provide for uninterrupted electrical contact from the back of the embodiment to the front and/or rear electrode(s). The mirror-holding system could be designed such that the mirror element 6801 is supported by a carrier 6830 having a judiciously formatted perimeter lip or wall 6830A that is flush with an edge of the front glass substrate 6802 and that covers the perimeter edge 6818 of the second glass substrate 6804 hiding it from view. A ground or frosted appearance on all visible glass edges is aesthetically preferred.

It would be appreciated that the use of a front substrate 6804 that is at least 2.5 mm thick will increase the overall weight of the mirror element 6801. Using glass plate that is 2.2 mm or less in thickness is preferred. Using glass plate that is 1.6 mm thick or thinner is most preferred. In such preferred cases of thinner substrates, the edge surface of the overall mirror element could be rounded to a radius of at least 2.5 mm to meet European specifications. It will be understood that this approach results in making either one of the electrodes or a clip, providing for electrical communications between the electrodes and the back of the mirror element, visible from the front of the mirror element.

One solution to this problem, in reference to FIG. 69A, is to configure the second substrate 6904 of the mirror element 6906 with a recess or indentation 6908 in which an electrical buss (clip of electrically conductive section) is fit over the edge surface of the rear substrate 6904. FIG. 69B demonstrates a front view of a stack of the first substrate 6910 and the second substrate 6904. FIG. 69C schematically shows the rounded profile added to the edge surface of an assembled mirror element in the area of the recess 6908. As shown, post assembly, the recessed area 6908 of the substrate 6904 can be filled with a material 6912 that simulates the look of ground glass, such as a UV-curable acrylic resin filled with glass flakes. The assembled mirror element is then shaped to a rounded profile, Rad, as described above, around a perimeter of the mirror element.

Rounded Carrier/Bezel Edge.

Alternative solutions addressing the European requirements of safety may be based on configuring a frame of the mirror without a lip extending onto the first surface of the mirror and with a rounded edge. Further to the discussion presented in reference to FIG. 39, aesthetic requirements currently dictating a color match between the rearview assembly and a vehicular dash board would be met if the mirror frame had a metallic appearance. Several embodiments implementing such solutions are schematically shown in FIGS. 70-72.

Figure 70A:
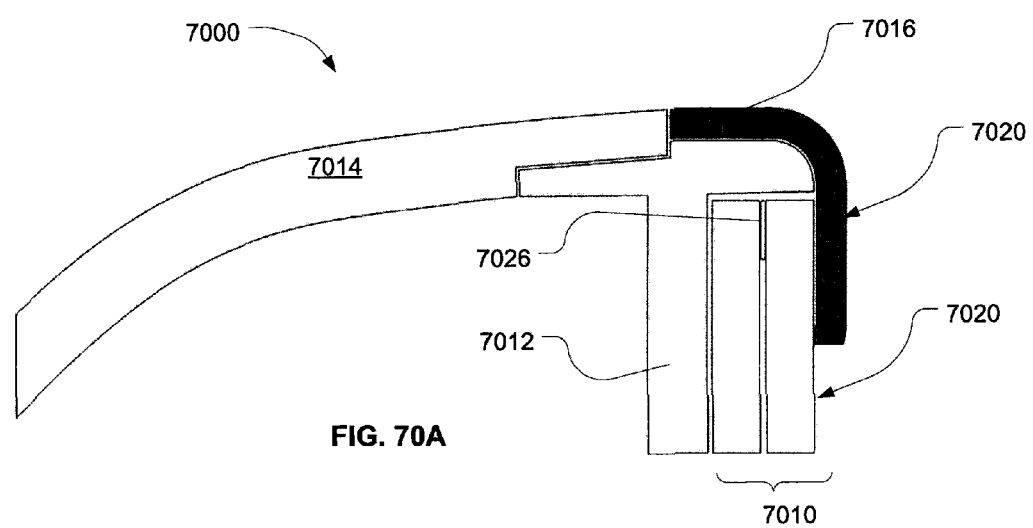
FIGS. 70(A,B), 71(A-C), 72(A-C) show embodiments of invention having a lipless frame of the mirror system.
Figure 70B:
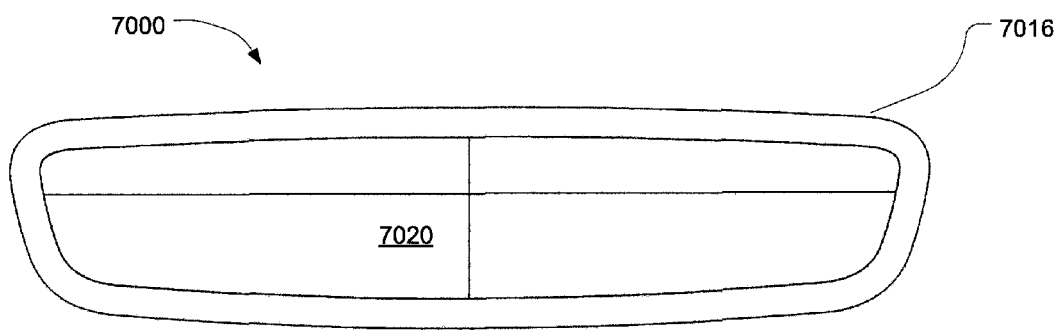

As shown in a partial side view and a front view in FIGS. 70(A, B), an embodiment 7000 of a multi-piece frame construction of the mirror element 7010 of the invention includes a carrier 7012 supporting the mirror element 7010 and attached to a housing 7014 and a bezel 7016 stamped of metal and attached to the carrier 7012 with adhesive. In a related embodiment, the metallic bezel 7016 may be snapped or insert-molded into the carrier 7012. As shown, the embodiment of the bezel 7016 has a front lip 7018 extending over the first surface 7020 of the mirror element 7010. In a specific embodiment, the bezel 7016 may be molded out of plastic and plated with metal. It is appreciated that, generally, no peripheral ring is required within the mirror element 7010 because a seal 7026 of the mirror element is protected from light exposure by the lip 7018.

Figure 71A:
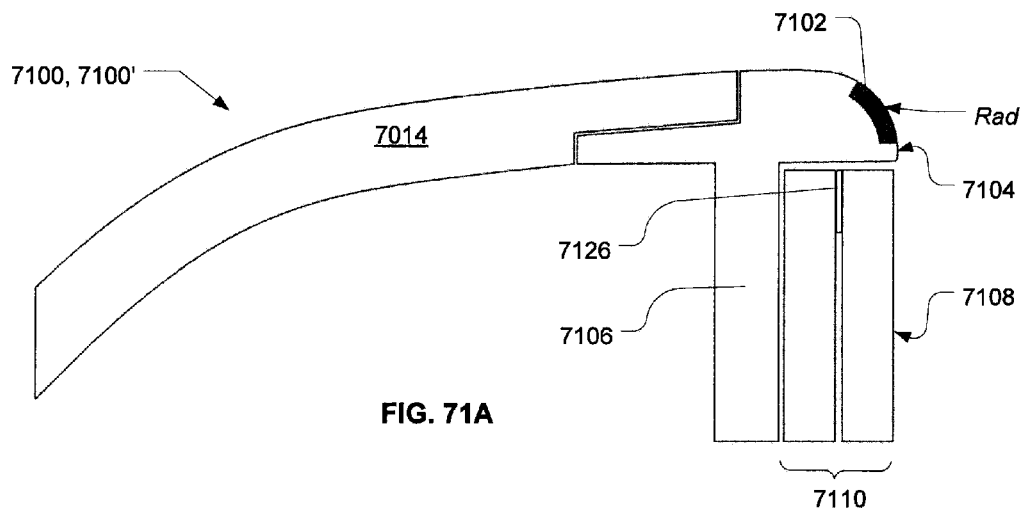
Figure 71B:
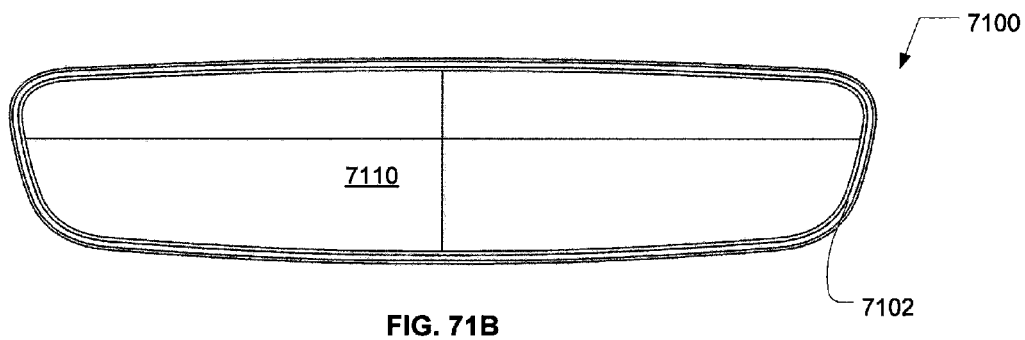
Figure 71C:
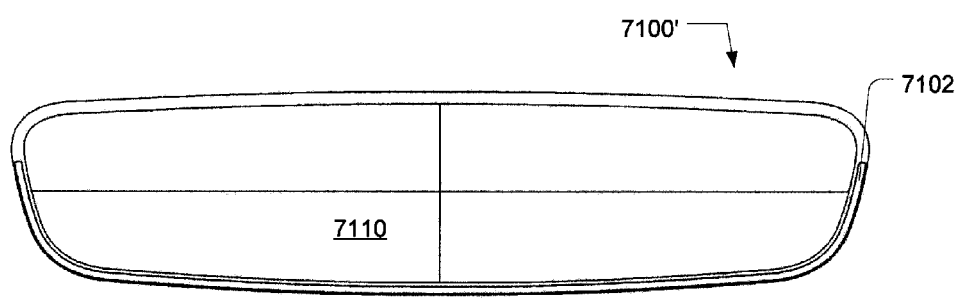

A partial side view and two different front views of an alternative bezel-less embodiment 7100, 7100' of a mirror frame are presented in FIGS. 71(A-C). As shown, a decorative inlay 7102 is inserted into a front surface 7104 of a carrier 7106 having a rounded bound, Rad≥2.5 mm, that levels the front surface 7104 with the first surface 7108 of the mirror element 7110. In this configuration, the frame 7100 does not obstruct the front surface of the mirror element. The decorative inlay 7102 may be stamped of metal or extruded from plastic and plated with metal, and attached to the carrier 7106 with adhesive, by snapping, or insert molding. It is appreciated that, to be used with this embodiment of the frame, the mirror element should incorporate a peripheral ring (not shown) to protect a seal 7126 from exposure to light. The front views of FIGS. 71B and 71C illustrate, respectively, that the inlay 7102 may or may not be present around the entire perimeter of the mirror element 7110.

Figure 72A:
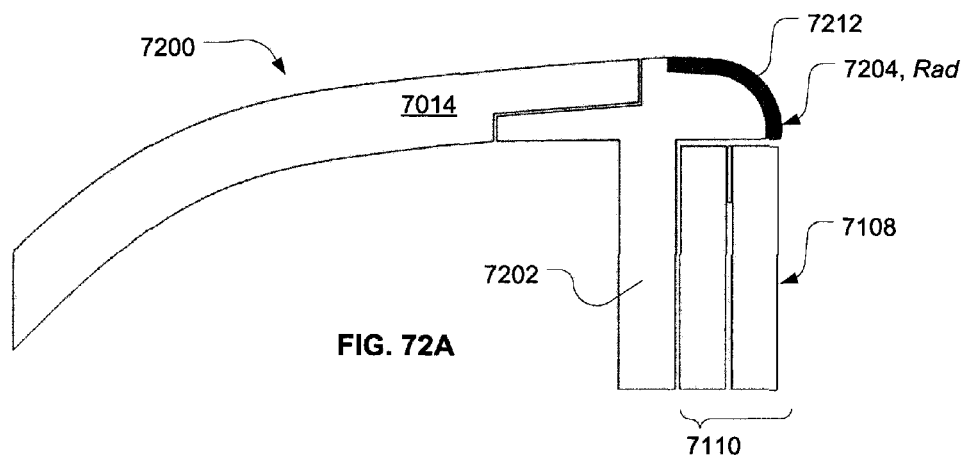
Figure 72B:
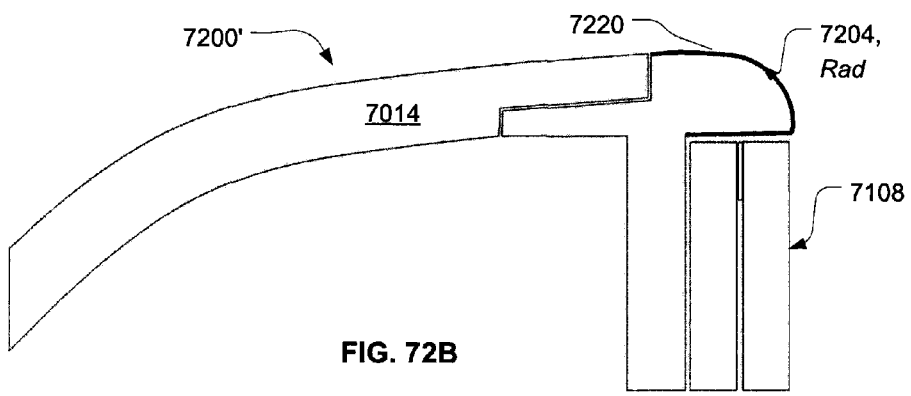
Figure 72C:
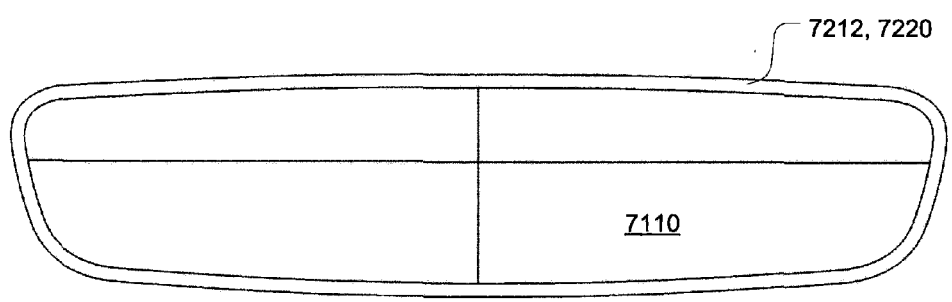

FIGS. 72(A-C) show, in side views and in front view, two more alternative bezel-less embodiments 7200, 7200' satisfying the European safety and aesthetic requirements. As shown in a multi-piece embodiment 7200, a carrier plate 7202 has a front surface 7204 rounded with a radius Rad≥2.5 mm and leveled with the front surface 7108 of the mirror element 7110. A decorative insert 7212 of the embodiment 7200 is similar to the insert 7102 if the embodiment 7100, but extends further towards the housing 7014 of the assembly thereby providing for an uninterrupted metallic appearance of the frame in the front view, FIG. 72C. A specific single-piece embodiment 7200' of FIG. 72B provides for metal-plating, painting, pad-printing or hydrographic decorating 7220 of the front surface of the carrier 7202 to assure the metallic appearance in a front view of FIG. 72C.

User Interface.

As was discussed in reference to FIGS. 4 and 61-64, various operator interface elements including buttons have been conventionally positioned in a housing or a mounting element that wraps around the edge surface of the mirror system (such as a bezel with a lip extending onto the first surface). To accommodate the interface modalities, the mounting element has to possess sufficient width. For example, a chin of the bezel containing buttons and switches of the user interface typically has to be wider than the remaining portion of the bezel including a lip that extends onto the first surface of the mirror system. Some practical systems, e.g., employ a bezel with a chin portion that may be as wide as 20 mm. Incorporating of the user-interface components into such wide mounting element causes several problems. Firstly, the presence of a mounting element with mirror having a surface of a given size increases the overall width of the rearview assembly by the width of the mounting element, thereby blocking the front view of the road to such a degree that a driver may experience discomfort. Secondly, a risk of misplacing or tilting the rearview assembly when pressing a mechanical user-interface button positioned near the edge of the assembly, in the chin of the mounting element, is increased, which causes the driver to restore the rear field of view by manually re-adjusting the assembly. Understandably, this re-adjustment may be a source of distraction to a driver. In addition, disposing movable parts such as buttons within the mounting element without additional precautions is recognized to increase the level of noise such as rattling or squeaking, which may reduce the driver's comfort on the road.

The first of the abovementioned problems, related to increasing the effective area of the mirror system perceivable by the user without necessarily increasing the overall size of the rearview assembly, has been already discussed in this application. Solutions proposed herein include the use of a lip-less bezel (or a bezel with reduced width, or no bezel at all) in combination with the use of a peripheral ring the visual appearance of which satisfies the auto-manufacturer's requirements (e.g., substantially matches the appearance of the central portion of the mirror, both in terms of color and irradiance of reflected light; or has a different aesthetics and/or provides a multi-band appearance). Such "reduced bezel approach", however, begs a question of how to re-configure the mirror system in order to not sacrifice any of the interface and/or indicator modalities that have been conventionally housed within the wide portion of the mounting element of the mirror.

Embodiments of a user interface of a rearview assembly addressing this question and discussed below can be enabled in combination with any embodiment of the rearview assembly including that employing a prismatic element; or that employing a peripheral ring; and with any configuration of the mounting element (bezel, carrier, housing) discussed elsewhere in this application, in particular with those discussed in reference to FIGS. 42-54 and 58, 59, 68-72. In particular, references made specifically to EC-elements are made for convenience and illustration purposes only: the scope of invention also includes rearview assemblies employing prismatic elements even if no corresponding drawings are provided.

According to embodiments discussed below, elements of user interface include various functional elements such as switches, sensors, and other actuators of the rearview assembly that may be operated with no mechanical activation. Such switching elements or sensors are activated by a user input that may include placing a driver's finger in close proximity to the switching element or sensor. Alternatively, the functional element is activated when the user slightly touches on a component of the functional element such as, for example, a conductive pad. In response to such user input, the switching element activates, triggers, or switches one of auxiliary devices that are located inside the assembly and that may exchange visual or audio information with the user. For example, an auxiliary device may be a display that forms an image to be observed by the user through the mirror element of the assembly. In another example, an auxiliary device may include a voice activated system that will await for an audio input from the user to perform a required operation. Although sensing solutions have been implemented in different arts, the inventors are not aware of any such application in automotive rearview assemblies. Relevant art does not appear to consider the use of non-mechanical sensing components in vehicular rearview assembly. Indicia of non-obviousness of use of currently existing non-mechanical sensing solutions in rearview assemblies include high cost of the sensors, limited sensitivity ranges that are below the level required to recognize the presence of a driver's hand wearing a glove, and susceptibility to false triggering.

In addition or alternatively, proposed implementations of the user interface facilitate reduction of size or, in specific embodiments, even elimination of a rim-like portion of the mounting element conventionally extending around the edge surface of the mirror system of the invention. Embodiments of the user interface of the invention include an optical switch, a capacitive on-glass switch, a capacitive through-glass switch, a capacitive in-glass switch, a capacitive glass-edge switch, a capacitive through-bezel switch, a capacitive conductive bezel switch, a conventional capacitive or a resistive touch-screen-based switch, or a waveguide-based sensor. According to the embodiments discussed below, either positioning the user's finger in proximity of a sensor or a switch of an embodiment or a gentle touch on a sensing pad located adjacent to the surface of the mirror system induces the rearview assembly to activate a required function such as, e.g., illumination of a portion of a display, or dimming or clearing of an electro-optic element of the assembly. Because the operation of the user-interface embodiments of the invention may include touching an area of the first surface of the mirror element, this surface may be appropriately treated with a finger-print dissipating coating such as the Opcuity film provided by Uni-Pixel Inc. (Clear View™). If an input area is configured outside of the primary reflective area of the mirror, a matte finish may be used to resist fingerprints.

In describing embodiments of a non-mechanically activated user interface of the invention, references are made to a legend, or indicia, corresponding to a particular sensor, or a switch, or an actuator. In this context, a legend/indicia refers to a physical marking or an indication, disposed on one of the surfaces of an embodiment in such a fashion as to be perceived to correspond to a given sensor, that provides identification of the given sensor and its function to the user activating this sensor. Generally, a legend or its equivalents may be configured in an opaque, transflective or translucent layer deposited on or inserted into a surface (by, e.g., masking out a portion of the layer during deposition or by pre-molding an inlay that is further implanted into a component) to form a required graphical or textual identifier that is appropriately made visible to the user. For example, as will be discussed below, a legend may be configured in an overlay patch disposed on a first surface of the mirror system or on a mounting element; in a thin-film stack of either the second or third surfaces of the mirror system; or in a surface of the mounting element that is visually accessible by the user. According to present embodiments, the most common way of causing a legend to be visible is to highlight the legend with a source of light located behind the legend with respect to the user. It is understood that even when only a particular implementation of a legend is referred to in a description of an embodiment, other appropriate implementations are considered to be within the scope of the invention and are implied.

Optical-switch-based embodiments of the user interface may include at least one of a line-of-sight sensor (interrupter) and a reflective sensor. FIGS. 73(A-C), for example, illustrate an optical interrupter that is employed in an interface of an embodiment 7300 of the rearview assembly and that includes an IR photodiode and an LED pair (although multiple pairs may be present, corresponding to multiple interrupters). A shown, an emitter 7302 and a receiver (detector) 7304 form a line-of-sight sensor and are respectively disposed in opposing (as shown, top and bottom) portions of a mounting element 7310 that surrounds an edge surface 7312a mirror element 7314 and slightly protrudes over a first surface 7314a toward an outside portion of the rearview assembly. In one embodiment, the mounting element 7310 may be either a bezel or a carrier of the mirror system supporting the system in the assembly. When the user interrupts an optical connection established between the emitter and detector and shown with an arrow (optical path) 7320 in FIG. 73B by placing a finger across this optical path, the detector is caused to lose the reception of optical signal, which in turn triggers the sensor's response to this user input. To increase a signal-to-noise ratio of the embodiment and to reduce or reject signal interference from ambient lighting, the operation of the emitter 7302 may be modulated at a high frequency allowing the detector 7304 to be AC-coupled.

A rearview assembly function to be initiated by the user input through activation of the line-of-sight sensor 7302, 7304 may be indicated with a use of a graphic- or text-based legend 7322 associated with a display of the rearview assembly and located, e.g., within the boundaries of the mounting element 7310 on the first surface 7314a of the mirror element 7314. (It is appreciated that, in a related embodiment, when the rearview assembly contains transflective coatings such legend may be appropriately formatted in a coating disposed on either a second or a third surface, e.g., by judiciously masking a legend portion of the coating during the deposition process). In a specific embodiment, the legend 7322 may be made visible by backlighting when required. Backlighting of the legend may be provided by a simple LED, optionally with appropriate masking, or with the use of an illuminated LCD or an OLED-display from behind the element 7314. Alternatively, the legend may be incorporated in the assembly as a permanently visible graphic.

In one embodiment, the optical communication 7320 between the emitter and detector of a line-of-sight sensor of the embodiment 7300 is established through optical windows (not shown) covering the emitter and detector. Such windows may be fabricated from IR-grade transparent or translucent plastics that in the visible portion of the spectrum are perceived as being almost black and, therefore, may be color-matched with the dark mounting element 7310 to disguise the sensor areas. In a specific embodiment, the emitter/detector pair(s) may also be mounted in the mounting element in such a way as to provide a small gap near the glass that is covered in front by IR-light-transmitting plastic. Alternatively, as shown in FIG. 73C, the detector 7304' may be disposed in the back of the mirror system 7314 and light pipes 7326 may be configured to deliver IR-light 7320 to the detector 7304'. Similarly, in a related embodiment (not shown), the emitter 7302 may be disposed in the back of the mirror system, delivering light towards the front of the mirror system via another light pipe. Optionally, the hard edge of the mounting element 7310 may be rounded, preferably with a radius Rad of at least 2.5 mm, as illustrated in FIG. 73C and discussed in reference to FIGS. 70-72.

Figure 73A:
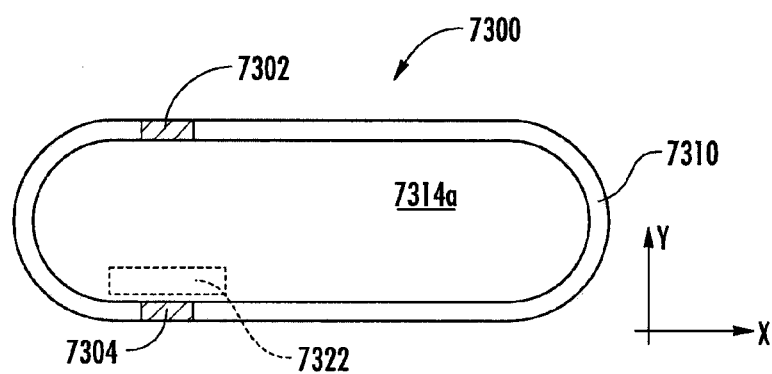
FIGS. 73(A-C) illustrate embodiments with a user interface including an optical interrupter.
Figure 73B:
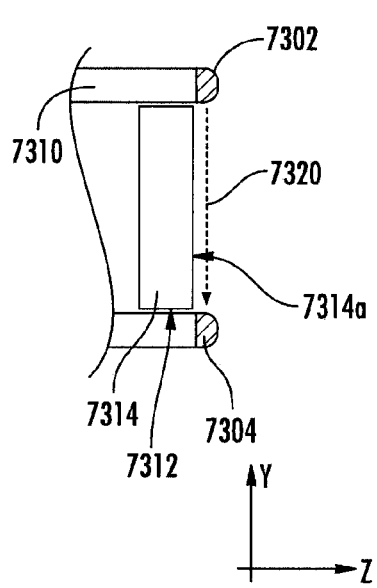
Figure 73C:
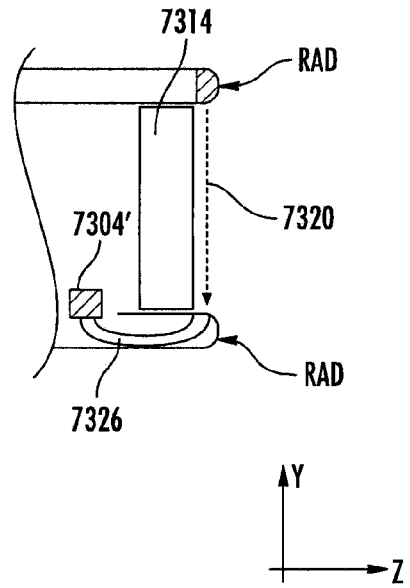
Figure 74:
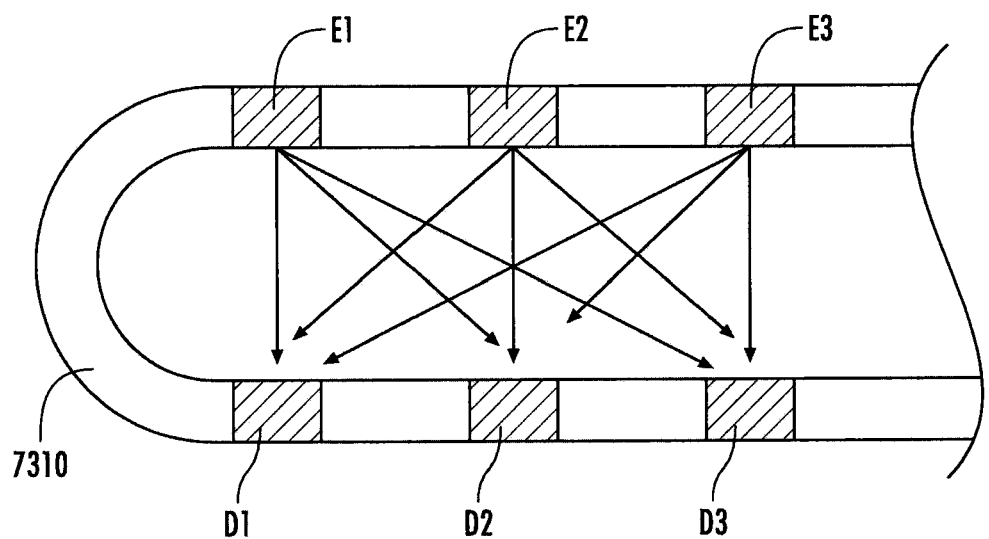
FIG. 74 schematically shows an embodiment with a user interface having three line-of-sight sensors.

Although only a single emitter/detector pair is shown in FIG. 73A, generally a plurality of such pairs may be employed. To this end, FIG. 74 schematically illustrates a specific embodiment including 3 line-of-sight sensors (3 pairs of emitters/detectors (E1, D1), (E2, D2), and (E3, D3)). In such a multi-sensor case, a process of identification of which line-of-sight among those connecting the emitters and the detector is interrupted by the user may be facilitated by operating the emitters E1, E2, and E3 in an alternating fashion. In one embodiment, the emitters are turned "on" one at a time. Once a given emitter is switched "on", all receivers are tested for signal. Based on which light path is blocked by the user's finger, six operational modes can be identified, as shown in Table 8 corresponding to the embodiment of FIG. 74. These modes allow the electronic circuitry of the rearview assembly system to decide which light-path connecting which pair of the emitter/detector has been blocked by a user (based on, e.g., a look-up table) and, consequently, to activate a corresponding function of the rearview assembly:

TABLE 8

| Emitter/Detector (0 = blocked, 1 = signal) | | | | | | | | | |
|---|---|---|---|---|---|---|---|---|---|
| E1/D1 | E1/D2 | E1/D3 | E2/D1 | E2/D2 | E2/D3 | E3/D1 | E3/D2 | E3/D3 | Zone |
| 0 | 0 | 0 | 1 | 1 | 1 | 1 | 1 | 1 | 1 |
| 1 | 1 | 1 | 0 | 0 | 0 | 1 | 1 | 1 | 2 |
| 1 | 1 | 1 | 1 | 1 | 1 | 0 | 0 | 0 | 3 |
| 0 | 1 | 1 | 0 | 1 | 1 | 0 | 1 | 1 | 4 |
| 1 | 0 | 1 | 1 | 0 | 1 | 1 | 0 | 1 | 5 |
| 1 | 1 | 0 | 1 | 1 | 0 | 1 | 1 | 0 | 6 |

An indicia or legend employed with this embodiment may be dynamic and configured to be perceived as located on a surface of the mirror element. For example, a legend may be formatted as an options menu that is not highlighted from behind (not visible to the user) during normal operation of the rearview assembly. However, activation of a user interface by any user input triggers highlighting of the indicia. The highlighting of the indicia may also be enabled automatically at vehicle ignition on. In various embodiments, the indicia is configured with a bitmapped display, or with a segmented displays or with masked backlit regions. Additionally, information contained in the legend may also be expressed through brightness of a legend-highlight or color (e.g., green or bright to indicate that a function is enabled and red or dim to indicate that a function is disabled).

Figure 75:
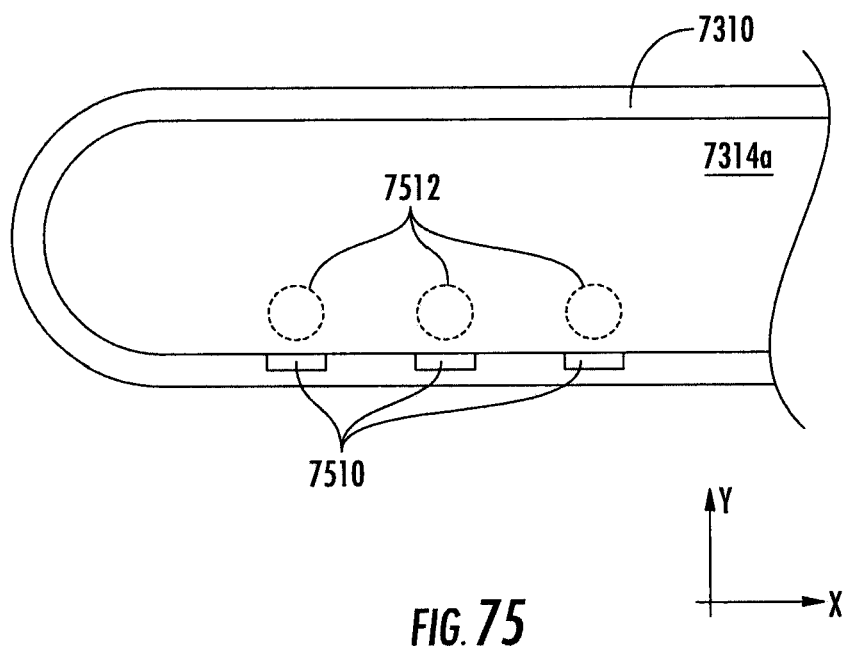
FIG. 75 illustrates an embodiment with a user interface employing an optical reflective sensor.

An embodiment of user interface of the invention employing optical reflective sensors operating in, e.g., IR-light is schematically shown in FIG. 75. As shown, the emitters and detectors of the "reflective" embodiments are disposed on the same side of the mirror element, side-by-side. A group 7510 of emitters disposed in the mounting element 7310 of the assembly, while a group of detectors is positioned at a back portion of the mirror element 7314 so as to be aligned with eye-hole openings 7512. The sensor system of either embodiment is then triggered when light emitted by an emitter reflects from the user's finger and is detected by a detector of the group through an eye-hole opening. The use of a visible-light reflective sensor instead of the IR-light-based sensor may provide an additional advantage of illuminating an area of interest for the user. In such an embodiment, operation of the emitter may also be modulated at a high frequency to increase a signal-to-noise ratio and reject interference due to ambient light. To minimize direct coupling of light from the emitter to the detector in the absence of the triggering action by the user, an appropriate optical blocking barrier (not shown) may be disposed between the emitter and the detector. A legend (not shown) can be combined with an optical opening (e.g., overlaid upon it or be formed in one of the thin-film coatings that are internal to the EC-cell, as discussed above) to convey the information about the purpose of a switch to the user.

Figure 76:
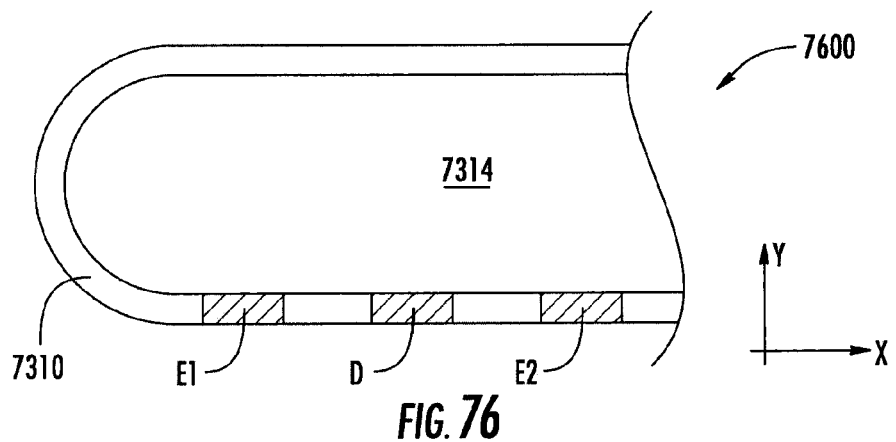
FIG. 76 illustrates an alternative embodiment with a user interface employing an optical reflective sensor.

FIG. 76 illustrates an alternative embodiment 7600 operating in a reflective mode that, in addition to detecting the user input, is capable of providing positional information in a touch-type sensor application with the use in a vehicular rearview assembly. As shown, a pair of IR emitters E1, E2 is used in conjunction with a single receiver D disposed between the emitters. It is understood that lines-of-sight corresponding to the optical devices E1, E2, and D are directed along the first surface 7314a of the mirror element 7314. In operation, the emitters are alternately enabled, and the user establishes optical connections between the emitters and a detector by placing a finger ("reflector") in a proximity of the detectors thereby reflecting portions of light, emanating from each of the emitters, towards the detector. Resulting optical signals are measured by the photodiode D. The ratio of the signals associated with the emitters provides the system with positional information about a location of the "reflector" (i.e., left or right with respect to the detector D). The sum of the two signals provides vertical position information. As a result, a rearview assembly employing the embodiment 7600 is capable of sensing and spatially resolving multiple positions, across the surface of the mirror element, at which the user communicates with the user interface of the assembly. At these positions, virtual "touching pads" of a touch-screen sensor or switch may be deployed. A legend for such a sensor can be provided in a fashion similar to that described in reference to FIG. 74. In a specific embodiment, a touch-sensor system such as that provided by the QuickSense product line of the Silicon Labs (Austin, Tex.; www.siliconlabs.com) can be used. Because the described system can resolve both X and Y positional information, multiple user-interface options are enabled. In one embodiment, virtual touch pads are configured with the use of a programmable LCD or OLED-display located behind the mirror element. Pressing these virtual touch pads causes the activation of corresponding functions. The X/Y position information can also be used to control a cursor, similar to that of a personal computer. Tapping or pressing various regions of the display would act like a mouse click on a computer. Dragging a finger across the display surface can also act like a 'drag' function, and is useful for actions such as scrolling a map in a navigation display, or to switch between menu pages.

Capacitive sensors that detect finger pressure applied to a particular sensing pad are generally known. Various capacitive sensors are available from the Silicon Labs, TouchSensor (Wheaton, Ill.; www.touchsensor.com), AlSentis (Holland, Mich.; www.alsentis.com), and Microchip (Chandler, Ariz.; www.microchip.com). Some of capacitive sensors operate on the basis of a field effect and are structured to include a conductive sensor area surrounded with a conducting ring. Capacitive coupling between these two conductors is increased when the user places his finger in close proximity.

Figures 77A, 77B:
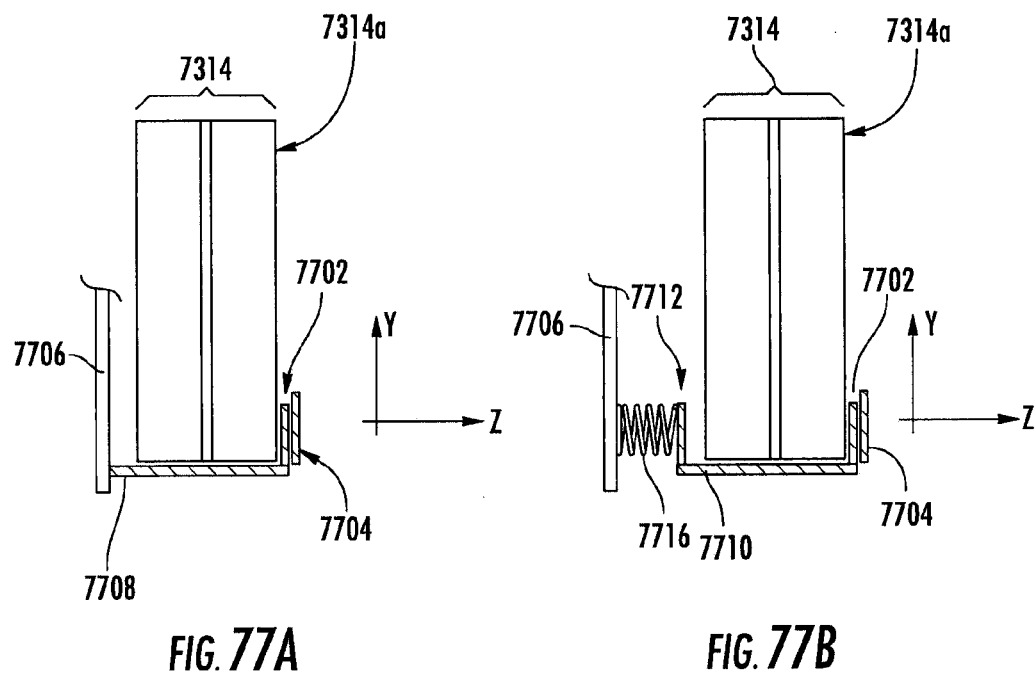
FIGS. 77(A, B) show embodiments employing a user interface having an "on-glass" type of capacitive sensor.

According to an alternative embodiment of the present invention, a capacitive sensor of the user interface of the rearview assembly is configured in an "on-glass" fashion and has a sensing area, on the first surface of the mirror element, that is in electrical communication with an electronic circuit board disposed at the back of the assembly. (If multiple sensing areas are present, these areas are electrically isolated from each other). As shown in a cross-sectional view of in FIGS. 77(A, B), a layer of electrically-conductive material 7702 forming a front sensing area (or front sensing pad) is disposed on the first surface 7314a of the mirror element 7314. The front conductive pad 7702 is electrically extended through a connector 7708 to the back of the mirror element. In one embodiment, FIG. 77A, such electrical extension assures a direct electrical connection with control electronics on a PCB 7706, in which case the connector 7708 may be a pin. An alternative embodiment shown in FIG. 77B employs an electrically-conductive bridge 7710, fabricated of metal or carbon-loaded ink, between the front conductive pad 7702 and a back conductive pad 7712 positioned at the back of the mirror element 7314 (on the fourth surface of the mirror element or on a different element in the back of the mirror). The back contact area 7712 can then be further connected to the PCB 7706 by a spring contact or other well-known contacting means 7716. In a specific embodiment, a conductive elastomer may be used instead of the spring contact. It has been unexpectedly discovered that configuring the back conductive pad 7712 to have a smaller lateral extent than that of the front conductive pad 7702 facilitates the increase of signal-to-noise ratio of operating sensor by reducing offset capacitance to the ground of the system. Therefore, in a preferred embodiment the back conductive pad has a smaller lateral extent as compared to the front conductive pad.

An alternative version of the front-to-back electrical connection of a capacitive sensor may use a conductive adhesive tape or a flex circuit leading from the first surface to the controlling PCB. The top surface of the flex circuit could also include the indicia, finger print resistant coatings, a metallic or reflective cosmetic layer, and an insulating layer (such as a non-conductive layer 7704) reducing a static spark during the operation of the embodiment and increasing the electrostatic discharge (ESD) tolerance of the system.

Suitable top conductive areas or pads may be produced by metallic coatings manufactured with electroplating, vacuum deposition, or adhesive-based conductors, metallic or carbon based conductive inks. The electrically-conductive coatings may employ copper nickel, stainless steel, or transparent coatings such as ITO. Non-transparent coatings can be patterned in a way such as to allow light form a backlight to pass through and illuminate the top cosmetic overlay 7704 or a legend (not shown) that may include information indicia for the convenience of the user. In the alternative, the conductive pad 7702 itself may be patterned and used as a legend for the corresponding switch. If desired, conductors such as carbon ink can be used as an underlayment color for a legend on the first surface of the mirror element. It is appreciated that the hard edge of the mounting element (if present) may be rounded, preferably with a radius Rad of at least 2.5 mm, as discussed in reference to FIGS. 70-72. Alternatively, if embodiments of FIGS. 77(A,B) are configured to be bezel-less, the front glass component may be appropriately rounded in a fashion similar to that discussed in reference to FIG. 68.

Figure 78A:
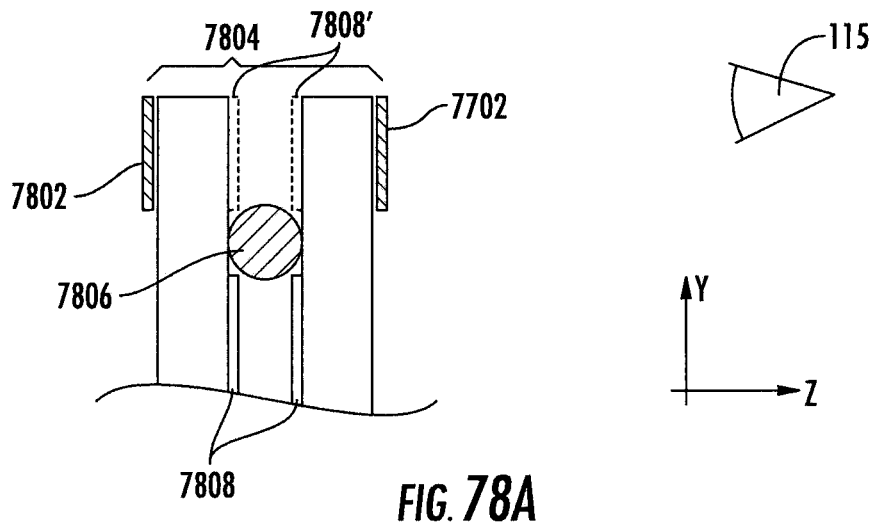
FIGS. 78(A-C) show embodiments employing a user interface having a "through-glass" type of capacitive sensor.
Figure 78B:
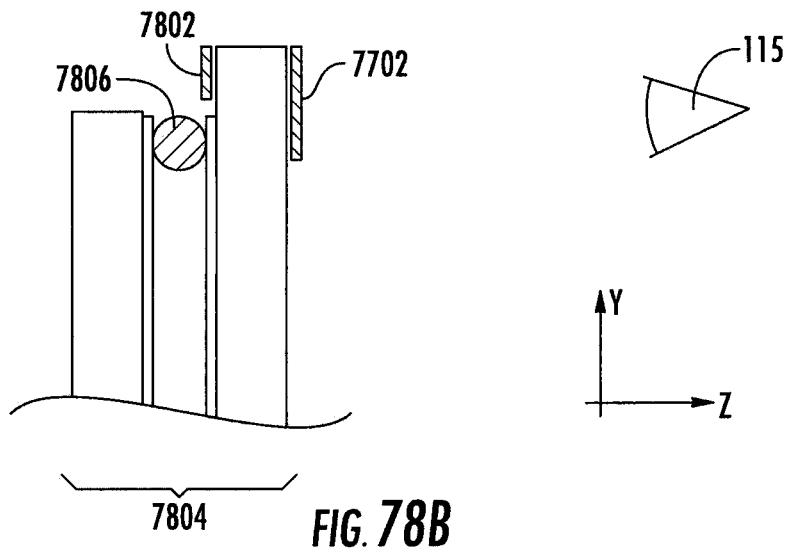

Embodiments of capacitive and field effect-based sensors for use with embodiments of rearview assembly of the invention can also be configured in a "through-the-glass" fashion. This requires that the sensor area be not shielded by a conductive layer, or at least that any present conductive shielding layer is small and electrically isolated from other parts of the circuit. Several alternative configurations of the invention employing a through-the-glass capacitive or field-effect based sensor 7802 are shown in FIGS. 78(A-C). FIG. 78A demonstrates an embodiment in which the two substrates of an EC-element 7804 are not transversely offset with respect to one another, while FIG. 78B shows an embodiment with a transverse offset between the substrates of the EC-element. Various mounting elements and housing, electrical connectors, auxiliary thin-film coatings are not shown in FIG. 78 for simplicity of illustration.

As shown in FIGS. 78A and 78B, both a seal 7806 and electrically-conductive coatings 7808 of the EC-element 7804 are placed far enough inboard of the EC-element with respect to a seal 7806 to keep the EC-medium from shielding the front and back sensor pads 7702, 7802 and/or providing electrical interference with its operation. (Optionally, the transflective conductive coatings of the EC-element may have external portions 7808' as shown in a dashed line in FIG. 78A. A PCB or flex circuit is located at the back side of the element. The front sensing pad 7702 may have an insulating overlay and a legend (not shown) carried thereon, and the circuitry may optionally contain LEDs to illuminate a touch pad area (corresponding to the overlay 7704) employed by the user to activate the sensor.

Figure 78C:
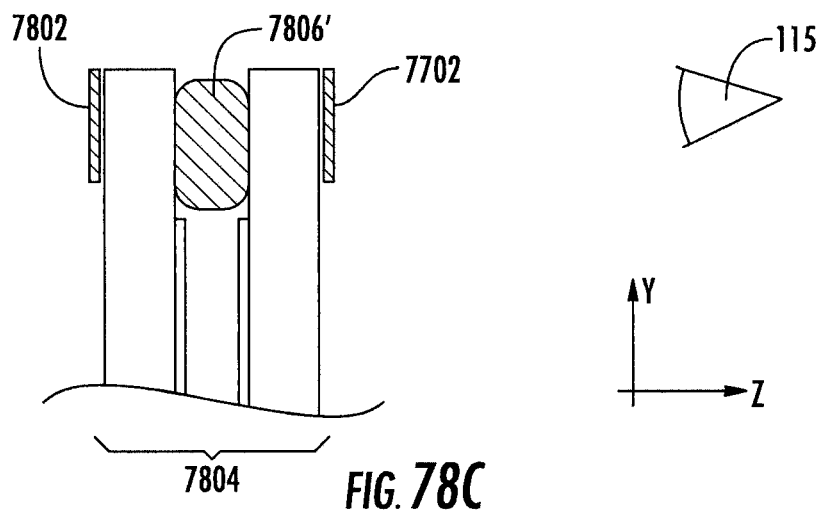

In comparison with FIGS. 78A and 78B, where the seal 7806 is configured to be narrow and transversely offset with respect to the sensor pads, the embodiment of FIG. 78C illustrates a situation where the seal 7806' is configured to be wide and placed in the area of the sensor (between the front and back conductive pads 7702, 7802). This embodiment may require a use of wide peripheral ring configured to extend over the seal 7806'. Here, the seal is made of material that is transparent or at least translucent at the wavelengths of light used to backlight the indicia/legend on the front of the mirror element through the mirror element. In addition, the seal material can also be adapted to optically diffuse light to provide for optically diffusive appearance of the first surface indicia. "Through-the-glass" sensing embodiments of user interface for use with rearview assembly additionally improve the ESD protection of the sensor electronics. It is appreciated that the hard edge of the mounting element (not shown) may be rounded, preferably with a radius Rad of at least 2.5 mm, as discussed in reference to FIGS. 70-72. Alternatively, if embodiments of FIGS. 78(A,B) are configured to be bezel-less, the front glass component may be appropriately rounded in a fashion similar to that discussed in reference to FIG. 68.

Figure 79A:
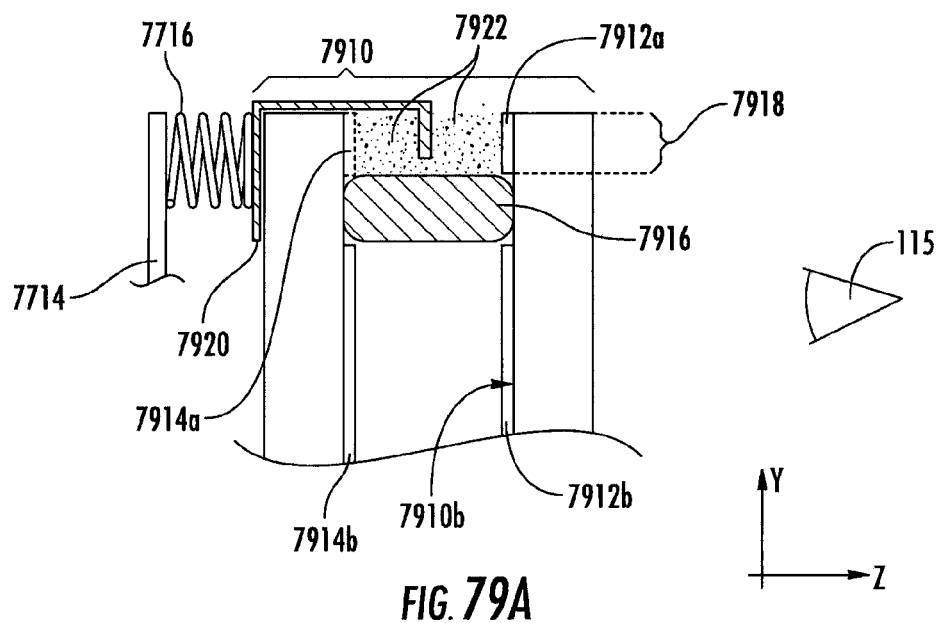
FIGS. 79(A, B) show an embodiment employing a user interface having an "in-glass" type of capacitive sensor.
Figure 79B:
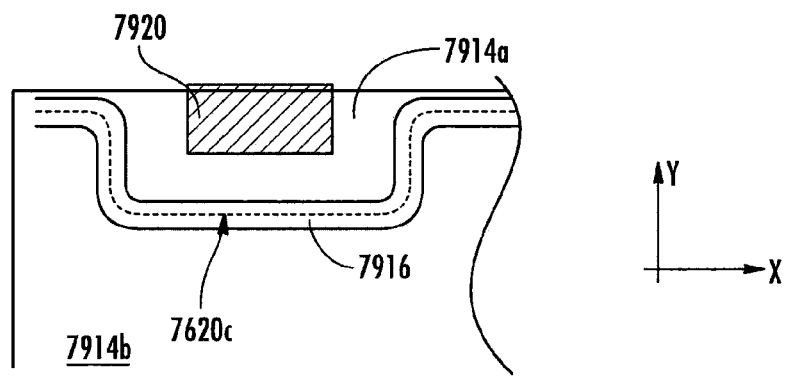
Figure 79C:
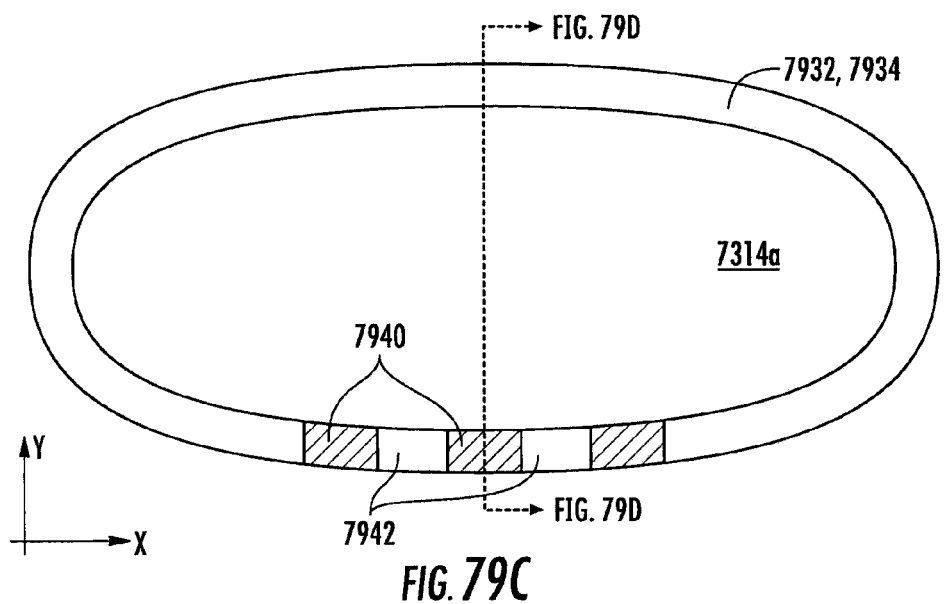
Figure 79D:
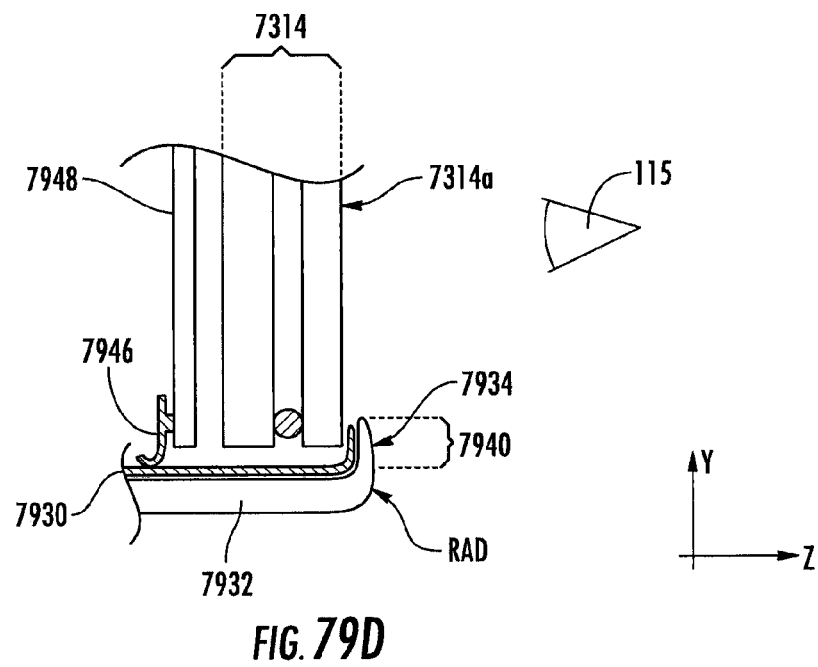

In embodiments of the user interface of the present invention that utilize capacitive "in-glass" based sensors, the electrically conductive layers and connectors positioned internally with respect to the EC-element are configured to serve as sensor areas. In one embodiment, schematically shown in FIGS. 79(A, B), a transparent electrode 7912 of the EC-element 7910 (located, as discussed, on the second surface 7910b of the element) is configured to have electrically independent portions 7912a, 7912b, where the portion 7912a forms a sensing area. The reflective electrode 7914 of the third surface of the EC-element is preferably isolated into portions 7914a and 7914b, where the outer portion 7914a corresponds to the sensor area 7819 and is optional (as indicated by a dashed line). When the two portions 7914a, 7914b are electrically connected and form a single electrically-conductive coating (not shown), it is preferred to keep the reflective electrode at or near a ground potential. As shown, the seal 7916 is appropriately positioned in-board with respect to the sensor area 7918 to prevent electrical interaction between the sensor area and the electrochromic gel (not shown). In a related embodiment (not shown), where the sealing material may be extended into the sensing area 7918, the seal 7916 is configured to be translucent (either clear or optically diffusing) to allow for backlighting of a legend (not shown) corresponding to the sensor. (As in any of the user interface embodiments discussed in this application, a legend may be located on the first surface of the embodiment or, alternatively, in a non-transparent inner layer of the EC-element, or may be backlit by masking or programmable display.) FIG. 79B illustrates a front view of the embodiment of FIG. 79A, where the reflective electrode 7914 includes two portions—the outer portion 7914a corresponding to the sensor area 7918 and the inner portion 7914b corresponding to the central area of the mirror system of the rearview assembly. The portions 7914a and 7914b are then electrically isolated from one another with an isolation trench or area 620c created in the reflective electrode as discussed elsewhere herein. FIG. 79B schematically illustrates, in top view, one possible way to dispose the seal 7916 around the electrical connector 7920 submerged in epoxy 7922. In one embodiment, the epoxy may be non-conductive. Although neither a mounting element nor auxiliary electrical connectors have been shown in FIGS. 79(A,B), it is appreciated that, in a specific embodiment, the mounting element including a bezel may be present. In this case, the hard edge of such mounting element is preferably rounded with a radius Rad of at least 2.5 mm, as illustrated in FIG. 73C and discussed in reference to FIGS. 70-72. Alternatively, if embodiments of FIGS. 78(A,B) are configured to be bezel-less, the edge of glass component may be appropriately rounded in a fashion similar to that discussed in reference to FIG. 68.

In a capacitive glass-edge embodiment of the user interface (not shown), spatially isolated electrically-conductive connectors such as metallic tabs or conductive coatings are added to the edge of the glass or on the inner surface of the mounting element. In a specific embodiment, such a connector may extend inboard with respect to the edge surface of the EC-element. The conductive epoxy currently being used may be segmented, and separate segments are then electrically contacted to the PCB.

A capacitive through-bezel type of interface sensor embodiment, schematically shown in FIGS. 79 (C, D), a flex circuit or an electrical conductor 7930 is placed behind and underneath the mounting element 7932 having a front lip 7934 extending onto the first surface 7314a of the mirror EC-element 7314 and, preferably, having a rounded profile with a radius of at least 2.5 mm. The embodiment of the sensor or switch is activated when the user touches a front pad 7940 configured on a front surface of the mounting element 7932 to carry a legend or indicia. In another embodiment, where several front pads 7940 are present that are made electrically conductive, these pads separated by corresponding non-conductive areas 7942. (If front pads are made electrically conductive by appropriate deposition of an electrically conductive film or by use of an electrically-conductive insert as described elsewhere herein, the separating areas 7942 are made non-conductive.) The flex circuit 7930 may have several extensions behind the lip 7934, with each extension positioned to correspond to a different front pad. Alternatively, several individual flex circuits could be used for each of the sensors corresponding to each of the front pads 7940.

Figure 79E:
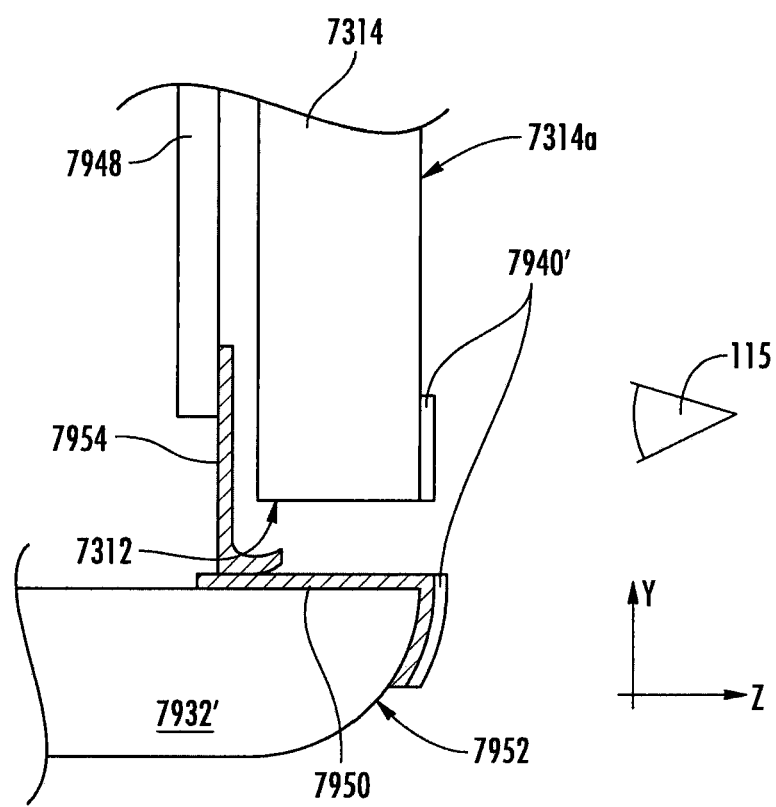

Flex circuit may optionally contain the sensing electronics and LEDs. A leaf-spring contact 7946 to the main board 7948 could be used instead of a wire to establish a required electrical connection. It is appreciated that a sensor legend (not shown) may be disposed on a surface of the front lip 7914 visible to the viewer 115, and the mounting element may be made of translucent material, in which case the legend is highlighted, e.g., by light channeled by the mounting element from a light source (such as LED, not shown) at the back of the system. In a related embodiment, the element 7930 may be a simple contacting electrically-conductive layer such as a foil, a mesh, or a thin-film layer establishing the electrical communication with the main board at the back of the system. A related alternative embodiment is schematically illustrated in FIG. 79E, where an electrical conductor 7950 is disposed on the inner surface of a lip-less mounting element 7932' substantially surrounding the edge surface 7312 and partially extends to a front, outer surface 7952 of the mounting element A second electrical conductor 7954 such as a leaf-spring is adapted to provide electrical connection between a conductive pad (not shown) of a main board 7948 and the front surface 7952 of the mounting element 7932'. In this embodiment, a front pad 7940' carrying a legend may be configured on either both the front surface 7952 of the mounting element and a peripheral portion of the first surface 7314*a* of the mirror element 7314 as shown, or, alternatively, only on the front surface 7952 of the mounting element.

Figure 79F:
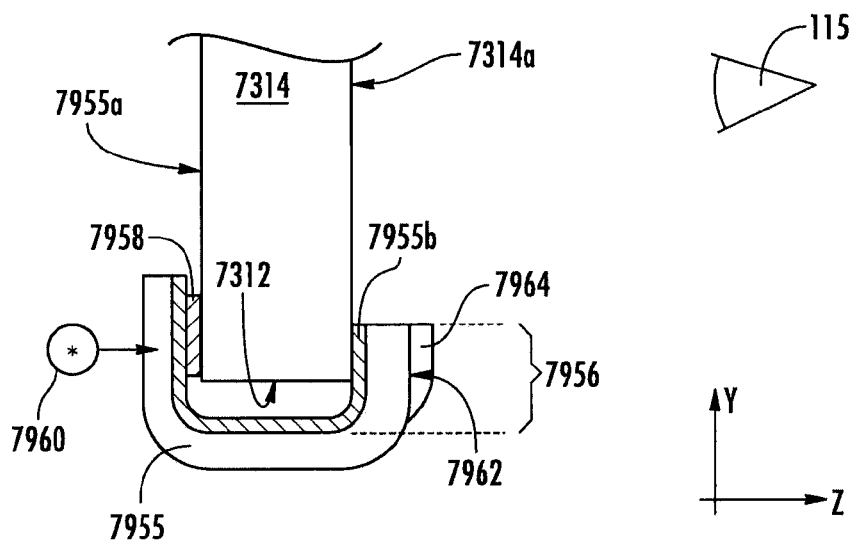
Figure 79G:
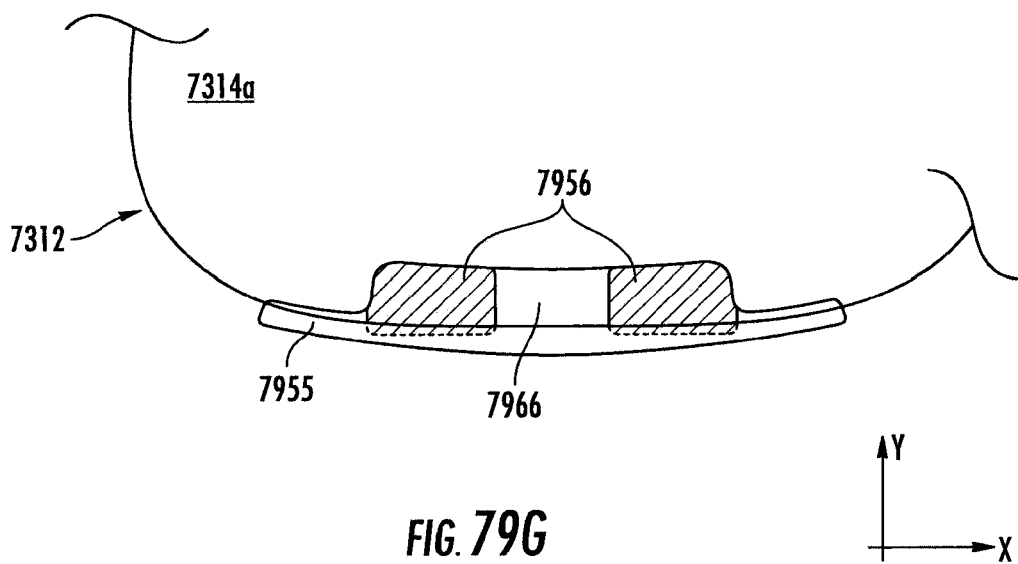

Another alternative embodiment of a component of a user-interface sensor (such as a capacitive sensor or a field sensor) of the invention operating as a switch for an auxiliary device located inside the assembly is shown in cross-sectional and front views in FIGS. 79F and 79G, where a plastic cap 7955, providing a tray-like covering for a peripheral portion of the mirror element 7314, is used to configure the component in issue. An inner surface of the removable cap 7955, which is appropriately sized to assure a close fitting around the edge surface 7312 of the mirror element 7314 and is appropriately shaped to sufficiently extend onto and both the first surface 7314*a* and over the back 7955*a* of the mirror element, is overlayed with an electrically-conductive covering 7955*b* forming a thin-film layer, a foil, or a mesh. In one embodiment, the inner surface of the cap 7955 is in physical contact with both the first surface 7314*a* and the back of the mirror element. A front portion 7956 of the covering 7955*b* corresponding to a front portion of the rearview assembly acts as a front electrically-conductive pad of a sensing element. A portion of the covering 7955*b* that wraps around the edge surface 7312 to extend onto the back 7955*a* of the mirror element establishes an electrical contact between the electrically-conductive portion 7956 and a back conductive pad 7958 (such as a thin-film layer) disposed at the back of the mirror element. The cap 7955 may be configured from a plate of translucent plastic-based material bent so as to fit around the mirror element of the rearview assembly and to allow for light channeling, within the thickness of the cap, from a light source 7960 in the back of the assembly towards an indicia/legend carried on an outer surface 7962 of the cap. The legend (not shown) may be disposed within the surface 7962 (by imprinting, for example) or in a legend-layer 7964 carried on the surface 7962 so as to overlap with the pad 7956, when viewed from the first surface 7314*a*. It is appreciated that a front portion of the cap that extends over the first surface 7314*a* provides the embodiment with a reliable ESD protection due to a finite thickness of the cap, which may be anywhere from several hundreds of microns to a few millimeters. In an embodiment having several sensors, the electrically-conductive covering is adapted to include several sub-coverings electrically insulated from one another, along the inner surface of the cap 7950, with non-conducting areas 7966. In operation, the cap 7955 is removably put on over the edge surface of the mirror element.

Figure 80A:
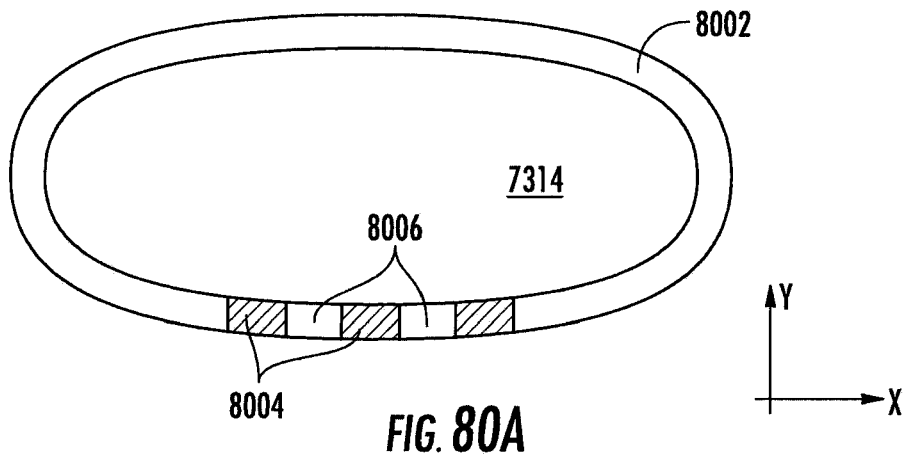
FIGS. 80(A-C) illustrate embodiment having a "capacitive conductive bezel" type of user interface.
Figure 80B:
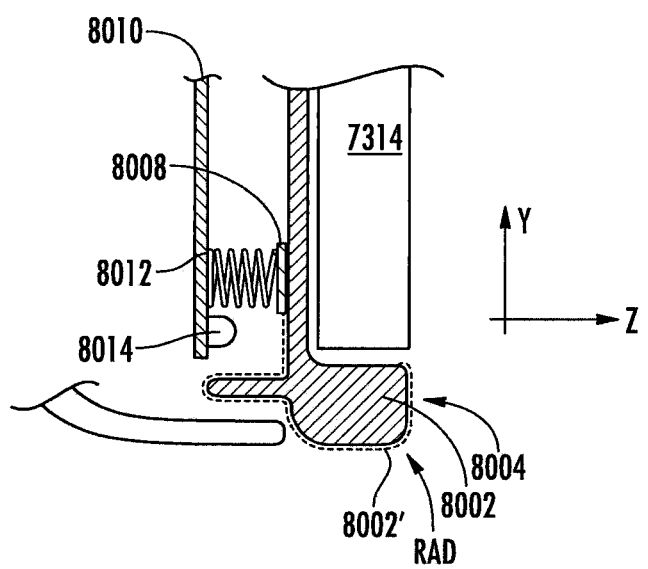
Figure 80C:
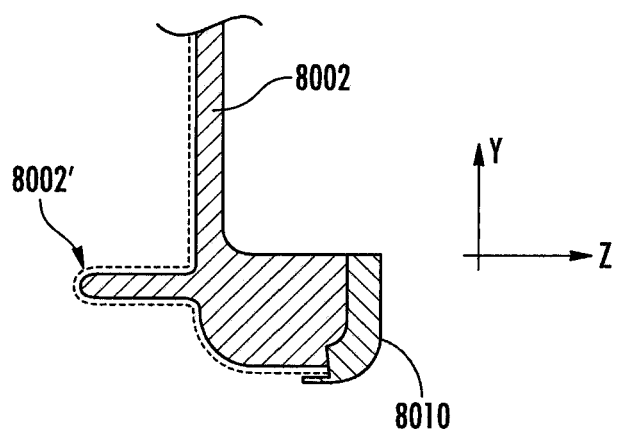

In a "capacitive conductive bezel" type interface, an embodiment of which is schematically shown in FIGS. 80A and 80B, a plastic mounting element 8002 (such as a bezel or a carrier extending around an edge surface of the mirror element 7314) having metallic coating, deposited on a portion of the outer surface of the mounting element 8002 and shown with a dashed line 8002', is spatially segmented with electrically-isolated areas 8006 thereby forming electrically conducting pad areas 8004 that the user will touch to activate a corresponding switch. The mounting element 8002 may also be used as a combination element/PCB holder. The isolation pattern 8006 may be defined by laser treatment, CNC, etching, or masking during deposition of the pattern to separate pads corresponding to different switches so as to provide for independent electrical communication between each of the front pad areas 8004 and a corresponding conductive pad (shown as 8008) on the back of the mirror system. A rear electrical pad area 8008 can be further electrically connected to a PCB 8010 through a spring or an elastomeric contact 8012. For the convenience of the user, a legend or other graphics (not shown) identifying a particular pad and a corresponding switch can be incorporated by inscription into the metallic coating 8002' in the area 8004. In this case, to facilitate backlighting of the legend by an optional light source 8014 such as an LED disposed in the back of the mirror system, the element 8002 may be made of transparent or translucent material. Coupling of light from the source 8014 to the translucent mounting element 8002 can be configured directly or with the use of an auxiliary optical component (not shown), and the mounting element will channel the coupled light towards the indicia at area 8004. Alternatively, indicative graphics/legends can be placed on the first surface (or formed in thin-film layers located within the EC-element) adjacent to corresponding switch areas 8004, or backlit by LCD or masked LED graphics. In addition, the conductive coating 8002' may be overcoated with a clear insulating coating layer to protect the finish, or may alternatively be painted to color-match the vehicle interior or some other components, as instructed by the auto-manufacturer. In a specific embodiment the front conducting areas 8004 of the mounting element 8002, a portion of which is shown in FIG. 80C, can be configured as separate inlays 8010 that are inserted within the mounting element 8002 in a fashion similar to that described in reference to FIGS. 70-72.

In addition or alternatively, various already existing and commercially used (e.g., in cell phones, PDAs, navigation systems) capacitive or resistive touch screen systems may be used as part of a user interface in a rearview assembly of the invention.

Various modifications of the embodiments are contemplated within the scope of the invention so as to optimize the performance of the user interface. For example, in any of the embodiments of a mirror system that includes legend/graphics on the first surface and a mounting element having a lip extending onto the first surface, the mounting element may be raised slightly above the glass surface so as to reduce or prevent the wearing off of the graphics during handling (such as during loading into a shipping box and rattling or vibrating in the box during shipment). For the same reason, if a legend is placed onto a lip of a mounting element, the legend may be recessed slightly into the surface of the lip. In a different example, with any of the embodiments that use capacitive or field effect sensors, an additional optical emitter/detector pair may be used to detect that the user's finger is approaching an interface. Such additional optical sensing pair can act as a 'gate' for the computer program product that enables the capacitive or field effect sensors, thereby increasing the sensitivity of the embodiment by rejecting spurious electrical noise events that may occur during the time intervals when the user is not using the interface. Increase in sensitivity of detection in this way may facilitate the use of the user interface by a driver wearing gloves, where otherwise the gloves reduce the electrical effect that a finger would have on the sensor. In another embodiment, an electronic circuitry of the rearview assembly may be configured to utilize the increased sensitivity of a sensor in such a fashion as to provide for a time-period, after the sensor of the interface has been activated, during which the legend/indicia of the sensor remains lit and visible. In a related embodiment, the legend may be kept lit dimly (to minimize visual distraction of the driver), but be illuminated more intensely when the driver's hand is sensed to be reaching for the legend.

While direct electrical connections have been discussed in reference to FIGS. 77-80, such direct connections are not always required. A flexible conductor insulated on both sides can wrap from the front surface to the back (similar to the on-glass solutions above). Having both sides insulated allows a protective cosmetic layer on the visible surface, but also allows the back side of the conductor to avoid short circuits to the exposed conductors at the edge of the element. A larger area spring contact to the electronics can compensate for an indirect connection, as this will form a capacitive coupling to the sensor.

In all optical or capacitive touch-systems it is preferred to have a direct feedback that the sensor has been activated. Appropriate feedback can be provided for the user using optical, audible, or haptic mechanisms. An optical feedback mechanism may include a change of brightness or color of back-lit indicia associated with the activated sensing area of the user interface. An audible feedback mechanism may employ a speaker or a piezoelectric device as part of the rearview assembly, or a direct connection or a network connection to an audio device already present in the vehicle. A haptic feedback mechanism can initiate a slight vibration of the mirror using offset weight electric motors or an electromagnetic actuator.

In an embodiment employing a user interface of the invention in conjunction with a mirror element having a rounded edge (such as embodiments of FIGS. 68, 69), the first surface overlay of the user interface may be wrapped around the rounded edge of the mirror element to create a continuous surface appearance. This may be done with pad printing, or adhesive overlay. Electrical isolation among the sensing areas of the embodiment discussed in reference to FIGS. 73-80 should be equivalent to a resistive separation of at least 10 kOhms, and, preferably, 100 kOhms or greater. Levels of ESD, measured according to industry standards, should be on the order of at least several keV, for example 4 kEV, preferably 15 keV, more preferably 20 keV.

Figure 81:
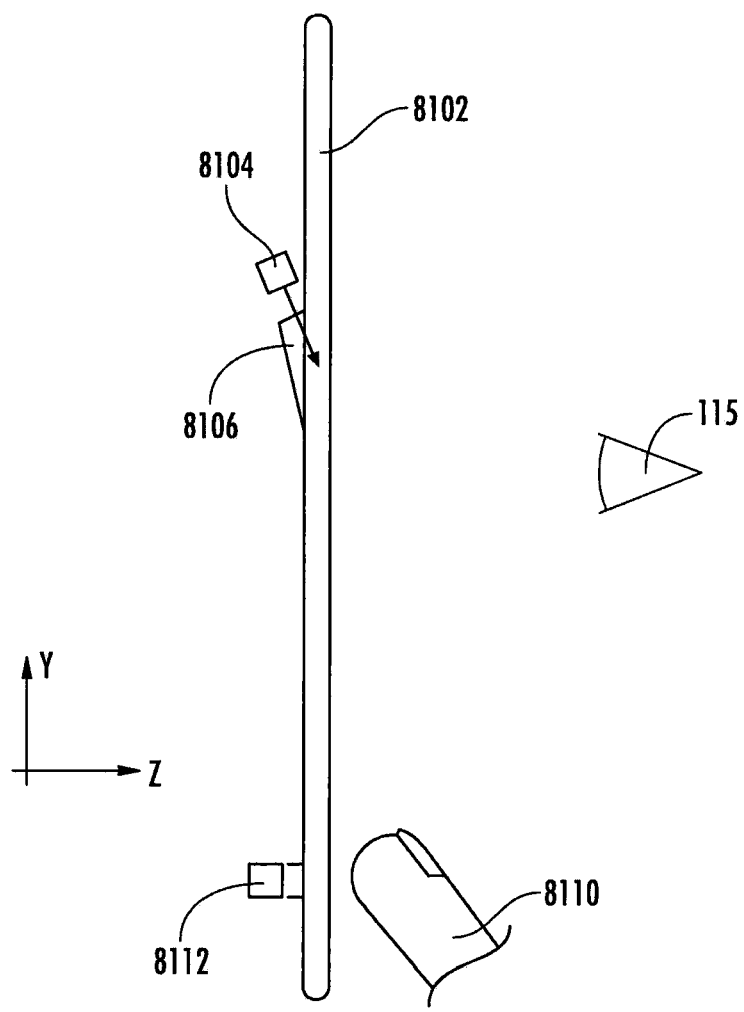
FIG. 81 shows an embodiment where a user interface employs an optical waveguide element.

It will be appreciated that in another alternative embodiment a sensing/switching element of the user interface of the rearview assembly may be configured with the use of waveguide optics. In particular, the first surface of the mirror element may be appropriately overcoated with a slab waveguide layer 8102, as shown schematically in FIG. 81, guiding the light coupled from a light source 8104 through a coupling means 8106. The coupling means 8106 may be configured as any appropriate coupling means used in waveguide optics (a diffractive element, for example). When an external object 8110 such as a user's finger makes optical contact with the surface of the waveguide layer 8102, the waveguiding is frustrated and light leaks from the waveguide thereby scattering around the point of contact. The scattered light is further detected by an optical detector 8112 (an optical diode, CMOS or other sensor). While light in different spectral regions can be generally used for the purposes of the user interface in a rearview assembly of the invention, a narrow band light source 8104 preferred to reduce potential interference with ambient light and increase signal-to-noise ratio of the operating embodiment. Other techniques, such as pulsing of the light source to differentiate a touch response from ambient light levels through comparison of source on, to source off detected light levels can be used to actively correct for background and/or stray light and prevent false responses.

In fabrication of the above-discussed embodiments of user interface, a conductive capacitive or resistive switch pattern can be fabricated on or in a pattern carrier (that may be a mounting element such as the element 7310, for example, or the surface of the mirror element) as follows:

The pattern carrier can be coated with a metal or conductive metal oxide, sulfide, carbide or nitride by vacuum evaporation, sputtering or other PVD processes. The pattern carrier can be plated with metal. Metal containing or metalorganic inks can be applied to the pattern carrier. A conductive polymer such as polyanaline can be used to form the conductive pattern on or in the pattern carrier. Other techniques for applying and patterning conductive materials on substrates (such as those as described in U.S. Patent Application Publication US2007/0201122 A1 that is incorporated herein by reference in its entirety) may also be applied. Conductive coatings can be applied in a pattern or patterned or segmented in a secondary operation using a laser, chemical etch, water jet, sand blasting or mechanical cutting, milling or scoring.

Conductive metal or conductive plastic inserts can be molded or fashioned and then incorporated into the molded mounting element during the injection molding process or placed or pressed into or onto the mounting element after the molding process. A two-step injection molding process could be used with a first step involving molding of conductive portions of the mounting element from electrically-conductive plastic and another step involving molding non-conductive portions of the bezel using a non-conductive plastic. A contact point that engages the switch could also be a plastic or metal form or tape that contains the switch conductor or pattern that is adhered to the mounting element or a surface of the mirror element, preferably in a periphery of the mirror substrate.

A thin metal film, or metal tape, or conductive resin could be affixed to the inside or outside surface of the mounting element or the first surface of the mirror element to form the switch contact point. Segmented conductive switch patterns could be formatted on such a film or tape prior to adhering it to the pattern carrier.

A conductive paint such as a graphite, carbon nanotube, or carbon black filled resin, or a resin that is filled with a transparent or translucent conductive metal oxide particle (antimony doped tin oxide, aluminum doped zinc oxide, tin doped Indium oxide, indium oxide, zinc oxide or indium zinc oxide, for example) can be used for form conductive switch patterns on the surface of the pattern carrier. An opaque film such as a carbon-loaded paint can be applied over a translucent or transparent substrate and patterned to create an icon that could be backlit by light illuminating such a substrate. The opaque paint or film could be conductive, or, alternatively, the substrate could be coated with a transparent conductive material such as a TCO (transparent conductive oxide), a thin conductive polymer such as polyanaline. In a specific embodiment, the substrate could be filled with transparent conductive particles such as indium oxide, indium tin oxide, zinc oxide, tin oxide, or low concentration levels of carbon nanotubes or metal fibers or transparent particles or fibers coated with a transparent conductive material such as antimony doped tin oxide or indium tin oxide.

In embodiment employing a capacitive type switch, it is desirable to protect the conductor and electronic circuitry from static discharge. Such protection is provided by overcoating the conductor with an insulating layer of plastic, ceramic, paint or lacquer or recessing the conductor in such a way as to avoid contact with potential static generating items (like the human hand or finger).

It is understood that at least one of the transparent and reflective electrodes of surfaces II and III, respectively, could be segmented or patterned with an icon/legend in an area corresponding to the area of the conductive switch or sensor. A peripheral ring could also be segmented and if desired patterned with an icon with or with out a backlight into a conductive switch contact area.

The icon and/or switch circuitry and/or backlight illuminator can be entirely contained in and/or behind the mirror element, in and/or behind the bezel element or a combination of the bezel and mirror area. A flush bezel could extend a minimum of 2.5 mm around the perimeter of the mirror and still meet European minimum edge radius requirements. A typical perimeter ring is about 5 mm wide. Unless the ring or the bezel is made wider in the switch area, which may be aesthetically undesirable, a 2.5 mm or 5 mm switch/icon area may not be easily discernable by the driver and a 2.5 mm or 5 mm touch landing pad area may be difficult to accurately locate and touch. Combining both the bezel area and the chrome ring area to enable an enlarged switch area for the icons, backlight and circuitry enable a more user friendly and functional switch system. The icon symbols and backlight could be positioned in the mirror area and the bezel could have a continuation of the icon, or the bezel could be a different color in the icon area and/or the bezel could be raised in the icon area to enhance switch location visibility and functionality. Since finger prints are more readily visible on a smooth glass surface than on most bezel surfaces, it may be desirable to attract direct finger contact primarily to the bezel area. It is also desirable to cover the contacted area of the bezel and/or glass area with an anti-finger print layer or coating to avoid the visually objectionable accumulation of dirt and finger oils.

Multi-Band Peripheral Ring.

Embodiments of peripheral rings for EC-elements of vehicular rearview assemblies discussed so far in related art and in this application have a single circumferential band 8210 disposed around a perimeter of the first or second surface of the mirror element 8220, as shown in FIG. 82A. While this "one size fits all" design has been commonly accepted, it does not address different aesthetic requirements set by different car manufacturers. We discovered that configuring an embodiment of a peripheral ring as a multi-band construct may provide a non-obvious solution to satisfying various aesthetical requirements to appearance of the mirror. Generally, in multi-band embodiments of a peripheral ring, a plurality of bands of spectral filter materials are disposed circumferentially around a perimeter of and on a surface of a mirror system of the invention. While different bands of a peripheral ring may be configured in a quasi-concentric fashion, thus sharing an origin with one inside the other, a non-concentric configuration and a segmented configuration are also contemplated to be within the scope of the present invention. An exemplary illustration of a multi-band peripheral ring concept is provided in FIG. 82B, where a top view of a substrate of an embodiment 8230 of a mirror system is shown to have two peripheral rings 8232, 8234. It is understood that locations within the mirror system, widths of, and materials the bands of a peripheral ring are made of will depend on a particular application and aesthetic requirements. Moreover, it is understood that different bands may be carried on different structural surfaces of a mirror system, as is described in more detail below. In a specific embodiment, therefore, a multi-band peripheral ring may include bands spatially separated along the direction of incidence of light onto the mirror system. Generally, according to the embodiment of the invention, the aggregate of widths of bands of a multi-band peripheral ring will not exceed 10 mm, and will preferably be less than 6 mm, and most preferably less than 4 mm. Relative to the aggregate width of a peripheral ring, a width of a given band can be between 5 percent and 95 percent, preferably between 10 percent and 90 percent, and most preferably between 25 percent and 75 percent.

Figure 83B:
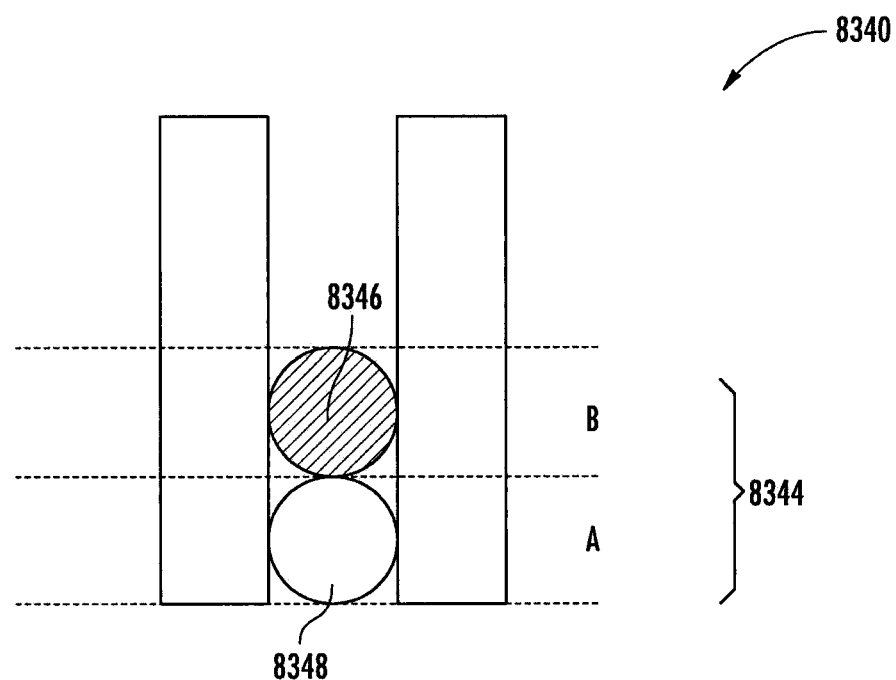
FIG. 83B illustrates a two-lite embodiment of an electro-optic (EO) element having a two-band peripheral ring and a double seal the components of which correspond tom the two bands.

FIG. 83A schematically shows peripheral regions A, B, C, and D of a specific embodiment 8300 of a mirror system comprising three substrates 8310, 8312, 8314 where a multi-band peripheral ring (in this case, a ring including up to four bands) may be configured. For simplicity of illustration, no mounting elements (such as a bezel or a carrier), or conventional optical coatings, or sealing materials are shown. Although the peripheral regions are identified on only one side of FIG. 83A, it is understood that these regions extend in a circumferential fashion around the perimeter of the embodiment 8300. It is also understood that configuration of a multi-band peripheral ring is not limited to a single surface of a particular substrate. Rather, a multi-band peripheral ring may consist of bands generally disposed on different surfaces (in the case of embodiment 8300, on either of surfaces I through VI). As shown, e.g., a multi-band peripheral ring 8320 includes four bands 8322, 8324, 8326, 8328 disposed respectively on the first, second, third, and fourth surfaces of the embodiment. Generally, several seals can be used between the substrates forming an EO-element of the embodiment, each seal corresponding to a particular band of the peripheral ring. For example, as shown in FIG. 83B, an embodiment of a two-lite EO-element 8340 may have a peripheral ring 8344 defined by two bands (A and B, corresponding coatings not shown) and a double seal including seal components 8348, 8346 that respectively correspond to the bands A and B.

It is also understood that, in general, some of the substrates may be transversely offset with respect to other substrates and/or be of different dimensions in order to facilitate, e.g., configuration of electrical interconnections and fabrication processes.

Figure 83C:
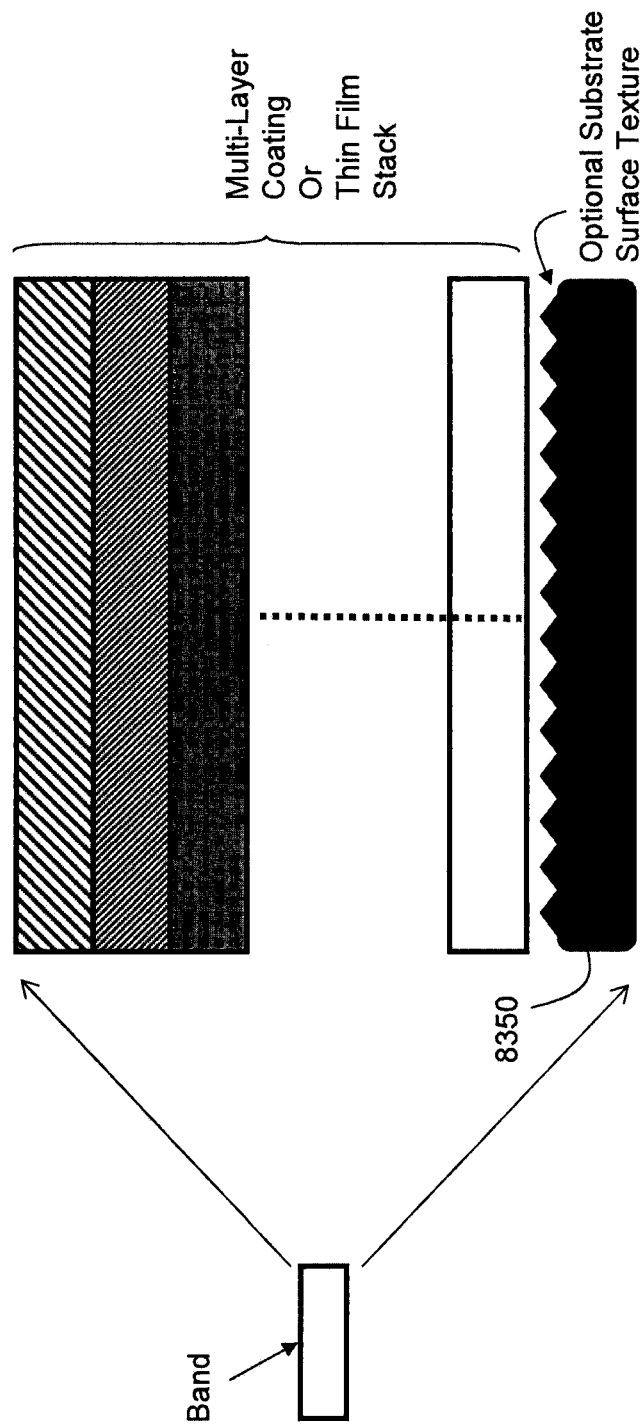
FIG. 83C illustrates a non-specularly reflecting peripheral ring of an embodiment of invention.

In reference to FIG. 83C, a peripheral region may be characterized by specular or non-specular reflectance, or a reflectance the characteristic of which spatially varies with a position in the region. The non-specular characteristic may be formed by choice of material deposited on a substrate 8350, such as a frit, or the substrate may be altered by bead (or sand or other media)-blasting, sanding, rubbing, laser treating, deposition of a transparent layer, a semi-translucent layer with small particles, or semi-transparent layer that has texture or altered from a smooth surface by other means. A peripheral region may have a color determined by various means known in the art such as thin film interference, deposition of a colored thin film (absorption effects), paint, frit or other means. Alternatively, a coating or treatment may be absent in a zone and the aesthetics then determined by the seal or other components within or behind the corresponding band of a multi-band ring. It is essential that means employed to achieve desired aesthetic parameters does not hinder or frustrate electrical interconnections required for proper functioning of the embodiment. If a given treatment, coating or other aesthetic means is employed that is not compatible with the necessary electrical interconnections then electrical interconnections should be appropriately modified and/or reconfigured by, e.g., employing electrically-conductive coatings instead of hard-body connectors. These reconfigured components may be hidden by the aesthetic means or may be incorporated as part of the aesthetic means whereby the reconfigured electrical interconnectors additionally contribute to the appearance of one or more regions of a band.

A specific embodiment of a two-band ring where all bands are disposed on the same surface can be fabricated either in two cycles (e.g., one band per cycle) or in a single cycle if thin-film structures of the two bands are appropriate configured to contain common layers. For example, as schematically shown in FIG. 84A, two bands A and B of a peripheral ring 8410 are disposed on the same surface 8412 of a substrate 8414. A reflectance value of a band A is higher than that of a band B. Both the thin-film stack corresponding to the band A and that corresponding to the band B include a common layer 8416 of a TCO or another dielectric material such as $SiO_2$, MgO, $Ta_2O_5$, $ZrO_2$, $MgF_2$, ITO, TiOx, CeOx, $SnO_2$, ZnS, NiOx, $CrO_x$, $NbO_x$, and $ZrO_x$, $WO_3$, NiO or $Ti_xSiO_y$, zinc oxide, aluminum zinc oxide, titanium oxide, silicon nitride disposed on the surface 8412. Examples of suitable TCO materials include ITO, F:SnO2, Sb:SnO2, Doped ZnO such as Al:ZnO, Ga:ZnO, B:ZnO, and/or IZO. The band A additionally includes a dielectric layer 8418 (selected from the list above for layer 8416) and a metallic layer 8420 (such a silver-gold alloy, silver alloys as described below, chrome, ruthenium, stainless steel, silicon, titanium, nickel, molybdenum, and alloys of chromium, molybdenum and nickel, nickel chromium, nickel-based alloys, Inconel, indium, palladium, osmium, cobalt, cadmium, niobium, brass, bronze, tungsten, rhenium, iridium, aluminum and aluminum alloys as described below, scandium, yttrium, zirconium, vanadium, manganese, iron, zinc, tin, lead, bismuth, antimony, rhodium, tantalum, copper, nickel, gold, platinum, or their alloys and alloys whose constituents are primarily those aforementioned materials, any other platinum group metals, and combinations thereof. The spectral properties of light reflected from the band A are determined essentially by the material of the layer 8420 and the aggregate thickness of the layers 8416 and 8418.

In comparison with the band A, the band B has an additional layer 8422 interdisposed between the layers 8416 and 8418, which is used to dramatically reduce the overall reflectance of the band B. Preferably a metal used for layer 8422 should high value of real part of a refractive index in order to meet the reflectance objectives of a given application. The real part of refractive index should be above about 1.5, preferably above 1.9, and most preferably greater than about 2.1. The value of the imaginary part of the refractive index for a metallic material 8422 for attaining very low reflectance values will vary with the real refractive index. Lower k values are needed for low real refractive indices and higher k values will work as the real index increases. Preferably, both the real and imaginary parts of the refractive indices should be relatively large. Appropriate metals or materials for the thin absorbing metal layer include nickel silicide, chrome, nickel, titanium, monel, cobalt, platinum, indium, vanadium, stainless steel, aluminum titanium alloy, niobium, ruthenium, molybdenum tantalum alloy, aluminum silicon alloys, nickel chrome molybdenum alloys, molybdenum rhenium, molybdenum, tungsten, tantalum, rhenium, alloys of these metals and other metals or materials with both the real and imaginary refractive indices being relatively large. The thickness of the thin metal layer should be less than about 20 nm, preferably less than about 15 nm and most preferably less than about 10 nm. The preferred thickness will vary with the reflectance objective and refractive index of the metal selected for a given application. It is anticipated that at least one thin-film layer of the multi-band peripheral ring 8410 may extend into the viewing area while the others are localized in the area of the ring. In addition, UV shielding or blocking may be attained through a combination of material choices and the optical design of the stack. For example, the dielectric materials may be selected which display absorption properties. Specifically, $TiO_2$ $CeO_2$ and zinc oxide are effective UV absorbers. The absorption of the UV light by these materials may be augmented through a judicious optical design of the coating by using a multilayer stack such as an H/L/H stack. It is appreciated, that coatings of a particular band of a multi-band peripheral ring that are located on surfaces preceding the sealing materials should preferably protect the sealing materials from exposure to the ambient UV light. The UV blocking means should reduce the UV transmittance below 5%, preferably below 2.5% and most preferably below 1%.

In a non-limiting example, the substrate 8414 is made of glass, and the surface 8412 is the second surface of the embodiment. The band B contains the layer 8416 is about 52 nm of ITO, the layer 8422 is 8.2 nm of Chrome, the layer 8418 is 46 nm of ITO, and the layer 8420 is 50 nm of silver-gold alloy, with gold being at about 7% of the composition. When viewed through the first glass substrate 8414, the band B has a neutral color and a reflectance of 6.9%. The reflected value of a* is 3.1 and that of b* is −3.8. The band A, where the Chrome layer 8422 is not present, has a neutral reflected color and a reflectance of greater than about 86.6%. The reflected value of a* is −2.0 and that of b* is 0.6. The presence or absence of one layer, therefore, may result in a reflectance difference value of greater than about 70% for this coating stack. Table 9A illustrates how the value of reflectance and color of reflected light may be altered by the adjustment of the thickness of the layers. The stack may be altered to change the intensity of the reflectance and/or the color as needed for a given application. Substitution of any or all of the layers with different materials can be used to attain further degrees of freedom in designing a coating for a particular set of optical requirements. Table 9B shows how the color and transmittance vary with the thickness of the high reflectance AgAu7x layer. As a layer is thinned, the transmittance increases with only subtle changes to the color and reflectance.

TABLE 9A

| ITO | Cr | ITO | AgAu7x | R | a* | b* |
| --- | --- | --- | --- | --- | --- | --- |
| 52 | 8.2 | 46 | 50 | 6.9 | 3.1 | −3.8 |
| 42 | 8.2 | 46 | 50 | 7.0 | 4.7 | 2.6 |
| 32 | 8.2 | 46 | 50 | 8.0 | 3.4 | 10.9 |
| 22 | 8.2 | 46 | 50 | 9.9 | 0.5 | 16.9 |
| 12 | 8.2 | 46 | 50 | 12.2 | −2.2 | 18.8 |
| 62 | 8.2 | 46 | 50 | 7.9 | −1.1 | −6.1 |
| 82 | 8.2 | 46 | 50 | 11.7 | −9.0 | −0.3 |
| 52 | 6.2 | 46 | 50 | 7.0 | 5.1 | −15.4 |
| 52 | 4.2 | 46 | 50 | 12.4 | 4.0 | −20.8 |
| 52 | 10.2 | 46 | 50 | 9.1 | 0.8 | 4.7 |

TABLE 9A-continued

| ITO | Cr | ITO | AgAu7x | R | a* | b* |
|---|---|---|---|---|---|---|
| 52 | 14.2 | 46 | 50 | 15.7 | −1.0 | 8.0 |
| 52 | 8.2 | 36 | 50 | 10.1 | 3.2 | −7.3 |
| 52 | 8.2 | 26 | 50 | 14.7 | 3.5 | −8.7 |
| 52 | 8.2 | 56 | 50 | 5.1 | 7.1 | −7.4 |
| 52 | 8.2 | 66 | 50 | 5.2 | 25.7 | −37.3 |

TABLE 9B

| ITO | Cr | ITO | AgAu7x | R | a* | b* | T |
|---|---|---|---|---|---|---|---|
| 52 | 8.2 | 46 | 50 | 6.9 | 3.1 | −3.8 | 0.5 |
| 52 | 8.2 | 46 | 40 | 6.8 | 2.8 | −2.6 | 1.1 |
| 52 | 8.2 | 46 | 30 | 6.5 | 2.3 | −0.1 | 2.6 |
| 52 | 8.2 | 46 | 20 | 5.9 | 1.7 | 4.0 | 6.5 |
| 52 | 8.2 | 46 | 10 | 6.1 | 2.3 | 4.1 | 16.8 |

The reflectance value of light reflection in the area of the "bright" band A is dominated by the reflectance of the metal positioned away from the viewer. If the silver-gold alloy from the previous example is replaced with chrome and the other layers are re-optimized (the thickness of the layer 8416 of ITO is 53 nm and the thickness of the layer 8418 of ITO is 57 nm), then a neutral appearance in reflection is still attained but the reflectance of the band A is reduced to about 50%. If, instead of silver-gold alloy, Ruthenium is used in the layer 8420, the reflectance is about 57%, Rhenium yields about 38%, Molybdenum 45%, Copper 54%, Germanium 29%, Tantalum 39%, and other metals will yield other reflectance values depending on their properties. This embodiment is not limited to this set of metals and other metals (described elsewhere in this document) with different reflectance values and hues may be used and are within the scope of this art. Moreover, multiple metals may be employed where the thickness of each layer is adjusted to attain the reflectance and hue for a given application. For example, in the case where a silver alloy is used as the second metal layer, a high reflectance is attained. If it is important to have lower reflectance and opacity one can include an additional metal or metals between the silver alloy layer and the viewer to attenuate the intensity of the reflectivity. The additional layer may provide other benefits such as adhesion, corrosion protection or any other of beneficial properties. Typically, the reflectance will decrease as the thickness of the additional layer(s) is increased, eventually reaching the reflectance of the additional metal when the thickness reaches a critical thickness. Alternatively, if only the reflectance is to be reduced, and transmittance is not needed to be low (see embodiments below) the thickness of the metal, such as silver gold alloy, can be reduced thus decreasing the reflectance and increasing the transmittance. In other embodiments where lower reflectance is desired in combination with low transmittance, the additional metal or absorbing layer may be placed behind the reflector metal, relative to the viewer on the outside portion of the rearview assembly. In this manner, the thickness of the reflecting metal layer may be adjusted as needed to attain the desired reflectance value and the thickness of the additional layer behind the reflector metal can be adjusted as needed to attain the desired transmittance value. The metal above or below the silver layer may be selected to be, e.g., chromium, stainless steel, silicon, titanium, nickel, molybdenum, and alloys of chrome, and molybdenum and nickel, nickel chromium, molybdenum, and nickel-based alloys, Inconel, indium, palladium, osmium, tungsten, rhenium, iridium, molybdenum, rhodium, ruthenium, tantalum, titanium, copper, nickel, gold, platinum, and other platinum-group metals, as well as alloys the constituents of which are primarily aforementioned materials. Combinations of metal layers are selected so that the reflectance may be set between about 45 and 85% with the transmittance between about 45 and 5%. Preferably the reflectance is between 55% and 80% with transmittance intensity between about 35% and 10%.

It is recognized that appropriate optimization of a thin-film stack of a particular band of the peripheral ring will affect the optical properties of the band. In a specific embodiment, it may be preferred to include a layer of a quarter wave thickness and a refractive index intermediate between the first TCO or dielectric layer and the refractive index of the substrate, e.g., glass or other transparent media between the substrate and the TCO layer. Flash overcoat layers of materials mentioned in U.S. Pat. No. 6,700,692 may also be incorporated into the above described designs. Depending on the thickness and optical properties of the materials chosen for the flash layer(s), adjustments may be needed to the underlying stack to maintain a similar degree of match or mismatch between the relatively opaque region and the transflective region(s).

In order to have a noticeably different appearance between the bands of a multi-band peripheral ring, when required, the corresponding brightness values should differ by at least 3 L* units. Preferably the brightness values of the bands will differ by greater than about 10 L* units, more preferably by about 20 L* units, even more preferably by more than about 50 L* units. The low reflectance band of the peripheral ring should be less than about 60%, more preferably less than about 30%, even more preferably less than 20% and most preferably less than about 12%. The value of reflectance of the high-reflectance band should be greater than about 40%, preferably greater than about 50%, even more preferably greater than about 60% and most preferably greater than about 70%. The difference in reflectance values between the two bands may be a difference in magnitude of the specular reflectance or it may be a difference in the specular and non-specular reflectance. In addition or alternatively, the two bands have a difference in color or hue. The corresponding difference in C* values (measured in reflectance) should be greater than about 5 units, preferably greater than about 10 units, more preferably greater than about 15 units and most preferably greater than about 25 units. The color difference may be combined with changes in either reflectance magnitude, reflectance type (specular or non-specular) or some other aesthetic effect such as surface texturing.

Figure 84D:
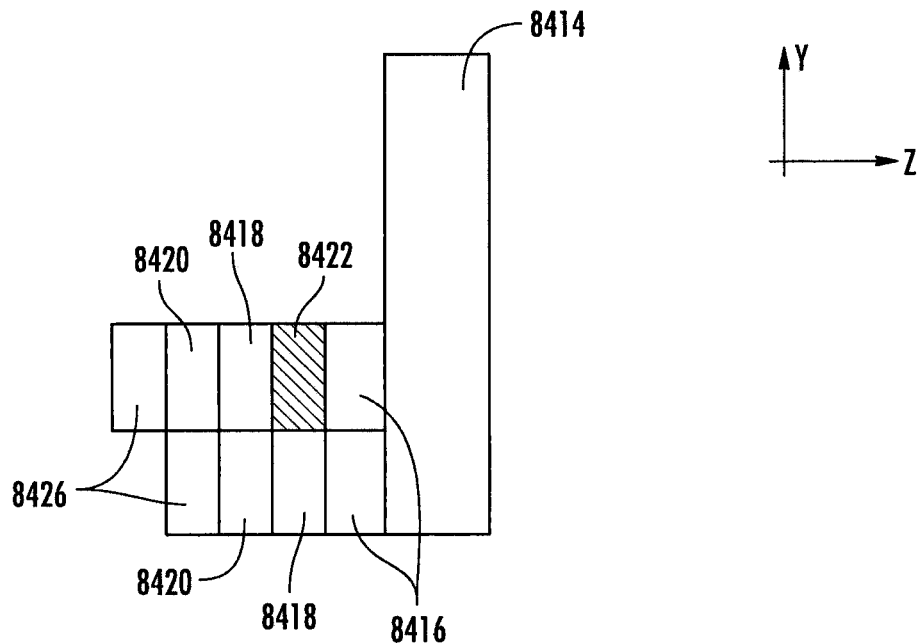
FIGS. 84(A-D) show various embodiments of a two-band peripheral ring used in w minor system of a rearview assembly of the invention.
Figure 84A:
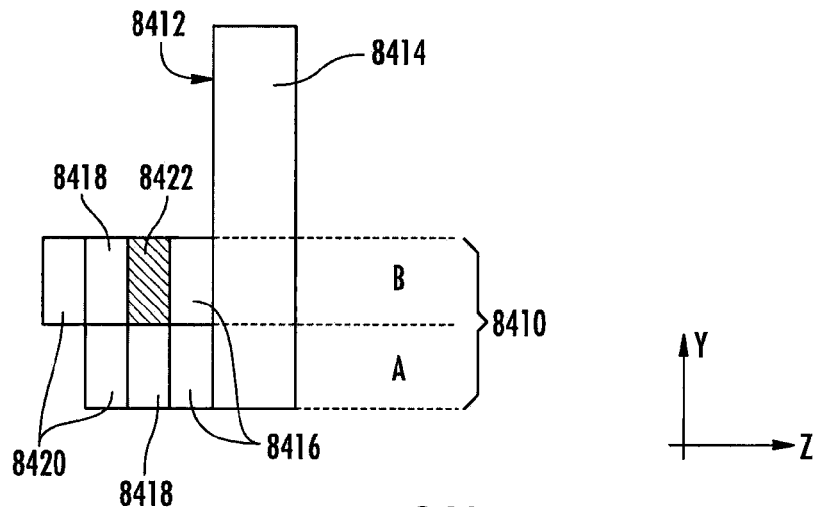
Figure 84C:
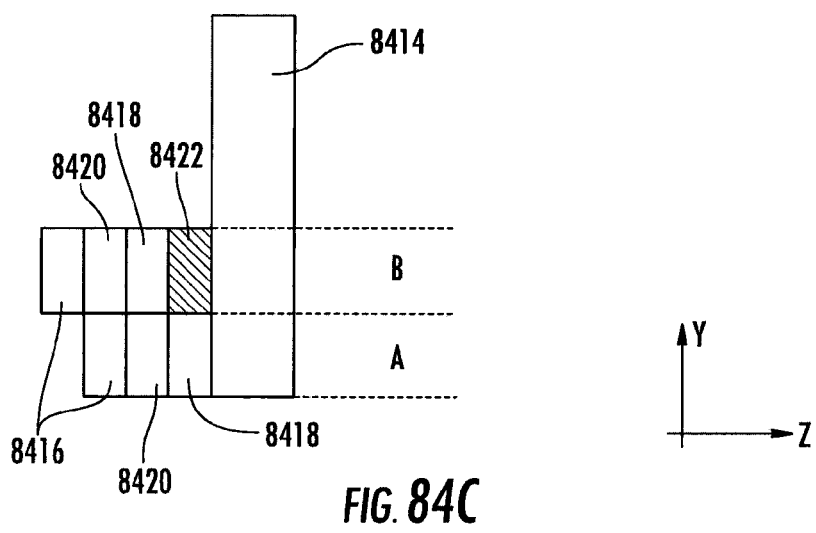
Figure 84B:
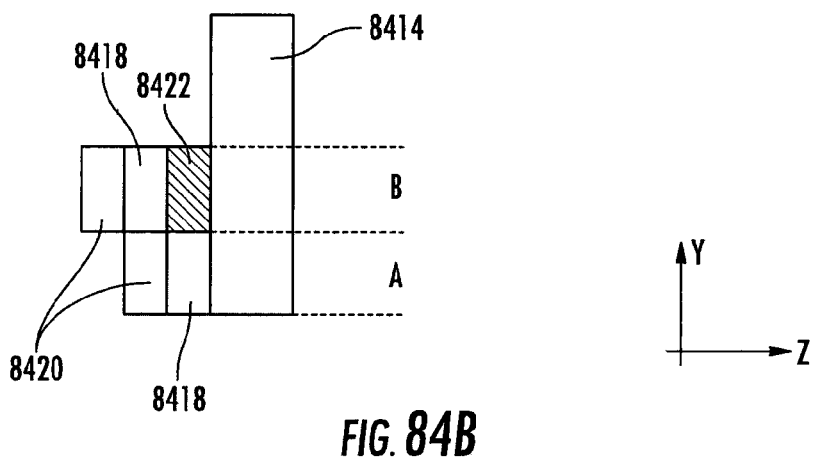

FIGS. 84B through 84D present different variants of the embodiment of FIG. 84A. The stacks A and B in FIG. 84B, for example, do not have the first TCO or dielectric layer disposed on glass as shown in FIG. 84A. (If the first TCO covered the entire surface, then its removal would result in a lower sheet resistance in the viewing area and potentially increasing the switching or darkening time.) The reflectance in the two bands and color of ambient light incident from the first surface and reflected by the bands in the +z direction are relatively unaffected by the removal of the first ITO layer. The color and reflectance may be tuned or adjusted as described above but with one less degree of freedom. The thickness of the layers, as described above, can be altered to change the color. The ease of color tuning is reduced when a layer is absent. The embodiment of FIG. 84B demonstrates a basic structure of a two-band peripheral ring having a high-reflectance band and a low-reflectance band. FIG. 84C, in comparison with FIG. 84B, has an additional TCO or dielectric layer 8416 as the layer distal to the viewer. This layer may be present in the ring area only or it may extend into the viewing area. This layer may be present to protect the metal layers or improve the adhesion to the seals or provide an altered electrical contact to the buss or electro optic material. FIG. 84D, in comparison with FIG. 84A, shows an additional TCO or dielectric layer 8426 on top of the layers 8420 in both bands A and B. The layer 8426 can add properties similar to those as described in reference to FIG. 84C. Furthermore, if the outermost layer is a TCO then it will lower the sheet resistance in the viewing area or modify the optical thickness and the resultant color in the bright and predominantly, the dark state of an EC as described in Our Prior Applications. A TCO layer used within the area of a peripheral ring serves a purpose of attaining the desired reflectance and color, and when it extends beyond the peripheral ring it also serves as a transparent electrode for the EC-cell, the conductivity of which may be modified by additional TCO layers. The thickness of a TCO layer in various positions in the stack may be optimized to coordinate the desired color in the ring positions and the viewing area in the bright and dark state. Additional TCO layers that extend beyond the ring area may be added on top of the ring layers to add additional conductivity to the electrode.

It is appreciated that when a multi-band peripheral ring is disposed on the first surface instead of the second surface, the order of the layers should be reversed (with respect to the viewer) in order to preserve the optical properties of the band discussed in reference to FIGS. 8A-8D.

Figure 85:
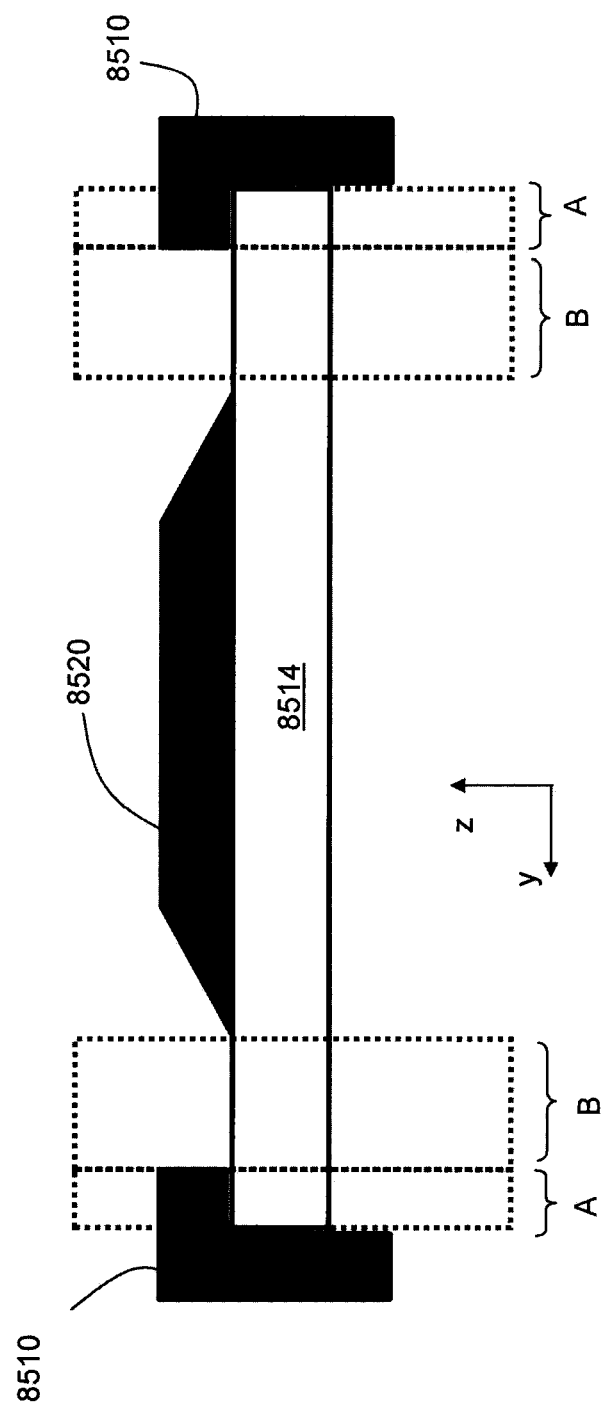
FIG. 85 illustrates a mask construction means used to fabricate an embodiment of a two-band peripheral ring of the invention.

As demonstrated, configuring bands of a multi-band peripheral ring to have common thin-films layers makes the multi-band ring more suitable for manufacturing. One technique to facilitate a single-cycle manufacturing is to use simplified masking and registration of multiple masks. There are several masking options available for deposition of the multi-band coating depending on the type of coater used (e.g., in-line or turret). FIG. 85 shows one possible mask construction including an edge mask 8510 and the plug mask 8512. It is understood that other masking or fabrication options are viable for making these products and the invention is not limited to this particular example. In a turret type coater the substrate 8514 to be coated is held stationary relative to the target with or without masking present. The target or other deposition means are activated and the substrate is coated in areas not masked. The part then cycles to another deposition bay where the process is repeated with the same or different masking arrangement.

The number of deposition bays is selected based on a given application. In order to produce the construction described in FIG. 8a the substrate would be arranged with only the plug mask so that both bands A and B receive the coating. Optionally, the plug mask 8512 may be absent so that the layer 8416 covers the entire surface of the substrate in addition to the regions A and B. Further, the edge mask 8510 is used to prevent the deposition of the layer 8422 in the region A and the plug mask 8512 is used to limit the deposition of layer 8422 in the region B. The layer 8418 would be disposed similarly to the layer 8416. In the case of the layer 8420, only the plug mask 8512 would be used. It is understood that other masks may be added or subtracted as needed to achieve the proper thickness and locations of the layers on the part and is within the capabilities of one skilled in the art.

Figure 86:
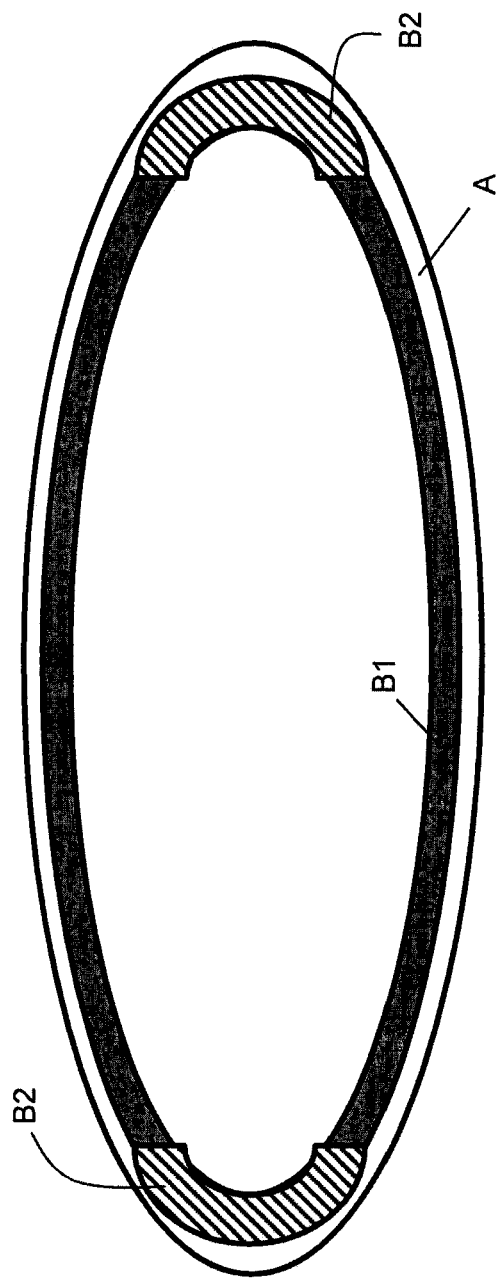
FIG. 86 shows an embodiment of a two-band peripheral ring having a non-uniform thickness.

Generally, a dark material such as an appliqué may be disposed at the back of the mirror element. In embodiment including two lites of glass, such appliqué may be disposed on or behind the fourth surface and does not need to terminate at an edge of peripheral region B. For aesthetic reasons, such as matching the color of the vehicle interior, the appliqué may be of a color other than black. In other embodiments it is possible that embedded light sources with means such as matte finish and/or anti-reflective coatings (to decrease the visibility when off) are incorporated within region B. If the band B has low reflectance (and, accordingly, high transmittance) and the adjacent band A has high reflectance (and low transmittance), the light from the embedded light sources will traverse the mirror element towards the viewer substantially only through the band B because the band A and the central portion of the mirror have a relatively low transmittance. Alternatively, the light can originate from the edges of the glass or from another source direction and transmit through zone B either relatively collimated or with a spread of angles. The light source(s) of the embodiment may be arranged and integrated with other functionalities for a variety of purposes. In one embodiment the light sources indicate an approaching vehicle in the blind spot of the driver by scrolling from the top middle to the top left for a vehicle on the left and from the top middle to the top right for vehicles in the right blind zone. The light sources could also be used as a compass indicator with light at the top middle and bottom of the mirror corresponding to N, S, E, W. with additional points as desired. The light source(s) could also be used as a make-up or vanity mirror that might only allow activation if the vehicle were in park. Decorative functions or themes such as a holiday theme of red and green lights could also be incorporated into the peripheral ring lighting. Additionally, layers in a particular band of a peripheral ring may have non-uniform thickness as needed to attain particular functional or aesthetic effects. This can be seen in FIG. 86, where a band in region B is divided into two portions designated as B1 and B2 and generally having different reflectance and transmittance values. The two regions in zone B can be comparable to stacks of the prior or related art and as described of the novel coatings and structures defined in this patent. The transmittance in the low reflectance and high reflectance zones, in some embodiments, is less than about 5%, preferably less than about 2%, more preferably less than about 0.5% and most preferably less than about 0.25%. This is so that the seal is protected from UV light which can degrade the integrity of the seal, as described above. If, however, it is important to convey visual information through the seal area, the transmittance may be relatively high as described above.

As already mentioned, in a specific embodiments it may be beneficial to have all or part of the multi-band peripheral ring be at least partly transparent in the visible, UV or NIR spectra. For instance, a glare sensor can be positioned behind the ring when a band of region A and/or B has sufficient transmittance in the relevant part of the electromagnetic spectrum and the seal (if present in a particular band) also has the necessary transmittance. Here, teachings of U.S. Pat. Nos. 7,342,707; 7,417,717; 7,663,798 (different means for attaining a transflective coating, including a graded transition) and U.S. patent application Ser. Nos. 11/682,121; 11/713,849; 11/833, 701; 12/138,206; 12/154,824; 12/370,909 (transflective stacks, including means to minimize the color difference between multiple zones of a mirror element and to increase durability) can be advantageously utilized. A number of different means may be employed to produce a transflective ring. For instance, a band of a multi-band peripheral ring may comprise a thin metal layer, a semiconductor material such as silicon, or may be composed of a dielectric multilayer stack. Silver or a dielectric multi-layer is most applicable when both relatively high transmittance and reflectance is desired. The semiconductor layer may comprise Silicon or doped silicon. Small amounts of dopants may be added to alter the physical or optical properties of the Silicon to facilitate its use in different embodiments. The benefit of a semiconductor layer is that it enhances the reflectivity with less absorption compared to a metal. Another benefit of many semiconductor materials is that they have a relatively low band gap. This equates to an appreciable amount of absorption at the UV and blue-to-green wavelengths and high transmittance in the amber/red parts of the spectrum is needed for sensors and the like. The preferential absorption of one or more bands of light lends the coating to have relatively pure transmitted color. The high transmitted color purity equates to having certain portions of the visible or near infrared spectra with transmittance values greater than 1.5 times the transmittance of the lower transmitting regions. More preferably the transmittance in the high transmitting region of a multi-band transflective peripheral ring will be more than 2 times the transmittance in the low transmitting region of a multi-band transflective peripheral ring and most preferably more than 4 times the transmittance in the low transmitting region. Alternately or in addition, the transmitted color of a transflective band of a multi-band peripheral ring should have a C* value greater than about 8, preferably greater than about 12 and most prefer ably greater than about 16. Other semiconductor materials that result in transflective coatings with relatively high purity transmitted color include SiGe, InSb, InP, InGa, InAlAs, InAl, InGaAs, HgTe, Ge, GaSb, AlSb, GaAs and AlGaAs. Other semiconductor materials that would be viable would be those that have a band gap energy at or below about 3.5 eV. In an application where stealthy characteristics are desired and a red signal is used then a material such as Ge or an SiGe mixture may be preferred. Ge has a smaller band gap compared to Si and this resulting in relatively low transmittance levels within greater wavelength range, which facilitates the "hiding" of any features behind the mirror. If a uniform transmittance is needed then it would be advantageous to select a semiconductor material that has a relatively high band gap.

Figure 87A:
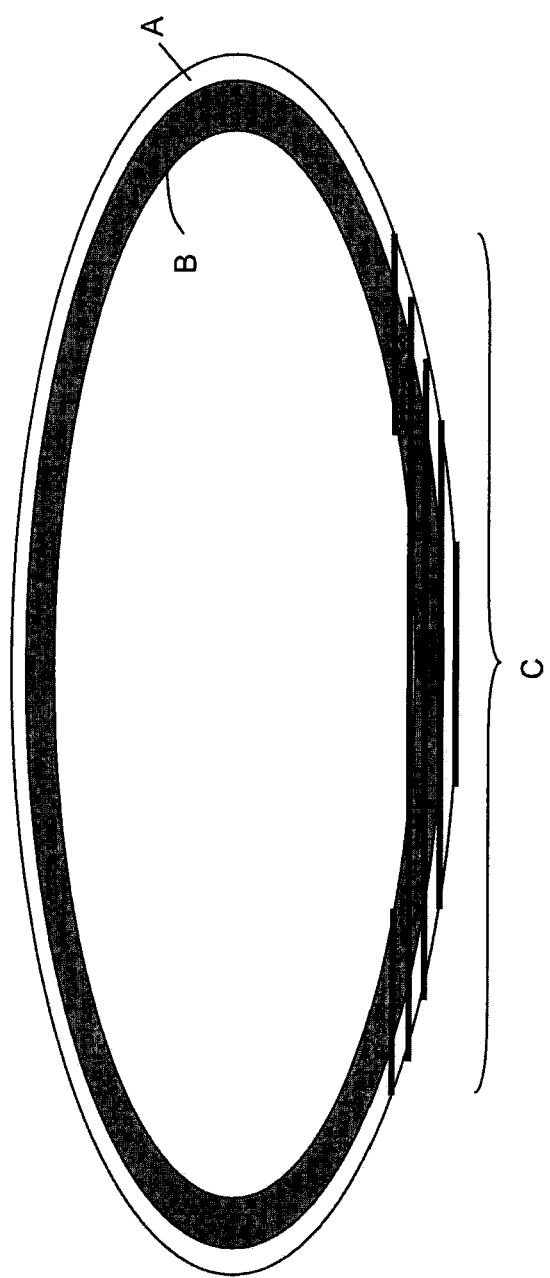
FIGS. 87(A, B) illustrate an embodiment of a two-band peripheral ring with a portion that is transflective.
FIG. 87B: a sensor is positioned behind the transflective portion of a two-band peripheral ring.
FIG. 87C illustrates transmission and reflection spectra of one embodiment of a transflective thin-film stack used on a second surface of the mirror system of the invention.
Figure 87B:
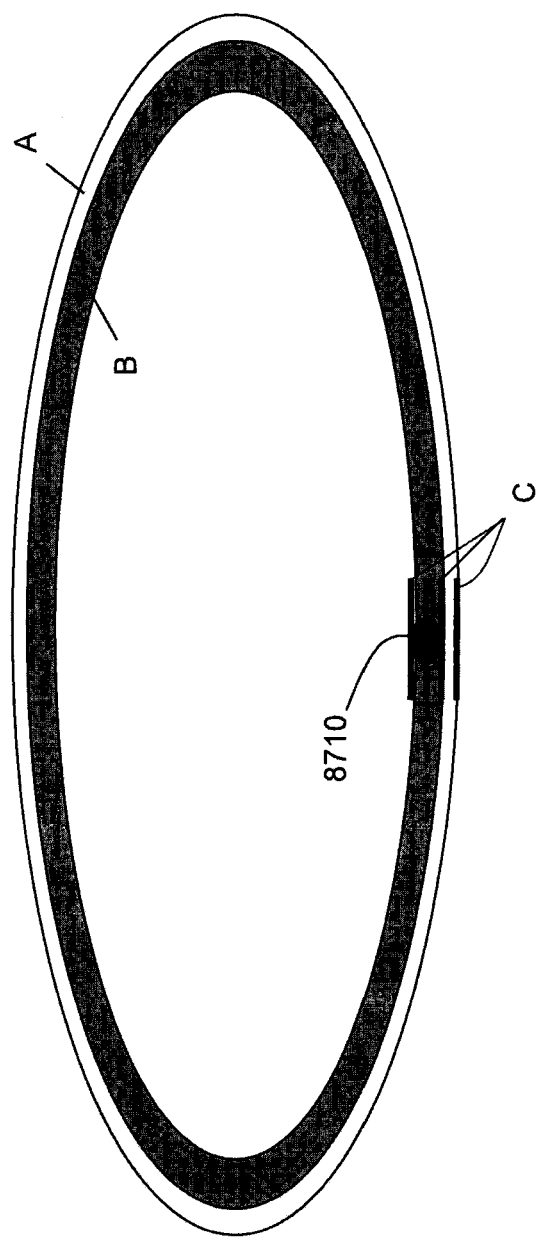
Figure 87C:
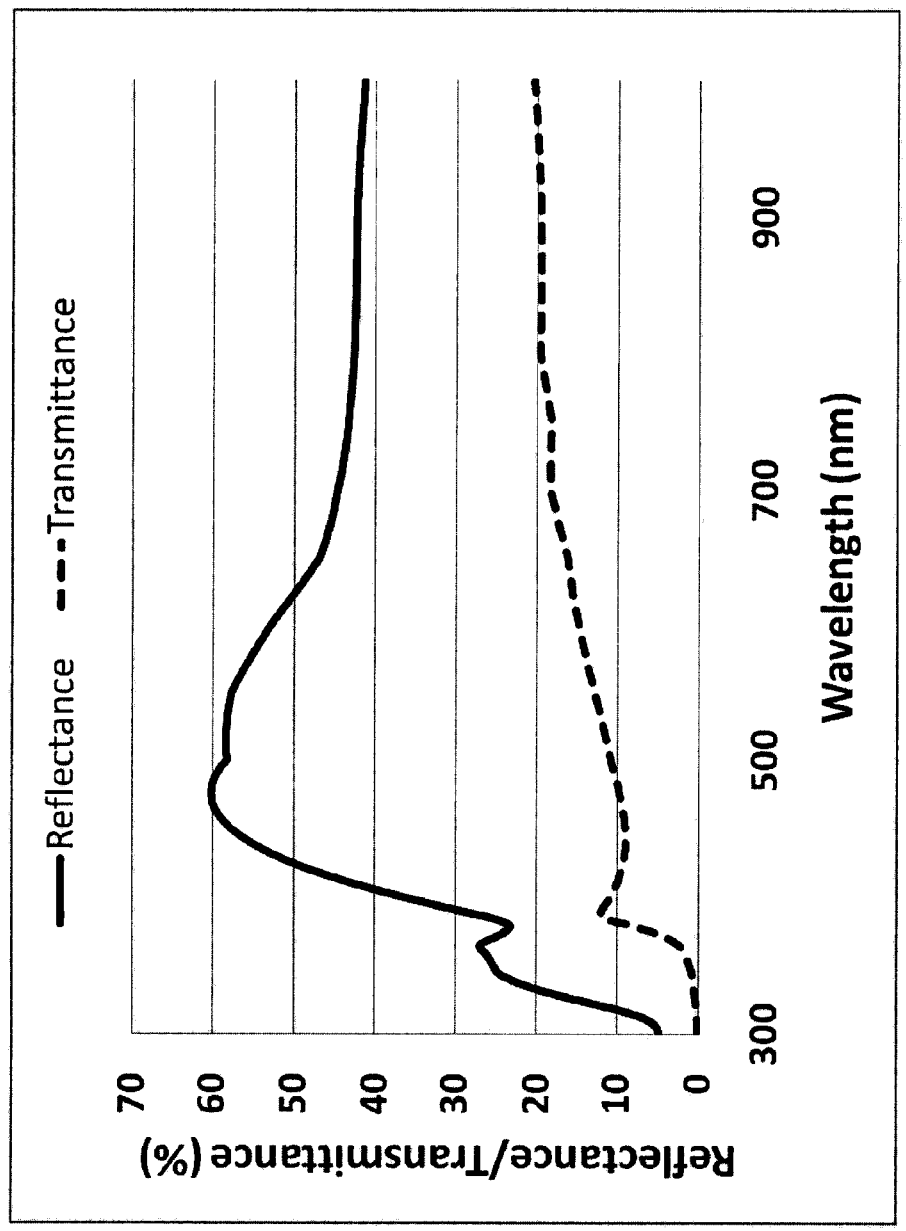

FIG. 87A shows an example where a portion C of a two-band peripheral ring is transflective, while another portion includes the above-described bands A and B. Optionally, the portion of the ring outside of portion C may consist of a single band A, produced with the desired aesthetics for a given application. The transflective portion C may cover a part or the entire peripheral ring as needed for a given application. In FIG. 87B, the transflective portion C is relatively small and a sensor 8710 is placed behind it. The sealing element (not shown) may be positioned in the portion C such that it does not block the light from reaching the sensor or, optionally, the seal may be formed by using a clear seal. The transitions between the opaque zone A and the transflective zone C may be formed using means taught in "multi-zone mirror" so that there is no discernable line or interface between the two zones. Some examples of transflective thin-film stacks for use with corresponding opaque zone are listed in Table 9c. Examples A through I in Table 9c all include a specific embodiment of a transflective surface II perimeter ring stack. Examples A, B, C and G also include an opaque equivalent. In each case, the stack is identified as being on surface II with the glass substrate listed as the first entry. Each subsequent entry represents a layer applied to surface 2 subsequent to the layer listed above it. The opaque versions are designed to match the color and reflectance of the transflective perimeter ring stack as closely as is reasonable for embodiments where it is desirable for only a portion of the perimeter ring to be transflective with the remainder being essentially opaque. The thickness of each layer is shown in nanometers. The transmittance (%), reflectance (%) and color (a*, b*) are also given for each example. In each case other than A, the transition between the transflective stack and the opaque stack can be abrupt, which will yield a reasonably stealthy transition, or the transition can be graded to yield a very stealthy transition. Example A would likely require a graded transition in order to appear stealthy. Both approaches are taught in detail in U.S. 2009/0207513. FIG. 87C shows the reflectance and transmittance of example H. The spectra show low transmittance in the UV portion of the solar spectrum and a relatively high transmittance in the visible spectrum. Preferably the UV transmittance is less than about 15% of the visible transmittance, preferably less than about 10% of the visible transmittance and most preferably less than about 5% of the visible transmittance.

TABLE 9c

Examples of surface 2 transflective thin film stacks, some with matching opaque equivalents.

| Example | Transflective: | | | | | | Opaque: | | | | | |
|---|---|---|---|---|---|---|---|---|---|---|---|---|
| | Layer | nm | % T | % R | a* | b* | Layer | nm | % T | % R | a* | b* |
| A | Glass | | 5.1 | 64.9 | 0.4 | 4.8 | Glass | | 0.8 | 73.2 | −0.4 | 1.8 |
| | Al90/Si10 | 23.5 | | | | | Al90/Si10 | 40.0 | | | | |
| | ITO | 145.0 | | | | | ITO | 145.0 | | | | |
| B | Glass | | 6.5 | 46.2 | −1.8 | −3.8 | Glass | | 0.7 | 57.1 | −1.3 | −2.5 |
| | Cr | 14.0 | | | | | Cr | 35.0 | | | | |
| | ITO | 145.0 | | | | | ITO | 145.0 | | | | |
| C | Glass | | 5.5 | 52.8 | −1.1 | 0.3 | Glass | | 0.5 | 63.7 | −1.0 | 2.7 |
| | Brass | 10.0 | | | | | Brass | 10.0 | | | | |
| | Cr | 13.0 | | | | | Cr | 35.0 | | | | |
| | ITO | 145.0 | | | | | ITO | 145.0 | | | | |
| D | Glass | | 10.1 | 34.0 | 4.5 | −4.6 | | | | | | |
| | Ti | 35.0 | | | | | | | | | | |
| | ITO | 145.0 | | | | | | | | | | |
| E | Glass | | 8.2 | 40.9 | 4.2 | 0.2 | | | | | | |
| | Brass | 5.0 | | | | | | | | | | |
| | Ti | 35.0 | | | | | | | | | | |
| | ITO | 145.0 | | | | | | | | | | |
| F | Glass | | 8.8 | 64.9 | 2.2 | 2.5 | | | | | | |
| | 7X | 25.0 | | | | | | | | | | |
| | Ru | 5.0 | | | | | | | | | | |
| | ITO | 145.0 | | | | | | | | | | |
| G | Glass | | 21.5 | 65.4 | 0.4 | 3.1 | Glass | | 2.0 | 65.7 | 0.7 | 0.0 |
| | ITO | 72.7 | | | | | ITO | 72.7 | | | | |

TABLE 9c-continued

Examples of surface 2 transflective thin film stacks, some with matching opaque equivalents.

| Example | Transflective: | | | | | | Opaque: | | | | | |
|---|---|---|---|---|---|---|---|---|---|---|---|---|
| | Layer | nm | % T | % R | a* | b* | Layer | nm | % T | % R | a* | b* |
| | 7X | 14.0 | | | | | 7X | 14.0 | | | | |
| | Ni | 0.0 | | | | | Ni | 30.0 | | | | |
| | 7X | 9.3 | | | | | 7X | 9.3 | | | | |
| H | Glass | | 12.9 | 56.2 | −5.7 | −0.1 | | | | | | |
| | ITO | 115 | | | | | | | | | | |
| | Cr | 5 | | | | | | | | | | |
| | Ru | 5 | | | | | | | | | | |
| | Si | 115 | | | | | | | | | | |
| I | Glass | | 31.4 | 66.2 | −1.7 | 0.6 | | | | | | |
| | TiO2 | 54.5 | | | | | | | | | | |
| | SiO2 | 91.4 | | | | | | | | | | |
| | TiO2 | 54.5 | | | | | | | | | | |
| | SiO2 | 91.4 | | | | | | | | | | |
| | TiO2 | 54.5 | | | | | | | | | | |
| | ITO | 72.1 | | | | | | | | | | |

Figure 88B:
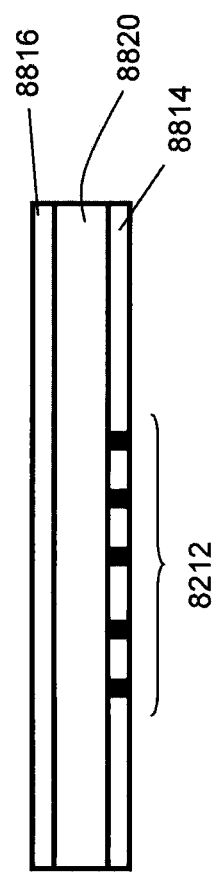
FIGS. 88(A-D) illustrate alternative embodiments and uses of a transflective multi-band peripheral ring of the invention.
Figure 88C:
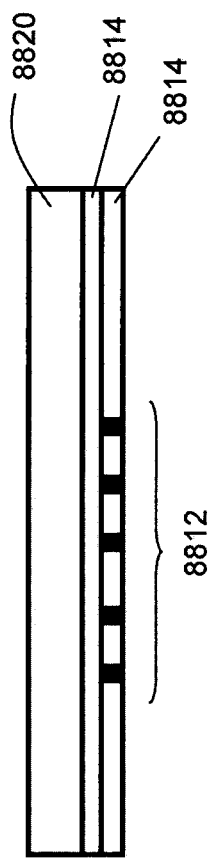
Figure 88A:
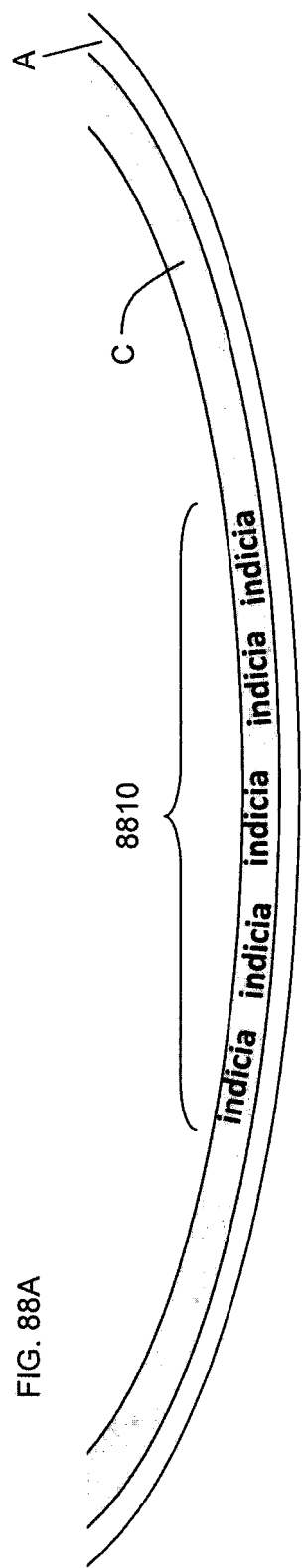
Figure 88D:
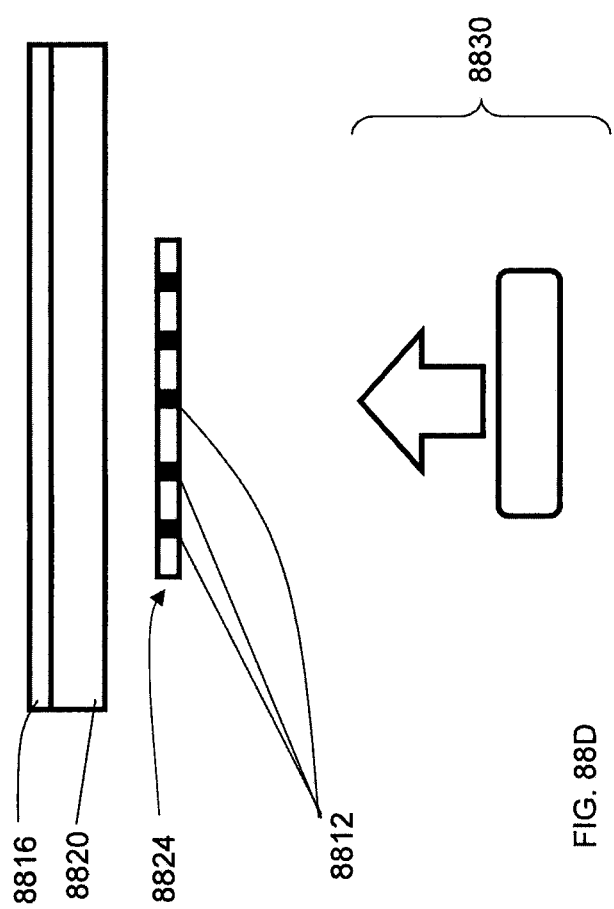

In another embodiment of a peripheral ring, as shown in FIG. 88A, a transflective portion C of a two-band (A and C) peripheral ring may include indicia or icons 8810. The indicia may be invisible under normal conditions and only become observable when needed. In other embodiments it may be preferable to have the indicia visible under normal conditions. In yet another embodiment, the indicia may become observable via voice activation, proximity sensors or other means. In the embodiment where the ring is transflective, the openings 8812 for indicia or icons 8810 may be formed in a relatively opaque coating 8814 located behind a transflective coating 8816 on one of the surfaces of a corresponding substrate 8820, as shown in FIGS. 89B and 89C. Alternatively, the openings 8812 for indicia or icons may be present on a separate masking element 8824 located behind the transflective coating 8816 of the peripheral ring and only become visible when the light unit 8830 of the rearview assembly is activated, see FIG. 88D.

Optimization of Choice of Materials for Reflectance Enhancement.

Earlier in this application described was a means of increasing the reflectance of a portion of the peripheral ring with the use of high reflectance (HR) metallic layers by disposing them directly on a TCO, dielectric or another other layer, directly on glass substrate, or an optional adhesion-enhancement layer that may be present on the glass surface. The high reflectance metals appropriate for such a purpose are defined based on their bulk reflectance properties and, to a large extent, their intrinsic color. Preferably the high reflectance metal should have a neutral color so that ambient light reflected from the resulting peripheral ring substantially matches in color the light reflected from the central portion of the mirror element. Earlier examples illustrated in Tables 1a through 1e showed how the use of different metallic layers and thickness of those layers in a peripheral ring can affect the color match between the ring and the central portion of the mirror. Table 10 below illustrates the reflectance values characterizing various metallic 3 nm-thick layers deposited on and viewed through the glass substrate and comparisons of these reflectance values and color of reflected ambient light with that of the glass substrate itself.

TABLE 10

| Material | Reflectance | a* | b* | Delta R | Delta a* | Delta b* |
|---|---|---|---|---|---|---|
| glass | 7.9 | −0.2 | −0.6 | | | |
| 3 nm cobalt | 5.8 | −0.1 | 0.0 | −2.2 | 0.1 | 0.6 |
| 3 nm chrome | 6.3 | −2.0 | −2.3 | −1.7 | −1.8 | −1.7 |
| 3 nm iridium | 6.7 | −0.9 | 0.7 | −1.3 | −0.8 | 1.2 |
| 3 nm Mo | 5.4 | −2.9 | −1.2 | −2.6 | −2.7 | −0.7 |
| 3 nm Ag with 7% Au | 11.0 | 1.3 | 4.1 | 3.1 | 1.5 | 4.6 |
| 3 nm Au | 7.8 | 0.8 | 9.2 | −0.2 | 0.9 | 9.8 |
| 3 nm Cd | 8.5 | −0.5 | −0.4 | 0.5 | −0.3 | 0.2 |
| Cu 3 nm | 6.9 | 5.1 | 3.7 | −1.1 | 5.3 | 4.3 |
| 3n 5050 SnCu | 6.7 | −0.1 | 0.6 | −1.2 | 0.0 | 1.2 |
| 3 nm 5050 CuZn | 7.5 | 1.0 | 4.7 | −0.4 | 1.2 | 5.3 |
| 3 nm Nb | 4.2 | −0.1 | −1.3 | −3.7 | 0.1 | −0.7 |
| 3 nm Pd | 6.5 | 0.3 | 0.6 | −1.4 | 0.5 | 1.1 |
| 3 nm Ru | 10.5 | 0.4 | −0.1 | 2.5 | 0.6 | 0.4 |
| 3 nm Pt | 5.5 | 0.2 | 0.5 | −2.4 | 0.3 | 1.0 |
| 3 nm Rhenium | 5.8 | −1.5 | −4.7 | −2.2 | −1.3 | −4.1 |
| 3 nm Rh | 7.7 | 0.7 | 0.3 | −0.3 | 0.9 | 0.9 |
| 3 nm Ta | 5.1 | −0.2 | −0.2 | −2.9 | 0.0 | 0.4 |
| 3 nm Ag | 10.3 | 1.2 | 3.7 | 2.4 | 1.4 | 4.3 |
| 3 nm Al | 19.9 | 0.2 | 3.5 | 11.9 | 0.4 | 4.0 |

Table 11 illustrates values of real and imaginary parts of the refractive indices at 550 nm for various metals.

TABLE 11

| Metal | n @550 nm | K @550 nm |
|---|---|---|
| Ag | 0.136 | 3.485 |
| AgAu7x | 0.141 | 3.714 |
| Al | 0.833 | 6.033 |
| Al:Si 60:40 | 3.134 | 4.485 |
| Al:Si 90:10 | 1.244 | 4.938 |
| Al:Ti 50:50 | 2.542 | 2.957 |
| Al:ti 70:30 | 2.885 | 3.392 |
| Au | 0.359 | 2.691 |
| Cd | 1.041 | 4.062 |
| Co | 2.053 | 3.826 |
| Cr | 2.956 | 4.281 |
| Cu | 0.958 | 2.577 |
| CuSn | 1.871 | 4.133 |
| CuZn | 0.587 | 2.854 |
| Ge | 3.950 | 1.975 |
| Ir | 2.229 | 4.314 |
| Mo | 3.777 | 3.521 |
| Nb | 2.929 | 2.871 |
| Ne | 1.772 | 3.252 |
| Pd | 1.650 | 3.847 |
| Pt | 2.131 | 3.715 |

TABLE 11-continued

| Metal | n @550 nm | K @550 nm |
|---|---|---|
| Re | 4.253 | 3.057 |
| Rh | 2.079 | 4.542 |
| Ru | 3.288 | 5.458 |
| Ta | 3.544 | 3.487 |
| Ti | 1.887 | 2.608 |
| V | 3.680 | 3.019 |
| W | 3.654 | 3.711 |
| Zn | 1.117 | 4.311 |
| Zr | 1.820 | 0.953 |

It is known by one skilled in the art that refractive index of a given metal and dispersion of refractive index are dependent on the process and deposition parameters used to produce the coating and that a deposition processes can be optimized to slightly modify optical constants of a particular metal. The difference between material properties of thin metallic films as compared to bulk (or thick film) metals has limited the use of metals, at least in applications related to automotive rearview mirror assemblies, to substantially thick metallic layers where the optical properties are more predictable and consistent with the "bulk"-metal behavior. The data of Table 10 suggest that, generally, metals would not be optimal materials for increasing the reflectance of other metals or, if such a possibility exists, then at least the increase in reflectance may not be accompanied with a neutrality of color. As a result, the use of thin metallic film for reflectance-enhancement of multi-layer stacks has been substantially limited.

The following describes an attempt to formulate a generalized approach of determining which metals can be reliably used for enhancing the reflectance of a simple structure comprising a chosen metallic material (referred to hereinafter as a base metal) carried by a thick glass superstrate that acts as incident medium. In particular, such reflectance-enhancing (RE) metallic layers are considered to be disposed on a second surface of the thick glass superstrate and the base metal. The change in reflectance is being considered in light incident onto the metallic layers through the glass superstrate and reflected back to the first surface. The generalized approach is determined based on considering the relationships, between the real and imaginary parts of refractive indices for several base metals and several 3 nm thick RE-metallic layers, that allow for increase in reflectance at issue. The D65 Illuminant and 10 degree observer color standards were used for all calculations.

Example 1

Environmentally stable and low-cost Chromium is used as the base metal. A thin film program was used to calculate the resultant color and reflectance of light for the different 3 nm-thick RE-metallic layers. The results are summarized in Table 12.

TABLE 12

| Structure | Reflectance | a* | b* |
|---|---|---|---|
| Reference (Glass + chrome base layer) | 52.3 | −1.9 | −0.7 |
| Reference + RE-layer made of . . . | | | |
| cobalt | 54.3 | −1.6 | 0.5 |
| chrome | 52.3 | −1.9 | −0.7 |
| iridium | 54.8 | −1.8 | 0.6 |

TABLE 12-continued

| Structure | Reflectance | a* | b* |
|---|---|---|---|
| Mo | 50.1 | −1.4 | 1.5 |
| Ag with 7% Au | 57.4 | −1.7 | −0.3 |
| Au | 54.7 | −2.1 | 2.1 |
| Cd | 56.7 | −1.7 | −0.6 |
| Cu | 54.4 | −1.3 | 0.3 |
| SnCu 5050 | 55.2 | −1.7 | 0.2 |
| CuZn 5050 | 55.0 | −1.7 | 0.9 |
| Nb | 50.9 | −1.4 | 1.4 |
| Pd | 55.2 | −1.6 | 0.3 |
| Ru | 54.9 | −1.6 | 0.2 |
| Pt | 53.9 | −1.6 | 0.8 |
| Rhenium | 47.6 | −1.2 | 4.3 |
| Rh | 55.7 | −1.4 | 0.4 |
| Ta | 50.2 | −1.6 | 2.1 |
| Ag | 56.9 | −1.7 | −0.2 |
| Al | 62.2 | −1.5 | −0.9 |
| Al:Si 60:40 | 53.2 | −1.6 | 0.3 |
| Al:Si 90:10 | 58.3 | −1.7 | −0.3 |
| Al:Ti 50:50 | 51.8 | −1.7 | 0.9 |
| Al:Ti 70:30 | 51.7 | −1.6 | 1.3 |
| Ge | 47.4 | −1.9 | −1.1 |
| Ni | 53.8 | −1.7 | 0.8 |
| Ti | 52.7 | −1.8 | 0.4 |
| W | 49.2 | −1.7 | 3.1 |
| V | 49.4 | −0.7 | 0.8 |
| Zn | 56.7 | −3.1 | −1.1 |
| Zr | 51.7 | −1.9 | −0.7 |

Figure 89A:
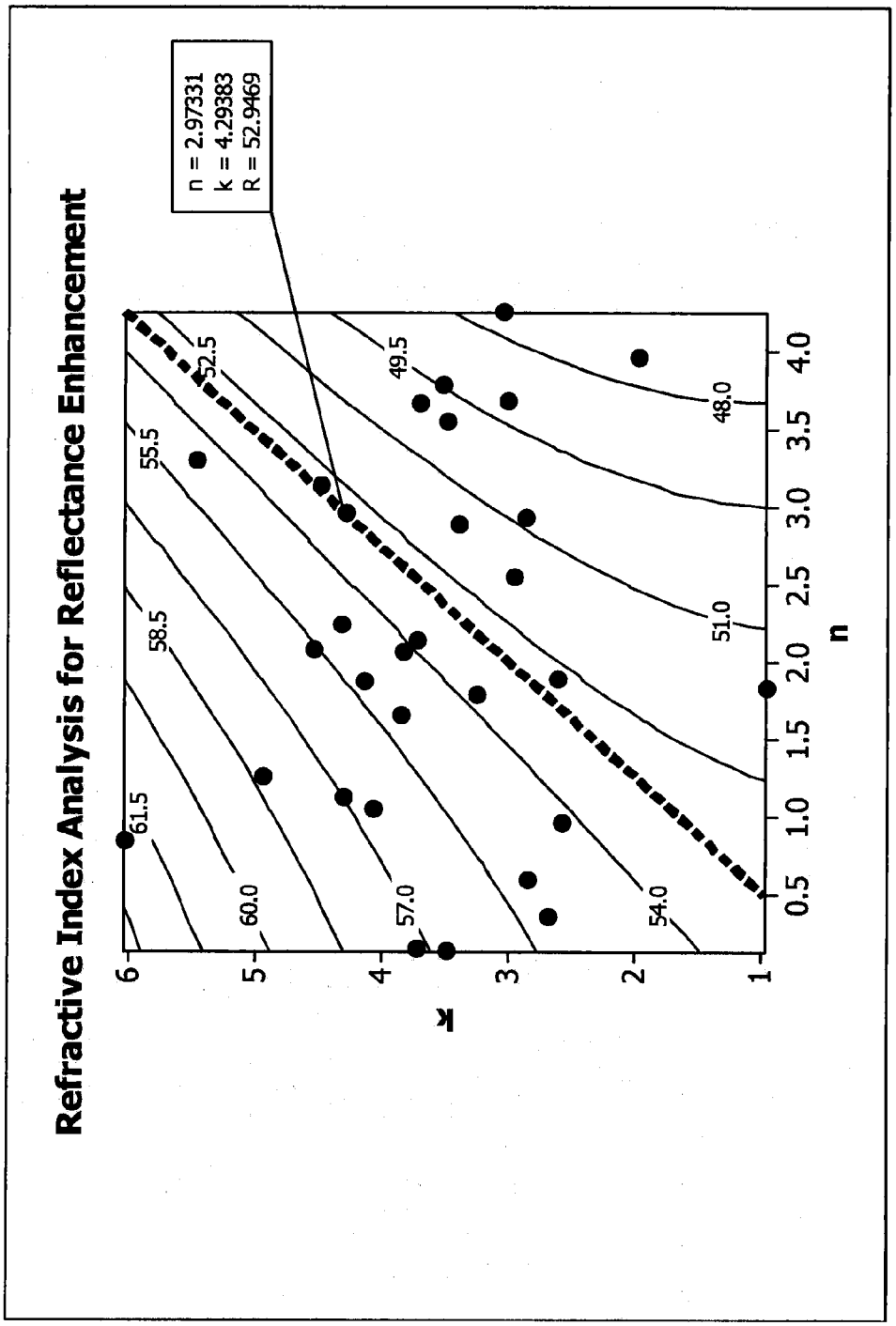
FIGS. 89(A-C) show variations in reflectance values as functions of real and imaginary parts of refractive index of a metal layer used for reflectance-enhancement in three corresponding embodiments of the invention.
Figure 89B:
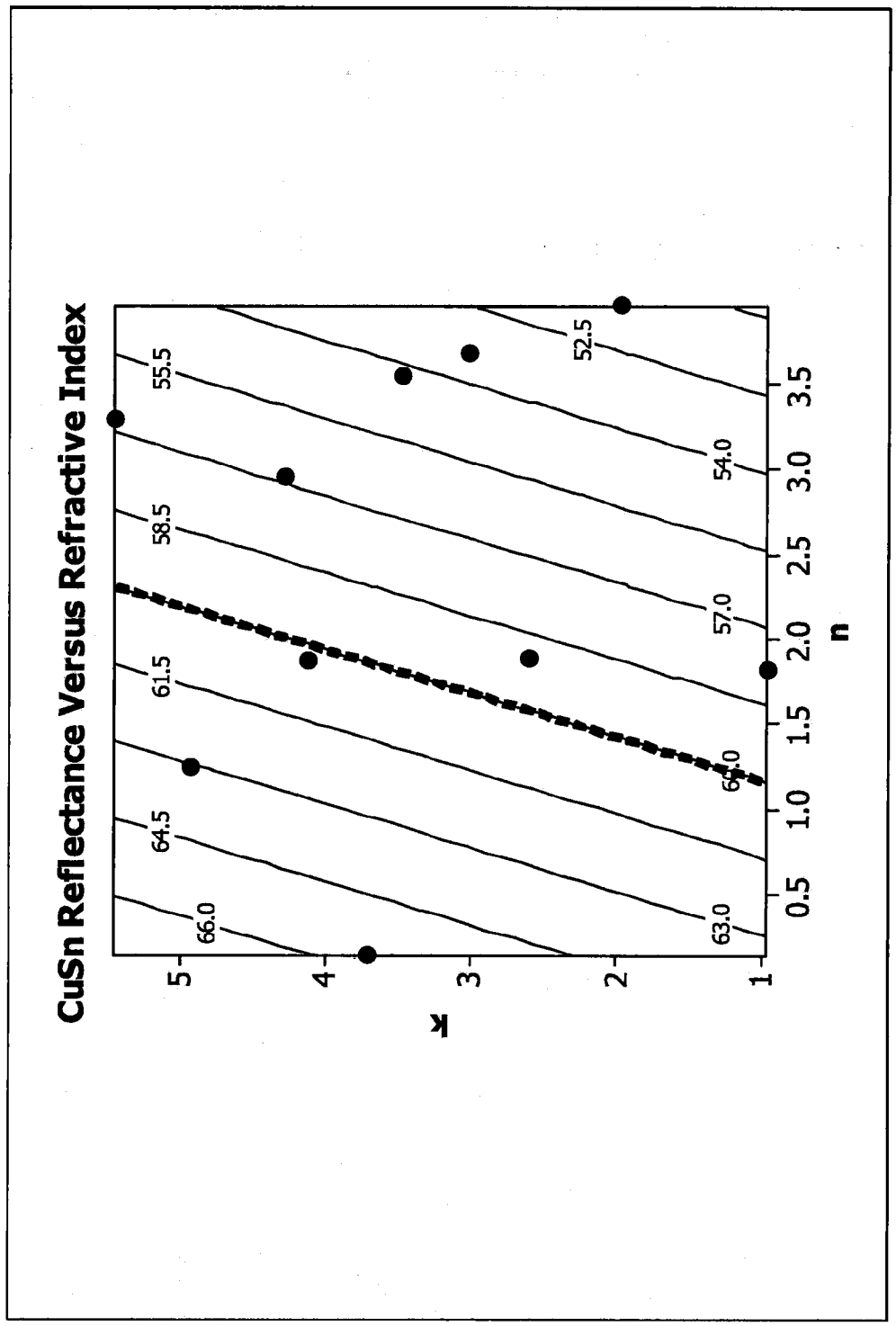
Figure 89C:
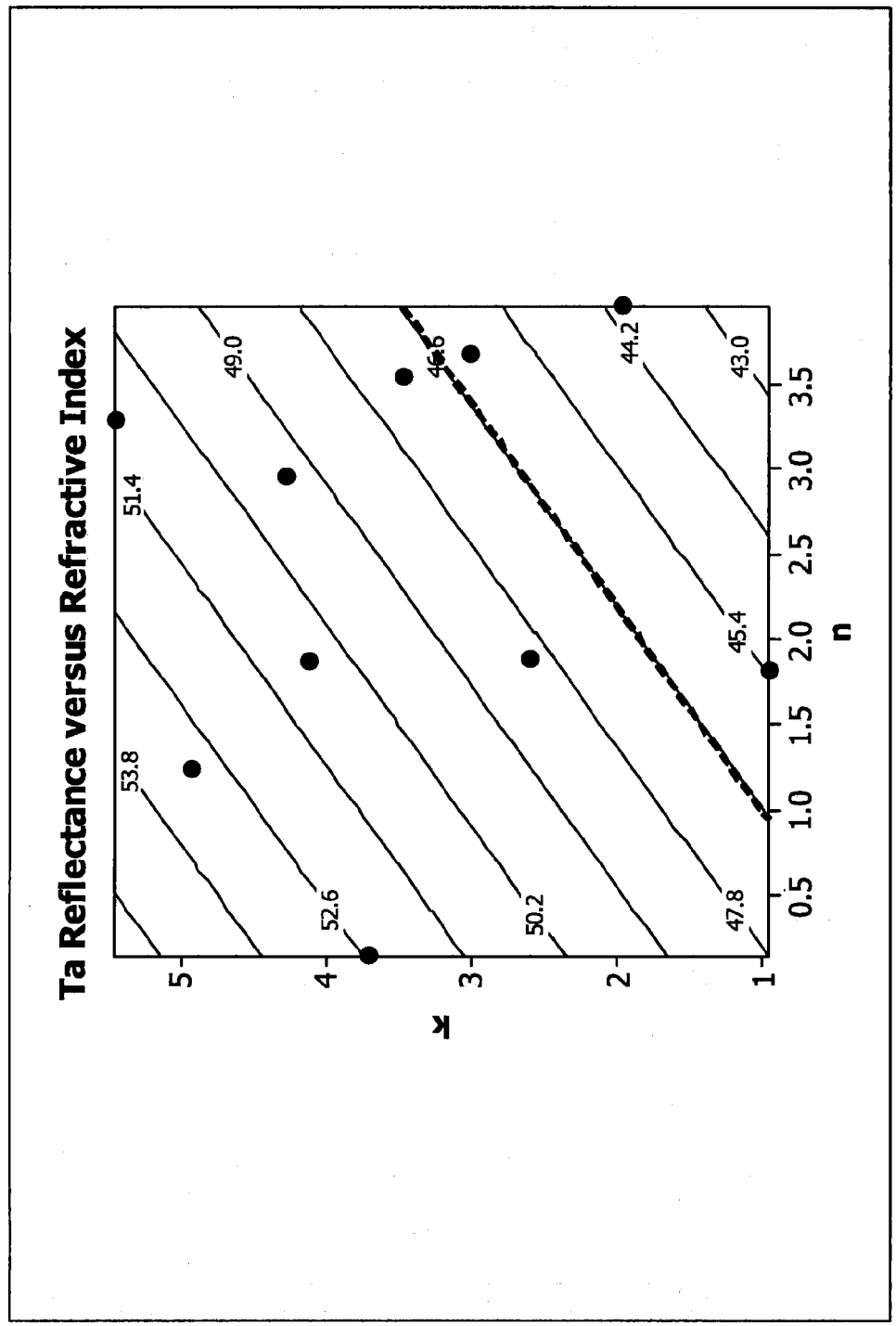

FIG. 89A graphically shows a corresponding change in reflectance of the considered structures of Table 12 with n (real part of the index of the RE-metal, x-axis) and k (imaginary part of the index of RE-metal, y-axis). The dots on the graph represent the reflectance values for the different RE-metals. The contour lines represent contours of iso-reflectance. The dashed line represents a contour approximately describing the reference structure of Table 12. The use of metals having n and k values falling to the right of the dashed reference line as RE-metals leads to decrease of the reflectance value of the structure, while the use of metals with n and k values falling to the left of the dashed reference line leads to the overall increase in reflectance. Based on the dashed reference iso-contour, the condition on RE-metals assuring the increase in reflectance of the reference structure of Table 12 is k−1.33n≥0.33. It is understood that when a metal satisfying the above equation is used as a RE-layer added to the reference structure, the increase of the RE-layer thickness above 3 nm will only further increase the overall reflectance. Generally, therefore, the thickness of the RE-metallic layer should be greater than about 1 nm, preferably greater than about 3 nm, more preferably greater than about 5 nm and most preferably greater than about 10 nm. As noted above there may be other layers between the reflectance enhancement layer and the substrate.

Similarly, two additional examples have been considered: Example 2 with CuSn alloy (50:50) as the base metal, and Example 3 with Ta as the base metal. Table 13 and FIG. 89B present results for Example 3, while Table 14 and FIG. 89C summarize the results for Example 4.

TABLE 13

| Structure | n | k | R | a* | b* |
|---|---|---|---|---|---|
| Reference (Glass + CuSn base layer) | 1.871 | 4.133 | 60.0 | −0.4 | 3.2 |
| Reference + RE-layer made of . . . | | | | | |
| AgAu7x | 0.141 | 3.714 | 65.4 | −0.4 | 3.3 |

TABLE 13-continued

| Structure | n | k | R | a* | b* |
|---|---|---|---|---|---|
| Al:Si 90:10 | 1.244 | 4.938 | 64.1 | −0.5 | 2.7 |
| Cr | 2.956 | 4.281 | 56.2 | −0.2 | 1.5 |
| Ge | 3.950 | 1.975 | 50.3 | 0.1 | 2.3 |
| Ru | 3.288 | 5.458 | 56.7 | −0.6 | 2.3 |
| Ta | 3.544 | 3.487 | 52.4 | 0.2 | 5.4 |
| Ti | 1.887 | 2.608 | 58.1 | −0.3 | 4.0 |
| V | 3.680 | 3.019 | 57.3 | 0.4 | 2.5 |
| Zr | 1.820 | 0.953 | 58.4 | −0.4 | 3.0 |

TABLE 14

| Structure | n | k | R | a* | b* |
|---|---|---|---|---|---|
| Reference (Glass + Ta base metal) | 3.544 | 3.487 | 46.6 | 0.2 | 3.7 |
| Reference + RE-layer made of . . . | | | | | |
| AgAu7x | 0.141 | 3.714 | 51.9 | 0.1 | 4.0 |
| Al:Si 90:10 | 1.244 | 4.938 | 53.6 | −0.1 | 3.1 |
| Cr | 2.956 | 4.281 | 49.2 | −0.3 | 1.9 |
| CuSn | 1.871 | 4.133 | 50.6 | 0.0 | 3.4 |
| Ge | 3.950 | 1.975 | 42.9 | 0.1 | 1.0 |
| Ru | 3.288 | 5.458 | 51.3 | −0.2 | 2.1 |
| Ti | 1.887 | 2.608 | 47.7 | 0.2 | 3.6 |
| V | 3.680 | 3.019 | 47.6 | 0.4 | 2.2 |
| Zr | 1.820 | 0.953 | 46.3 | 0.1 | 3.2 |

The reflectance iso-contour for Example 2 in FIG. 89B is at 60% reflectance and is described by the equation k=3.919*n−3.6129. The higher reflectance is attained when the following condition is met: k−3.919*n≥−3.6129. The reflectance iso-contour for Example 3 in FIG. 89C is at 46.6%. The equation for this contour is estimated to be k=0.8452*n+0.1176. The condition for enhanced reflectance is k−0.8453*n≥0.1176.

Figure 90A:
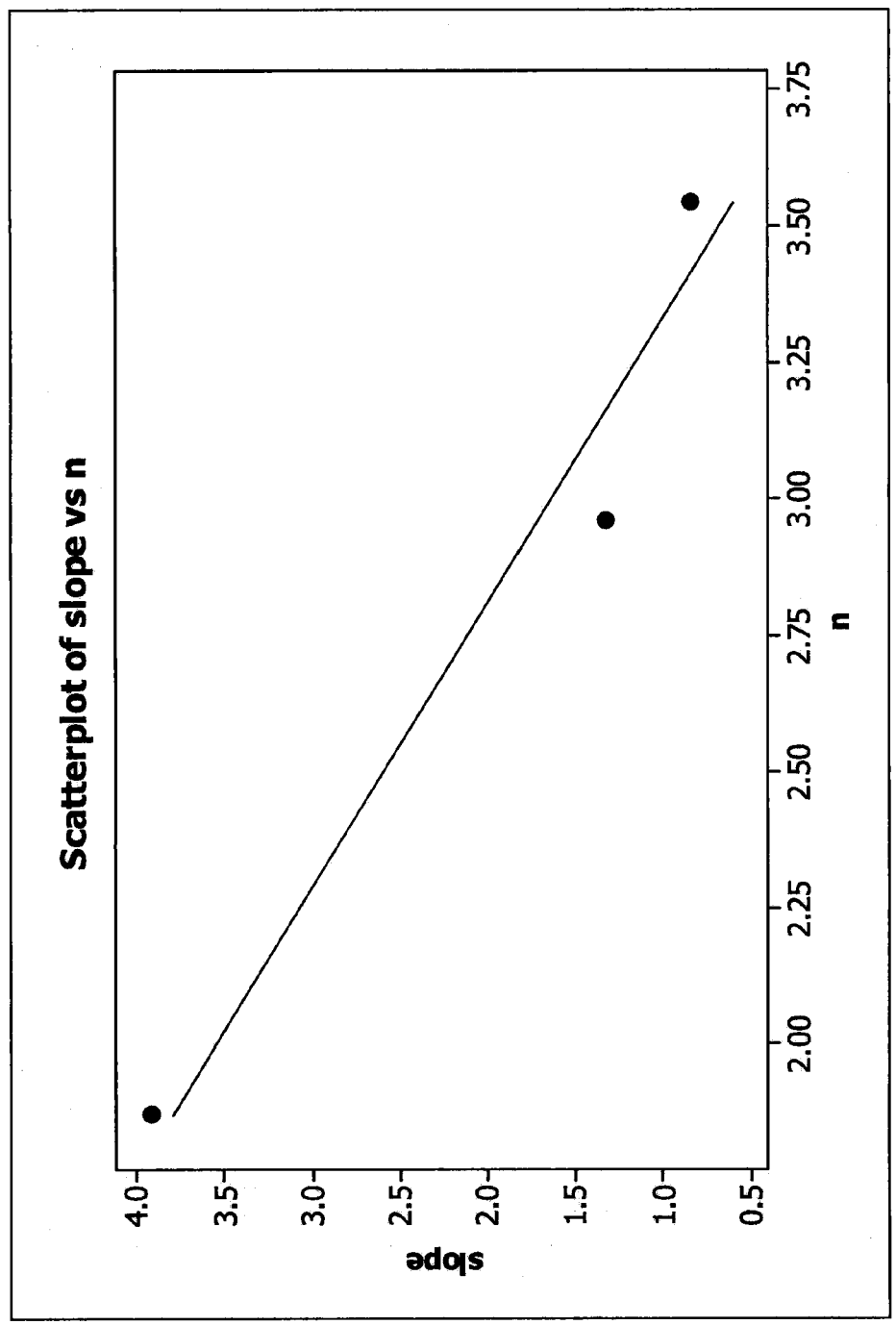
FIGS. 90(A, B) illustrate a derivation of formula facilitating the determination of a metallic material for reflectance-enhancement in embodiments of the invention.
Figure 90B:
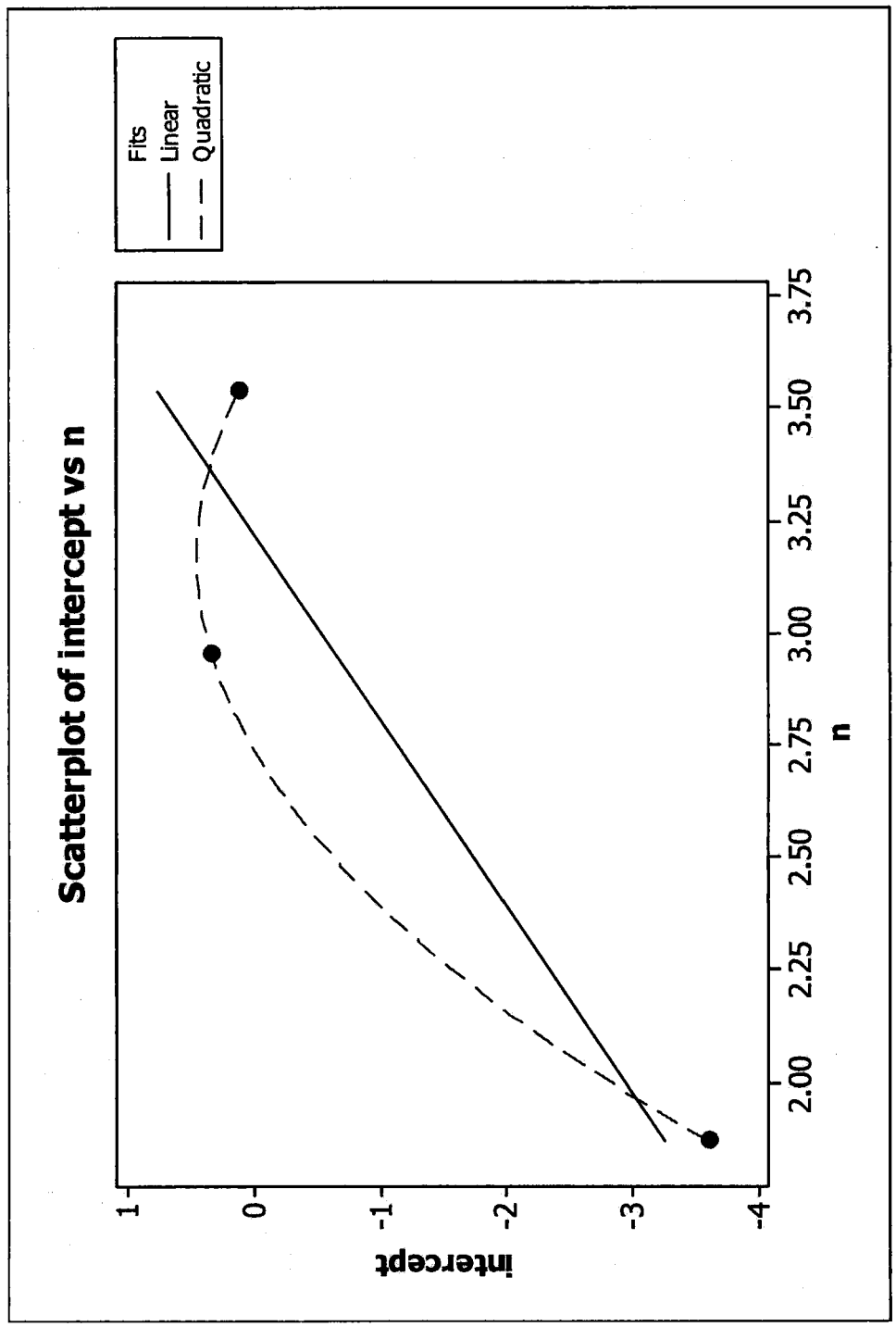

Further, values of slopes of the above three linear dependences and values of k corresponding to n=0 (the intercept of the y-axis) were plotted against values of n to obtain FIGS. 90A and 90B, where discreet results are fitted linearly (FIGS. 90A and 90B) and quadratically (FIG. 90B). The obtained fits are as follows: slope=7.362−1.911*n; linearly fit intercept=2.413*n−7.784 and the quadratically fit intercept=−23.7+15.23*n−2.401*n². Based on these generalized fits, the estimate of the coefficients of the equation necessary to define the optical constants for the RE-metals can be performed.

The appropriate materials for reflectance enhancement taught above are defined for systems with a relatively high refractive index superstrate. Float glass or plastic, for instance, have a relatively high refractive index relative to air. That is why the thin metals, as taught above, act as anti-reflection layers when in contact with, and viewed through, a high index superstrate. A similar behavior occurs with other superstrate materials such as Electrochromic fluid or gel. The EC fluid or gel has a high refractive index relative to air and that is why the reflectance of an EC element is substantially lower than the reflectance of the mirror metalized glass. A mirror system described herein, comprising a first lite of glass with a first and second surface, a transparent electrode arranged on the second surface such as ITO, a second lite of glass with a third and fourth surface, a reflective metal system comprising a first layer of chrome on the third surface and a second layer of ruthenium on the chrome layer with a perimeter seal that forms a chamber between the two lites of glass. The chrome/ruthenium coated glass has a reflectance of about 70% when measured with air as a superstrate and about 57% in the EC configuration. Much of the reflectance drop is due to the high refractive index of the EC fluid being in contact with the ruthenium layer.

Various metals have been taught in the art that exhibit high reflectance and are electrochemically stable in an Electrochromic device. For instance, silver alloys, such as silver gold, or other noble metals such as platinum or palladium have been described in the Electrochromic art. There have been a limited number of viable metals taught in the art due to the combined requirement of high reflectance and electrochemical stability. For instance, as taught in U.S. Pat. No. 6,700,692, the metals must have a sufficient electrochemical potential to function satisfactorily as an anode or cathode in a fluid based electrochemical device. Only noble metals, Au, Pt, Rh, Ru, Pd have demonstrated sufficient reflectivity and electrochemical stability. The prior art references that alloys may be viable but no methods are described that can be used determine which alloys may be viable from a reflectance perspective. The formula described above can be used to target the viable noble metals alloys that will increase the reflectance of a base metal in an electrochromic device. The structure of the coatings on the $2^{nd}$ lite of glass would be glass/base metal/reflectance enhancement noble metal alloy/viewer. The formula taught above demonstrates a way to select improved metal alloys that include noble metals that are suitable for Electrochromic devices.

The previous teaching around the use of noble metals in Electrochromic devices relies on the combination of electrochemical stability and high reflectivity that the noble metals possess. Other metals, other than aluminum, haven't been proposed because they do not have sufficient reflectivity and electrochemical stability. Aluminum has been proposed, but has not been realized practically as a third surface electrode because it does not have sufficient electrochemical stability in a fluid based EC device. Other metals or alloys have not been employed in Electrochromic devices because it is believed that they do not have the necessary reflectivity and electrochemical stability. The discovery described above, where a metal with a newly defined refractive index characteristic can increase the reflectance of a base metal, enables a new class of metals, alloys and materials to be considered for use in Electrochromic mirrors and devices. The REM should increase the reflectance of the base metal by at least 2 percentage points, i.e., 50 to 52%, preferably increase the reflectance by about 5%, more preferably by about 7.5% and most preferably by greater than about 10%.

The refractive index characteristic is insufficient because there is no correlation between this characteristic and the electrochemical potential characteristics. If the REM is doped or alloyed with a noble metal it would fall within the improvements for the noble metal alloys defined above. The REM may be employed in a thin film stack in an intermediate location by the application of a capping layer with sufficient electrochemical properties. The capping layer may be a noble metal, or alloy of a noble metal or may be a transparent conduction oxide such as ITO, IZO or the like described elsewhere in this application. The capping layer, if it does not have a refractive index as defined with our new equation will reduce the reflectance of the REM. This has obvious disadvantages and therefore the capping layer must be relatively thin otherwise there will be no reflectance increase attained from the REM. The capping layer, if it does not meet the criteria for reflectance enhancement, will decrease the reflectance to a greater degree in an opposite manner to which the refractive index will increase the reflectance. Therefore, layers with large real parts of the refractive index and low parts of the imaginary refractive index will decrease the reflectance the greatest. Obviously, as taught above the relative change in the reflectance is a function of the relative refractive indices between the two metals. The amount of change for a given thickness of film (3 nm in FIGS. 1, 2 and 3) can be estimated from the newly developed formulas. Preferably, a capping layer with noble characteristics should reduce the reflectance by less than 5%, more preferably less than 2.5% and most preferably less than 1.5%. The thickness of the capping metal layer with noble characteristics necessary to maintain these reflectance changes will vary with the refractive index properties of the REM but should be less than about 4 nm, preferably less than about 3 nm and most preferably less than about 2 nm. A TCO-based capping layer may meet the reflectance requirements at up to a 30 nm thickness.

Silver Alloys for Corrosion Resistance.

High reflectivity of silver makes this material particularly useful for mirrors and EC-mirrors. Specifically, in applications where the central portion of the mirror inside the peripheral ring has reflectance values greater than 60%, more preferably greater than 70% and most preferably greater than about 80%, and where matching of the ring's reflectance value to that of the central portion of the mirror is required, it is advantageous to use high-reflectance Ag-based materials for the peripheral ring instead of Chrome and noble metals. The requirements for a peripheral ring application are more stringent than those for a $3^{rd}$ surface reflector because all portions of the peripheral ring are visible to the user while portions of the $3^{rd}$ surface reflector next to electrical buss connections are hidden from the view and, therefore, allow for minor metal degradation and corrosion. Therefore, not only must the seal and electrical connections be maintained in environmental tests but the visual appearance of the coating must be maintained. Silver has limited corrosion resistance and electrochemical stability that originally limited its use as a third surface reflector electrode in EC-mirror systems. Dopants and stabilizing layers have been proposed and commercialized that give silver acceptable resistance to both CASS testing from a chemical durability perspective and electrochemical stability from a device electrical cycling perspective. A commonly-assigned U.S. Pat. No. 6,700,692 taught that platinum group metals, such as Pt and Pd along with Au were the preferred dopants for Ag, and that noble metals such as Ru, Rh and Mo were preferred materials for stabilization layers. No specific examples were given, however, that pertain specifically to the dopants alone and their effect on chemical or environmental durability of Ag. Prior art simply implied that the platinum group metals within the silver layer provide the electrochemical stability while the layers below (and/or above) the silver provide the CASS resistance.

We discovered non-obvious solutions that allow for substantial improvement of the durability of Ag and Ag-alloys through the use of alternate dopants and without stabilization layers. The basic structure of an underlying embodiment included Glass/125 nm ITO/50 nm silver or silver alloy/15 nm of ITO. Fully assembled EC-elements were run through the CASS testing and steam testing, while epoxy-sealed EC-cells without EC-medium were subjected to blow tests. Testing conditions were as follows: CASS testing was performed according to recognized industrial standards. In the steam tests the parts are held in an autoclave at approximately 13 psi and 120 C in a steam environment and checked once a day until failure. In the case of CASS two failure modes are noted—coating degradation and seal integrity. In the case of the steam tests, only seal failure is reported. In the blow test, a hole is drilled in a part, the part is gradually pressurized until failure occurs, and the pressure at failure is noted. A number of failure modes are possible in the Blow test but in this example, adhesion of the coating materials to the glass, adhesion of the coating materials to each other and adhesion of the coating materials to the epoxy are the failure modes of most interest.

Table 15 shows the CASS, Steam and Blow results, obtained with multiple samples, for pure silver and different silver alloys. The average values are presented for the Steam and Blow tests, while results of the CASS tests are expressed in days to failure. It is believed that ability of a material to survive approximately 2 days without coating damage (in CASS test) is sufficient for most vehicle interior applications. All CASS tests were stopped at 17 days or 400 hours, which corresponds to a relatively long exterior vehicle test. Depending on the application the CASS requirement may vary between these two extrema. The pure silver has the worst performance in the steam test, relatively poor CASS results, and relatively poor adhesion in the blow tests that demonstrated substantial intra-coating delamination. Samples made with the traditional dopants, Pd, Pt and Au, are also shown in Table 5. Improvements are demonstrated for the steam and blow tests relative to the pure silver but the CASS results are still not adequate. Similarly, the AgIn alloy has improved properties in Steam and Blow but the CASS results are improved but not adequate for all applications.

Silver alloys known as Optisil™ (supplied by APM Inc) were also evaluated. Three versions, 592, 595 and 598 were tested. The compositions are shown below in Table 16. Each version demonstrates substantial improvement relative to the pure silver with the Optisil 598 showing the best performance. The Optisil 598 has some coating lift in the blow tests but percentage of coating lift was very small and this also corresponded with the highest average blow value. Therefore, even though some lift is present, the results do not show significant failure mode for this material. The Optisil materials are viable for interior vehicle applications and some are viable for external applications also. A number of sterling silver alloys were tested. The specific compositions, based on analysis of the sputtering targets, are shown in Table 16. These particular alloys show substantial improvement over the pure silver. The Sterling "88" and 51140 alloys had the best performance of the group with the 51308 and Argentium having lesser performance. In the Optisil family, the lower levels of Cu and Zn provide better CASS resistance. For the Argentium, the copper and germanium additions help improve the CASS resistance. The "Sterling" samples benefited from the addition of copper (all), zinc and Si (88 and 51308) and Sn (51308).

TABLE 15

| | Days to Failure (Results are for all parts in test unless noted) | | | | |
|---|---|---|---|---|---|
| Material | CASS Coating | CASS Seal | Steam Day-To-Fail | Steam % Coating lift | Blow PSI |
| Ag 99.99% | 1 (1 part ok to day 12) | 1 (1 part ok to day 12) | 4.3 | 30 | 31.2[#] |
| Optisil 592 | 5.5 (2 part average) (2 parts ok to day 17) | 15 | 20.5 | 0.8 | 32.4 |
| Opti 595 | 17 | 17 | 20.2 | 15.8 | 30.1 |
| Optisil 598 | 17 | 17 | 24.3 | 0.83 | 41.5[#] |
| 83Ag/17In | 1 | 6.25 | 19.7 | 0 | 37.0 |

TABLE 15-continued

Days to Failure
(Results are for all parts in test unless noted)

| Material | CASS Coating | CASS Seal | Steam Day-To-Fail | Steam % Coating lift | Blow PSI |
|---|---|---|---|---|---|
| Ag94/Pt6 | 1 | 1 | 18.7 | 4.2 | 35.2# |
| Ag96/Pd3 | 1 | 1 | 12.2 | 86.7 | 39.4# |
| Argentium sterling | 1 (2 part average) (2 parts ok to day 17) | 5.5 (2 part average) (2 parts ok to day 17) | 27.3 | 0 | 38.1# |
| Sterling "88" | 17 | 9 (2 part average) (2 parts ok to day 17) | 21.3 | 0 | 28.5 |
| Sterling 51140* | 7 (1 part) (3 parts ok to day 17) | 7 (1 part) (3 parts ok to day 17) | 23.7 | 0 | 32.1 |
| Sterling 51308 | 8 | 8 | 20.7 | 8.3 | 34.6 |
| Ag93/Au7 | 1 | 1.33 | 13.3 | 25.8 | 29.2# |
| Ag16Au | 2 | 2 | 18.3 | 22.5 | 30.2 |
| Ag76/Au24 | 1 | 1.33 | 11.3 | 95.8 | 40.5 |

*These parts had some suspended data in steam tests, therefore actual average is higher than reported values
These part had some intra-coating adhesion failures

TABLE 16

Silver Alloy Compositions

| Name | Ag | Cu | Ge | Zn | Sn | Si | Au | In |
|---|---|---|---|---|---|---|---|---|
| Argentium | 91.73 | 6.879 | 1.329 | | | | | |
| Sterling 51308 | 92.76 | 2.775 | | 4.194 | 0.1097 | 0.0894 | 0.0153 | |
| Sterling 51140 | 92.18 | 7.779 | | | | | | |
| Sterling 88 | 92.49 | 5.5403 | | 1.8833 | | 0.0422 | | |
| Optisil 598 | 98.24 | 1.134 | | 0.4805 | | 0.088 | | |
| Optisil 595 | 95.04 | 2.761 | | 1.892 | 0.0573 | 0.2066 | | |
| Optisil 592 | 92.95 | 4.767 | | 2.064 | 0.1183 | 0.0577 | | |
| Ag/In | 82.82 | 0.0124 | | 0.0056 | | | 0.0114 | 17.13 |

Degradation of a material usually occurs in multiple ways, and there are often multiple possible protection pathways and the different elements doped into or alloyed with the silver can act to stabilize the metal thus improving its performance. The different silver alloys may contain one or more elements that act on one or more of the protection pathways to stabilize the silver. Silver often degrades by migration into a lower energy state. The silver atoms are 100 times more mobile along the boundary of an Ag-grain than within the bulk of the grain. Therefore, addition of an element migrating to the Ag-grain boundary and inhibiting the mobility of the silver is expected act to improve the durability of Ag. Metals such as Ti and Al are often corrosion resistant because they oxidize and the surface oxide seals the metal preventing further reactions. In the case of silver, elements may be added to the metal that act to protect the silver from the corrosive or degradation of environmental stressors. In other cases an element may be added that forms an alloy with the silver that alters the chemical or environmental activity of the silver. The Sterling silver alloys described above may, in part, contribute to this stabilization method. Still other methods to stabilize the silver include the use of an interface treatment as taught in Our Prior Applications, where sulfur or other element is embedded into the surface of a coating or substrate prior to the deposition of the silver or silver alloy. Out Prior Applications also taught the deposition of silver or a silver alloy onto a ZnO or other surface that puts the deposited material into a low energy state, thereby improving its environmental durability. The silver layer may also be protected by the application of metal or non-metal (oxide, nitrides, etc) either above or below the silver layer. Additionally, the silver or silver alloy may be protected by being overcoated with a relatively thick oxide layer such as ITO. It is recognized that variation of deposition conditions such as target shielding angles, target to substrate distance, composition of residual background gasses, speed of layer growth, e.g., may produce somewhat varying results. Nonetheless, the trend of improvement of various characteristics for noted materials noted is expected to hold over a range of parameters, particularly those typical for magnetron sputtering.

Specific elements that may be added to the silver that can enable one or more of the stabilization mechanisms described above include: Al, Zn, Cu, Sn, Si, Ge, Mn, Mg, W, Sb, B, Cr, Th, Ta, Li and In. These can be used either alone or in combination to enable good CASS performance, adequate Steam lifetime and good adhesion. Preferably, the CASS resistance should be greater than about 2 days, preferably greater than 5 days, more preferably greater than 10 days and most preferably greater than 17 days. The steam lifetime should be greater than 10 days, preferably greater than 15 days, and more preferably greater than 20 days. The coating stack should maintain adherence to glass, epoxy and within itself during adhesion tests. The blow test described above demonstrates relative performance among a set of samples but the test is dependent on mirror shape, pressure ramp rate, edge treatment and epoxy type as well as coating performance.

Aluminum Alloys for Corrosion Resistance.

As noted in other parts of this specification, aluminum has a high reflectance and, for that reason, is also of interest for fabrication of a peripheral ring. Though the use of this material in peripheral rings is known, no means of improving its chemical and environmental durability has been proposed. We discovered a variety of alloys of aluminum and dopants that improve the stability of aluminum in EC-element environment. Elements such as magnesium, manganese, silicon, copper, ruthenium, titanium, copper, iron, oxygen, nitrogen or palladium either alone or in combination with other elements in this group will improve the stability of the aluminum. Other elements may be present in the aluminum without deviating from the spirit of this invention. The amounts of these elements required for improvement of aluminum qualities may be between 50 and 0.1 weight-%, preferably between 40 and 0.5 weight-%, more preferably between about 25 and 0.5 weight-%, and most preferably between about 10 and 0.5 weight-%.

Table 17 shows the performance of different Al-based materials in the CASS test either as single layers or in stacks. The stack consists of 120 nm ITO/5 nm chrome/Al-based material/35 nm chrome/5 nm ruthenium. This stack is particularly well suited for a perimeter ring. The ITO provides the electrical conductivity for the EC-cell, the 5 nm chrome layer provided adhesion of different metals to the ITO, the Al-based material provides relatively high reflectance for the system, the 35 nm chrome provides opacity, and the 5 nm ruthenium provides good electrical conductivity and stability to a Ag-paste type electrical buss of he EC-element. The aluminum-based materials may be spatially uniform in composition or the composition may be graded across a part. A graded part is one in which the composition gradually changes from one composition to another composition across the part. The graded parts are produced in a combinatorial fashion using two three-inch sputter cathodes angled toward each other. The angle of the cathodes, the relative power and the composition of the targets mounted to each cathode can be varied to alter the composition across the substrate. The relative composition of the coating at different locations can be estimated using analytical techniques or from calibration experiments.

As shown in Table 17, the pure aluminum coating is degraded in less than a day in CASS testing. We discovered that stability of aluminum coatings varies with the thickness of the aluminum layer. In particular, the lifetime in CASS decreases as the thickness of the layer increases. A very thin layer, approximately 50 angstroms, has significantly superior stability lasting up to 17 days in CASS. We also unexpectedly discovered that Al deposited at high grazing angles in the combinatorial deposition system also had unexpectedly high stability, which can possibly be explained by the fact that a thin metallic layer incorporates more of the background gas into its matrix during deposition and the trace oxygen or water present during deposition is partially oxidizes the aluminum, thereby leading to the improved CASS stability. For improved stability, the oxygen content in the aluminum film should be below about 20%, preferably below about 10%, more preferably less than about 5%, and most preferably less than about 2.5%. The lower oxygen content has the added benefit of having a lesser impact on the optical properties of the aluminum. Alternatively, the crystal structure of the aluminum may vary with thickness. In this case the physical thickness of the layers themselves, rather than oxygen content is the mechanism leading to improved stability. The aluminum layer should be less than about 70 angstroms, preferably less than about 55 angstroms and most preferably less than about 40 angstroms. The reflectance of a stack may be tailored to a specific level by depositing a breaker layer in between multiple silver layers such as Al/SiO$_2$/Al/SiO$_2$/Al. The breaker layer should be relatively thin to avoid thin film interference colors, i.e., less than about 500 angstroms, preferably less than 250 angstroms and most preferably less than about 100 angstroms.

We also discovered that Al:Si compound, where the Si-content varies from about 40% to 10%, performs substantially better than the pure aluminum. The higher Si level of about 40% has CASS performance that is independent of thickness, while the lower Si content material (at about 10% level) demonstrates the CASS stability versus thickness of the layer similar to that of the pure aluminum.

Aluminum-titanium compounds were also evaluated. Titanium contents between about 50% and 25% show substantially improved CASS stability. Ruthenium added to AlTi or other aluminum compounds also substantially improved the performance even at very small levels. This additive, along with Pd, is expected to lead to improved CASS results in various aluminum-based materials.

TABLE 17

| Stack | Metal Details | Metal Thickness (angstroms) | CASS Performance |
| --- | --- | --- | --- |
| ITO/Cr/Metal/Cr/Ru | Al | 140 | <1 day |
| ITO/Cr/Metal/Cr/Ru | AlTi 70:30 | ~150-200 | 14 days |
| ITO/Cr/Metal/Cr/Ru | AlTi 50:50 | ~150-200 | 14 days |
| ITO/Cr/Metal/Cr/Ru | AlTi 75:25 | ~150-200 | 14 days |
| ITO/Cr/Metal/Cr/Ru | Al | 94 | <1 day |
| ITO/Cr/Metal/Cr/Ru | Al | 70 | <1 day |
| ITO/Cr/Metal/Cr/Ru | Al | 56 | 2 days |
| ITO/Cr/Metal/Cr/Ru | Al | 47 | very light damage up to 21 days |
| ITO/Cr/Metal/Cr/Ru | Al | 40 | very light damage up to 21 days |
| ITO/Cr/Metal/Cr/Ru | Al:Si 60:40 | 140 | >21 days |
| ITO/Cr/Metal/Cr/Ru | Al:Si 60:41 | 105 | >21 days |
| ITO/Cr/Metal/Cr/Ru | Al:Si 60:42 | 84 | >21 days |
| ITO/Cr/Metal/Cr/Ru | Al:Si 60:43 | 70 | >21 days |
| ITO/Cr/Metal/Cr/Ru | Al:Si 60:44 | 60 | >21 days |
| ITO/Cr/Metal/Cr/Ru | AlTiRu | ~150-200 | >17 |
| ITO/Cr/Metal/Cr/Ru | AlTiRu 90:8:2 | ~150-200 | >17 |

Optical properties of aluminum may be affected by added elements. Table 18 shows the refractive index of some of the aluminum-based materials. These values may be used in conjunction with the reflectance-enhancement-metal (REM) formula described above to determine the arrangements wherein these materials can be used to increase the reflectance of Al-based film.

TABLE 18

| Material | N | K |
| --- | --- | --- |
| Al60/Si40 | 3.13 | 4.49 |
| Al90/Si10 | 1.24 | 4.94 |
| Ti50/Al50 | 2.54 | 2.96 |
| Ti30/Al70 | 2.88 | 3.39 |

Other Materials Viable as REM with CASS Resistance

Copper alloys of Zinc and tin, known as brass and bronze, respectively, have good optical properties and function well as REM layers for a wide range of base metals and, depending on the composition, can have good CASS resistance. Navel brass, with a 60:40 Cu:Zn ratio and other trace elements, lasted up to 7 days in CASS while Cu:Sn at a 50:50 ratio also survived up to 7 days in CASS (both in a ITO/Cr/Metal/Cr/Ru stack described above for Al. It is expected that select alloys and compound of copper, alloyed with other elements will be suitable for use as REM layers. The homogeneous peripheral ring embodiments described herein are often preferred to match the reflectivity and color of the main mirror reflector. The color tolerancing described elsewhere in this document may be preferred in some applications. Additives to make brass more corrosion resistant include iron, aluminium, silicon nickel, tin and manganese. In certain applications, where a single phase is present in the brass, phosphorus, arsenic or antimony in levels of less than 0.1% can provide further stability. In some embodiments, having a zinc content of less than 15% may also provide benefits. Brasses known commonly as "Admiralty" or "Navel" brass may be particularly stable in corrosive environments. Bismuth bronze, a copper/zinc alloy with a composition of 52 parts copper, 30 part nickel, 12 parts zinc, 5 parts lead, and 1 part bismuth is quite stable. It is able to hold a good polish and so is sometimes used in light reflectors and mirrors. Additives to make copper-tin bronzes more corrosion resistant include phosphorus, zinc, aluminum, iron, lead, and nickel.

The homogeneous ring embodiments described herein are often preferred to match the reflectivity and color of the main mirror reflector. The color tolerancing described elsewhere in this document may be preferred in some applications.

Universal Thin Film Stacks.

The durable silver- and aluminum-based alloys are particularly useful as so-called universal materials. Depending on the requirements of a particular application, the reflectivity and color of the peripheral ring may vary. As more reflectivity levels of the ring are requested by the users, manufacturing of peripheral rings becomes challenging if multiple metals are needed to attain the desired reflectivity properties. If, for instance, different embodiments or applications require 35%, 45%, 55%, 65%, 75% or 85% reflectance, then up to 6 different materials could be used to attain the desired color match. It is often easier to lower the reflectance of a high reflectance metal rather than raise the reflectance of a lower reflectance metal. Therefore, in certain manufacturing scenarios a range of reflectance values can be obtained with a high reflectance metal by either reducing the thickness of the metal and optionally backing the layer with a low transmittance metal when opacity is needed. The REM formula described above can be used to assist selecting appropriate metal combinations. Another way to lower the reflectance of a high reflectance metal is to put a lower reflectance metal in front of it (relative to the viewer). The thickness of the lower reflectance metal can be increased to decrease the reflectance of the high reflectance metal. The silver and aluminum alloys described herein are particularly good in that they have excellent environmental durability, adhesion and high reflectance. Therefore, in a production environment, a number of commercial products may be produced simply by adjusting the thickness of a single layer. This leads to a particularly simple process for manufacturing thus reducing capital cost, development time and product durability.

Electrochromic Medium.

Preferably the chamber contains an electrochromic medium. Electrochromic medium is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium preferably includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. Nos. 6,193,912; 6,188,505; 6,262,832; 6,129,507; 6,392,783; and 6,249,369 disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572 or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201, the entire disclosure of which is incorporated herein by reference.

In at least one embodiment, a rearview mirror assembly is provided with an electro-optic element having a substantially transparent seal. Examples of substantially transparent seals and methods of forming substantially transparent seals are provided in U.S. Pat. No. 5,790,298, the entire disclosure of which is included herein by reference.

In at least one embodiment, the rearview mirror assembly is provided with a bezel 6580 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

It should be understood that the above description and the accompanying figures are for illustrative purposes and should in no way be construed as limiting the invention to the particular embodiments shown and described. The appending claims shall be construed to include all equivalents within the scope of the doctrine of equivalents and applicable patent laws and rules.

What is claimed is:

1. A vehicular rearview assembly having a front, the assembly comprising:
    a mirror element including a first substrate, an edge surface, and an at least partially reflective coating on a surface of the mirror element, the first substrate having a first surface that is unobstructingly observable from the front;
    a mounting structure juxtaposed with the mirror element, the mounting structure having a peripheral portion that substantially surrounds the edge surface of the mirror element, the peripheral portion having an outer surface that defines an annular region having a radius of curvature of greater than 2.5 mm;
    electronic circuitry disposed behind the mirror element inside the assembly;
    a user interface (UI) connected to the electronic circuitry; and
    indicia observable from the front and corresponding to at least one auxiliary device associated with the assembly;
    wherein the electronic circuitry is operable to trigger, in response to an input applied to the UI, at least one auxiliary device associated with the rearview assembly, and
    wherein a surface of the mirror element contains a plurality of electrically-conductive layers disposed thereon, said electrically-conductive layers being electrically isolated from one another by at least one separation area, of said surface, that is substantially devoid of electrically conductive material.

2. An assembly according to claim 1, wherein the plurality of electrically-conductive layers are disposed on a surface of the mirror element that is behind the first surface as viewed from the front of the assembly.

3. An assembly according to claim 1, wherein the mirror element has a beveled edge.

4. An assembly according to claim 1, further comprising a second substrate that is smaller than the first substrate, the second substrate positioned behind the first substrate as viewed from the front such as to create an offset between said first and second substrates along at least a portion of a perimeter of the mirror element.

5. An assembly according to claim 4, wherein the mirror element includes an electrochromic (EC) element defined by the first and second substrates and further comprising
    a perimeter seal material disposed along a perimeter of the second substrate such as to affix the first and second substrates together and define a chamber therebetween; and
    a ring of spectral filter material established around a perimeter of the first substrate to conceal the perimeter seal material from being observable from the front of the assembly.

6. An assembly according to claim 5, wherein an electrode layer of the EC element is electrically extended over an edge of the second substrate to the electronic circuitry through a conductive member.

7. An assembly according to claim 5, further comprising a reflective optical polarizer juxtaposed with a surface of said mirror element and including an optically-anisotropic plastic layer.

8. An assembly according to claim 7, further comprising a videodisplay behind the reflective optical polarizer.

9. An assembly according to claim 5, wherein said EC element has a thin-film stack on a surface thereof, which contains a succession of layers including a first insulator layer, a metallic layer, and a second insulator layer.

10. An assembly according to claim 5, wherein said EC element includes a thin-film coating on the second substrate, said thin-film coating including a first transflective zone having a first perimeter and a second zone that is substantially opaque to the UV light and visible light, the second zone having an outer perimeter and surrounding the first zone, the second zone adjoining said first zone along the first perimeter, the second zone extending under the perimeter seal material.

11. An assembly according to claim 5, wherein the outer perimeter of the second zone is configured to make the perimeter seal material visible through the second substrate.

12. An assembly according to claim 1, further comprising a proximity switch.

13. An assembly according to claim 12, wherein the proximity switch includes a capacitive switch.

14. An assembly according to claim 13, wherein at least one of said electrically-conductive layers is configured to operate as a sensing electrode of the capacitive switch of the assembly.

15. An assembly according to claim 1, wherein the at least one auxiliary device includes at least one of a source of light, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system and a tunnel detection system.

16. An assembly according to claim 1, wherein said peripheral portion includes an engaging protrusion and the mounting element further includes a housing shell with an outboard flange that mates with the engaging protrusion in an assembled state.

17. An assembly according to claim 1, wherein the at least partially-reflective coating of the first substrate contains an opaque optical thin-film ring of material disposed along a perimeter of the first substrate.

18. A vehicular rearview assembly having a front, the assembly comprising:
    an electrochromic (EC) mirror element including
        a first substrate having a first surface corresponding to the front, a second surface opposite to the first surface, a rounded edge configured to improve durability of the first substrate, the second surface having a ring of spectral filter material disposed circumferentially around a perimeter of the second surface;

a second substrate having third and fourth surfaces and an edge surface connecting third and fourth surfaces, the second substrate being smaller than and disposed in a parallel and spaced-apart relationships with respect to the first substrate such as (i) to define a gap between the second and third surfaces; (ii) to define an offset between the first and second substrates along at least a portion of a perimeter of the EC mirror element, and (iii) to conceal a perimeter of the second substrate behind the first substrate as viewed from the front, the second substrate carrying at least partially reflective coating on a surface thereof; and an EC medium in said gap;

a mounting structure juxtaposed with the EC mirror element and having a peripheral portion that surrounds at least a portion of the edge surface of the second substrate;

electronic circuitry disposed behind the EC mirror element inside the assembly;

a user interface (UI) at the front, the UI operably connected to the electronic circuitry; and indicia observable from the front and corresponding to at least one auxiliary device associated with the assembly;

wherein the electronic circuitry is operable to trigger, in response to an input applied to the UI, the at least one auxiliary device associated with the rearview assembly, and wherein a surface of the mirror element contains a plurality of electrically-conductive layers disposed thereon, said electrically-conductive layers being electrically isolated from one another by at least one separation area, of said surface, that is substantially devoid of electrically conductive material.

19. An assembly according to claim 18, wherein an edge of the front of the assembly has a radius of greater than 2.5 mm.

20. An assembly according to claim 18, wherein said rounded edge of the first substrate has a radius of greater than 2.5 mm.

21. An assembly according to claim 18, wherein an electrode layer of the EC element is electrically extended over an edge of the second substrate to the electronic circuitry through a conductive member.

22. An assembly according to claim 18, wherein a layer from the plurality of electrically-conductive layers is disposed on a surface of the mirror element that is behind the first surface as viewed from the front of the assembly.

23. An assembly according to claim 18, further comprising a proximity switch.

24. An assembly according to claim 23, wherein the proximity switch includes a capacitive switch.

25. An assembly according to claim 24, wherein at least one of said electrically-conductive layers is configured to operate as a sensing electrode of the capacitive switch of the assembly.

26. An assembly according to claim 18, wherein the mirror element has a beveled edge.

27. An assembly according to claim 18, further comprising a reflective optical polarizer juxtaposed with a surface of said mirror element and including an optically-anisotropic plastic layer, and a videodisplay behind said reflective optical polarizer.

28. An assembly according to claim 18, wherein the electronic circuitry is further operable to trigger, in response to an input applied to the front of the assembly, at least one auxiliary device associated with the rearview assembly.

29. An assembly according to claim 18, wherein the at least one auxiliary device includes at least one of a source of light adapted to transmit light through the first substrate toward the FOV, an illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system and a tunnel detection system.

30. A vehicular rearview assembly having a front and a front peripheral portion and comprising:

an electrochromic (EC) mirror element including
a first substantially transparent substrate having first and second surfaces;
a second substrate having third and fourth surfaces and an edge surface adjoining the third and fourth surfaces, the first and second substrates being sealed together in a spaced-apart relationship by a primary seal material circumferentially disposed between the second and third surfaces such as to form a chamber therebetween;
a first thin-film stack deposited on the second surface and containing an opaque optical thin-film ring of material disposed along a perimeter of the second surface; and
a second at least partially reflective thin-film coating covering a central portion of the third surface and extending under the primary seal material, the second thin-film coating including at least one electrically conductive layer that is electrically extended over the edge surface to the fourth surface through a conductive section;

wherein the first surface corresponds to the front of the assembly, wherein said optical thin-film ring is configured to conceal the primary seal material from being observable from the front; and wherein an edge of the first substrate is rounded to define a first curved surface and an edge of the second substrate is rounded to define a second curved surface, the first and second curved surfaces being congruent with a surface having a radius of at least 2.5 mm.

31. An assembly according to claim 30, wherein the second substrate has a notch at its peripheral portion and wherein said at least one electrically-conductive layer is electrically extended at the notch over the edge surface to the fourth surface through a conductive section.

32. An assembly according to claim 31, wherein the notch is filled, over the conductive section, with an optically diffusive translucent material extending outside of the edge surface.

33. An assembly according to claim 31, wherein the first substrate forms a ledge with respect to the edge surface at the notch of the second substrate and wherein said second surface contains, at said ledge, a plurality of electrically-conductive layers that are substantially electrically insulated from one another by at least one area, of the said second surface, that is substantially devoid of electrically-conductive material.

34. An assembly according to claim 30, further comprising at least one of a light source positioned to project light from the second substrate through the first substrate, an interior illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system and a tunnel detection system.

35. A vehicular rearview assembly having a front, the assembly comprising:
 a mirror element including a first substrate that is unobstructingly observable from the front, an edge surface, and an at least partially reflective coating on a surface of the mirror element;
 a mounting structure juxtaposed with the mirror element, the mounting structure having a peripheral portion that substantially surrounds the edge surface of the mirror element, the peripheral portion having an outer surface that defines an annular region having a radius of curvature of greater than 2.5 mm;
 electronic circuitry disposed behind the mirror element inside the assembly;
 a user interface (UI) connected to the electronic circuitry, said UI including a capacitive switch in operable communication with the first surface; and
 indicia observable from the front and corresponding to at least one auxiliary device associated with the assembly,
 wherein the electronic circuitry is operable to trigger, in response to an input applied to said capacitive switch, at least one auxiliary device associated with the rearview assembly, and
 wherein a surface of the mirror element contains a plurality of electrically-conductive layers disposed thereon, said electrically-conductive layers being electrically isolated from one another by at least one separation area, of said surface, that is substantially devoid of electrically conductive material.

36. A vehicular rearview assembly having a front, the assembly comprising:
 an electrochromic (EC) mirror element including
  a first substrate having a first surface corresponding to the front, a second surface opposite to the first surface, a rounded edge configured to improve durability of the first substrate, the second surface having a ring of spectral filter material disposed circumferentially around a perimeter of the second surface;
  a second substrate having third and fourth surfaces and an edge surface connecting third and fourth surfaces, the second substrate being smaller than and disposed in a parallel and spaced-apart relationships with respect to the first substrate such as (i) to define a gap between the second and third surfaces; (ii) to define an offset between the first and second substrates along at least a portion of a perimeter of the EC mirror element, and (iii) to conceal a perimeter of the second substrate behind the first substrate as viewed from the front, the second substrate carrying at least partially reflective coating on a surface thereof; and
  an EC medium in said gap;
 a mounting structure juxtaposed with the EC mirror element and having a peripheral portion that surrounds at least a portion of the edge surface of the second substrate;
 electronic circuitry disposed behind the EC mirror element inside the assembly;
 a user interface (UI) including a capacitive switch in operable communication with the first surface and the electronic circuitry; and
 indicia observable from the front and corresponding to at least one auxiliary device associated with the assembly,
 wherein the electronic circuitry is operable to trigger, in response to an input applied to the capacitive switch, the at least one auxiliary device associated with the rearview assembly, and
 wherein a surface of the mirror element contains a plurality of electrically-conductive layers disposed thereon, said electrically-conductive layers being electrically isolated from one another by at least one separation area, of said surface, that is substantially devoid of electrically conductive material.

37. A vehicular rearview assembly having a front and a front peripheral portion and comprising:
 an electrochromic (EC) mirror element including
  a first substantially transparent substrate having first and second surfaces;
  a second substrate having third and fourth surfaces and an edge surface adjoining the third and fourth surfaces, the first and second substrates being sealed together in a spaced-apart relationship by a primary seal material circumferentially disposed between the second and third surfaces such as to form a chamber therebetween;
  a first thin-film stack deposited on the second surface and containing an opaque optical thin-film ring of material disposed along a perimeter of the second surface; and
  a second at least partially reflective thin-film coating covering a central portion of the third surface and extending under the primary seal material;
 wherein the first surface corresponds to the front of the assembly,
 wherein said optical thin-film ring is configured to conceal the primary seal material from being observable from the front; and
 wherein an edge of the first substrate is rounded to define a first curved surface and an edge of the second substrate is rounded to define a second curved surface, the first and second curved surfaces being congruent with a surface having a radius of at least 2.5 mm.

38. A vehicular rearview assembly having a front and a front peripheral portion, the assembly comprising:
 an EC mirror element including
  a front substrate, the front substrate having a first surface that is unobstructingly observable from the front, a rounded edge, and a second surface carrying the first and second electrically-conductive coatings in a peripheral region thereof, the first and second electrically-conductive coatings being electrically separated from one another with a separation area, the first electrically-conductive coating including a ring of opaque material disposed around a perimeter of the second substrate; and
  a rear substrate behind the first substrate as viewed from the front, the rear substrate having a third surface, an edge surface, and a fourth surface opposite the third surface, and further having a reflective thin-film stack deposited on a surface thereof;
 a mounting element adapted to support the EC mirror element;
 a housing shell defining an inner volume and an aperture corresponding to the front, the housing shell being configured to mechanically engage the mounting element;
 an electronic circuitry disposed behind the mirror element inside the housing shell; and a user interface (UI) in operable communication with said electronic circuitry, the UI containing mechanically-moveable triggering elements at a bottom portion of the housing shell and reachable from the front, said triggering elements corresponding to at least one auxiliary device associated with the rearview assembly, wherein the electronic circuitry is operable to trigger, in response to an input applied to said triggering elements, the at least one auxiliary device.

* * * * *